(12) United States Patent
Kwak et al.

(10) Patent No.: US 11,075,705 B2
(45) Date of Patent: *Jul. 27, 2021

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Minsung Kwak, Seoul (KR); Kyoungsoo Moon, Seoul (KR); Woosuk Kwon, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,860

(22) Filed: Sep. 13, 2019

(65) Prior Publication Data

US 2020/0007250 A1      Jan. 2, 2020

Related U.S. Application Data

(63) Continuation of application No. 15/307,734, filed as application No. PCT/KR2016/000058 on Jan. 5, 2016, now Pat. No. 10,454,602.

(Continued)

(51) Int. Cl.
*H04H 20/59*      (2008.01)
*H04N 7/08*       (2006.01)
(Continued)

(52) U.S. Cl.
CPC .............. *H04H 20/59* (2013.01); *H04N 7/08* (2013.01); *H04N 21/478* (2013.01);
(Continued)

(58) Field of Classification Search
CPC .. H04H 20/59; H04N 21/478; H04N 21/6112; H04N 21/814; H04N 7/08;
(Continued)

(56) References Cited

U.S. PATENT DOCUMENTS 8,026,806 B2 *   9/2011   Hasek .................. H04N 21/435
                                                  340/539.16
9,060,071 B1     6/2015   Wagner
(Continued)

FOREIGN PATENT DOCUMENTS

JP   2012-105361 A    5/2012
KR   10-2010-0033349 A   3/2010
(Continued)

OTHER PUBLICATIONS

3GPP TS 13.167, version 12.0.0 disclose IP Multimedia Subsystem (IMS) emergency sessions. (Year: 2012).*

*Primary Examiner* — Un C Cho
*Assistant Examiner* — Peter K Mak
(74) *Attorney, Agent, or Firm* — Birch, Stewart, Kolasch & Birch, LLP

(57) ABSTRACT

A method of processing a broadcast signal includes physical layer processing a plurality of packets into a plurality of data pipes to form a signal frame of the broadcast signal. Further, a packet includes an emergency alert message for an emergency alert service so that a data pipe carries the emergency alert massage, the emergency alert message including a message identifier (ID) for identifying the emergency alert message and a service ID identifying a service related to the emergency alert message. The physical layer processing (Continued)

further includes encoding data in each data pipe; bit interleaving the encoded data in each data pipe; and time interleaving the bit interleaved data in each data pipe according to a first mode or a second mode, the first mode represents that the time interleaving is performed based on convolutional interleaving operation, the second mode represents that the time interleaving is performed based on a combination of block interleaving operation and convolutional interleaving operation; and transmitting the broadcast signal. In addition, the broadcast signal further includes physical layer signaling information, the physical layer signaling information including a signaling information representing that the data pipe carries the emergency alert message and time interleaving signaling information related to the first mode and the second mode.

8 Claims, 82 Drawing Sheets

Related U.S. Application Data

(60) Provisional application No. 62/119,262, filed on Feb. 22, 2015, provisional application No. 62/100,081, filed on Jan. 6, 2015.

(51) Int. Cl.
| | |
|---|---|
| *H04N 21/81* | (2011.01) |
| *H04N 21/61* | (2011.01) |
| *H04W 4/90* | (2018.01) |
| *H04W 4/06* | (2009.01) |
| *H04N 21/478* | (2011.01) |

(52) U.S. Cl.
CPC ....... *H04N 21/6112* (2013.01); *H04N 21/814* (2013.01); *H04W 4/06* (2013.01); *H04W 4/90* (2018.02)

(58) Field of Classification Search
CPC .......... H04W 4/06; H04W 4/22; H04W 4/90; H04M 1/72536; H04M 2242/04; H04M 7/006
See application file for complete search history.

(56) References Cited

U.S. PATENT DOCUMENTS

| | | | |
|---|---|---|---|
| 2002/0160745 A1* | 10/2002 | Wang | H04L 29/06 455/404.1 |
| 2006/0046687 A1* | 3/2006 | Kwon | G08B 25/007 455/404.1 |
| 2007/0004377 A1* | 1/2007 | Medford | H04M 3/42357 455/404.1 |
| 2007/0286152 A1 | 12/2007 | Prakash et al. | |
| 2009/0097845 A1 | 4/2009 | Campbell | |
| 2009/0296688 A1 | 12/2009 | Bakker et al. | |
| 2010/0075591 A1 | 3/2010 | Eyer et al. | |
| 2010/0105351 A1 | 4/2010 | Xu et al. | |
| 2010/0124898 A1 | 5/2010 | Qu et al. | |
| 2011/0287735 A1 | 11/2011 | Xing | |
| 2013/0065550 A1 | 3/2013 | Green et al. | |
| 2015/0071217 A1 | 3/2015 | Doi et al. | |
| 2015/0111519 A1 | 4/2015 | Li et al. | |
| 2016/0316024 A1 | 10/2016 | Di Benedetto et al. | |

FOREIGN PATENT DOCUMENTS

| | | |
|---|---|---|
| KR | 10-2011-0060532 A | 6/2011 |
| KR | 10-2011-0060939 A | 6/2011 |
| KR | 10-1119250 B1 | 2/2012 |

* cited by examiner

FIG. 2

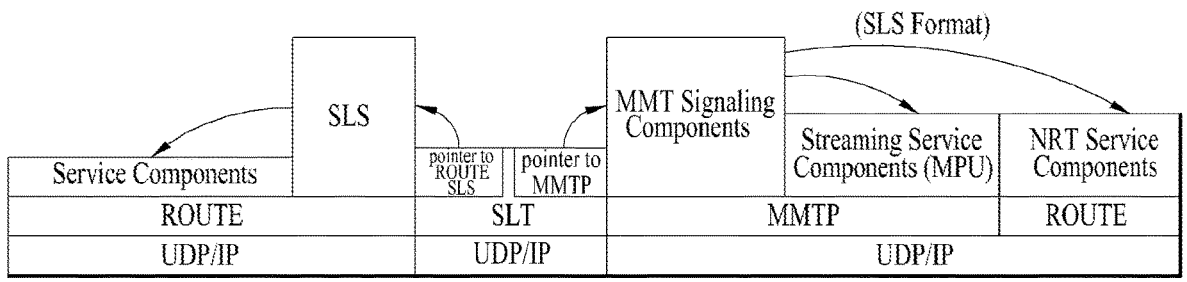

FIG. 3

| Element or Attribute Name | | Use |
|---|---|---|
| SLT | | |
| | @bsid | 1 |
| | @sltSectionVersion | 1 |
| | @sltSectionNumber | 0..1 |
| | @totalSltSectionNumbers | 0..1 |
| | @language | 0..1 |
| | @capabilities | 0..1 |
| | InetSigLoc | 0..1 |
| | Service | 1..N |
| |   @serviceId | 1 |
| |   @SLT serviceSeqNumber | 1 |
| |   @protected | 0..1 |
| |   @majorChannelNo | 1 |
| |   @minorChannelNo | 1 |
| |   @serviceCategory | 1 |
| |   @shortServiceName | 1 |
| |   @hidden | 0..1 |
| |   @sls ProtocolType | 1 |
| |   BroadcastSignaling | 0..1 |
| |   @slsPlpId | 0..1 |
| |   @slsDestinationIpAddress | 0..1 |
| |   @slsDestinationUdpPort | 0..1 |
| |   @slsSourceIpAddress | 0..1 |
| |   @slsMajorProtocolVersion | 0..1 |
| |   @SlsMinorProtocolVersion | 0..1 |
| |   @serviceLanguage | 0..1 |
| |   @broadbandAccessRequired | 0..1 |
| |   @capabilities | 0..1 |
| |   InetSigLoc | 0..1 |

FIG. 5

| Element or Attribute Name | | | | Use |
|---|---|---|---|---|
| bundleDescription | | | | |
| | userServiceDescription | | | |
| | | @serviceId | | M |
| | | @atsc: serviceId | | M |
| | | @atsc: serviceStatus | | OD |
| | | @atsc: fullMPDUri | | M |
| | | @atsc: sTSIDUri | | M |
| | | name | | 0..N |
| | | | lang | CM |
| | | serviceLanguage | | 0...N |
| | | atsc: capabilityCode | | 0...1 |
| | | deliveryMethod | | 1..N |
| | | | r12: broadcastAppService | 1..N |
| | | | basePattern | 1..N |
| | | | r12: unicastAppService | 0..N |
| | | | basePattern | 1..N |

FIG. 6

| Element and Attribute Names | | | | Use |
|---|---|---|---|---|
| S - TSID | | | | |
| | @serviceId | | | O |
| | RS | | | 1..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

FIG. 7

| Element or Attribute Name | | | | | Use |
|---|---|---|---|---|---|
| bundleDescription | | | | | |
| | userServiceDescription | | | | |
| | | @serviceId | | | M |
| | | @atsc: serviceId | | | M |
| | | Name | | | 0..N |
| | | | Lang | | CM |
| | | serviceLanguage | | | 0..N |
| | | atsc: capabilityCode | | | 0..1 |
| | | atsc: Channel | | | 1 |
| | | | @atsc: majorChannelNo | | M |
| | | | @atsc: minorChannelNo | | M |
| | | | @atsc: serviceLang | | O |
| | | | @atsc: serviceGenre | | O |
| | | | @atsc: serviceIcon | | M |
| | | | atsc: ServiceDescription | | 0..N |
| | | | | @atsc: serviceDescrText | M |
| | | | | @atsc: serviceDescrLang | O |
| | | atsc:mpuComponent | | | 0..1 |
| | | | @atsc: mmtPackageId | | M |
| | | | @atsc: next MmtPackageId | | O |
| | | atsc: routeComponent | | | 0..1 |
| | | | @atsc: sTSIDUri | | M |
| | | | @slsPlpId | | OD |
| | | | @slsDestinationIpAddress | | OD |
| | | | @slsDestinationUdpPort | | M |
| | | | @slsSourceIpAddress | | M |
| | | | @slsMajorProtocolVersion | | OD |
| | | | @SlsMinorProtocolVersion | | OD |
| | | atsc: broadbandComponent | | | 0..1 |
| | | | @atsc: fullfMPDUri | | M |
| | | atsc: ComponentInfo | | | 1..N |
| | | | @atsc: component Type | | M |
| | | | @atsc: component Role | | M |
| | | | @atsc: component ProtectedFlag | | OD |
| | | | @atsc: component Id | | M |
| | | | @atsc: component Name | | O |

FIG. 13
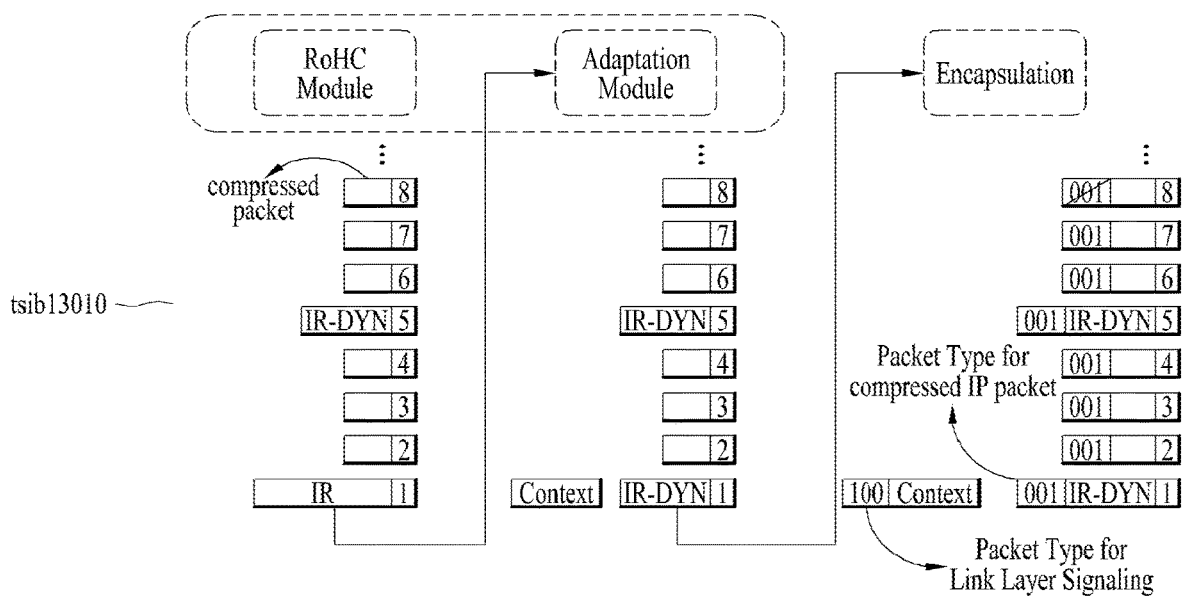
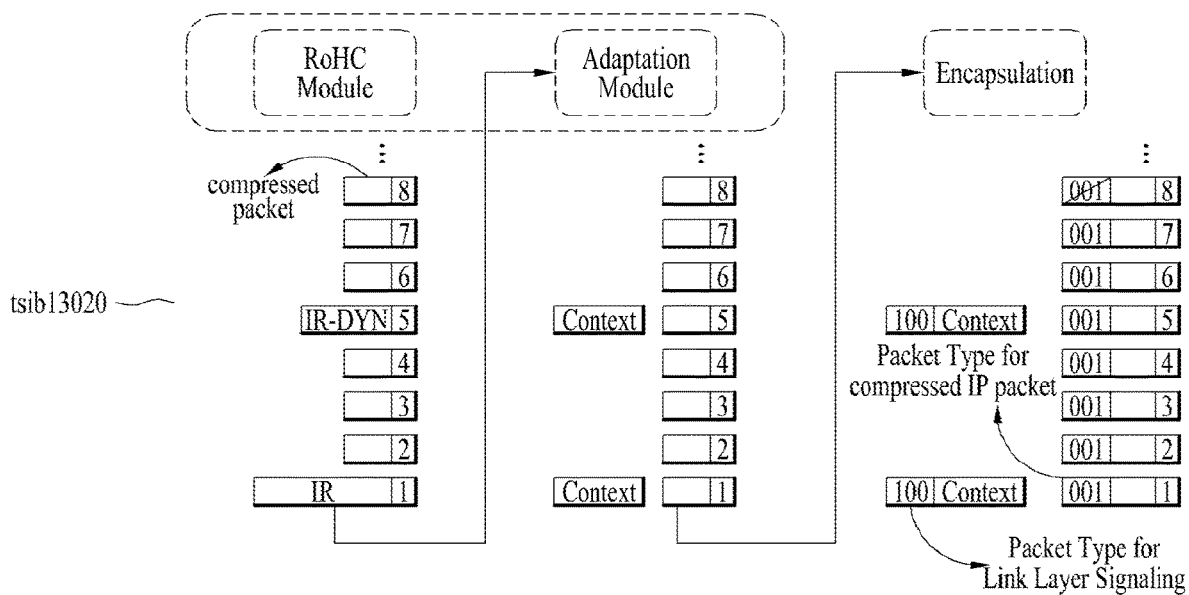

FIG. 14

| Syntax | Number of bits | Mnemonic |
|---|---|---|
| Link_Mapping_Table() { | | |
| signaling_type | 8 | "0x01" |
| PLP_ID | 6 | uimsbf |
| Reserved | 2 | |
| num_session | 8 | uimsbf |
| for(i=0; i<num_session; i++) { | | |
| src_IP_add | 32 | uimsbf |
| dst_IP_add | 32 | uimsbf |
| src_UDP_port | 16 | uimsbf |
| dst_UDP_port | 16 | uimsbf |
| SID_flag | 1 | bslbf |
| compressed_flag | 1 | bslbf |
| reserved | 6 | '000000' |
| if(SID_flag == "1") { | | |
| SID | 8 | uimsbf |
| } | | |
| if(compressed_flag == "1") { | | |
| context_id | 8 | uimsbf |
| } | | |
| } | | |
| } | | |

— tsib14010

| Syntax | Number of bits | Mnemonic |
|---|---|---|
| ROHC-U_description_table { | | |
| signaling_type | 8 | "0x02" |
| PLP_ID | 6 | uimsbf |
| adaptation_mode | 2 | uimsbf |
| context_config | 2 | bslbf |
| reserved | 6 | bslbf |
| context_id | 8 | uimsbf |
| context_profile | 8 | uimsbf |
| if(context_config = 0x01) { | | |
| context_length | 8 | uimsbf |
| static_chain_byte () | var | |
| } | | |
| else if(context_config = 0X02) { | | |
| context_length | 8 | uimsbf |
| dynamic_chain_byte () | var | uimsbf |
| } | | |
| else if(context_config = 0x03) { | | |
| context_length | 8 | uimsbf |
| static_chain_byte () | var | uimsbf |
| dynamic_chain_byte () | var | uimsbf |
| } | | |
| } | | |

— tsib14020

(a)
$S_{demux\_in}(i) = \{b_i(0), b_i(1), b_i(2), ..., b_i(\eta_{MOD}-1)\},$
$S_{demux\_out}(i) = \{c_i(0), c_i(1), c_i(2), ..., c_i(\eta_{MOD}-1)\},$
$c_i(1) = b_i(i\%\eta_{MOD}), c_i(2) = b_i((i+1)\%\eta_{MOD}), ..., c_i(\eta_{MOD}-1) = b_i((i+1)\%\eta_{MOD})$ a) Bit-Interleaving Output b) Bit-Demultiplexer Output

FIG. 24

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4<br> |
| PLS2_FEC_TYPE<br>PLS2_MOD<br>PLS2_SIZE_CELL<br>PLS2_STAT_SIZE_BIT<br>PLS2_DYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 25

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID | 6 |
| | DP_START | 15 (or13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |

FIG. 33

The main-PRBS generator is defined based on the $(N_a-1)$-bit binary word sequence $R_n$ with $N_a = \log_2 N_{max}$ $0 \leq n < 2$
$\quad R_n[N_a-2, N_a-3, \ldots, 1, 0] = 0, 0, , \ldots, 0, 0$
$n = 2$
$\quad R_n[N_a-2, N_a-3, \ldots, 1, 0] = 0, 0, , \ldots, 0, 1$
$2 < n < N_{max}$
$\quad R_n[N_a-3, N_a-4, \ldots, 1, 0] = R_n[N_a-2, N_a-3, \ldots, 2, 1]$
where
$R_n[N_a-2]$ is defined as:

in 8K FFT mode: $R_n[11] = R_{n-1}[0] \oplus R_{n-1}[1] \oplus R_{n-1}[4] \oplus R_{n-1}[6]$
in 16K FFT mode: $R_n[12] = R_{n-1}[0] \oplus R_{n-1}[1] \oplus R_{n-1}[4] \oplus R_{n-1}[5] \oplus R_{n-1}[9] \oplus R_{n-1}[11]$
in 32K FFT mode: $R_n[13] = R_{n-1}[0] \oplus R_{n-1}[1] \oplus R_{n-1}[2] \oplus R_{n-1}[12]$ (a)

| FFT mode | Nmax |
|---|---|
| 8K | 8192 |
| 16K | 16384 |
| 32K | 32768 |

The sub-PRBS generator is defined based on the $(N_b-1)$-bit binary word sequence $G_k$ with $N_b = \log_2 (0.5 N_{max})$ $0 \leq k < 4$
$\quad G_k[N_b-2, N_b-3,\ldots,1,0] = 0,0,,\ldots,0,0$
$k = 4$
$\quad G_k[N_b-2, N_b-3,\ldots,1,0] = 1,1,,\ldots,1,1$
$4 < k < N_{max}$
$\quad G_k[N_b-3, N_b-4,\ldots,1,0] = G_k[N_b-2, N_b-3,\ldots,2,1]$ where
$\quad G_k[N_b-2]$ is defined as:

in 8K FFT mode: $G_k[10] = G_{k-1}[0] \oplus G_{k-1}[2]$
in 16K FFT mode: $G_k[11] = G_{k-1}[0] \oplus G_{k-1}[1] \oplus G_{k-1}[4] \oplus G_{k-1}[6]$
in 32K FFT mode: $G_k[12] = G_{k-1}[0] \oplus G_{k-1}[1] \oplus G_{k-1}[4] \oplus G_{k-1}[5] \oplus G_{k-1}[9] \oplus G_{k-1}[11]$ (a)

$p = 0;$
$for \ (n=0; n < N_{max}; n = n+1)$
$\quad \{T(n) = (n \bmod 2) \cdot 2^{N_a-1} + \sum_{i=0}^{N_a-2}(2^i \ ?R_n[i]);$
$\quad S_l(n) = (T(n) + A_{\lfloor l/2 \rfloor}) \bmod N_{max};$
$\quad if \ S_l(n) < N_{data}$
$\quad \quad \{H_l(p) = S_l(n);$
$\quad \quad p = p+1; \}$
$\quad \}$ $(n \bmod 2) \cdot 2^{N_a-1}$ denotes 1-bit toggling, i.e., , $R_n[N_a-1] = 0,1,0,1,\ldots$ and the cyclic-shifting value $A_{\lfloor l/2 \rfloor}$ is calculated for every OFDM symbol pair (b)

FIG. 35

FIG. 36
| PLP_NUM | 1 | >1 |
|---|---|---|
| Interleaving type | CI | CI+BI |
FIG. 37
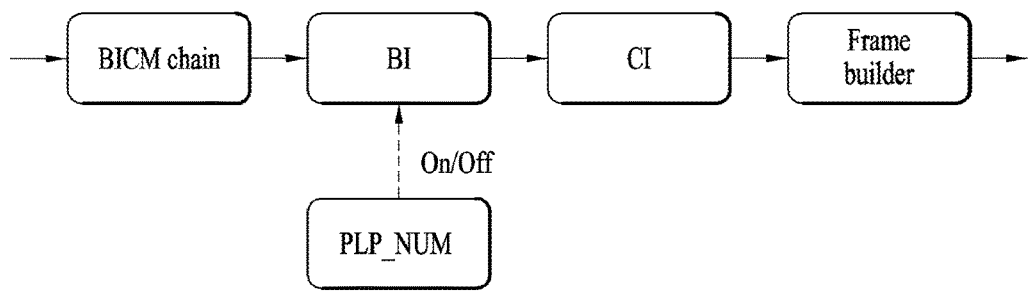
<Hybrid TI structure: example-1>
FIG. 38
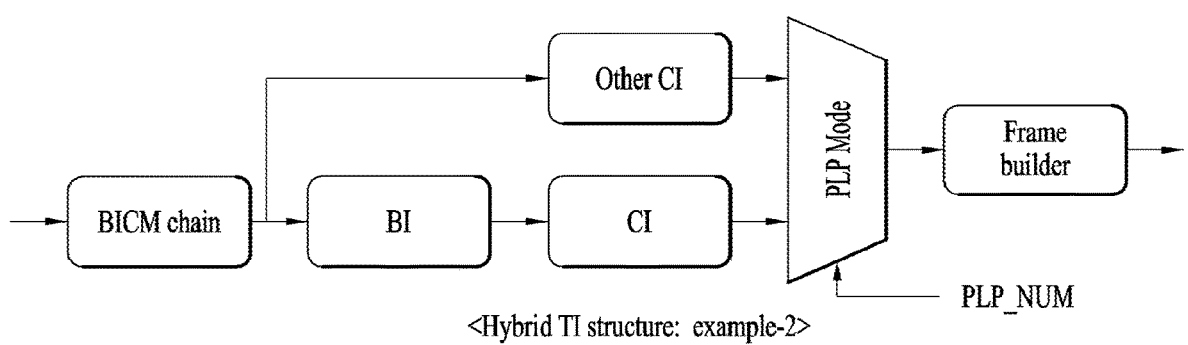
<Hybrid TI structure: example-2>

<Hybrid TI structure: example-1>

<Hybrid TI structure: example-2>

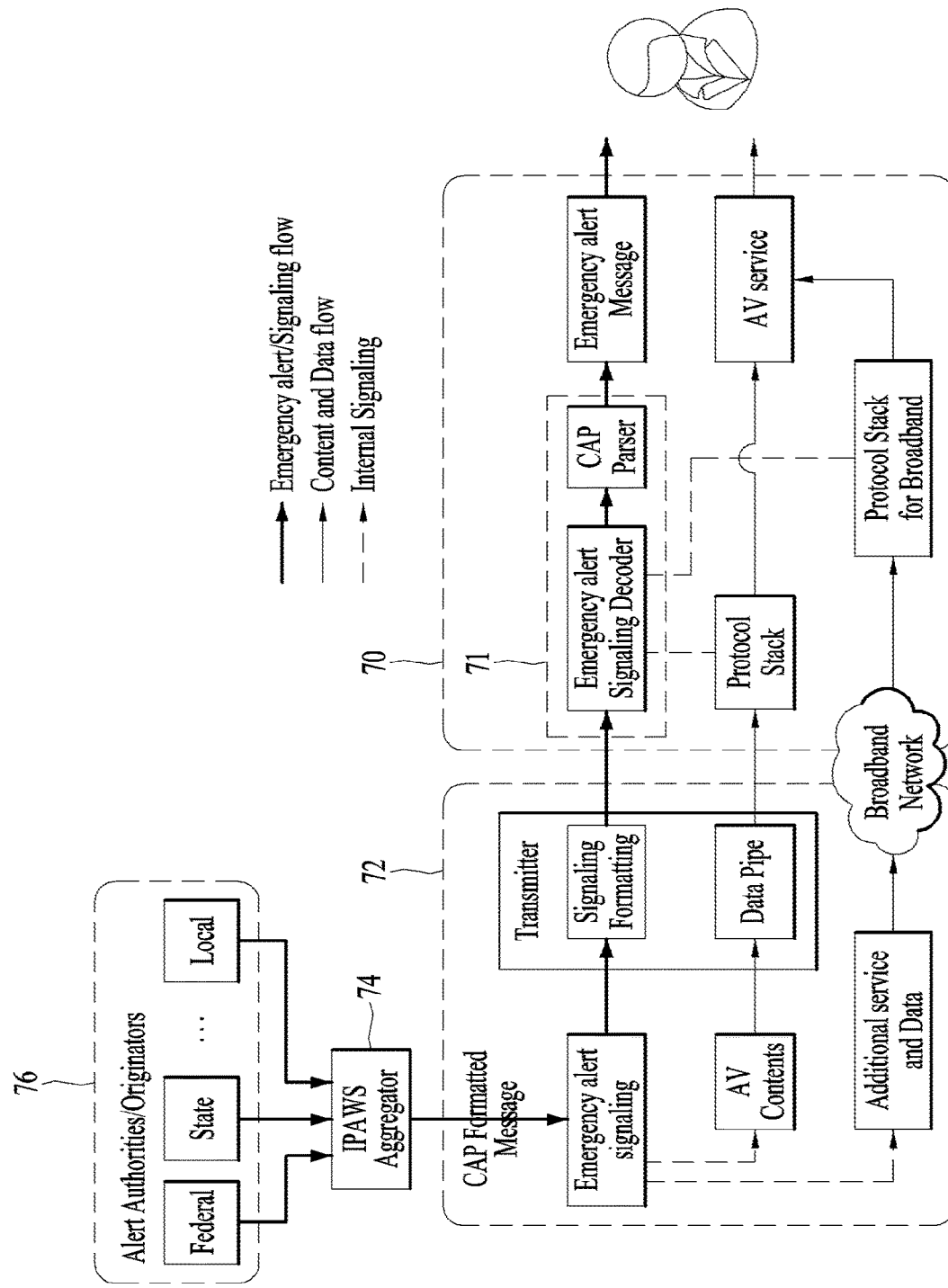

FIG. 45

| Syntax | No. Bits | Format |
|---|---|---|
| EAT_Information ( ) { | | |
|     EAT_protocol_version | var | uimsbf |
|     automatic_tuning_flag | var | bslbf |
|     num_EAS_messages | var | uimsbf |
| } | | |

FIG. 46

| Syntax | No. Bits | Format |
|---|---|---|
| Emergency_Alert_Message ( ) { | | |
|     EAS_message_id | 32 | uimsbf |
|     EAS_IP_version_flag | 1 | bslbf |
|     EAS_message_transfer_type | 3 | uimsbf |
|     EAS_message_encoding_type | 3 | uimsbf |
|     EAS_NRT_flag | 1 | bslbf |
|     if(EAS_message_transfer_type == 0x02) { | | |
|         reserved | 4 | '1111' |
|         EAS_message_length /* N */ | 12 | uimsbf |
|         EAS_message_bytes( ) | 8*N | var |
|     } | | |
|     else if (EAS_message_transfer_type == 0x03) { | | |
|         IP_address | 32 or 128 | uimsbf |
|         UDP_port_num | 16 | uimsbf |
|         DP_id | 8 | uimsbf |
|     } | | |
| } | | |

FIG. 47

| Syntax | No. Bits | Format |
|---|---|---|
| Automatic_Tuning_Info ( ) { | | |
|     automatic_tuning_channel_number | 8 | uimsbf |
|     automatic_tuning_DP_id | 8 | uimsbf |
|     automatic_tuning_service_id | 16 | uimsbf |
| } | | |

FIG. 48

| Syntax | No. Bits | Format |
|---|---|---|
| NRT_Service_Info () { | | |
|     EAS_NRT_service_id | 16 | uimsbf |
| } | | |

FIG. 49

| Syntax | No. Bits | Format |
|---|---|---|
| Emergency_Alert_Table ( ) { | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     table_id_extension { | | |
|         EAT_protocol_version | 8 | 0x0 |
|         reserved | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     automatic_tuning_flag | 1 | bslbf |
|     num_EAS_messages | 7 | uimsbf |
|     If (automatic_tuning_flag == '1') { | | |
|         Automatic_Tuning_Info () | var | var |
|     } | | |
|     for (m=0; m< num_EAS_messages; m++) { | | |
|         Emergency_Alert_Message () | var | var |
|         if(EAS_NRT_flag == '1') | | |
|             NRT_Service_Info () | var | var |
|     } | | |
| } | | |

FIG. 50

| Syntax | No. Bits | Format |
|---|---|---|
| Emergency_Alert_Table () { | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     table_id_extension { | | |
|         EAT_protocol_version | 8 | 0x0 |
|         reserved | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     automatic_tuning_flag | 1 | bslbf |
|     num_EAS_messages | 7 | uimsbf |
|     If (automatic_tuning_flag == '1') { | | |
|         automatic_tuning_channel_number | 8 | uimsbf |
|         automatic_tuning_DP_id | 8 | uimsbf |
|         automatic_tuning_service_id | 16 | uimsbf |
|     } | | |
|     for (m=0; m< num_EAS_messages; m++) { | | |
|         EAS_message_id | 32 | uimsbf |
|         EAS_IP_version_flag | 1 | bslbf |
|         EAS_message_transfer_type | 3 | uimsbf |
|         EAS_message_encoding_type | 3 | uimsbf |
|         EAS_NRT_flag | 1 | bslbf |
|         if(EAS_message_transfer_type == 0x02) { | | |
|             reserved | 4 | '1111' |
|             EAS_message_length /* N */ | 12 | uimsbf |
|             EAS_message_bytes() | 8*N | var |
|         } | | |
|         else if (EAS_message_transfer_type == 0x03) { | | |
|             IP_address | 32 or 128 | uimsbf |
|             UDP_port_num | 16 | uimsbf |
|             DP_id | 8 | uimsbf |
|         } | | |
|         if(EAS_NRT_flag == '1') { | | |
|             EAS_NRT_service_id | 16 | uimsbf |
|         } | | |
|     } | | |
| } | | |

FIG. 57

| Syntax | No. Bits | Format |
|---|---|---|
| Fast_Information_Chunk( ){ | | |
|     FIT_data_version | 8 | uimsbf |
|     num_broadcast | 8 | uimsbf |
|     emergency_alert_flag | 1 | bslbf |
|     reserved | 7 | bslbf |
|     If (emergency_alert_flag == '1') { | | |
|         automatic_tuning_flag | 1 | bslbf |
|         num_EAS_messages | 7 | uimsbf |
|         If (automatic_tuning_flag == '1') { | | |
|             Automatic_Tuning_Info ( ) | var | var |
|         } | | |
|         for (m=0; m< num_EAS_messages; m++) { | | |
|             Emergency_Alert_Message ( ) | var | var |
|             NRT_Service_Info ( ) | var | var |
|         } | | |
|     } | | |
|     for(i=0;i<num_broadcast;i++){ | | |
|         broadcast_id | 16 | uimsbf |
|         delivery_system_id | 16 | uimsbf |
|         base_DP_id | 8 | uimsbf |
|         base_DP_version | 5 | uimsbf |
|         reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for(k=0;k<num_component;k++){ | | |
|                 component_id | 8 | bslbf |
|                 DP_id | 8 | bslbf |
|                 RoHC_init_descriptor( ) | var | |
|             } | | |
|         } | | |
|     } | | |
| } | | |

FIG. 59

| Syntax | No. Bits | Format |
|---|---|---|
| Fast_Information_Chunk( ){ | | |
|     FIT_data_version | 8 | uimsbf |
|     num_broadcast | 8 | uimsbf |
|     emergency_alert_flag | 1 | bslbf |
|     reserved | 7 | bslbf |
|     If (emergency_alert_flag == '1') { | | |
|         automatic_tuning_flag | 1 | bslbf |
|         num_EAS_messages | 7 | uimsbf |
|         If (automatic_tuning_flag == '1') { | | |
|             Automatic_Tuning_Info ( ) | var | var |
|         } | | |
|         for (m=0; m< num_EAS_messages; m++) { | | |
|             EAS_message_id | 32 | uimsbf |
|             EAS_DP_id | 8 | bslbf |
|         } | | |
|     } | | |
|     for(i=0;i<num_broadcast;i++){ | | |
|         broadcast_id | 16 | uimsbf |
|         delivery_system_id | 16 | uimsbf |
|         base_DP_id | 8 | uimsbf |
|         base_DP_version | 5 | uimsbf |
|         reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for(k=0;k<num_component;k++){ | | |
|                 component_id | 8 | bslbf |
|                 DP_id | 8 | bslbf |
|                 RoHC_init_descriptor( ) | var | |
|             } | | |
|         } | | |
|     } | | |
| } | | |

FIG. 64

| Syntax | No. Bits | Format |
|---|---|---|
| Link_Layer_Packet_Header( ) { | | |
|     Packet_Type | 3 | '110' |
|     Payload_Config | 1 | bslbf |
|     if (Payload_Config =="0") { | | |
|         Count | 4 | uimsbf |
|         Signaling_Class | 3 | bslbf |
|         Information_Type | 3 | bslbf |
|         Signaling_Format | 2 | bslbf |
|         if (Signaling_Format =="1x") { | | |
|             for(i=0; i<Count; i++) { | | |
|                 Length | 16 | uimsbf |
|             } | | |
|         } | | |
|     } | | |
|     else { | | |
|         Last_Segment_Indicator | 1 | bslbf |
|         Segment_ID | 3 | uimsbf |
|         Segment_Sequence_Number | 4 | uimsbf |
|         if (Last_Segment_Indicator =="0") { | | |
|             Segment_Length_ID | 4 | bslbf |
|             if (Segment_Sequence_Number =="0000") { | | |
|                 Signaling_Class | 3 | bslbf |
|                 Information_Type | 3 | bslbf |
|                 Signaling_Format | 2 | bslbf |
|             } | | |
|         } | | |
|         else { | | |
|             Last_Segment_Length | 12 | uimsbf |
|         } | | |
|     } | | |
| } | | |

FIG. 65

| Signaling Class | Description |
|---|---|
| 000 | Signaling for Channel Scan and Service Acquisition |
| 001 | Signaling for Emergency Alert |
| 010 | Signaling for Header Compression |
| 011 | Reserved |
| 100 | Reserved |
| 101 | Reserved |
| 110 | Reserved |
| 111 | Various |

FIG. 66

| Information Type for Emergency Alert | Description |
|---|---|
| 000 | Emergency Alert Message |
| 001 | Link of Emergency Alert Message |
| 010 | Automatic Tuning Information |
| 011 | NRT Service Information |
| 100 | Reserved |
| 101 | Reserved |
| 110 | Reserved |
| 111 | Wake up indication |

FIG. 67

| Syntax | No. Bits | Format |
|---|---|---|
| Payload_for_Emergency_Alert_Message ( ) { | | |
|     EAS_message_id | 32 | uimsbf |
|     EAS_message_encoding_type | 4 | uimsbf |
|     EAS_message_version | 4 | uimsbf |
|     EAS_message_protocol | 4 | uimsbf |
|     EAS_message_length | 12 | uimsbf |
|     EAS_message_bytes() | 8*N | var |
| } | | |

FIG. 69

| Syntax | No. Bits | Format |
|---|---|---|
| Payload_for_Emergency_Alert_Message () { | | |
|     EAS_message_id | 32 | uimsbf |
|     EAS_message_encoding_type | 4 | uimsbf |
|     EAS_message_version | 4 | uimsbf |
|     EAS_message_protocol | 4 | uimsbf |
|     message_link_type | 4 | uimsbf |
|     if (message_link_type =="0000") { | | |
|         IP_address | 32 or 128 | uimsbf |
|         UDP_port_num | 16 | uimsbf |
|         DP_id | 8 | uimsbf |
|     } | | |
|     else if (message_link_type =="0001") { | | |
|         EAS_channel_number | 8 | uimsbf |
|         EAS_DP_id | 8 | uimsbf |
|         EAS_service_id | 16 | uimsbf |
|     } | | |
|     else if (message_link_type =="0010") { | | |
|         broadband_link_info() | var | uimsbf |
|     } | | |
|     else if (message_link_type =="0011") { | | |
|         external_network_information () | var | uimsbf |
|     } | | |
|     reserved | 4 | bslbf |
| } | | |

FIG. 71

| Syntax | No. Bits | Format |
|---|---|---|
| Payload_for_Automatic_Tuning () { | | |
|     num_associated_EAS_messages | 8 | uimsbf |
|     for(i=0; i< num_associated_EAS_messages; i++) { | | |
|         associated_EAS_message_id | 32 | uimsbf |
|     } | | |
|     automatic_tuning_channel_number | 8 | uimsbf |
|     automatic_tuning_DP_id | 8 | uimsbf |
|     automatic_tuning_service_id | 16 | uimsbf |
| } | | |

| Syntax | No. Bits | Format |
|---|---|---|
| Payload_for_NRT_Service_Info () { | | |
|     num_associated_EAS_messages | 8 | uimsbf |
|     for(i=0; i< num_associated_EAS_messages; i++) { | | |
|         associated_EAS_message_id | 32 | uimsbf |
|     } | | |
|     EAS_NRT_service_id | 16 | uimsbf |
| } | | |

FIG. 78

| Syntax | No. of Bits | Format |
|---|---|---|
| FIC_payload() { | | |
|     FIC_protocol_version | 8 | uimsbf |
|     broadcaststream_id | 16 | uimsbf |
|     num_services | 8 | uimsbf |
|     for (i=0; i<num_services;i++) { | | |
|         service_id | 16 | uimsbf |
|         service_data_version | 8 | uimsbf |
|         service_channel_number | 16 | uimsbf |
|         service_category | 5 | uimsbf |
|         short_service_name_length /*m*/ | 3 | uimsbf |
|         short_service_name | 16*m | bslbf |
|         partition_id | 16 | uimsbf |
|         service_status | 3 | uimsbf |
|         sp_indicator | 1 | bslbf |
|         IP_version_flag | 1 | bslbf |
|         SSC_source_IP_address_flag | 1 | bslbf |
|         num_min_capability | 2 | uimsbf |
|         for(m=0;m<num_min_capability;m++){ | | |
|             min_capability_type | 3 | uimsbf |
|             min_capability_value | 5 | uimsbf |
|         } | | |
|         if(SSC_source_IP_address_flag){ | | |
|             SSC_source_IP_address | 32 or 128 | uimsbf |
|         } | | |
|         SSC_destination_IP_address | 32 or 128 | uimsbf |
|         SSC_destination_UDP_port | 16 | uimsbf |
|         SSC_TSI | 16 | uimsbf |
|         SSC_DP_ID | 8 | uimsbf |
|         reserved | 4 | 1111 |
|         num_service_level_descriptors | 4 | |
|         for(j=0;j<num_service_level_descriptors;j++){ | | |
|             service_level_descriptor() | var | |
|         } | | |
|     } | | |
|     reserved | 4 | 1111 |
|     num_FIC_level_descriptors | 4 | uimsbf |
|     for (n=0; n<num_FIC_level_descriptors; n++) | | |
|         FIC_level_descriptor() | var | |
| } | | |

| service_category | Meaning |
|---|---|
| 0x00 | The service category is not specified by the service_category field. Look in the CMT to identify the category of service. |
| 0x01 | A/V service |
| 0x02 | Audio service |
| 0x03 | App Based service |
| 0x08 | Service Guide – Service Guide(Announcement) as defined in S33-2 |
| ~0x1F | Reserved for future use |

FIG. 81

| Syntax | No. Bits | Format |
|---|---|---|
| Emergency_Alert_Table () { | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     table_id_extension { | | |
|         EAT_protocol_version | 8 | 0x0 |
|         reserved | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     automatic_tuning_flag | 1 | bslbf |
|     num_EAS_messages | 7 | uimsbf |
|     If (automatic_tuning_flag == '1') { | | |
|         automatic_tuning_channel_number | 8 | uimsbf |
|         automatic_tuning_DP_id | 8 | uimsbf |
|         automatic_tuning_service_id | 16 | uimsbf |
|     } | | |
|     for (m=0; m< num_EAS_messages; m++) { | | |
|         EAS_message_id | 32 | uimsbf |
|         partition_id | 16 | uimsbf |
|         EAS_IP_version_flag | 1 | bslbf |
|         EAS_message_transfer_type | 3 | uimsbf |
|         EAS_message_encoding_type | 3 | uimsbf |
|         EAS_NRT_flag | 1 | bslbf |
|         if(EAS_message_transfer_type == 0x02) { | | |
|             reserved | 4 | '1111' |
|             EAS_message_length /* N */ | 12 | uimsbf |
|             EAS_message_bytes() | 8*N | var |
|         } | | |
|         else if (EAS_message_transfer_type == 0x03) { | | |
|             IP_address | 32 or 128 | uimsbf |
|             UDP_port_num | 16 | uimsbf |
|             DP_id | 8 | uimsbf |
|         } | | |
|         if(EAS_NRT_flag == '1') { | | |
|             EAS_NRT_service_id | 16 | uimsbf |
|         } | | |
|     } | | |
| } | | |

FIG. 84

| Syntax | No. Bits | Format |
|---|---|---|
| PLS_added { | | |
|     EAC_Flag | 1 | blsbf |
|         num_EA_data | 8 | |
|         for(j=0;j<num_EA_data;j++){ | | |
|             EA_data_Type | 2 | |
|             if(EA_data_Type == '00') { | | |
|                 WARN_data_version | 8 | |
|                 WARN_data_target | 2 | |
|             } | | |
|             else if(EA_data_Type == '01') { | | |
|                 WARN_data_version | 8 | |
|                 WARN_data_target | 2 | |
|                 WARN_data_Length | 16 | uimsbf |
|                 CAP_message_info() | var | |
|             } | | |
|             else if(EA_data_Type == '10'){ | | uimsbf |
|                 CAP_message_info() | 8 | |
|             } | | |
|         } | | |
| } | | |

FIG. 88

| Signaling Class | Description |
|---|---|
| 000 | Signaling for Channel Scan and Service Acquisition |
| 001 | Signaling for Emergency Alert |
| 010 | Signaling for Header Compression |
| 011 | Signaling for WARN message |
| 100 | Reserved |
| 101 | Reserved |
| 110 | Reserved |
| 111 | Various |

FIG. 89

| Signaling Class | Description |
|---|---|
| 000 | communities of Amber Alerts |
| 001 | imminent threats to safety or life |
| 010 | Presidential Alerts via geographically-targeted |
| 011 | Reserved |
| 100 | Reserved |
| 101 | Reserved |
| 110 | Reserved |
| 111 | Reserved |

FIG. 90

| Syntax | No. Bits | Format |
|---|---|---|
| PLS_added { | | |
|     EAC_Flag | 1 | blsbf |
|     if(EAC_Flag = 'false') { | | |
|         WARN_data_version | 8 | |
|         WARN_PLP_ID | 16 | |
|     } | | |
| } | | |

| Syntax | No . Bits | Format |
|---|---|---|
| PLS_added { | | |
|     EAC_Flag | 1 | blsbf |
|     if(EAC_Flag = 'false') { | | |
|         WARN_data_version | 8 | |
|         WARN_PLP_ID | 16 | |
|     } | | |
| } | | |

FIG. 93

| Syntax | No. Bits | Format |
|---|---|---|
| EAT { | | |
|     table_id | 8 | TBD |
|     version_number | 8 | |
|     num_EA_data | 2 | |
|     reserved | 6 | |
|     for(i=0;i<num_EA_data;i++) { | | |
|         EA_data_type | 2 | |
|         reserved | 6 | |
|         if(EA_data_type == '01'){ | | |
|             PLP_ID | 16 | |
|             data_version | 8 | |
|         } | | |
|     } | | |
| } | | |

FIG. 95

| Syntax | No. Bits | Format |
|---|---|---|
| PLS_added { | | |
|    num_EA_data | 8 | |
|    for(i=0;i<num_EA_data;i++){ | | |
|       EA_data_Type | 2 | |
|       if(EA_data_Type == '00') { | | |
|          WARN_data_version | 8 | |
|          WARN_data_target | 2 | |
|          sourceIPaddress | 32 or 128 | |
|          destIPaddress | 32 or 128 | |
|          destPort | 16 | |
|          tsi | 16 | |
|          PLP_ID | 16 | |
|       } | | |
|       else if(EA_data_Type == '01') { | | |
|          WARN_data_version | 8 | |
|          WARN_data_target | 2 | |
|          sourceIPaddress | 32 or 128 | |
|          destIPaddress | 32 or 128 | |
|          destPort | 16 | |
|          tsi | 16 | |
|          PLP_ID | 16 | |
|          WARN_data_Length | 16 | uimsbf |
|          CAP_message_info() | var | |
|       } | | |
|       else if(EA_data_Type == '10'){ | | |
|          CAP_message_info() | var | |
|       } | | |
|    } | | |
| } | | |

FIG. 97

| Syntax | No. Bits | Format |
|---|---|---|
| EAT { | | |
|     table_id | 8 | TBD |
|     version_number | 8 | |
|     num_EA_data | 2 | |
|     reserved | 6 | |
|     for(i=0;i<num_EA_data;i++) { | | |
|         EA_data_type | 2 | |
|         reserved | 6 | |
|         if(EA_data_type == '01'){ | | |
|             data_version | 8 | |
|             data_target | 2 | |
|             PLP_ID | 16 | |
|             sourceIPaddress | 32 or 128 | |
|             destIPaddress | 32 or 128 | |
|             destPort | 16 | |
|             PLP_ID | 16 | |
|             tsi | 16 | |
|             reserved | 6 | |
|         } | | |
|     } | | |
| } | | |

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

CROSS-REFERENCE TO RELATED APPLICATIONS

This Application is a Continuation of co-pending U.S. patent application Ser. No. 15/307,734 filed on Oct. 28, 2016, which is the National Phase of PCT International Application No. PCT/KR2016/000058 filed on Jan. 5, 2016, which claims the priority benefit under 35 U.S.C. § 119(e) to U.S. Provisional Application Nos. 62/119,262 filed on Feb. 22, 2015 and 62/100,081 filed on Jan. 6, 2015, all of which are hereby expressly incorporated by reference into the present application.

BACKGROUND OF THE INVENTION

Field of the Invention

The present invention relates to an apparatus for transmitting a broadcast signal, an apparatus for receiving a broadcast signal and methods for transmitting and receiving a broadcast signal.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

SUMMARY OF THE INVENTION

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

The present invention provides a system capable of effectively supporting future broadcast services in an environment supporting future hybrid broadcasting using terrestrial broadcast networks and the Internet and related signaling methods.

Advantageous Effects

The present invention can control quality of service (QoS) with respect to services or service components by processing data on the basis of service characteristics, thereby providing various broadcast services.

The present invention can achieve transmission flexibility by transmitting various broadcast services through the same radio frequency (RF) signal bandwidth.

The present invention can provide methods and apparatuses for transmitting and receiving broadcast signals, which enable digital broadcast signals to be received without error even when a mobile reception device is used or even in an indoor environment.

The present invention can effectively support future broadcast services in an environment supporting future hybrid broadcasting using terrestrial broadcast networks and the Internet.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a relation between an SLT and service layer signaling (SLS) according to an embodiment of the present invention.

FIG. 3 illustrates an SLT according to an embodiment of the present invention.

FIG. 5 illustrates a USBD fragment for ROUTE/DASH according to an embodiment of the present invention.

FIG. 6 illustrates an S-TSID fragment for ROUTE/DASH according to an embodiment of the present invention.

FIG. 7 illustrates a USBD/USD fragment for MMT according to an embodiment of the present invention.

FIG. 13 illustrates an example of adaptation modes in IP header compression according to an embodiment of the present invention (transmitting side).

FIG. 14 illustrates a link mapping table (LMT) and an RoHC-U description table according to an embodiment of the present invention.

FIG. 24 is a table illustrating PLS1 data according to an embodiment of the present invention.

FIG. 25 is a table illustrating PLS2 data according to an embodiment of the present invention.

FIG. 33 illustrates a main PRBS used for all FFT modes according to an embodiment of the present invention.

FIG. 34 illustrates a sub-PRBS used for FFT modes and an interleaving address for frequency interleaving according to an embodiment of the present invention.

FIG. 35 illustrates a write operation of a time interleaver according to an embodiment of the present invention.

FIG. 36 is a table illustrating an interleaving type applied according to the number of PLPs.

FIG. 37 is a block diagram including a first example of a structure of a hybrid time interleaver.

FIG. 38 is a block diagram including a second example of the structure of the hybrid time interleaver.

FIG. 44 is a block diagram illustrating the whole configuration of the emergency alert system according to an embodiment of the present invention.

FIG. 45 illustrates syntax of EAT information according to an embodiment of the present invention.

FIG. 46 illustrates syntax of an emergency alert message according to an embodiment of the present invention.

FIG. 47 illustrates syntax for automatic channel tuning information according to an embodiment of the present invention.

FIG. 48 illustrates syntax for NRT service information according to an embodiment of the present invention.

FIG. 49 illustrates embodiments of syntax of a section table for transmitting an emergency alert message according to the present invention.

FIG. 50 illustrates embodiments of syntax of a section table for transmitting an emergency alert message according to the present invention.

FIG. 57 illustrates an embodiment of syntax of an emergency alert message transmitted through a signaling channel.

FIG. 59 illustrates an embodiment of syntax for signaling an emergency alert transmitted through a signaling channel.

FIG. 64 illustrates the fixed header and the extended header in the form of syntax.

FIG. 65 is a diagram illustrating definition of values assigned to a signaling class field of a link layer packet header in the form of a table according to the present invention.

FIG. 66 is a diagram illustrating definition of values assigned to an information_type field of the link layer packet header in the form of a table according to the present invention.

FIG. 67 illustrates an example of syntax of a payload a packet for an emergency alert when a link layer packet is the packet and an emergency alert message is transmitted using the payload of the packet.

FIG. 69 illustrates an example of syntax of a payload a packet for an emergency alert when a link layer packet is the packet and connection (or link) information of an emergency alert message is transmitted using the payload of the packet.

FIG. 71 illustrates an example of syntax of a payload a packet for an emergency alert when a link layer packet is the packet and automatic tuning information related to the emergency alert is transmitted using the payload of the packet.

FIG. 78 is a diagram illustrating an FIC according to an embodiment of the present invention.

FIG. 81 is a diagram illustrating Emergency_Alert_Table( ) according to an embodiment of the present invention.

FIG. 84 is a diagram illustrating syntax related to an EAC added to PLS according to an embodiment of the present invention.

FIG. 88 is a diagram illustrating a signaling_class field according to an embodiment of the present invention.

FIG. 89 is a diagram illustrating an information_type field according to an embodiment of the present invention.

FIG. 90 is a diagram illustrating syntax related to a WARN message added to PLS according to an embodiment of the present invention.

FIG. 93 is a diagram illustrating an EAT that includes signaling information for a WARN message according to an embodiment of the present invention.

FIG. 95 is a diagram illustrating PLS that includes signaling information for a WARN message according to an embodiment of the present invention.

FIG. 97 is a diagram illustrating an EAT in a case in which signaling information for a WARN message is transmitted through an EAC according to an embodiment of the present invention.

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
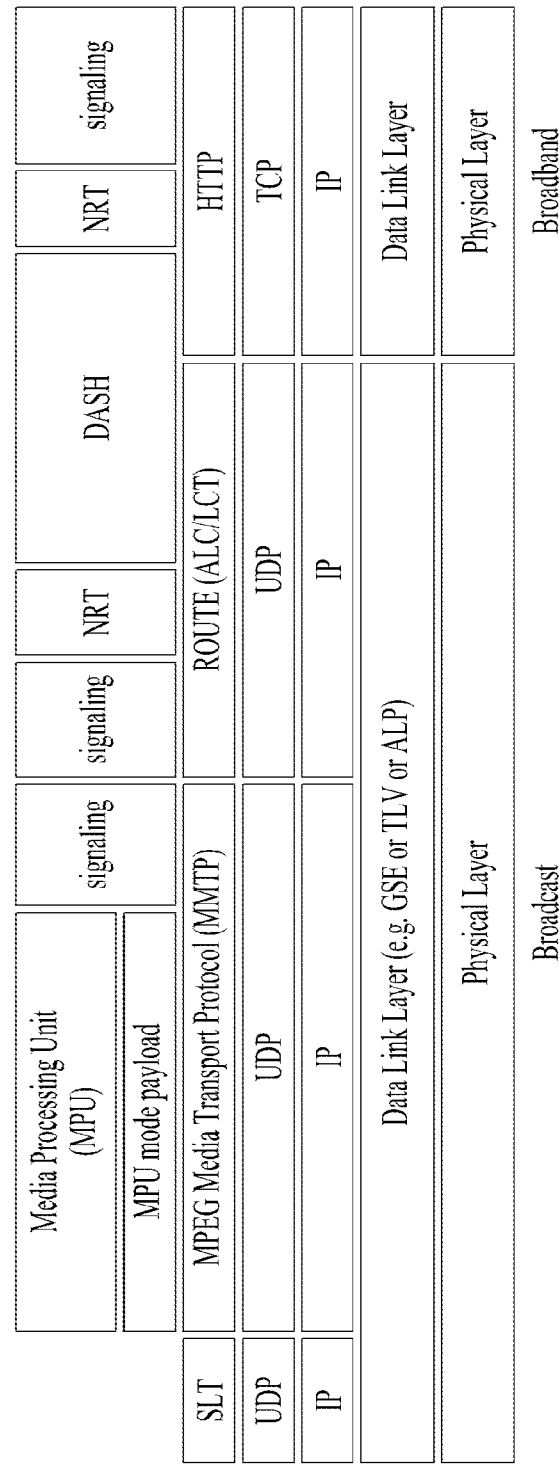
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel. Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be aversion number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted.

In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

Figure 4:
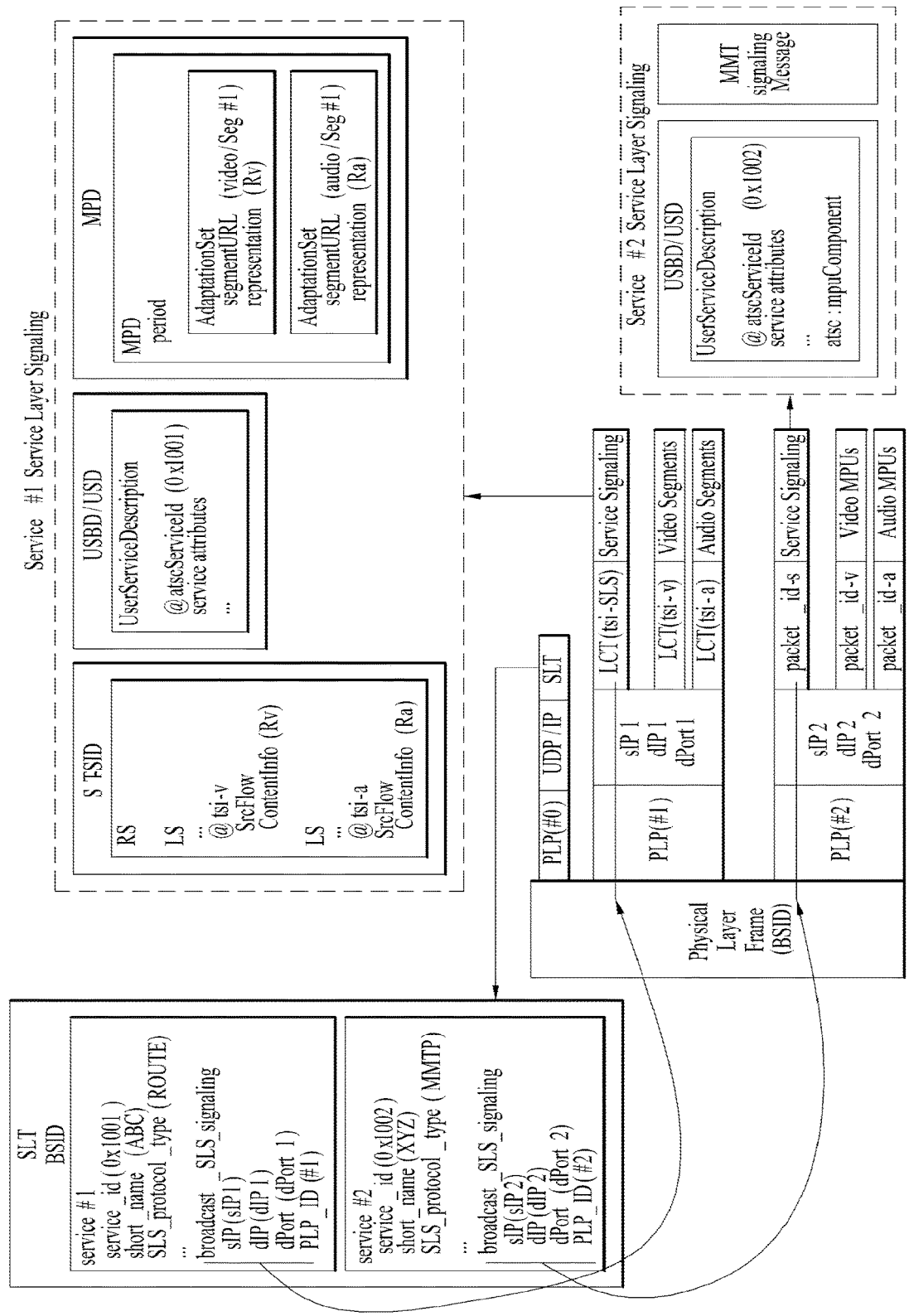
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's MPT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @dIpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service. (default: current physical layer Pipe).

@sTSIDDestinationIpAddress can be a string containing the dotted-IPv4 destination address of the packets carrying S-TSID for this service. (default: current MMTP session's source IP address).

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset_id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below. MMT ATSC3 (MA3) message mmt_atsc3_message( ) This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

Figure 8:
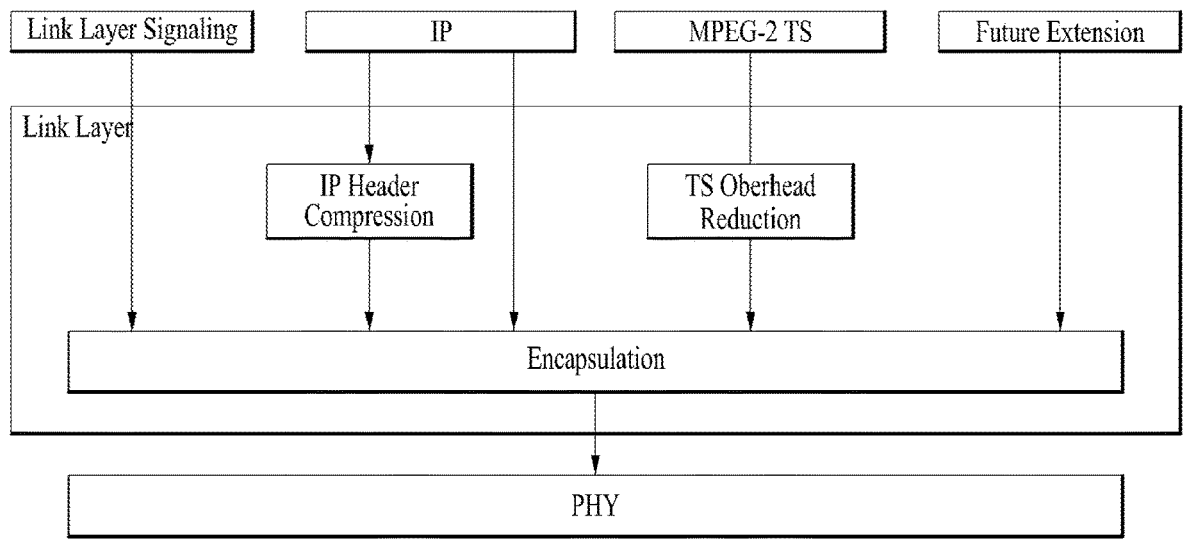
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
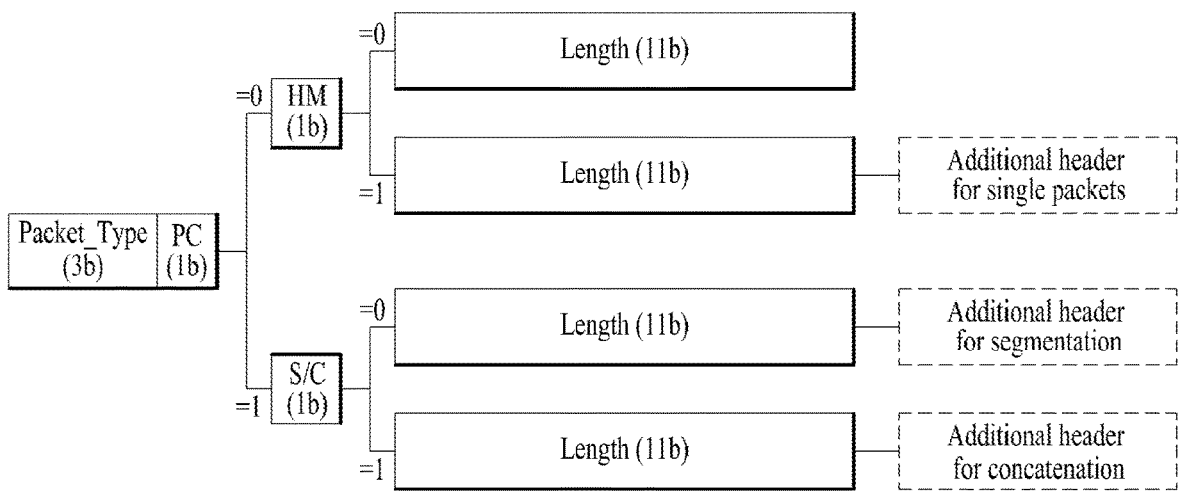
FIG. 9 illustrates a structure of a base header of a link layer packet according to an embodiment of the present invention.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet Type is "000", "001" "100" or "111", that is the original data type of an ALP packet is one of an IPv4 packet, a compressed IP packet, link layer signaling or extension packet. When the MPEG-2 TS packet is encapsulated, the value of Packet_Type can be "010". Other values of the Packet Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be an 11-bit field that indicates the 11 least significant bits (LSBs) of the length in bytes of payload carried by the link layer packet. When there is a Length_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

Figure 10:
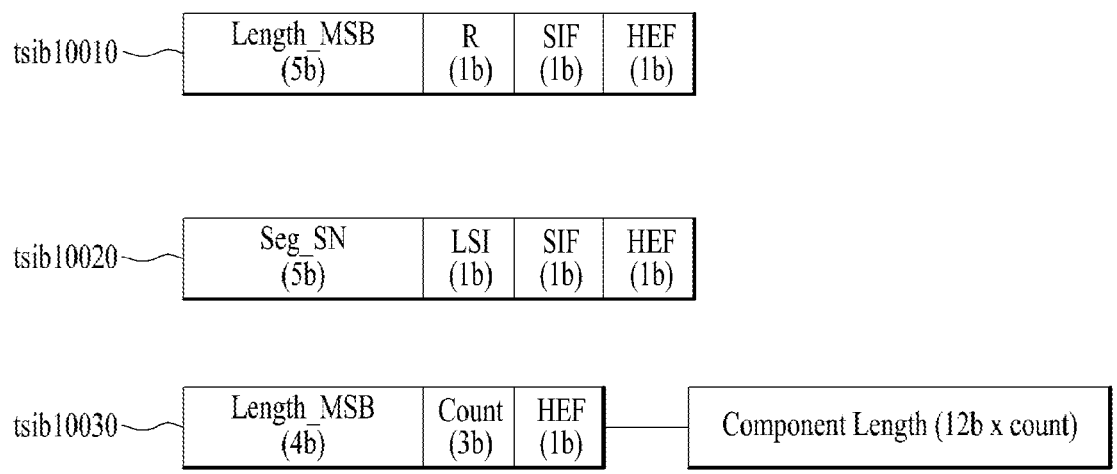
FIG. 10 illustrates a structure of an additional header of a link layer packet according to an embodiment of the present invention.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header Mode (HM)="1". The Header Mode (HM) can be set to 1 when the length of the payload of the link layer packet is larger than 2047 bytes or when the optional fields are used. The additional header for single packet is shown in Figure (tsib10010).

Length MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation Concatenation (S/C)="0". Segment Sequence Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be an 8-bit field that can indicate the sub stream identifier for the link layer packet. If there is optional header extension, SID present between additional header and optional header extension.

Header_Extension ( ) can include the fields defined below.

Extension_Type can be an 8-bit field that can indicate the type of the Header Extension ( ).

Extension_Length can be an 8-bit field that can indicate the length of the Header Extension ( ) in bytes counting from the next byte to the last byte of the Header_Extension( ).

Extension_Byte can be a byte representing the value of the Header_Extension( ).

Figure 11:
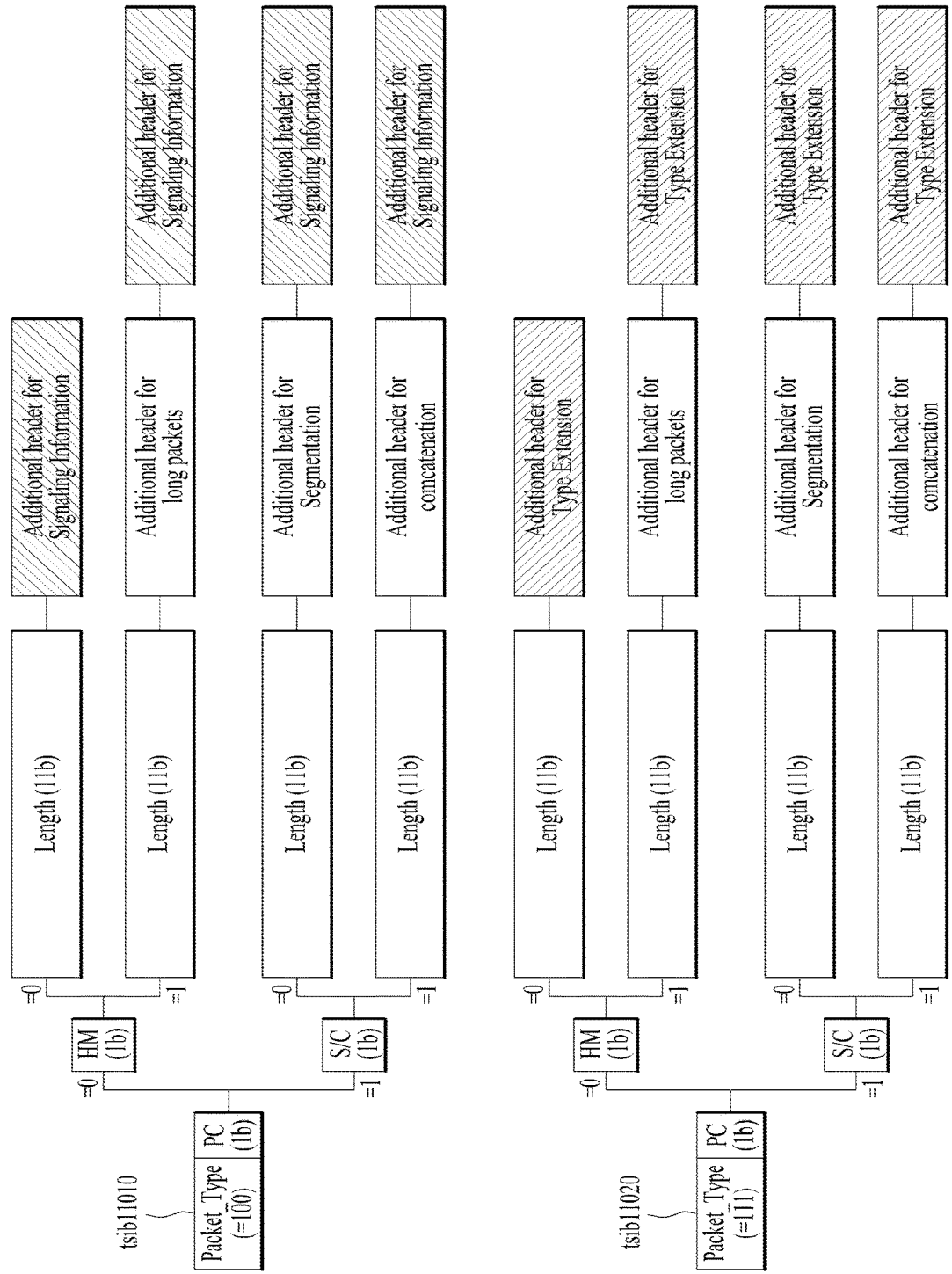
FIG. 11 illustrates a structure of an additional header of a link layer packet according to another embodiment of the present invention.

FIG. 11 illustrates a structure of an additional header of a link layer packet according to another embodiment of the present invention.

Hereinafter, a description will be given of an additional header for signaling information.

How link layer signaling is incorporated into link layer packets are as follows. Signaling packets are identified by when the Packet Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields. According to a given embodiment, some fields may be omitted.

Signaling_Type can be an 8-bit field that can indicate the type of signaling.

Signaling_Type_Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet type is 111 in the base header as described above. Figure (tsib11020) shows the structure of the link layer packets containing additional header for type extension.

The additional header for type extension can include following fields. According to a given embodiment, some fields may be omitted.

extended_type can be a 16-bit field that can indicate the protocol or packet type of the input encapsulated in the link layer packet as payload. This field cannot be used for any protocol or packet type already defined by Packet Type field.

Figure 12:
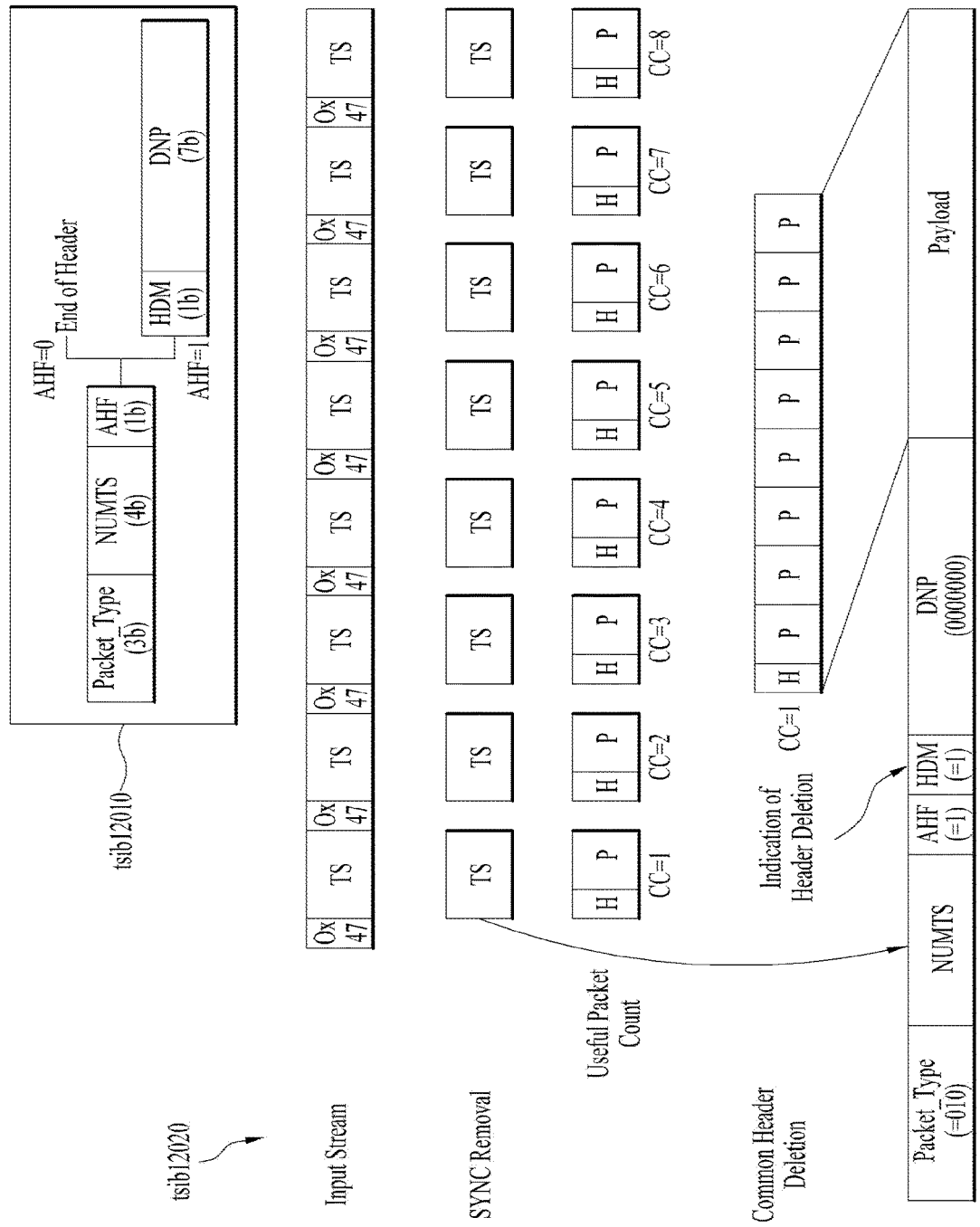
FIG. 12 illustrates a header structure of a link layer packet for an MPEG-2 TS packet and an encapsulation process thereof according to an embodiment of the present invention.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion.

According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces the size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirctional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling.

In Adaptation Mode 2 (tsib13010), the adaptation module can detect the IR packet from ROHC packet flow and extract the context information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to "100".

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT)

provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit Boolean field that indicates whether the header compression is applied the link layer packets carrying the upper layer session identified by above 4 fields, Src_IP_add, Dst IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context_ID field can be present.

SID can be an 8-bit unsigned integer field that indicates sub stream identifier for the link layer packets carrying the upper layer session identified by above 4 fields, Src IP_add, Dst IP_add, Src_UDP_Port and Dst_UDP_Port. This field can be present when the value of SID_flag is equal to 1.

context_id can be an 8-bit field that provides a reference for the context id (CID) provided in the ROHC-U description table. This field can be present when the value of compressed flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling type field for ROHC-U description table (RDT) can be set to "0x02".

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to "0x0". If the static_chain( ) or dynamic_chain( ) byte is included in this table, this field may be set to "0x01" or "0x02" respectively. If both of the static_chain( ) and dynamic_chain( ) byte are included in this table, this field may be set to "0x03".

context length can be an 8-bit field that indicates the length of the static chain byte sequence. This field can be omitted.

static_chain_byte ( ) can be a field that conveys the static information used to initialize the ROHC-U decompressor. The size and structure of this field depend on the context profile.

dynamic_chain_byte ( ) can be a field that conveys the dynamic information used to initialize the ROHC-U decompressor. The size and structure of this field depend on the context profile.

The static_chain byte can be defined as sub-header information of IR packet. The dynamic_chain byte can be defined as sub-header information of IR packet and IR-DYN packet.

Figure 15:
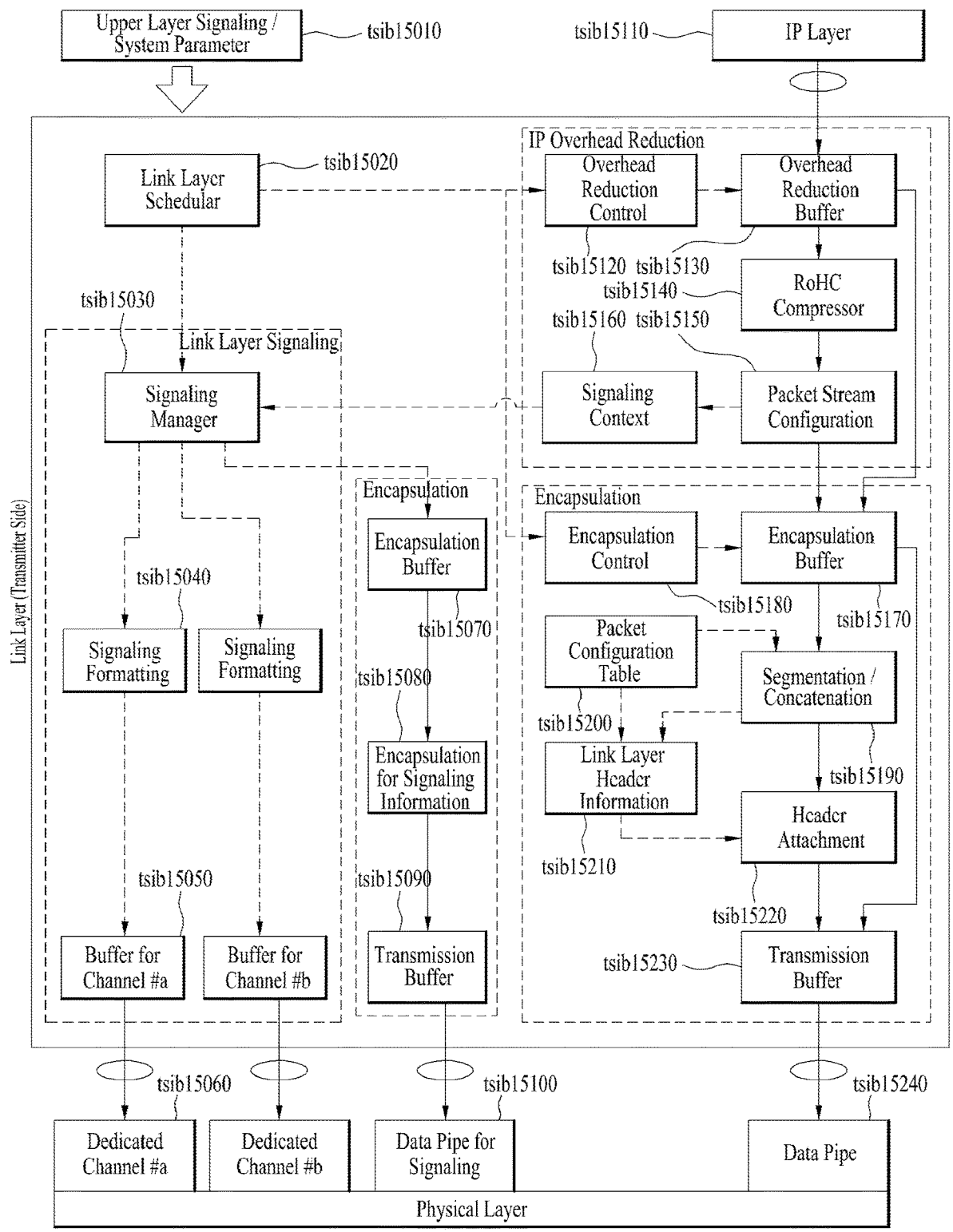
FIG. 15 illustrates a structure of a link layer on a transmitter side according to an embodiment of the present invention.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be filterer or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/ configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel. A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160. The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

Figure 16:
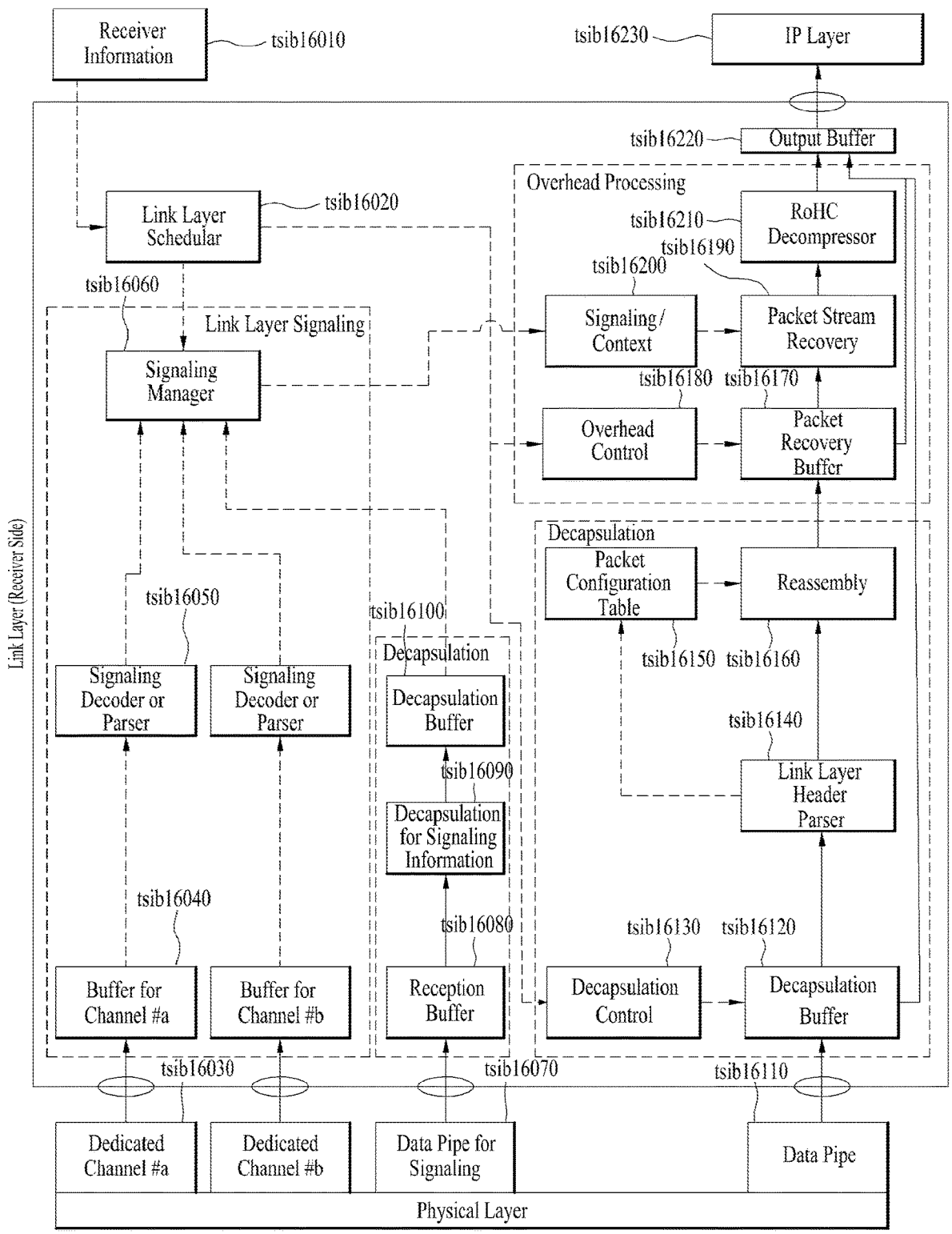
FIG. 16 illustrates a structure of a link layer on a receiver side according to an embodiment of the present invention.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream. This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

Figure 17:
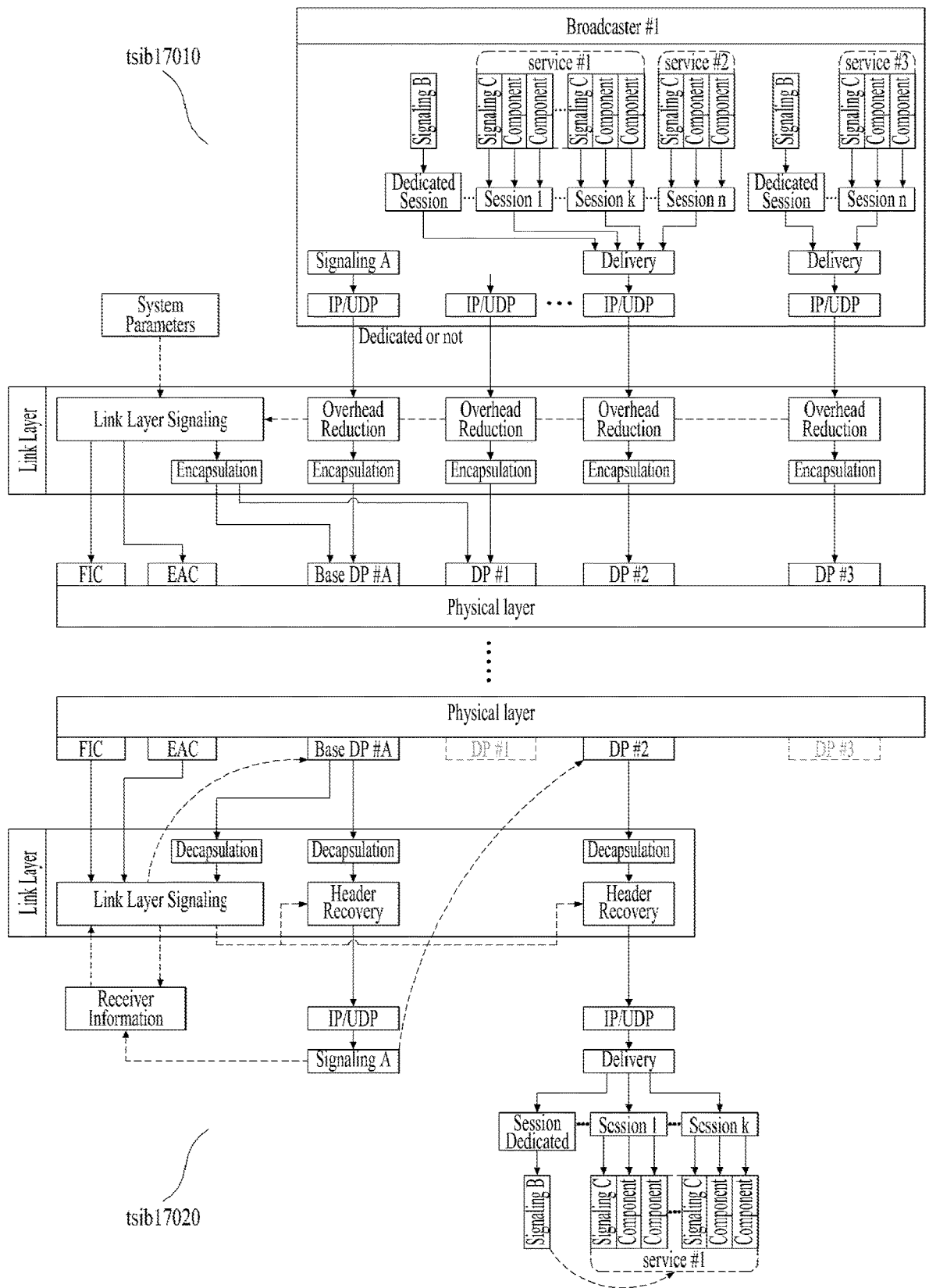
FIG. 17 illustrates a configuration of signaling transmission through a link layer according to an embodiment of the present invention (transmitting/receiving sides).

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, . . . ). In general, a signal for a service may be transmitted through a general transmission session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transmission session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

While MISO or MIMO uses two antennas in the following for convenience of description, the present invention is applicable to systems using two or more antennas. The present invention proposes a physical profile (or system) optimized to minimize receiver complexity while attaining the performance required for a particular use case. Physical (PHY) profiles (base, handheld and advanced profiles) according to an embodiment of the present invention are subsets of all configurations that a corresponding receiver should implement. The PHY profiles share most of the functional blocks but differ slightly in specific blocks and/or parameters. For the system evolution, future profiles may also be multiplexed with existing profiles in a single radio frequency (RF) channel through a future extension frame (FEF). The base profile and the handheld profile according to the embodiment of the present invention refer to profiles to which MIMO is not applied, and the advanced profile refers to a profile to which MIMO is applied. The base profile may be used as a profile for both the terrestrial broadcast service and the mobile broadcast service. That is, the base profile may be used to define a concept of a profile which includes the mobile profile. In addition, the advanced profile may be divided into an advanced profile for a base profile with MIMO and an advanced profile for a handheld profile with MIMO. Moreover, the profiles may be changed according to intention of the designer.

The following terms and definitions may be applied to the present invention. The following terms and definitions may be changed according to design.

Auxiliary stream: sequence of cells carrying data of as yet undefined modulation and coding, which may be used for future extensions or as required by broadcasters or network operators.

Base data pipe: data pipe that carries service signaling data.

Baseband frame (or BBFRAME): set of Kbch bits which form the input to one FEC encoding process (BCH and LDPC encoding).

Cell: modulation value that is carried by one carrier of orthogonal frequency division multiplexing (OFDM) transmission.

Coded block: LDPC-encoded block of PLS1 data or one of the LDPC-encoded blocks of PLS2 data.

Data pipe: logical channel in the physical layer that carries service data or related metadata, which may carry one or a plurality of service(s) or service component(s).

Data pipe unit (DPU): a basic unit for allocating data cells to a DP in a frame.

Data symbol: OFDM symbol in a frame which is not a preamble symbol (the data symbol encompasses the frame signaling symbol and frame edge symbol).

DP_ID: this 8-bit field identifies uniquely a DP within the system identified by the SYSTEM_ID.

Dummy cell: cell carrying a pseudo-random value used to fill the remaining capacity not used for PLS signaling, DPs or auxiliary streams.

Emergency alert channel (EAC): part of a frame that carries EAS information data.

Frame: physical layer time slot that starts with a preamble and ends with a frame edge symbol.

Frame repetition unit: a set of frames belonging to the same or different physical layer profiles including an FEF, which is repeated eight times in a superframe.

Fast information channel (FIC): a logical channel in a frame that carries mapping information between a service and the corresponding base DP.

FECBLOCK: set of LDPC-encoded bits of DP data.

FFT size: nominal FFT size used for a particular mode, equal to the active symbol period Ts expressed in cycles of an elementary period T.

Frame signaling symbol: OFDM symbol with higher pilot density used at the start of a frame in certain combinations of FFT size, guard interval and scattered pilot pattern, which carries a part of the PLS data.

Frame edge symbol: OFDM symbol with higher pilot density used at the end of a frame in certain combinations of FFT size, guard interval and scattered pilot pattern.

Frame group: the set of all frames having the same PHY profile type in a superframe.

Future extension frame: physical layer time slot within the superframe that may be used for future extension, which starts with a preamble.

Futurecast UTB system: proposed physical layer broadcast system, the input of which is one or more MPEG2-TS, IP or general stream(s) and the output of which is an RF signal.

Input stream: a stream of data for an ensemble of services delivered to the end users by the system.

Normal data symbol: data symbol excluding the frame signaling symbol and the frame edge symbol.

PHY profile: subset of all configurations that a corresponding receiver should implement.

PLS: physical layer signaling data including PLS1 and PLS2.

PLS1: a first set of PLS data carried in a frame signaling symbol (FSS) having a fixed size, coding and modulation, which carries basic information about a system as well as parameters needed to decode PLS2.

NOTE: PLS1 data remains constant for the duration of a frame group.

PLS2: a second set of PLS data transmitted in the FSS, which carries more detailed PLS data about the system and the DPs.

PLS2 dynamic data: PLS2 data that dynamically changes frame-by-frame.

PLS2 static data: PLS2 data that remains static for the duration of a frame group.

Preamble signaling data: signaling data carried by the preamble symbol and used to identify the basic mode of the system.

Preamble symbol: fixed-length pilot symbol that carries basic PLS data and is located at the beginning of a frame.

The preamble symbol is mainly used for fast initial band scan to detect the system signal, timing thereof, frequency offset, and FFT size.

Reserved for future use: not defined by the present document but may be defined in future.

Superframe: set of eight frame repetition units.

Time interleaving block (TI block): set of cells within which time interleaving is carried out, corresponding to one use of a time interleaver memory.

TI group: unit over which dynamic capacity allocation for a particular DP is carried out, made up of an integer, dynamically varying number of XFECBLOCKs.

NOTE: The TI group may be mapped directly to one frame or may be mapped to a plurality of frames. The TI group may contain one or more TI blocks.

Type 1 DP: DP of a frame where all DPs are mapped to the frame in time division multiplexing (TDM) scheme.

Type 2 DP: DP of a frame where all DPs are mapped to the frame in frequency division multiplexing (FDM) scheme.

XFECBLOCK: set of Ncells cells carrying all the bits of one LDPC FECBLOCK.

Figure 18:
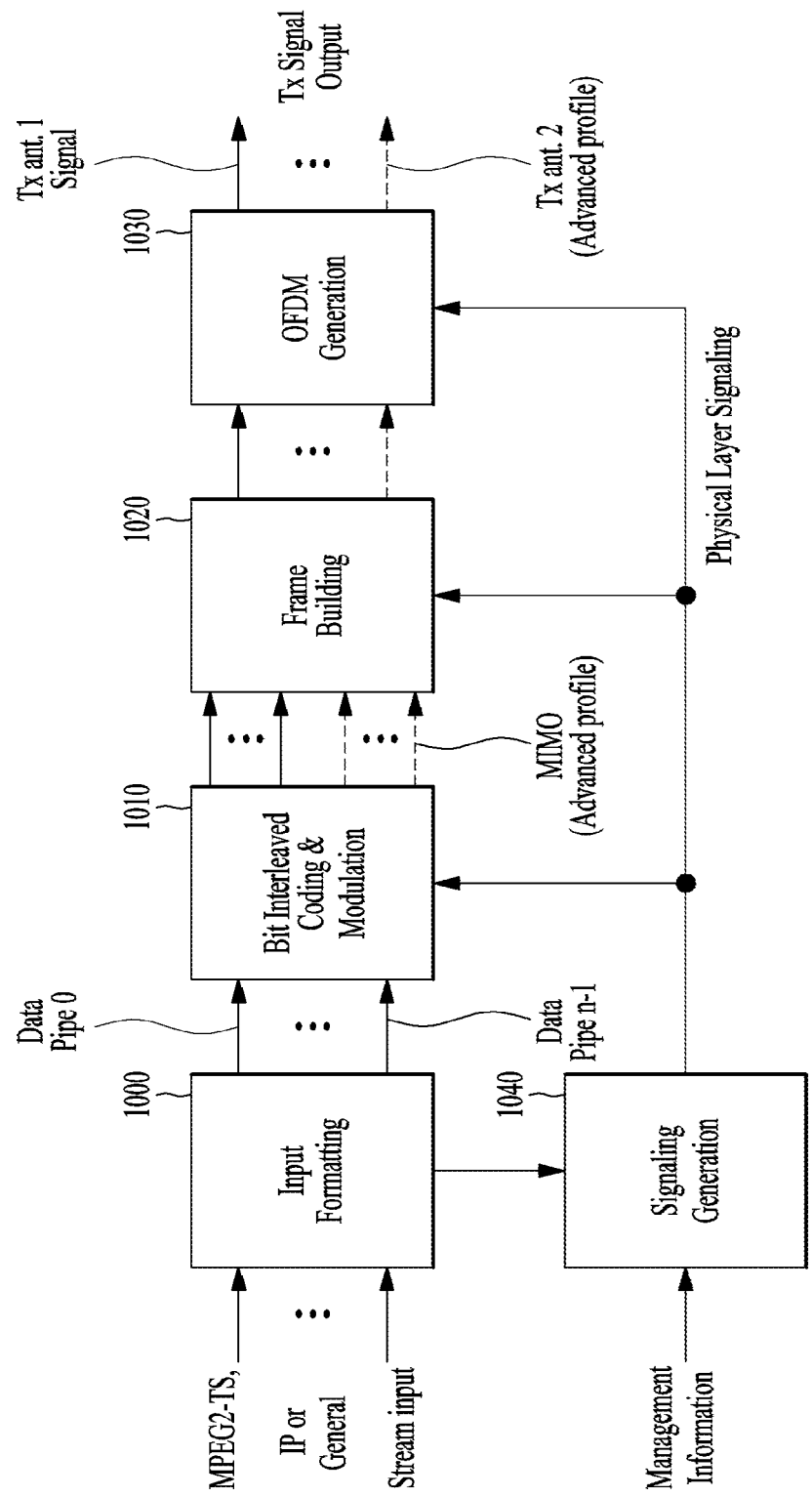
FIG. 18 is a block diagram illustrating a configuration of a broadcast signal transmission apparatus for future broadcast services according to an embodiment of the present invention.

FIG. 18 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams. In addition to these data inputs, management information is input to control scheduling and allocation of the corresponding bandwidth for each input stream. In addition, the present invention allows simultaneous input of one or a plurality of TS streams, IP stream(s) and/or a general stream(s).

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

In addition, a DPU is a basic unit for allocating data cells to a DP in one frame.

An input to the physical layer may include one or a plurality of data streams. Each of the data streams is delivered by one DP. The input formatting block 1000 may covert a data stream input through one or more physical paths (or DPs) into a baseband frame (BBF). In this case, the input formatting block 1000 may perform null packet deletion or header compression on input data (a TS or IP input stream) in order to enhance transmission efficiency. A receiver may have a priori information for a particular part of a header, and thus this known information may be deleted from a transmitter. A null packet deletion block 3030 may be used only for a TS input stream.

In the BICM block 1010, parity data is added for error correction and encoded bit streams are mapped to complex-value constellation symbols. The symbols are interleaved across a specific interleaving depth that is used for the corresponding DP. For the advanced profile, MIMO encoding is performed in the BICM block 1010 and an additional data path is added at the output for MIMO transmission.

The frame building block 1020 may map the data cells of the input DPs into the OFDM symbols within a frame, and perform frequency interleaving for frequency-domain diversity, especially to combat frequency-selective fading channels. The frame building block 1020 may include a delay compensation block, a cell mapper and a frequency interleaver.

The delay compensation block may adjust timing between DPs and corresponding PLS data to ensure that the DPs and the corresponding PLS data are co-timed at a transmitter side. The PLS data is delayed by the same amount as the data pipes by addressing the delays of data pipes caused by the input formatting block and BICM block. The delay of the BICM block is mainly due to the time interleaver. In-band signaling data carries information of the next TI group so that the information is carried one frame ahead of the DPs to be signaled. The delay compensation block delays in-band signaling data accordingly.

The cell mapper may map PLS, DPs, auxiliary streams, dummy cells, etc. to active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. A basic function of the cell mapper is to map a data cell generated by time interleaving for each DP and PLS cell to an array of active OFDM cells (if present) corresponding to respective OFDM symbols in one frame. Service signaling data (such as program specific information (PSI)/SI) may be separately gathered and sent by a DP. The cell mapper operates according to dynamic information produced by a scheduler and the configuration of a frame structure. The frequency interleaver may randomly interleave data cells received from the cell mapper to provide frequency diversity. In addition, the frequency interleaver may operate on an OFDM symbol pair including two sequential OFDM symbols using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

Specifically, after inserting a preamble at the beginning of each frame, the OFDM generation block 1030 may apply conventional OFDM modulation having a cyclic prefix as a guard interval. For antenna space diversity, a distributed MISO scheme is applied across transmitters. In addition, a PAPR scheme is performed in the time domain. For flexible network planning, the present invention provides a set of various FFT sizes, guard interval lengths and corresponding pilot patterns.

In addition, the present invention may multiplex signals of a plurality of broadcast transmission/reception systems in the time domain such that data of two or more different broadcast transmission/reception systems providing broadcast services may be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

The signaling generation block 1040 may create physical layer signaling information used for an operation of each functional block. This signaling information is also transmitted so that services of interest are properly recovered at a receiver side. Signaling information according to an embodiment of the present invention may include PLS data. PLS provides the receiver with a means to access physical layer DPs. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame. Details of the PLS data will be described later.

The above-described blocks may be omitted or replaced by blocks having similar or identical functions.

Figure 19:
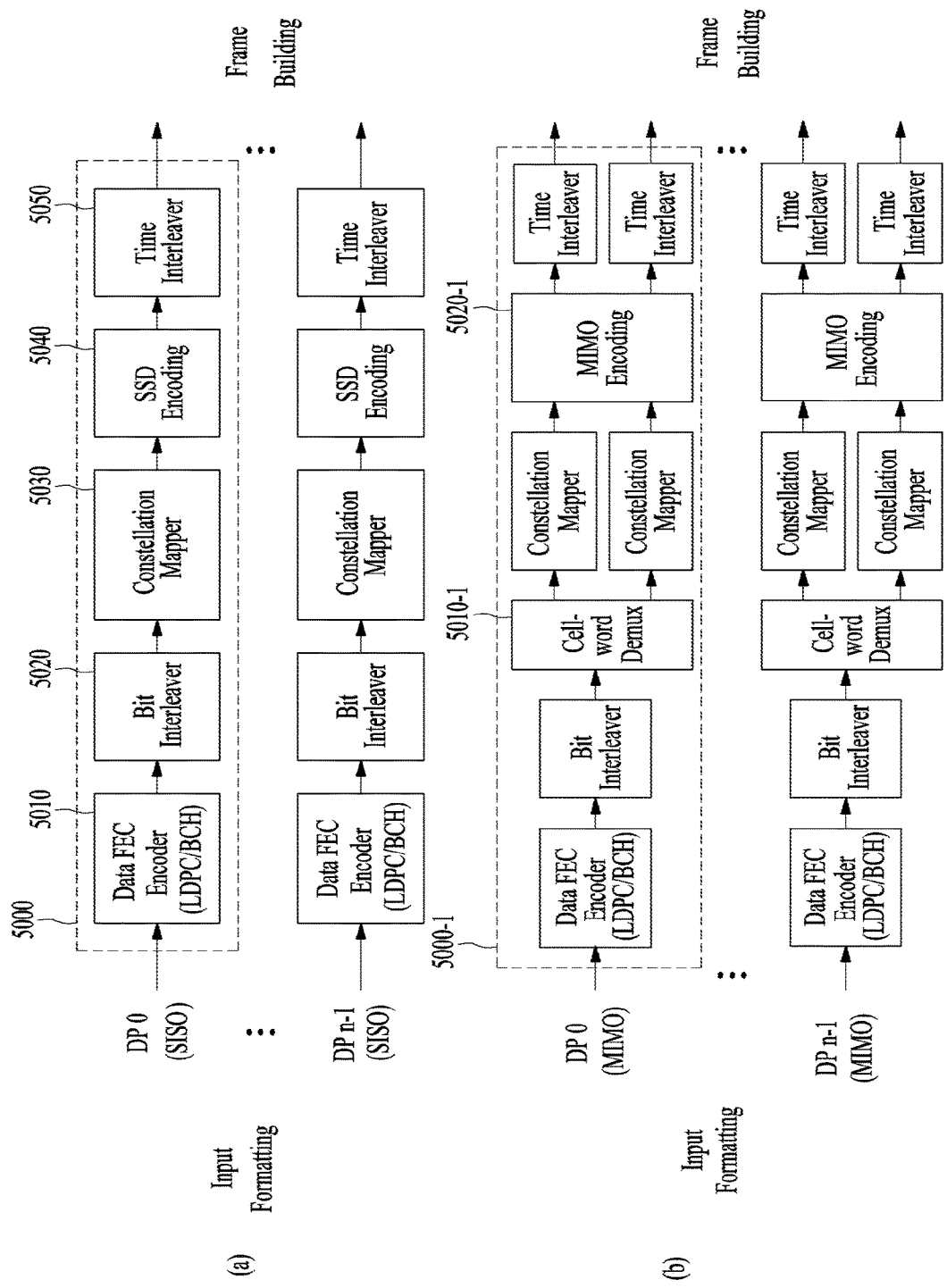
FIG. 19 is a block diagram illustrating a bit interleaved coding & modulation (BICM) block according to an embodiment of the present invention.

FIG. 19 illustrates a BICM block according to an embodiment of the present invention.

The BICM block illustrated in FIG. 19 corresponds to an embodiment of the BICM block 1010 described with reference to FIG. 18.

As described above, the broadcast signal transmission apparatus for future broadcast services according to the embodiment of the present invention may provide a terrestrial broadcast service, mobile broadcast service, UHDTV service, etc.

Since QoS depends on characteristics of a service provided by the broadcast signal transmission apparatus for future broadcast services according to the embodiment of the present invention, data corresponding to respective services needs to be processed using different schemes. Accordingly, the BICM block according to the embodiment of the present invention may independently process respective DPs by independently applying SISO, MISO and MIMO schemes to data pipes respectively corresponding to data paths. Consequently, the broadcast signal transmission apparatus for future broadcast services according to the embodiment of the present invention may control QoS for each service or service component transmitted through each DP.

(a) shows a BICM block applied to a profile (or system) to which MIMO is not applied, and (b) shows a BICM block of a profile (or system) to which MIMO is applied.

The BICM block to which MIMO is not applied and the BICM block to which MIMO is applied may include a plurality of processing blocks for processing each DP.

Description will be given of each processing block of the BICM block to which MIMO is not applied and the BICM block to which MIMO is applied.

A processing block 5000 of the BICM block to which MIMO is not applied may include a data FEC encoder 5010, a bit interleaver 5020, a constellation mapper 5030, a signal space diversity (SSD) encoding block 5040 and a time interleaver 5050.

The data FEC encoder 5010 performs FEC encoding on an input BBF to generate FECBLOCK procedure using outer coding (BCH) and inner coding (LDPC). The outer coding (BCH) is optional coding method. A detailed operation of the data FEC encoder 5010 will be described later.

The bit interleaver 5020 may interleave outputs of the data FEC encoder 5010 to achieve optimized performance with a combination of LDPC codes and a modulation scheme while providing an efficiently implementable structure. A detailed operation of the bit interleaver 5020 will be described later.

The constellation mapper 5030 may modulate each cell word from the bit interleaver 5020 in the base and the handheld profiles, or each cell word from the cell-word demultiplexer 5010-1 in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point, el. This constellation mapping is applied only for DPs. It is observed that QAM-16 and NUQs are square shaped, while NUCs have arbitrary shapes. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in the PLS2 data.

The time interleaver 5050 may operates at a DP level. Parameters of time interleaving (TI) may be set differently for each DP. A detailed operation of the time interleaver 5050 will be described later.

A processing block 5000-1 of the BICM block to which MIMO is applied may include the data FEC encoder, the bit interleaver, the constellation mapper, and the time interleaver.

However, the processing block 5000-1 is distinguished from the processing block 5000 of the BICM block to which MIMO is not applied in that the processing block 5000-1 further includes a cell-word demultiplexer 5010-1 and a MIMO encoding block 5020-1.

In addition, operations of the data FEC encoder, the bit interleaver, the constellation mapper, and the time interleaver in the processing block 5000-1 correspond to those of the data FEC encoder 5010, the bit interleaver 5020, the constellation mapper 5030, and the time interleaver 5050 described above, and thus description thereof is omitted.

The cell-word demultiplexer 5010-1 is used for a DP of the advanced profile to divide a single cell-word stream into dual cell-word streams for MIMO processing.

The MIMO encoding block 5020-1 may process an output of the cell-word demultiplexer 5010-1 using a MIMO encoding scheme. The MIMO encoding scheme is optimized for broadcast signal transmission. MIMO technology is a promising way to obtain a capacity increase but depends on channel characteristics. Especially for broadcasting, a strong LOS component of a channel or a difference in received signal power between two antennas caused by different signal propagation characteristics makes it difficult to obtain capacity gain from MIMO. The proposed MIMO encoding scheme overcomes this problem using rotation-based precoding and phase randomization of one of MIMO output signals.

MIMO encoding is intended for a 2×2 MIMO system requiring at least two antennas at both the transmitter and the receiver. A MIMO encoding mode of the present invention may be defined as full-rate spatial multiplexing (FR-SM). FR-SM encoding may provide capacity increase with relatively small complexity increase at the receiver side. In addition, the MIMO encoding scheme of the present invention has no restriction on an antenna polarity configuration.

MIMO processing is applied at the DP level. NUQ (e1,i and e2,i) corresponding to a pair of constellation mapper outputs is fed to an input of a MIMO encoder. Paired MIMO encoder output (g1,i and g2,i) is transmitted by the same carrier k and OFDM symbol 1 of respective TX antennas thereof.

The above-described blocks may be omitted or replaced by blocks having similar or identical functions.

Figure 20:
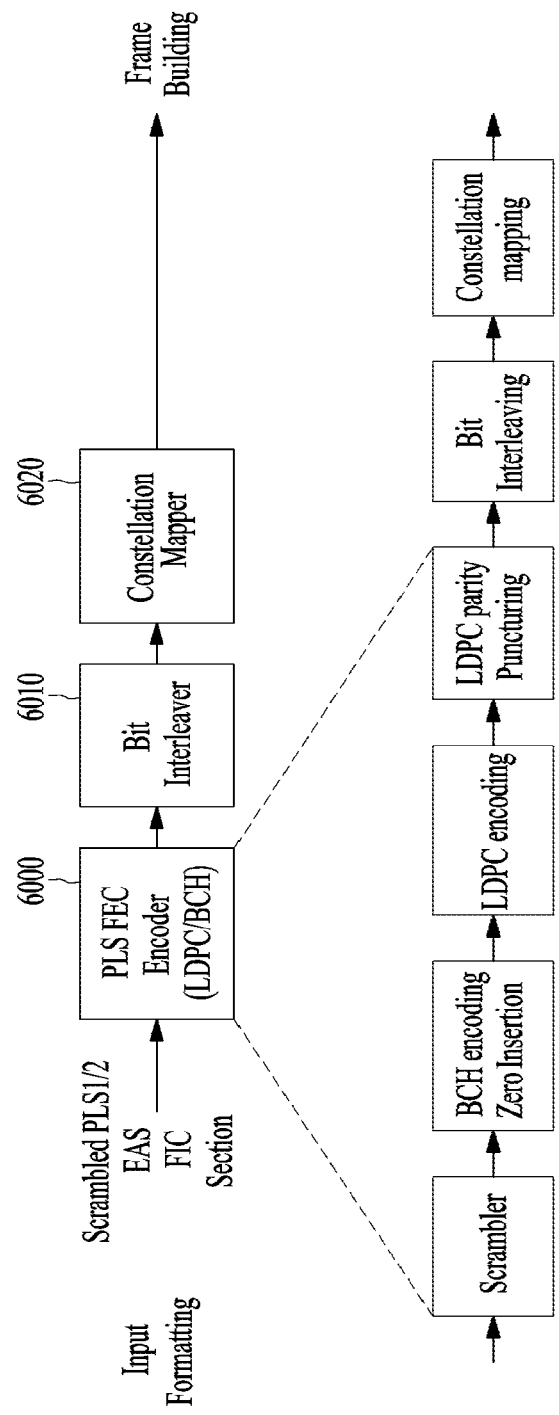
FIG. 20 is a block diagram illustrating a BICM block according to another embodiment of the present invention.

FIG. 20 illustrates a BICM block according to another embodiment of the present invention.

The BICM block illustrated in FIG. 20 corresponds to another embodiment of the BICM block 1010 described with reference to FIG. 18.

FIG. 20 illustrates a BICM block for protection of physical layer signaling (PLS), an emergency alert channel (EAC) and a fast information channel (FIC). The EAC is a part of a frame that carries EAS information data, and the FIC is a logical channel in a frame that carries mapping information between a service and a corresponding base DP. Details of the EAC and FIC will be described later.

Referring to FIG. 20, the BICM block for protection of the PLS, the EAC and the FIC may include a PLS FEC encoder 6000, a bit interleaver 6010 and a constellation mapper 6020.

In addition, the PLS FEC encoder 6000 may include a scrambler, a BCH encoding/zero insertion block, an LDPC encoding block and an LDPC parity puncturing block. Description will be given of each block of the BICM block.

The PLS FEC encoder 6000 may encode scrambled PLS1/2 data, EAC and FIC sections.

The scrambler may scramble PLS1 data and PLS2 data before BCH encoding and shortened and punctured LDPC encoding.

The BCH encoding/zero insertion block may perform outer encoding on the scrambled PLS1/2 data using a shortened BCH code for PLS protection, and insert zero bits after BCH encoding. For PLS1 data only, output bits of zero insertion may be permutted before LDPC encoding.

The LDPC encoding block may encode an output of the BCH encoding/zero insertion block using an LDPC code. To generate a complete coded block, Cldpc and parity bits Pldpc are encoded systematically from each zero-inserted PLS information block Ildpc and appended thereto.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Equation 1]

The LDPC parity puncturing block may perform puncturing on the PLS1 data and the PLS2 data.

When shortening is applied to PLS1 data protection, some LDPC parity bits are punctured after LDPC encoding. In addition, for PLS2 data protection, LDPC parity bits of PLS2 are punctured after LDPC encoding. These punctured bits are not transmitted.

The bit interleaver 6010 may interleave each of shortened and punctured PLS1 data and PLS2 data.

The constellation mapper 6020 may map the bit-interleaved PLS1 data and PLS2 data to constellations.

The above-described blocks may be omitted or replaced by blocks having similar or identical functions.

Figure 21:
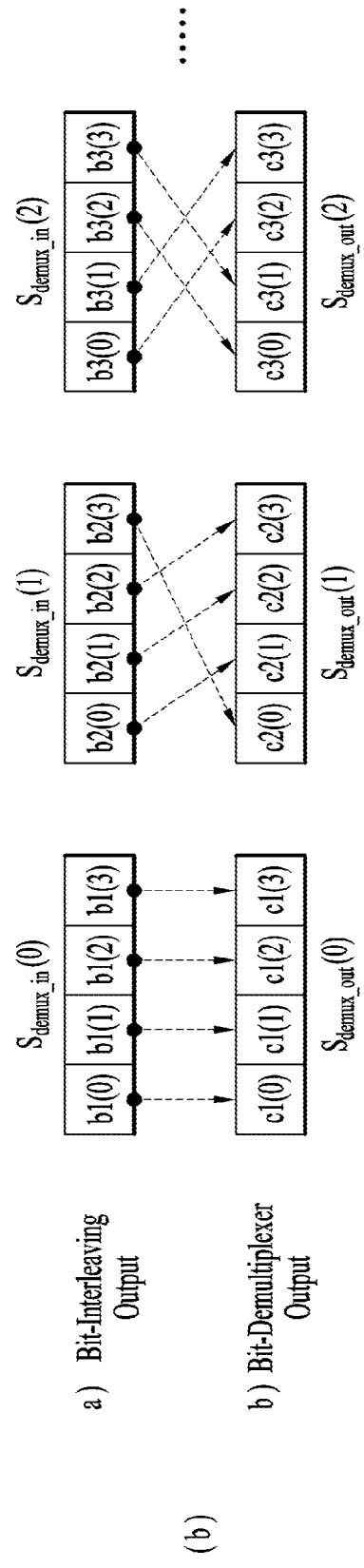
FIG. 21 illustrates a bit interleaving process of physical layer signaling (PLS) according to an embodiment of the present invention.

FIG. 21 illustrates a bit interleaving process of PLS according to an embodiment of the present invention.

Figure 22:
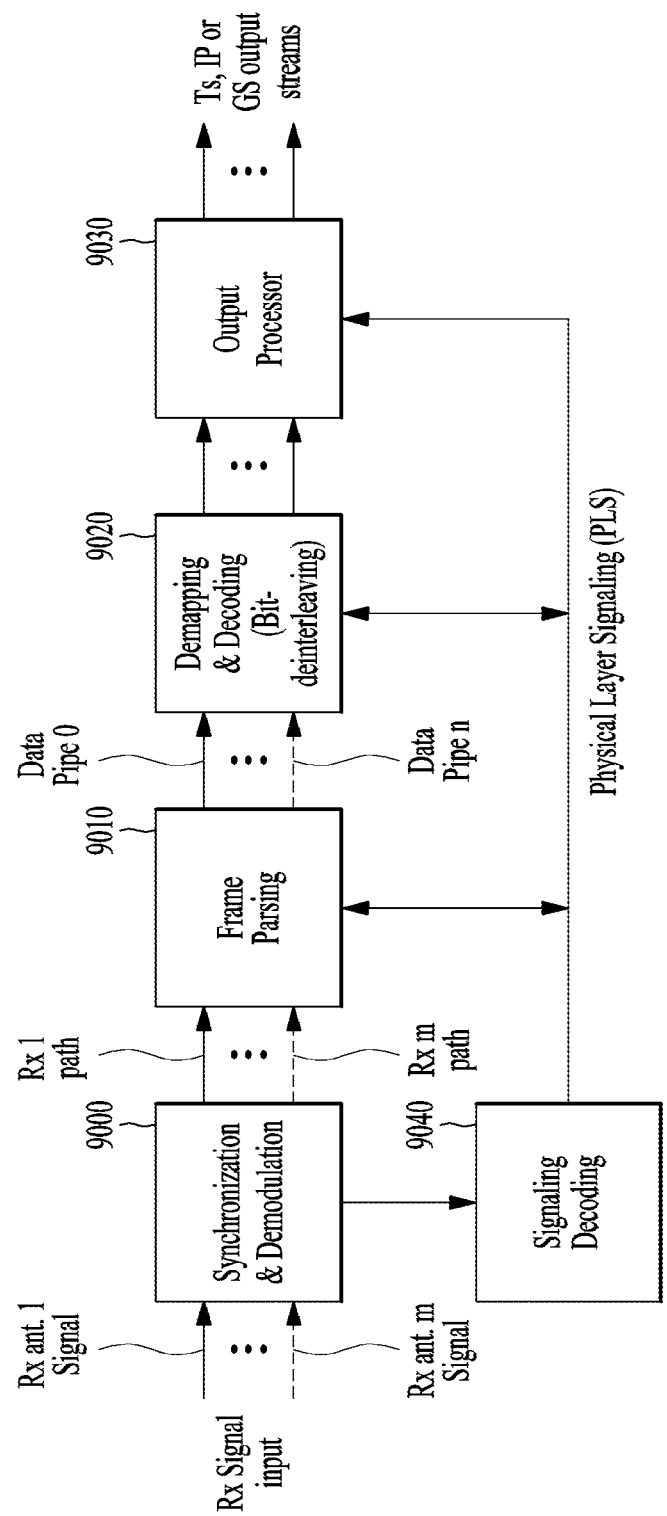
FIG. 22 is a block diagram illustrating a configuration of a broadcast signal reception apparatus for future broadcast services according to an embodiment of the present invention.

Each shortened and punctured PLS1 and PLS2 coded block is interleaved bit-by-bit as described in FIG. 22. Each block of additional parity bits is interleaved with the same block interleaving structure but separately.

In the case of BPSK, there are two branches for bit interleaving to duplicate FEC coded bits in the real and imaginary parts. Each coded block is written to the upper branch first. The bits are mapped to the lower branch by applying modulo NFEC addition with cyclic shifting value floor(NFEC/2), where NFEC is the length of each LDPC coded block after shortening and puncturing.

In other modulation cases, such as QSPK, QAM-16 and NUQ-64, FEC coded bits are written serially into the interleaver column-wise, where the number of columns is the same as the modulation order.

In the read operation, the bits for one constellation symbol are read out sequentially row-wise and fed into the bit demultiplexer block. These operations are continued until the end of the column.

Each bit interleaved group is demultiplexed bit-by-bit in a group before constellation mapping. Depending on modulation order, there are two mapping rules. In the case of BPSK and QPSK, the reliability of bits in a symbol is equal. Therefore, the bit group read out from the bit interleaving block is mapped to a QAM symbol without any operation.

In the cases of QAM-16 and NUQ-64 mapped to a QAM symbol, the rule of operation is described in FIG. 23(a). As shown in FIG. 23(a), i is bit group index corresponding to column index in bit interleaving.

FIG. 21 shows the bit demultiplexing rule for QAM-16. This operation continues until all bit groups are read from the bit interleaving block.

FIG. 22 illustrates a configuration of a broadcast signal reception apparatus for future broadcast services according to an embodiment of the present invention.

The broadcast signal reception apparatus for future broadcast services according to the embodiment of the present invention may correspond to the broadcast signal transmission apparatus for future broadcast services described with reference to FIG. 18.

The broadcast signal reception apparatus for future broadcast services according to the embodiment of the present invention may include a synchronization & demodulation module 9000, a frame parsing module 9010, a demapping & decoding module 9020, an output processor 9030 and a signaling decoding module 9040. A description will be given of operation of each module of the broadcast signal reception apparatus.

The synchronization & demodulation module 9000 may receive input signals through m Rx antennas, perform signal detection and synchronization with respect to a system corresponding to the broadcast signal reception apparatus, and carry out demodulation corresponding to a reverse procedure of a procedure performed by the broadcast signal transmission apparatus.

The frame parsing module 9010 may parse input signal frames and extract data through which a service selected by a user is transmitted. If the broadcast signal transmission apparatus performs interleaving, the frame parsing module 9010 may carry out deinterleaving corresponding to a reverse procedure of interleaving. In this case, positions of a signal and data that need to be extracted may be obtained by decoding data output from the signaling decoding module 9040 to restore scheduling information generated by the broadcast signal transmission apparatus.

The demapping & decoding module 9020 may convert input signals into bit domain data and then deinterleave the same as necessary. The demapping & decoding module 9020 may perform demapping of mapping applied for transmission efficiency and correct an error generated on a transmission channel through decoding. In this case, the demapping & decoding module 9020 may obtain transmission parameters necessary for demapping and decoding by decoding data output from the signaling decoding module 9040.

The output processor 9030 may perform reverse procedures of various compression/signal processing procedures which are applied by the broadcast signal transmission apparatus to improve transmission efficiency. In this case, the output processor 9030 may acquire necessary control information from data output from the signaling decoding module 9040. An output of the output processor 9030 corresponds to a signal input to the broadcast signal transmission apparatus and may be MPEG-TSs, IP streams (v4 or v6) and generic streams.

The signaling decoding module 9040 may obtain PLS information from a signal demodulated by the synchronization & demodulation module 9000. As described above, the frame parsing module 9010, the demapping & decoding module 9020 and the output processor 9030 may execute functions thereof using data output from the signaling decoding module 9040.

A frame according to an embodiment of the present invention is further divided into a number of OFDM symbols and a preamble. As shown in (d), the frame includes a preamble, one or more frame signaling symbols (FSSs), normal data symbols and a frame edge symbol (FES).

The preamble is a special symbol that enables fast future-cast UTB system signal detection and provides a set of basic transmission parameters for efficient transmission and reception of a signal. Details of the preamble will be described later.

A main purpose of the FSS is to carry PLS data. For fast synchronization and channel estimation, and hence fast decoding of PLS data, the FSS has a dense pilot pattern than a normal data symbol. The FES has exactly the same pilots as the FSS, which enables frequency-only interpolation within the FES and temporal interpolation, without extrapolation, for symbols immediately preceding the FES.

Figure 23:
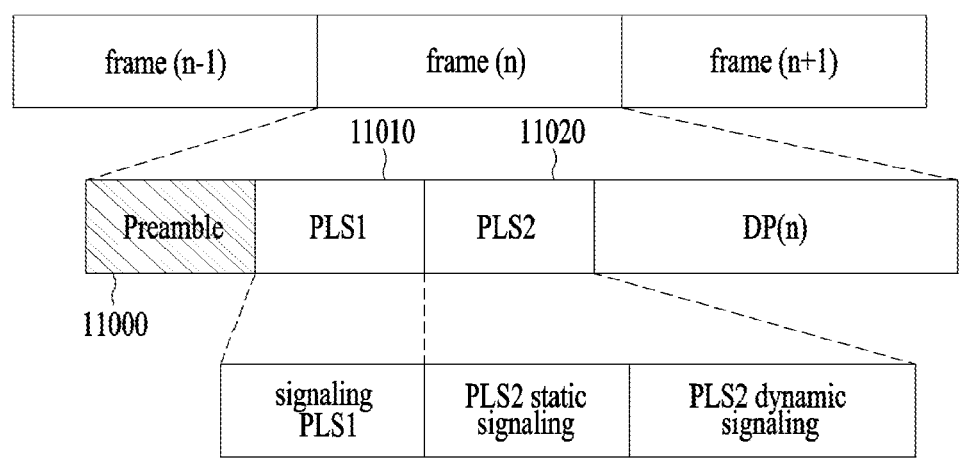
FIG. 23 illustrates a signaling hierarchy structure of a frame according to an embodiment of the present invention.

FIG. 23 illustrates a signaling hierarchy structure of a frame according to an embodiment of the present invention.

FIG. 23 illustrates the signaling hierarchy structure, which is split into three main parts corresponding to preamble signaling data 11000, PLS1 data 11010 and PLS2 data 11020. A purpose of a preamble, which is carried by a preamble symbol in every frame, is to indicate a transmission type and basic transmission parameters of the frame. PLS1 enables the receiver to access and decode the PLS2 data, which contains the parameters to access a DP of interest. PLS2 is carried in every frame and split into two main parts corresponding to PLS2-STAT data and PLS2-DYN data. Static and dynamic portions of PLS2 data are followed by padding, if necessary.

Preamble signaling data according to an embodiment of the present invention carries 21 bits of information that are needed to enable the receiver to access PLS data and trace DPs within the frame structure. Details of the preamble signaling data are as follows.

FFT_SIZE: This 2-bit field indicates an FFT size of a current frame within a frame group as described in the following Table 1.

TABLE 1

| Value | FFT size |
| --- | --- |
| 00 | 8K FFT |
| 01 | 16K FFT |
| 10 | 32K FFT |
| 11 | Reserved |

GI_FRACTION: This 3-bit field indicates a guard interval fraction value in a current superframe as described in the following Table 2.

TABLE 2

| Value | GI_FRACTION |
| --- | --- |
| 000 | 1/5 |
| 001 | 1/10 |
| 010 | 1/20 |
| 011 | 1/40 |
| 100 | 1/80 |
| 101 | 1/160 |
| 110 to 111 | Reserved |

EAC_FLAG: This 1-bit field indicates whether the EAC is provided in a current frame. If this field is set to '1', an emergency alert service (EAS) is provided in the current frame. If this field set to '0', the EAS is not carried in the current frame. This field may be switched dynamically within a superframe.

PILOT_MODE: This 1-bit field indicates whether a pilot mode is a mobile mode or a fixed mode for a current frame in a current frame group. If this field is set to '0', the mobile pilot mode is used. If the field is set to '1', the fixed pilot mode is used.

PAPR_FLAG: This 1-bit field indicates whether PAPR reduction is used for a current frame in a current frame group. If this field is set to a value of '1', tone reservation is used for PAPR reduction. If this field is set to a value of '0', PAPR reduction is not used.

RESERVED: This 7-bit field is reserved for future use.

FIG. 24 illustrates PLS1 data according to an embodiment of the present invention.

PLS1 data provides basic transmission parameters including parameters required to enable reception and decoding of PLS2. As mentioned above, the PLS1 data remain unchanged for the entire duration of one frame group. A detailed definition of the signaling fields of the PLS1 data is as follows.

PREAMBLE_DATA: This 20-bit field is a copy of preamble signaling data excluding EAC FLAG.

NUM_FRAME_FRU: This 2-bit field indicates the number of the frames per FRU.

PAYLOAD_TYPE: This 3-bit field indicates a format of payload data carried in a frame group. PAYLOAD_TYPE is signaled as shown in Table 3.

TABLE 3

| Value | Payload type |
|---|---|
| 1XX | TS is transmitted. |
| X1X | IP stream is transmitted. |
| XX1 | GS is transmitted. |

NUM_FSS: This 2-bit field indicates the number of FSSs in a current frame.

SYSTEM_VERSION: This 8-bit field indicates a version of a transmitted signal format. SYSTEM_VERSION is divided into two 4-bit fields: a major version and a minor version.

Major version: The MSB corresponding to four bits of the SYSTEM_VERSION field indicates major version information. A change in the major version field indicates a non-backward-compatible change. A default value is '0000'. For a version described in this standard, a value is set to '0000'.

Minor version: The LSB corresponding to four bits of SYSTEM_VERSION field indicates minor version information. A change in the minor version field is backwards compatible.

CELL_ID: This is a 16-bit field which uniquely identifies a geographic cell in an ATSC network. An ATSC cell coverage area may include one or more frequencies depending on the number of frequencies used per futurecast UTB system. If a value of CELL_ID is not known or unspecified, this field is set to '0'.

NETWORK ID: This is a 16-bit field which uniquely identifies a current ATSC network.

SYSTEM_ID: This 16-bit field uniquely identifies the futurecast UTB system within the ATSC network. The futurecast UTB system is a terrestrial broadcast system whose input is one or more input streams (TS, IP, GS) and whose output is an RF signal. The futurecast UTB system carries one or more PHY profiles and FEF, if any. The same futurecast UTB system may carry different input streams and use different RFs in different geographical areas, allowing local service insertion. The frame structure and scheduling are controlled in one place and are identical for all transmissions within the futurecast UTB system. One or more futurecast UTB systems may have the same SYSTEM_ID meaning that they all have the same physical layer structure and configuration.

The following loop includes FRU_PHY_PROFILE, FRU_FRAME_LENGTH, FRU_GI_FRACTION, and RESERVED which are used to indicate an FRU configuration and a length of each frame type. A loop size is fixed so that four PHY profiles (including an FEF) are signaled within the FRU. If NUM_FRAME_FRU is less than 4, unused fields are filled with zeros.

FRU_PHY_PROFILE: This 3-bit field indicates a PHY profile type of an (i+1)th (i is a loop index) frame of an associated FRU. This field uses the same signaling format as shown in Table 8.

FRU_FRAME_LENGTH: This 2-bit field indicates a length of an (i+1)th frame of an associated FRU. Using FRU_FRAME_LENGTH together with FRU_GI_FRACTION, an exact value of a frame duration may be obtained.

FRU_GI_FRACTION: This 3-bit field indicates a guard interval fraction value of an (i+1)th frame of an associated FRU. FRU_GI_FRACTION is signaled according to Table 7.

RESERVED: This 4-bit field is reserved for future use.

The following fields provide parameters for decoding the PLS2 data.

PLS2_FEC_TYPE: This 2-bit field indicates an FEC type used by PLS2 protection. The FEC type is signaled according to Table 4. Details of LDPC codes will be described later.

TABLE 4

| Content | PLS2 FEC type |
|---|---|
| 00 | 4K-1/4 and 7K-3/10 LDPC codes |
| 01 to 11 | Reserved |

PLS2_MOD: This 3-bit field indicates a modulation type used by PLS2. The modulation type is signaled according to Table 5.

TABLE 5

| Value | PLS2_MODE |
|---|---|
| 000 | BPSK |
| 001 | QPSK |
| 010 | QAM-16 |
| 011 | NUQ-64 |
| 100 to 111 | Reserved |

PLS2_SIZE_CELL: This 15-bit field indicates $C_{total\_partial\_block}$, a size (specified as the number of QAM cells) of the collection of full coded blocks for PLS2 that is carried in a current frame group. This value is constant during the entire duration of the current frame group.

PLS2_STAT_SIZE_BIT: This 14-bit field indicates a size, in bits, of PLS2-STAT for a current frame group. This value is constant during the entire duration of the current frame group.

PLS2_DYN_SIZE_BIT: This 14-bit field indicates a size, in bits, of PLS2-DYN for a current frame group. This value is constant during the entire duration of the current frame group.

PLS2_REP_FLAG: This 1-bit flag indicates whether a PLS2 repetition mode is used in a current frame group. When this field is set to a value of '1', the PLS2 repetition mode is activated. When this field is set to a value of '0', the PLS2 repetition mode is deactivated.

PLS2_REP_SIZE_CELL: This 15-bit field indicates $C_{total\_partial\_block}$, a size (specified as the number of QAM cells) of the collection of partial coded blocks for PLS2 carried in every frame of a current frame group, when PLS2 repetition is used. If repetition is not used, a value of this field is equal to 0. This value is constant during the entire duration of the current frame group.

PLS2_NEXT_FEC_TYPE: This 2-bit field indicates an FEC type used for PLS2 that is carried in every frame of a next frame group. The FEC type is signaled according to Table 10.

PLS2_NEXT_MOD: This 3-bit field indicates a modulation type used for PLS2 that is carried in every frame of a next frame group. The modulation type is signaled according to Table 11.

PLS2_NEXT_REP_FLAG: This 1-bit flag indicates whether the PLS2 repetition mode is used in a next frame group. When this field is set to a value of '1', the PLS2 repetition mode is activated. When this field is set to a value of '0', the PLS2 repetition mode is deactivated.

PLS2_NEXT_REP_SIZE_CELL: This 15-bit field indicates $C_{total\_full\_block}$, a size (specified as the number of QAM cells) of the collection of full coded blocks for PLS2 that is carried in every frame of a next frame group, when PLS2 repetition is used. If repetition is not used in the next frame group, a value of this field is equal to 0. This value is constant during the entire duration of a current frame group.

PLS2_NEXT_REP_STAT_SIZE_BIT: This 14-bit field indicates a size, in bits, of PLS2-STAT for a next frame group. This value is constant in a current frame group.

PLS2_NEXT_REP_DYN_SIZE_BIT: This 14-bit field indicates the size, in bits, of the PLS2-DYN for a next frame group. This value is constant in a current frame group.

PLS2_AP MODE: This 2-bit field indicates whether additional parity is provided for PLS2 in a current frame group. This value is constant during the entire duration of the current frame group. Table 6 below provides values of this field. When this field is set to a value of '00', additional parity is not used for the PLS2 in the current frame group.

TABLE 6

| Value | PLS2-AP mode |
| --- | --- |
| 00 | AP is not provided |
| 01 | AP1 mode |
| 10 to 11 | Reserved |

PLS2_AP_SIZE_CELL: This 15-bit field indicates a size (specified as the number of QAM cells) of additional parity bits of PLS2. This value is constant during the entire duration of a current frame group.

PLS2_NEXT_AP_MODE: This 2-bit field indicates whether additional parity is provided for PLS2 signaling in every frame of a next frame group. This value is constant during the entire duration of a current frame group. Table 12 defines values of this field.

PLS2_NEXT_AP_SIZE_CELL: This 15-bit field indicates a size (specified as the number of QAM cells) of additional parity bits of PLS2 in every frame of a next frame group. This value is constant during the entire duration of a current frame group.

RESERVED: This 32-bit field is reserved for future use.

CRC_32: A 32-bit error detection code, which is applied to all PLS1 signaling.

FIG. 25 illustrates PLS2 data according to an embodiment of the present invention.

FIG. 25 illustrates PLS2-STAT data of the PLS2 data. The PLS2-STAT data is the same within a frame group, while PLS2-DYN data provides information that is specific for a current frame.

Details of fields of the PLS2-STAT data are described below.

FIC_FLAG: This 1-bit field indicates whether the FIC is used in a current frame group. If this field is set to '1', the FIC is provided in the current frame. If this field set to '0', the FIC is not carried in the current frame. This value is constant during the entire duration of a current frame group.

AUX_FLAG: This 1-bit field indicates whether an auxiliary stream is used in a current frame group. If this field is set to '1', the auxiliary stream is provided in a current frame. If this field set to '0', the auxiliary stream is not carried in the current frame. This value is constant during the entire duration of current frame group.

NUM_DP: This 6-bit field indicates the number of DPs carried within a current frame. A value of this field ranges from 1 to 64, and the number of DPs is NUM_DP+1.

DP_ID: This 6-bit field identifies uniquely a DP within a PHY profile.

DP_TYPE: This 3-bit field indicates a type of a DP. This is signaled according to the following Table 7.

TABLE 7

| Value | DP Type |
| --- | --- |
| 000 | DP Type 1 |
| 001 | DP Type 2 |
| 010 to 111 | Reserved |

DP_GROUP_ID: This 8-bit field identifies a DP group with which a current DP is associated. This may be used by the receiver to access DPs of service components associated with a particular service having the same DP_GROUP_ID.

BASE_DP_ID: This 6-bit field indicates a DP carrying service signaling data (such as PSI/SI) used in a management layer. The DP indicated by BASE_DP_ID may be either a normal DP carrying the service signaling data along with service data or a dedicated DP carrying only the service signaling data.

DP_FEC_TYPE: This 2-bit field indicates an FEC type used by an associated DP. The FEC type is signaled according to the following Table 8.

TABLE 8

| Value | FEC_TYPE |
| --- | --- |
| 00 | 16K LDPC |
| 01 | 64K LDPC |
| 10 to 11 | Reserved |

DP_COD: This 4-bit field indicates a code rate used by an associated DP. The code rate is signaled according to the following Table 9.

TABLE 9

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001 to 1111 | Reserved |

DP_MOD: This 4-bit field indicates modulation used by an associated DP. The modulation is signaled according to the following Table 10.

TABLE 10

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001 to 1111 | Reserved |

DP_SSD_FLAG: This 1-bit field indicates whether an SSD mode is used in an associated DP. If this field is set to a value of '1', SSD is used. If this field is set to a value of '0', SSD is not used.

The following field appears only if PHY_PROFILE is equal to '010', which indicates the advanced profile:

DP_MIMO: This 3-bit field indicates which type of MIMO encoding process is applied to an associated DP. A type of MIMO encoding process is signaled according to the following Table 11.

TABLE 11

| Value | MIMO encoding |
|---|---|
| 000 | FR-SM |
| 001 | FRFD-SM |
| 010 to 111 | Reserved |

DP_TI TYPE: This 1-bit field indicates a type of time interleaving. A value of '0' indicates that one TI group corresponds to one frame and contains one or more TI blocks. A value of '1' indicates that one TI group is carried in more than one frame and contains only one TI block.

DP_TI_LENGTH: The use of this 2-bit field (allowed values are only 1, 2, 4, and 8) is determined by values set within the DP TI TYPE field as follows.

If DP_TI_TYPE is set to a value of '1', this field indicates PI, the number of frames to which each TI group is mapped, and one TI block is present per TI group (NTI=1). Allowed values of PI with the 2-bit field are defined in Table 12 below.

If DPTI TYPE is set to a value of '0', this field indicates the number of TI blocks NTI per TI group, and one TI group is present per frame (PI=1). Allowed values of PI with the 2-bit field are defined in the following Table 12.

TABLE 12

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates a frame interval (IJUMP) within a frame group for an associated DP and allowed values are 1, 2, 4, and 8 (the corresponding 2-bit field is '00', '01', '10', or '11', respectively). For DPs that do not appear every frame of the frame group, a value of this field is equal to an interval between successive frames. For example, if a DP appears on frames 1, 5, 9, 13, etc., this field is set to a value of '4'. For DPs that appear in every frame, this field is set to a value of '1'.

DP_TI_BYPASS: This 1-bit field determines availability of the time interleaver 5050. If time interleaving is not used for a DP, a value of this field is set to '1'. If time interleaving is used, the value is set to '0'.

DP_FIRST_FRAME_IDX: This 5-bit field indicates an index of a first frame of a superframe in which a current DP occurs. A value of DP_FIRST_FRAME_IDX ranges from 0 to 31.

DP_NUM_BLOCK_MAX: This 10-bit field indicates a maximum value of DP_NUM_BLOCKS for this DP. A value of this field has the same range as DP_NUM_BLOCKS.

DP_PAYLOAD_TYPE: This 2-bit field indicates a type of payload data carried by a given DP. DP_PAYLOAD_TYPE is signaled according to the following Table 13.

TABLE 13

| Value | Payload type |
|---|---|
| 00 | TS |
| 01 | IP |
| 10 | GS |
| 11 | Reserved |

DP_INBAND_MODE: This 2-bit field indicates whether a current DP carries in-band signaling information. An in-band signaling type is signaled according to the following Table 14.

TABLE 14

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates a protocol type of a payload carried by a given DP. The protocol type is signaled according to Table 15 below when input payload types are selected.

TABLE 15

| Value | If DP_PAYLOAD_TYPE is TS | If DP_PAYLOAD_TYPE is IP | If DP_PAYLOAD_TYPE is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in an input formatting block. A CRC mode is signaled according to the following Table 16.

TABLE 16

| Value | CRC mode |
|---|---|
| 00 | Not used |
| 01 | CRC-8 |
| 10 | CRC-16 |
| 11 | CRC-32 |

DNP_MODE: This 2-bit field indicates a null-packet deletion mode used by an associated DP when DP_PAYLOAD_TYPE is set to TS ('00'). DNP_MODE is signaled according to Table 17 below. If DP_PAYLOAD_TYPE is not TS ('00'), DNP_MODE is set to a value of '00'.

TABLE 17

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates an ISSY mode used by an associated DP when DP_PAYLOAD_TYPE is set to TS ('00'). ISSY_MODE is signaled according to Table 18 below. If DP_PAYLOAD_TYPE is not TS ('00'), ISSY_MODE is set to the value of '00'.

TABLE 18

| Value | ISSY mode |
| --- | --- |
| 00 | Not used |
| 01 | ISSY-UP |
| 10 | ISSY-BBF |
| 11 | Reserved |

HC_MODE_TS: This 2-bit field indicates a TS header compression mode used by an associated DP when DP_PAYLOAD_TYPE is set to TS ('00'). HC_MODE_TS is signaled according to the following Table 19.

TABLE 19

| Value | Header compression mode |
| --- | --- |
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates an IP header compression mode when DP_PAYLOAD_TYPE is set to IP ('01'). HC_MODE_IP is signaled according to the following Table 20.

TABLE 20

| Value | Header compression mode |
| --- | --- |
| 00 | No compression |
| 01 | HC_MODE_IP 1 |
| 10 to 11 | Reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following fields appear only if FIC_FLAG is equal to '1'.

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following fields appear only if AUX_FLAG is equal to '1'.

NUM_AUX: This 4-bit field indicates the number of auxiliary streams. Zero means no auxiliary stream is used.

AUX_CONFIG_RFU: This 8-bit field is reserved for future use.

AUX_STREAM_TYPE: This 4-bit is reserved for future use for indicating a type of a current auxiliary stream.

AUX_PRIVATE_CONFIG: This 28-bit field is reserved for future use for signaling auxiliary streams.

Figures 26, 27:
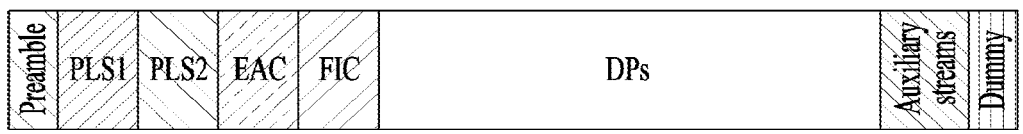
FIG. 26 is a table illustrating PLS2 data according to another embodiment of the present invention.
FIG. 27 illustrates a logical structure of a frame according to an embodiment of the present invention.

FIG. 26 illustrates PLS2 data according to another embodiment of the present invention.

FIG. 26 illustrates PLS2-DYN data of the PLS2 data. Values of the PLS2-DYN data may change during the duration of one frame group while sizes of fields remain constant.

Details of fields of the PLS2-DYN data are as below.

FRAME_INDEX: This 5-bit field indicates a frame index of a current frame within a superframe. An index of a first frame of the superframe is set to '0'.

PLS_CHANGE_COUNTER: This 4-bit field indicates the number of superframes before a configuration changes. A next superframe with changes in the configuration is indicated by a value signaled within this field. If this field is set to a value of '0000', it means that no scheduled change is foreseen. For example, a value of '1' indicates that there is a change in the next superframe.

FIC_CHANGE_COUNTER: This 4-bit field indicates the number of superframes before a configuration (i.e., content of the FIC) changes. A next superframe with changes in the configuration is indicated by a value signaled within this field. If this field is set to a value of '0000', it means that no scheduled change is foreseen. For example, a value of '0001' indicates that there is a change in the next superframe.

RESERVED: This 16-bit field is reserved for future use.

The following fields appear in a loop over NUM_DP, which describe parameters associated with a DP carried in a current frame.

DP_ID: This 6-bit field uniquely indicates a DP within a PHY profile.

DP_START: This 15-bit (or 13-bit) field indicates a start position of the first of the DPs using a DPU addressing scheme. The DP_START field has differing length according to the PHY profile and FFT size as shown in the following Table 21.

TABLE 21

| | DP_START field size | |
| --- | --- | --- |
| PHY profile | 64K | 16K |
| Base | 13 bits | 15 bits |
| Handheld | — | 13 bits |
| Advanced | 13 bits | 15 its |

DP_NUM_BLOCK: This 10-bit field indicates the number of FEC blocks in a current TI group for a current DP. A value of DP_NUM_BLOCK ranges from 0 to 1023.

RESERVED: This 8-bit field is reserved for future use.

The following fields indicate FIC parameters associated with the EAC.

EAC_FLAG: This 1-bit field indicates the presence of the EAC in a current frame. This bit is the same value as EAC_FLAG in a preamble.

EAS_WAKE_UP_VERSION_NUM: This 8-bit field indicates a version number of a wake-up indication.

If the EAC_FLAG field is equal to '1', the following 12 bits are allocated to EAC_LENGTH_BYTE. If the EAC_FLAG field is equal to '0', the following 12 bits are allocated to EAC COUNTER.

EAC_LENGTH_BYTE: This 12-bit field indicates a length, in bytes, of the EAC.

EAC_COUNTER: This 12-bit field indicates the number of frames before a frame where the EAC arrives.

The following fields appear only if the AUX_FLAG field is equal to '1'.

AUX_PRIVATE_DYN: This 48-bit field is reserved for future use for signaling auxiliary streams. A meaning of this field depends on a value of AUX_STREAM_TYPE in a configurable PLS2-STAT.

CRC_32: A 32-bit error detection code, which is applied to the entire PLS2.

FIG. 27 illustrates a logical structure of a frame according to an embodiment of the present invention.

As above mentioned, the PLS, EAC, FIC, DPs, auxiliary streams and dummy cells are mapped to the active carriers of OFDM symbols in a frame. PLS1 and PLS2 are first mapped to one or more FSSs. Thereafter, EAC cells, if any, are mapped to an immediately following PLS field, followed next by FIC cells, if any. The DPs are mapped next after the PLS or after the EAC or the FIC, if any. Type 1 DPs are mapped first and Type 2 DPs are mapped next. Details of types of the DPs will be described later. In some cases, DPs may carry some special data for EAS or service signaling data. The auxiliary streams or streams, if any, follow the DPs, which in turn are followed by dummy cells. When the PLS, EAC, FIC, DPs, auxiliary streams and dummy data cells are mapped all together in the above mentioned order, i.e. the PLS, EAC, FIC, DPs, auxiliary streams and dummy data cells, cell capacity in the frame is exactly filled.

Figure 28:
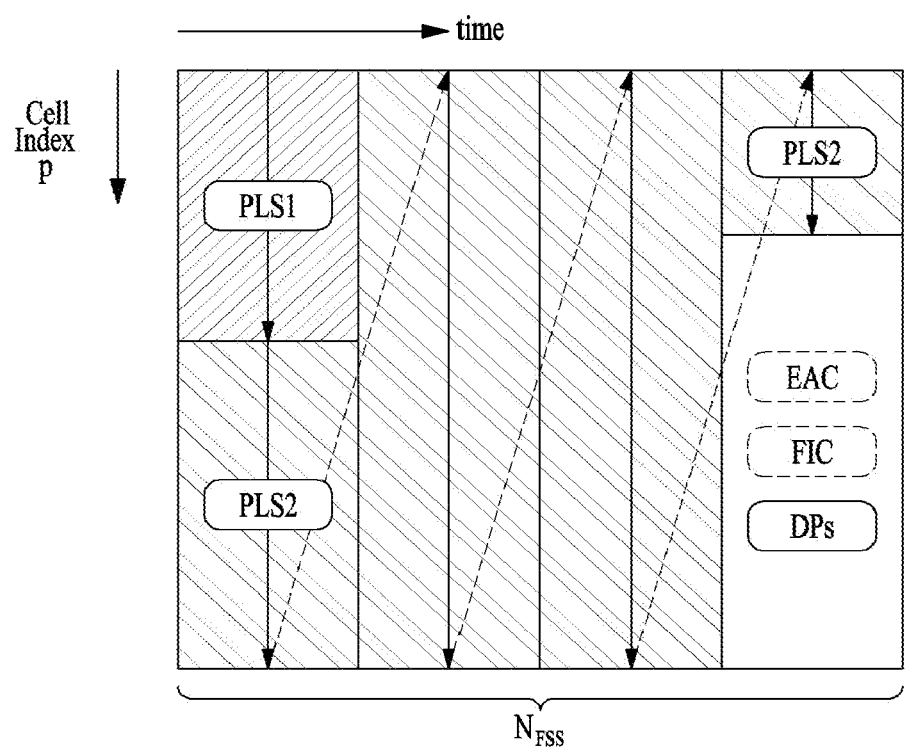
FIG. 28 illustrates PLS mapping according to an embodiment of the present invention.

FIG. 28 illustrates PLS mapping according to an embodiment of the present invention.

PLS cells are mapped to active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) have higher pilot density, allowing fast synchronization and frequency-only interpolation within the FSS.

PLS cells are mapped to active carriers of the FSS(s) in a top-down manner as shown in the figure. PLS1 cells are mapped first from a first cell of a first FSS in increasing order of cell index. PLS2 cells follow immediately after a last cell of PLS1 and mapping continues downward until a last cell index of the first FSS. If the total number of required PLS cells exceeds the number of active carriers of one FSS, mapping proceeds to a next FSS and continues in exactly the same manner as the first FSS.

After PLS mapping is completed, DPs are carried next. If an EAC, an FIC or both are present in a current frame, the EAC and the FIC are placed between the PLS and "normal" DPs.

Hereinafter, description will be given of encoding an FEC structure according to an embodiment of the present invention. As above mentioned, the data FEC encoder may perform FEC encoding on an input BBF to generate an FECBLOCK procedure using outer coding (BCH), and inner coding (LDPC). The illustrated FEC structure corresponds to the FECBLOCK. In addition, the FECBLOCK and the FEC structure have same value corresponding to a length of an LDPC codeword.

As described above, BCH encoding is applied to each BBF ($K_{bch}$ bits), and then LDPC encoding is applied to BCH-encoded BBF ($K_{ldpc}$ bits=$N_{bch}$ bits).

A value of $N_{ldpc}$ is either 64,800 bits (long FECBLOCK) or 16,200 bits (short FECBLOCK).

Table 22 and Table 23 below show FEC encoding parameters for the long FECBLOCK and the short FECBLOCK, respectively.

TABLE 22

| LDPC rate | $N_{ldpc}$ | $K_{ldpc}$ | $K_{bch}$ | BCH error correction capability | $N_{bch}$ - $K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 23

| LDPC rate | $N_{ldpc}$ | $K_{ldpc}$ | $K_{bch}$ | BCH error correction capability | $N_{bch}$ - $K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

Detailed operations of BCH encoding and LDPC encoding are as below.

A 12-error correcting BCH code is used for outer encoding of the BBF. A BCH generator polynomial for the short FECBLOCK and the long FECBLOCK are obtained by multiplying all polynomials together.

LDPC code is used to encode an output of outer BCH encoding. To generate a completed $B_{ldpc}$ (FECBLOCK), $P_{ldpc}$ (parity bits) is encoded systematically from each $I_{ldpc}$ (BCH—encoded BBF), and appended to $I_{ldpc}$. The completed $B_{ldpc}$ (FECBLOCK) is expressed by the following Equation.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}] \quad \text{[Equation 2]}$$

Parameters for the long FECBLOCK and the short FECBLOCK are given in the above Tables 22 and 23, respectively.

A detailed procedure to calculate $N_{ldpc}-K_{ldpc}$ parity bits for the long FECBLOCK, is as follows.

1) Initialize the parity bits $$p_0 = p_1 = p_2 = \ldots = p_{N_{ldpc}-K_{ldpc}-1} = 0 \quad \text{[Equation 3]}$$

2) Accumulate a first information bit—$i_0$, at a parity bit address specified in a first row of addresses of a parity check matrix. Details of the addresses of the parity check matrix will be described later. For example, for the rate of 13/15, $$p_{983} = p_{983} \oplus i_0 \quad p_{2815} = p_{2815} \oplus i_0$$

$$p_{4837} = p_{4837} \oplus i_0 \quad p_{4989} = p_{4989} \oplus i_0$$

$$p_{6138} = p_{6138} \oplus i_0 \quad p_{6458} = p_{6458} \oplus i_0$$

$$p_{6921} = p_{6921} \oplus i_0 \quad p_{6974} = p_{6974} \oplus i_0$$

$$p_{7572} = p_{7572} \oplus i_0 \quad p_{8260} = p_{8260} \oplus i_0$$

$$p_{8496} = p_{8496} \oplus i_0 \quad \text{[Equation 4]}$$

3) For the next 359 information bits, $i_s$, s=1, 2, ..., 359, accumulate is at parity bit addresses using following Equation.

$$\{x + (s \bmod 360) \times Q_{ldpc}\} \bmod (N_{ldpc}-K_{ldpc}) \quad \text{[Equation 5]}$$

Here, x denotes an address of a parity bit accumulator corresponding to a first bit $i_0$, and $Q_{ldpc}$ is a code rate dependent constant specified in the addresses of the parity check matrix. Continuing with the example, $Q_{ldpc}=24$ for the rate of 13/15, so for an information bit i1, the following operations are performed.

$$p_{1007} = p_{1007} \oplus i_0 \quad p_{2839} = p_{2839} \oplus i_0$$

$$p_{4861} = p_{4861} \oplus i_0 \quad p_{5013} = p_{5013} \oplus i_0$$

$$p_{6162} = p_{6162} \oplus i_0 \quad p_{6482} = p_{6482} \oplus i_0$$

$$p_{6945} = p_{6945} \oplus i_0 \quad p_{6998} = p_{6998} \oplus i_0$$

$$p_{7596} = p_{7596} \oplus i_0 \quad p_{8284} = p_{8484} \oplus i_0$$

$$p_{8520} = p_{8520} \oplus i_0 \quad \text{[Equation 6]}$$

4) For a 361th information bit $i_{360}$, an address of the parity bit accumulator is given in a second row of the addresses of the parity check matrix. In a similar manner, addresses of the parity bit accumulator for the following 359 information bits is, s=361, 362, . . . , 719 are obtained using Equation 6, where x denotes an address of the parity bit accumulator corresponding to the information bit $i_{360}$, i.e., an entry in the second row of the addresses of the parity check matrix.

5) In a similar manner, for every group of 360 new information bits, a new row from the addresses of the parity check matrix is used to find the address of the parity bit accumulator.

After all of the information bits are exhausted, a final parity bit is obtained as below.

6) Sequentially perform the following operations starting with i=1.

$$p_i = p_i \oplus p_{i-1}, i=1,2,\ldots,N_{ldpc}-K_{ldpc}-1 \quad \text{[Equation 7]}$$

Here, final content of $p_i$ (i=0, 1, . . . , $N_{ldpc}-K_{ldpc}-1$) is equal to a parity bit $p_i$.

TABLE 24

| Code rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for the short FEC-BLOCK is in accordance with t LDPC encoding procedure for the long FECBLOCK, except that Table 24 is replaced with Table 25, and the addresses of the parity check matrix for the long FECBLOCK are replaced with the addresses of the parity check matrix for the short FECBLOCK.

TABLE 25

| Code rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 29:
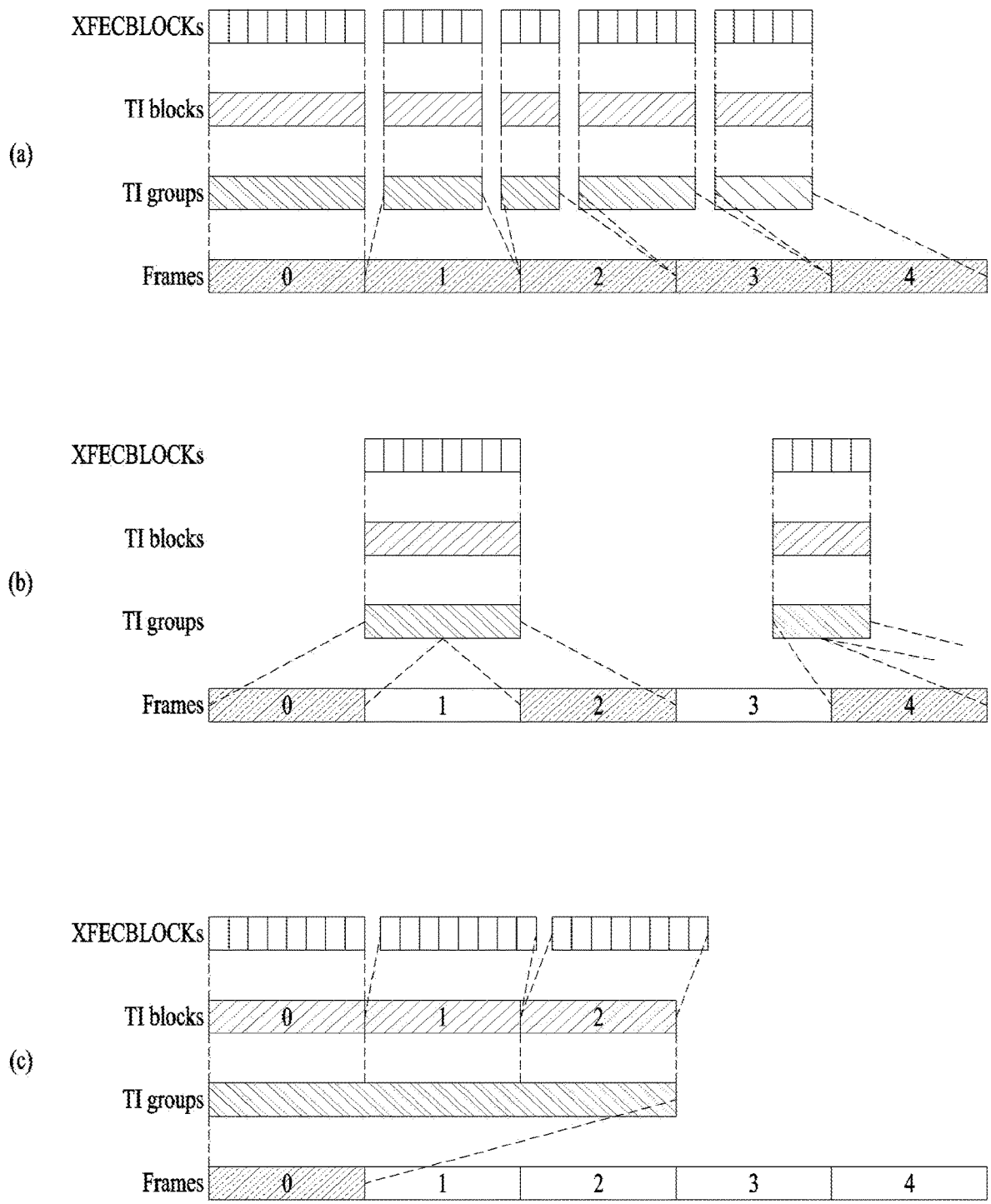
FIG. 29 illustrates time interleaving according to an embodiment of the present invention.

FIG. 29 illustrates time interleaving according to an embodiment of the present invention.

(a) to (c) show examples of a TI mode.

A time interleaver operates at the DP level. Parameters of time interleaving (TI) may be set differently for each DP.

The following parameters, which appear in part of the PLS2-STAT data, configure the TI.

DP_TI TYPE (allowed values: 0 or 1): This parameter represents the TI mode. The value of '0' indicates a mode with multiple TI blocks (more than one TI block) per TI group. In this case, one TI group is directly mapped to one frame (no inter-frame interleaving). The value of '1' indicates a mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): This parameter represents the maximum number of XFEC-BLOCKs per TI group.

DP_FRAME_INTERVAL (allowed values: 1, 2, 4, and 8): This parameter represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. This parameter is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the delay compensation block for the dynamic configuration information from the scheduler may still be required. In each DP, the XFECBLOCKs received from SSD/MIMO encoding are grouped into TI groups. That is, each TI group is a set of an integer number of XFEC-BLOCKs and contains a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from a minimum value of 0 to a maximum value of $N_{xBLOCK\_Group\_MAX}$ (corresponding to DP_NUM_BLOCK_MAX), the largest value of which is 1023.

Each TI group is either mapped directly to one frame or spread over PI frames. Each TI group is also divided into more than one TI block (NTI), where each TI block corresponds to one usage of a time interleaver memory. The TI blocks within the TI group may contain slightly different numbers of XFECBLOCKs. If the TI group is divided into multiple TI blocks, the TI group is directly mapped to only one frame. There are three options for time interleaving (except an extra option of skipping time interleaving) as shown in the following Table 26.

TABLE 26

| Modes | Descriptions |
|---|---|
| Option 1 | Each TI group contains one TI block and is mapped directly to one frame as shown in (a). This option is signaled in the PLS2-STAT by DP_TI_TYPE = '0' and DP_TI_LENGTH = '1' ($N_{TI}$ = 1). |
| Option 2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option 3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

Typically, the time interleaver may also function as a buffer for DP data prior to a process of frame building. This is achieved by means of two memory banks for each DP. A first TI block is written to a first bank. A second TI block is written to a second bank while the first bank is being read from and so on.

The TI is a twisted row-column block interleaver. For an sth TI block of an nth TI group, the number of rows $N_r$ of a TI memory is equal to the number of cells Ncells, i.e., $N_r=N_{cells}$ while the number of columns $N_c$ is equal to the number $N_{xBLOCK\_TI}(n,s)$.

Figure 30:
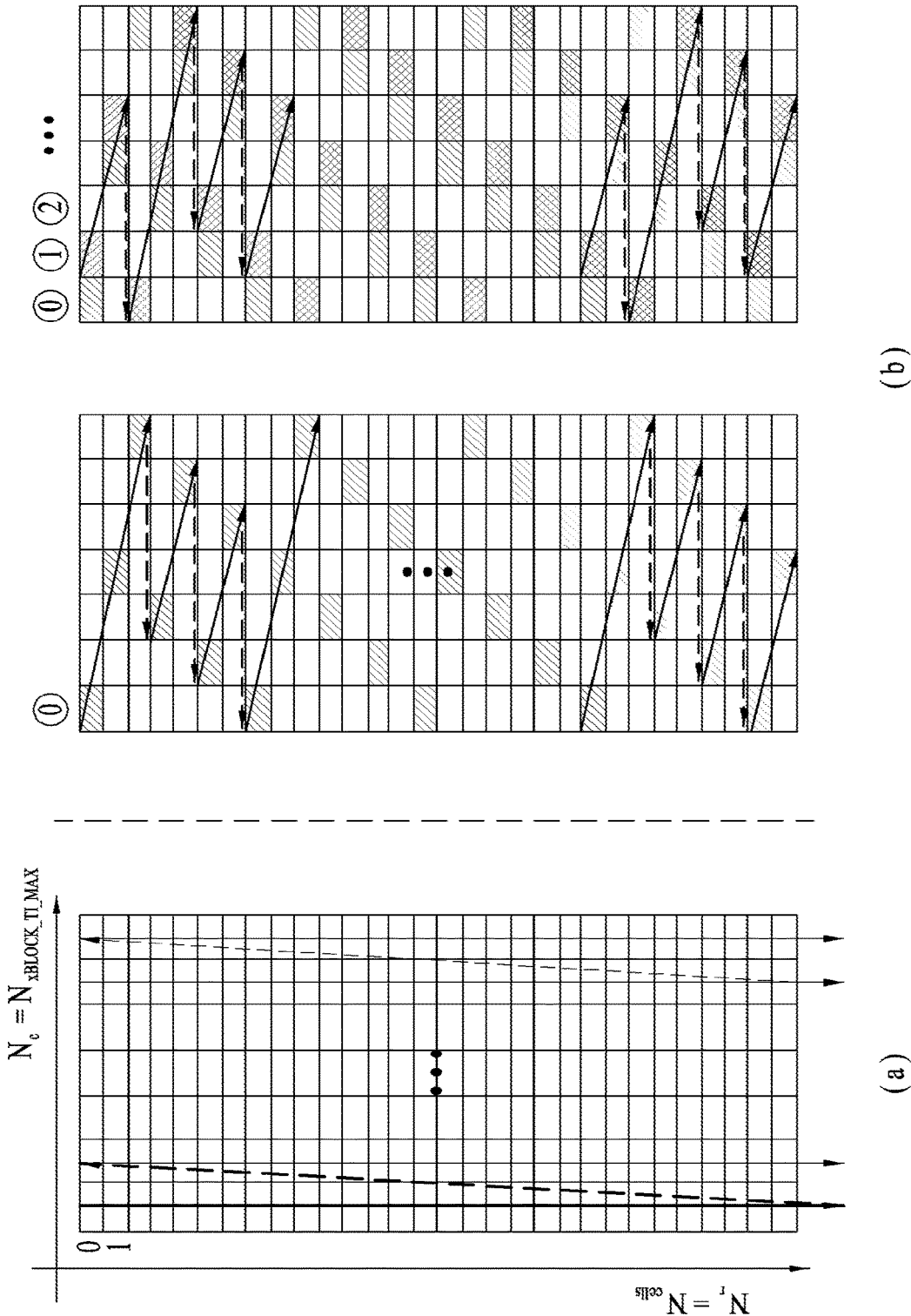
FIG. 30 illustrates a basic operation of a twisted row-column block interleaver according to an embodiment of the present invention.

FIG. 30 illustrates a basic operation of a twisted row-column block interleaver according to an embodiment of the present invention.

FIG. 30(a) shows a write operation in the time interleaver and FIG. 30(b) shows a read operation in the time interleaver. A first XFECBLOCK is written column-wise into a first column of a TI memory, and a second XFECBLOCK is written into a next column, and so on as shown in (a). Then, in an interleaving array, cells are read diagonal-wise. During diagonal-wise reading from a first row (rightwards along a row beginning with a left-most column) to a last row, $N_r$ cells are read out as shown in (b). In detail, assuming $z_{n,s,i}$ (i=0, . . . , $N_rN_c$) as a TI memory cell position to be read sequentially, a reading process in such an interleaving array is performed by calculating a row index $R_{n,s,i}$, a column index $C_{n,s,i}$, and an associated twisting parameter $T_{n,s,i}$ as in the following Equation.

$$\text{GENERATE}(R_{n,s,i}, C_{n,s,i}) = \begin{cases} R_{n,s,i} = \mod(i, N_r), \\ T_{n,s,i} = \mod(S_{shift} \times R_{n,s,i}, N_c), \\ C_{n,s,i} = \mod\left(T_{n,s,i} + \left\lfloor \frac{i}{N_r} \right\rfloor, N_c\right) \end{cases}$$ [Equation 8]

Here, $S_{shift}$ is a common shift value for a diagonal-wise reading process regardless of $N_{xBLOCK\_TI}(n,s)$, and the shift value is determined by $N_{xBLOCK\_TI\_MAX}$ given in PLS2-STAT as in the following Equation.

$$\text{for} \begin{cases} N'_{xBLOCK\_TI\_MAX} = N_{xBLOCK\_TI\_MAX} + 1, & \text{if } N'_{xBLOCK\_TI\_MAX} \mod 2 = 0 \\ N'_{xBLOCK\_TI\_MAX} = N_{xBLOCK\_TI\_MAX}, & \text{if } N'_{xBLOCK\_TI\_MAX} \mod 2 = 1 \end{cases}$$ [Equation 9]

$$S_{shift} = \frac{N'_{xBLOCK\_TI\_MAX} - 1}{2}$$

As a result, cell positions to be read are calculated by coordinates $z_{n,s,i} = N_r C_{n,s,i} + R_{n,s,i}$.

Figure 31:
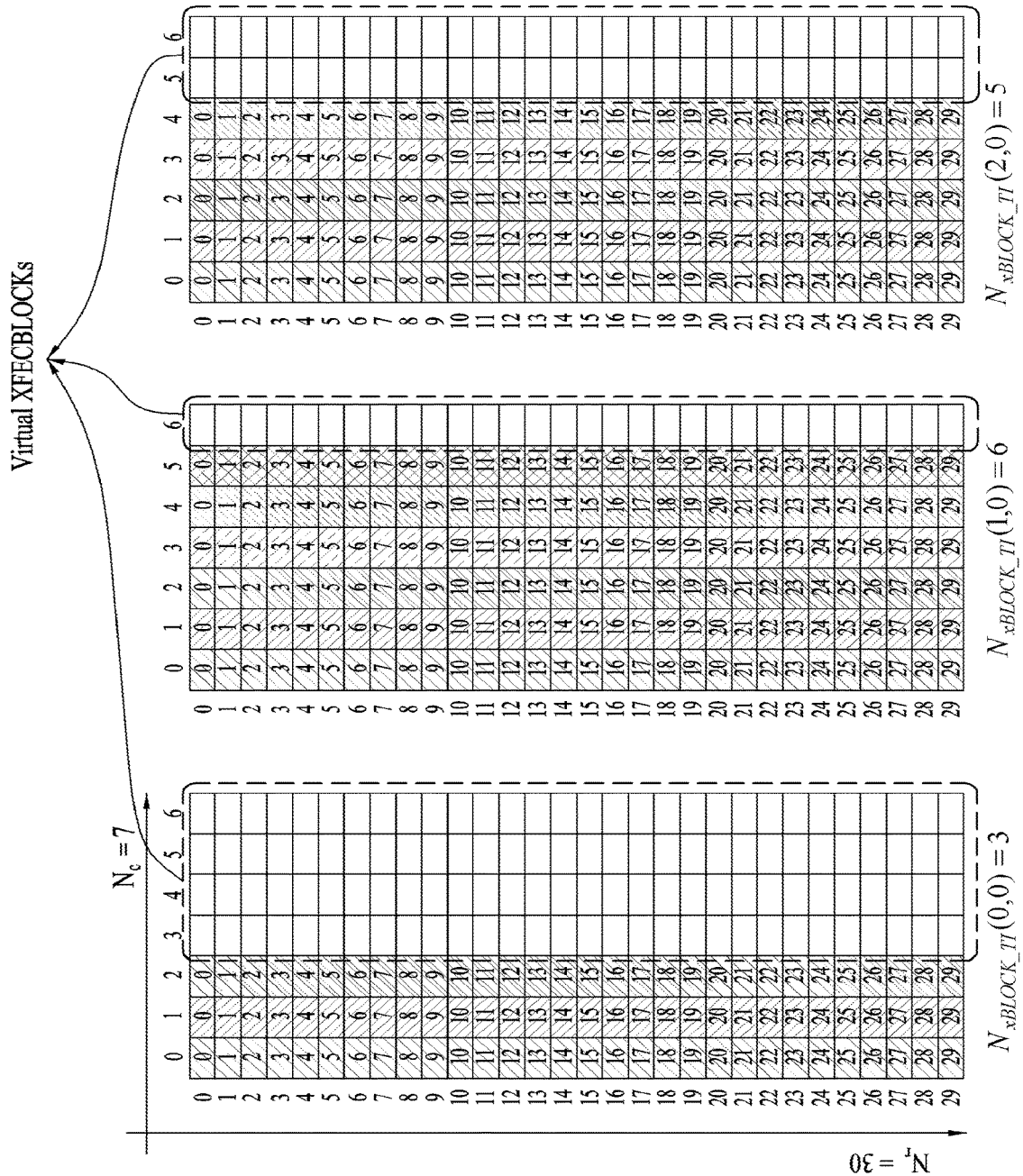
FIG. 31 illustrates an operation of a twisted row-column block interleaver according to another embodiment of the present invention.

FIG. 31 illustrates an operation of a twisted row-column block interleaver according to another embodiment of the present invention.

More specifically, FIG. 31 illustrates an interleaving array in a TI memory for each TI group, including virtual XFECBLOCKs when $N_{xBLOCK\_TI}(0,0)=3$, $N_{xBLOCK\_TI}(1,0)=6$, and $N_{xBLOCK\_TI}(2,0)=5$.

A variable number $N_{xBLOCK\_TI}(n,s)=N_r$ may be less than or equal to $N'_{xBLOCK\_TI\_MAX}$. Thus, in order to achieve single-memory deinterleaving at a receiver side regardless of $N_{xBLOCK\_TI}(n,s)$, the interleaving array for use in the twisted row-column block interleaver is set to a size of $N_r N_c = N_{cells} \times N'_{xBLOCK\_TI\_MAX}$ by inserting the virtual XFECBLOCKs into the TI memory and a reading process is accomplished as in the following Equation.

[Equation 10]
```
p = 0;
for i = 0;i < N_cells N'_xBLOCK_TI_MAX; i = i + 1
{GENERATE (R_{n,s,i}, C_{n,s,i});
V_i = N_r C_{n,s,i} + R_{n,s,i}
    if V_i < N_cells N_xBLOCK_TI(n,s)
    {
        Z_{n,s,p} = V_i; p = p + 1;
    }
}
```

The number of TI groups is set to 3. An option of the time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. A maximum number of XFECBLOCKs is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX}=6$.

The purpose of the Frequency Interleaver, which operates on data corresponding to a single OFDM symbol, is to provide frequency diversity by randomly interleaving data cells received from the frame builder. In order to get maximum interleaving gain in a single frame, a different interleaving-sequence is used for every OFDM symbol pair comprised of two sequential OFDM symbols.

Therefore, the frequency interleaver according to the present embodiment may include an interleaving address generator for generating an interleaving address for applying corresponding data to a symbol pair.

Figure 32:
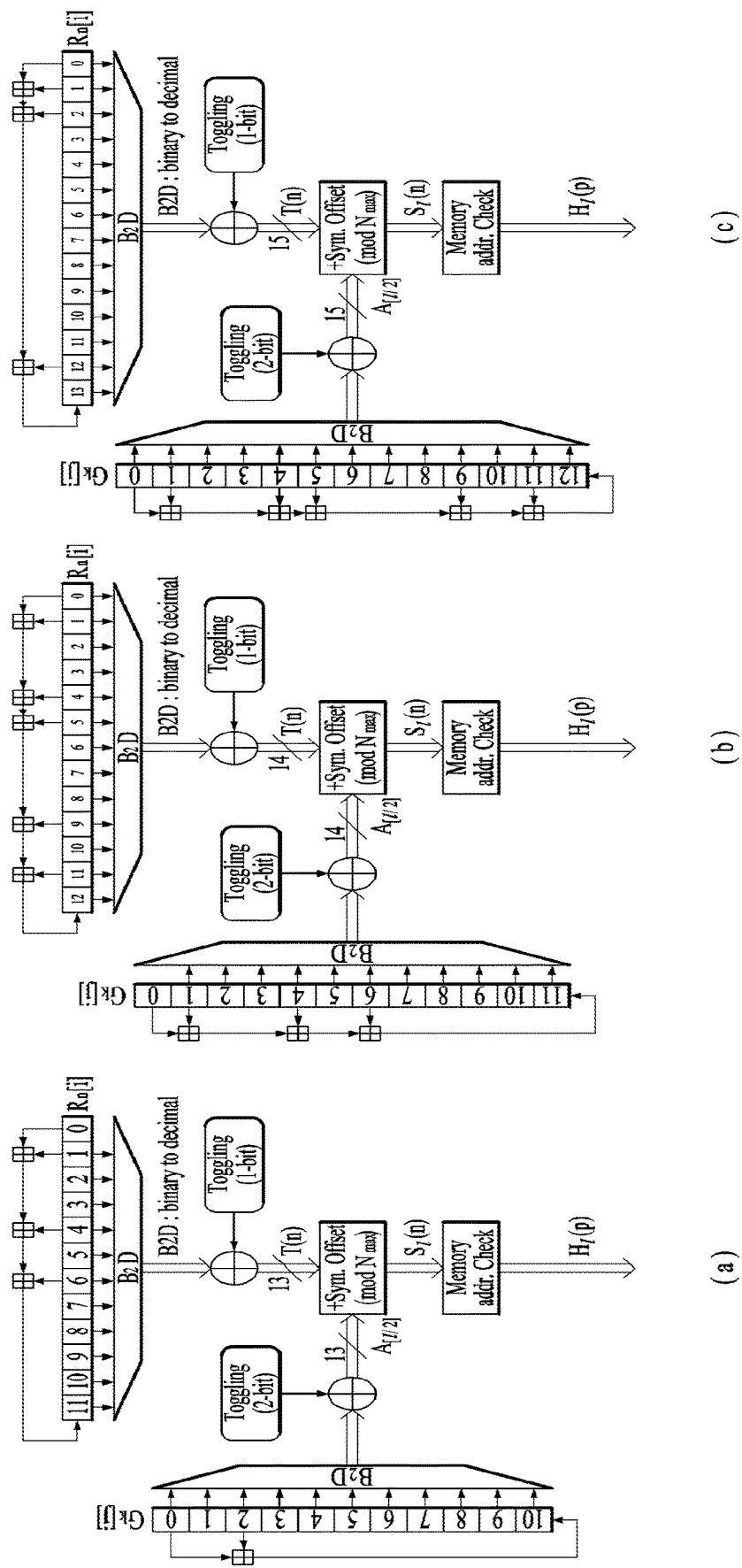
FIG. 32 is a block diagram illustrating an interleaving address generator including a main pseudo-random binary sequence (PRBS) generator and a sub-PRBS generator according to each FFT mode according to an embodiment of the present invention.

FIG. 32 illustrates an interleaving address generator including a main pseudo-random binary sequence (PRBS) generator and a sub-PRBS generator according to each FFT mode according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,0}, \ldots, x_{m,l,p}, \ldots, x_{m,l,N_{data}-1}]$ for l= 0, . . . , $N_{sym}-1$, where xm,l,p is the pth cell of the lth OFDM symbol in the mth frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0}, \ldots, v_{m,l,N_{data}-1}]$ for l=0, . . . , $N_{sym}-1$.

For the OFDM symbol pair, the interleaved OFDM symbol pair is given by $v_{m,l,H_i(p)}=x_{m,l,p}$, p=0, . . . , $N_{data}-1$, for the first OFDM symbol of each pair $v_{m,l,p}=x_{m,l,H_i(p)}$, p= 0, . . . , $N_{data}-1$, for the second OFDM symbol of each pair, where $H_i(p)$ is the interleaving address generated by a PRBS generator.

FIG. 33 illustrates a main PRBS used for all FFT modes according to an embodiment of the present invention.

(a) illustrates the main PRBS, and (b) illustrates a parameter Nmax for each FFT mode.

FIG. 34 illustrates a sub-PRBS used for FFT modes and an interleaving address for frequency interleaving according to an embodiment of the present invention.

(a) illustrates a sub-PRBS generator, and (b) illustrates an interleaving address for frequency interleaving. A cyclic shift value according to an embodiment of the present invention may be referred to as a symbol offset.

Figure 35:
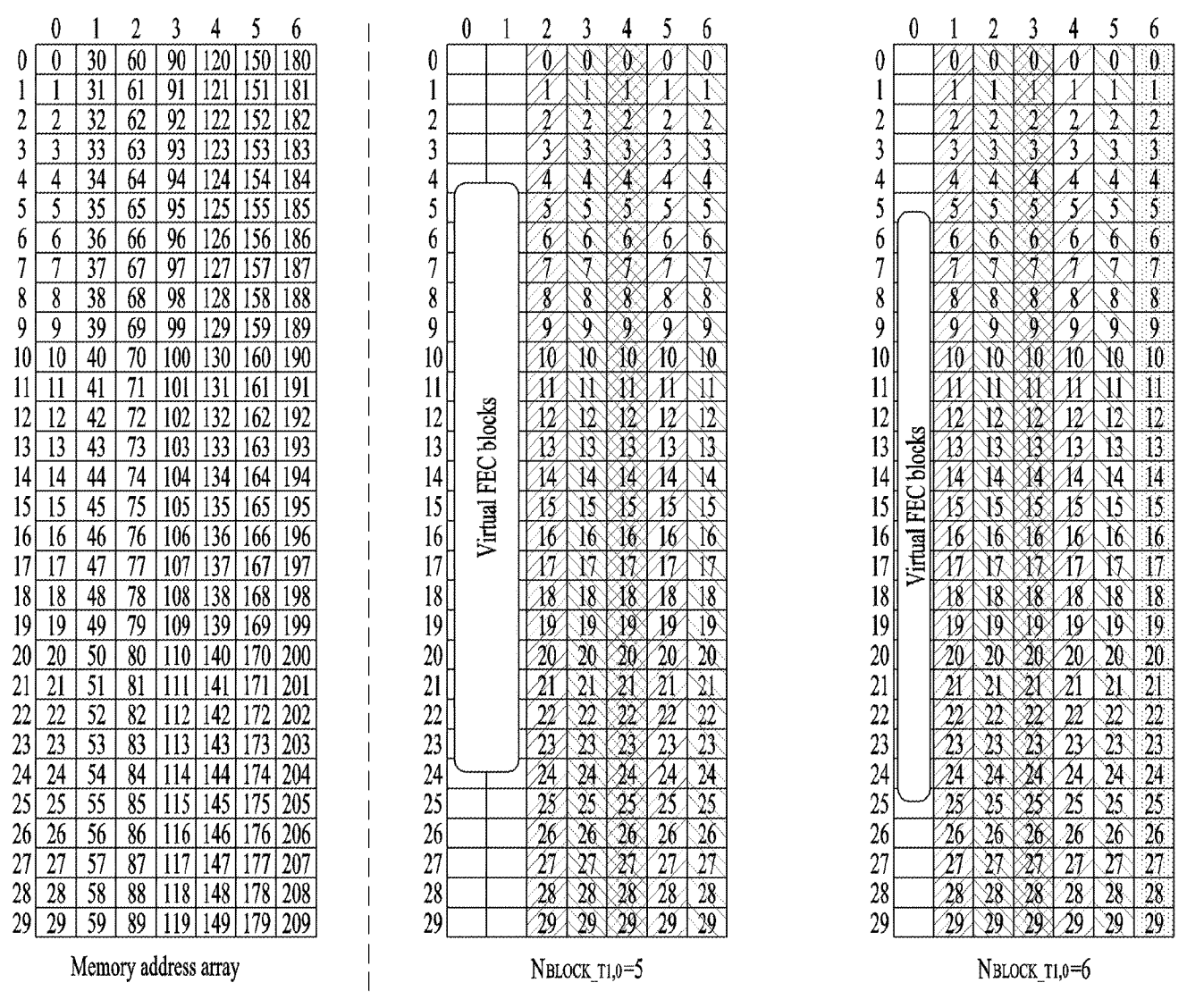

FIG. 35 illustrates a write operation of a time interleaver according to an embodiment of the present invention.

FIG. 35 illustrates a write operation for two TI groups.

A left block in the figure illustrates a TI memory address array, and right blocks in the figure illustrate a write operation when two virtual FEC blocks and one virtual FEC block are inserted into heads of two contiguous TI groups, respectively.

Hereinafter, description will be given of a configuration of a time interleaver and a time interleaving method using both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer.

A PLP mode according to an embodiment of the present invention may include a single PLP mode or a multi-PLP mode according to the number of PLPs processed by a broadcast signal transmitter or a broadcast signal transmission apparatus. The single PLP mode corresponds to a case in which one PLP is processed by the broadcast signal transmission apparatus. The single PLP mode may be referred to as a single PLP.

The multi-PLP mode corresponds to a case in which one or more PLPs are processed by the broadcast signal transmission apparatus. The multi-PLP mode may be referred to as multiple PLPs.

In the present invention, time interleaving in which different time interleaving schemes are applied according to PLP modes may be referred to as hybrid time interleaving. Hybrid time interleaving according to an embodiment of the present invention is applied for each PLP (or at each PLP level) in the multi-PLP mode.

FIG. 36 illustrates an interleaving type applied according to the number of PLPs in a table.

In a time interleaving according to an embodiment of the present invention, an interleaving type may be determined based on a value of PLP_NUM. PLP_NUM is a signaling field indicating a PLP mode. When PLP_NUM has a value of 1, the PLP mode corresponds to a single PLP. The single PLP according to the present embodiment may be applied only to a CI.

When PLP_NUM has a value greater than 1, the PLP mode corresponds to multiple PLPs. The multiple PLPs according to the present embodiment may be applied to the CI and a BI. In this case, the CI may perform inter-frame interleaving, and the BI may perform intra-frame interleaving.

FIG. 37 is a block diagram including a first example of a structure of a hybrid time interleaver described above.

The hybrid time interleaver according to the first example may include a BI and a CI. The time interleaver of the present invention may be positioned between a BICM chain block and a frame builder.

The BICM chain block illustrated in FIGS. 37 and 38 may include the blocks in the processing block 5000 of the BICM block illustrated in FIG. 19 except for the time interleaver 5050. The frame builder illustrated in FIGS. 37 and 38 may perform the same function as that of the frame building block 1020 of FIG. 18.

As described in the foregoing, it is possible to determine whether to apply the BI according to the first example of the structure of the hybrid time interleaver depending on values of PLP_NUM. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be the same as or similar to a structure and an operation of the CI applied when PLP_NUM=1.

FIG. 38 is a block diagram including a second example of the structure of the hybrid time interleaver described above.

An operation of each block included in the second example of the structure of the hybrid time interleaver is the same as the above description in FIG. 20. It is possible to determine whether to apply a BI according to the second example of the structure of the hybrid time interleaver depending on values of PLP_NUM. Each block of the hybrid time interleaver according to the second example may perform operations according to embodiments of the present invention. In this instance, an applied structure and operation of a CI may be different between a case of PLP_NUM=1 and a case of PLP_NUM>1.

Figure 39:
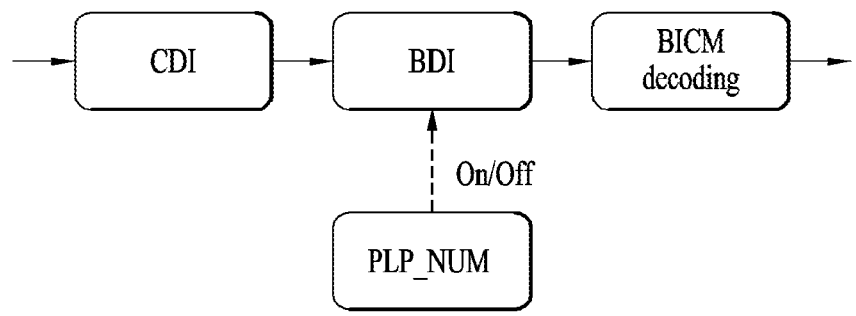
FIG. 39 is a block diagram including a first example of a structure of a hybrid time deinterleaver.

FIG. 39 is a block diagram including a first example of a structure of a hybrid time deinterleaver.

The hybrid time deinterleaver according to the first example may perform an operation corresponding to a reverse operation of the hybrid time interleaver according to the first example described above. Therefore, the hybrid time deinterleaver according to the first example of FIG. 39 may include a convolutional deinterleaver (CDI) and a block deinterleaver (BDI).

A structure and an operation of the CDI applied when PLP_NUM>1 may be the same as or similar to a structure and an operation of the CDI applied when PLP_NUM=1.

It is possible to determine whether to apply the BDI according to the first example of the structure of the hybrid time deinterleaver depending on values of PLP_NUM. That is, when PLP_NUM=1, the BDI is not applied (BDI is turned OFF) and only the CDI is applied.

The CDI of the hybrid time deinterleaver may perform inter-frame deinterleaving, and the BDEI may perform intra-frame deinterleaving. Details of inter-frame deinterleaving and intra-frame deinterleaving are the same as the above description.

Figure 40:
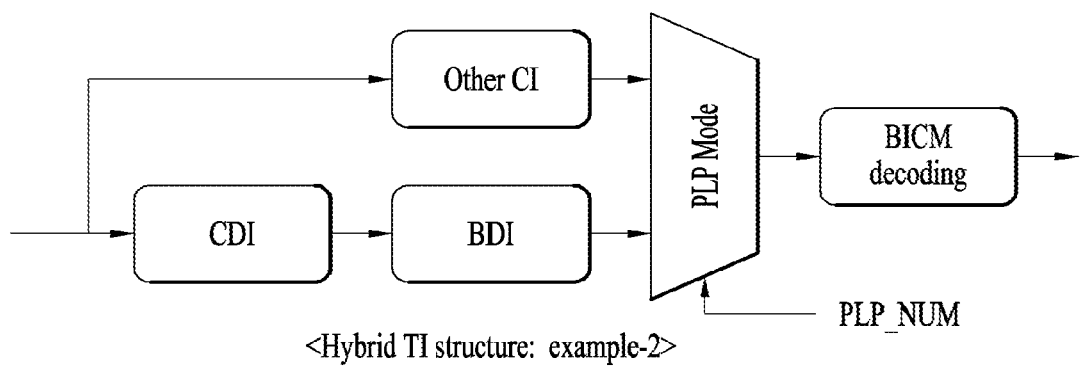
FIG. 40 is a block diagram including a second example of the structure of the hybrid time deinterleaver.

A BICM decoding block illustrated in FIGS. 39 and 40 may perform a reverse operation of the BICM chain block of FIGS. 37 and 38.

FIG. 40 is a block diagram including a second example of the structure of the hybrid time deinterleaver.

The hybrid time deinterleaver according to the second example may perform an operation corresponding to a reverse operation of the hybrid time interleaver according to the second example described above. An operation of each block included in the second example of the structure of the hybrid time deinterleaver may be the same as the above description in FIG. 39.

It is possible to determine whether to apply a BDI according to the second example of the structure of the hybrid time deinterleaver depending on values of PLP_NUM. Each block of the hybrid time deinterleaver according to the second example may perform operations according to embodiments of the present invention. In this instance, an applied structure and operation of a CDI may be different between a case of PLP_NUM=1 and a case of PLP_NUM>1.

Figure 41:
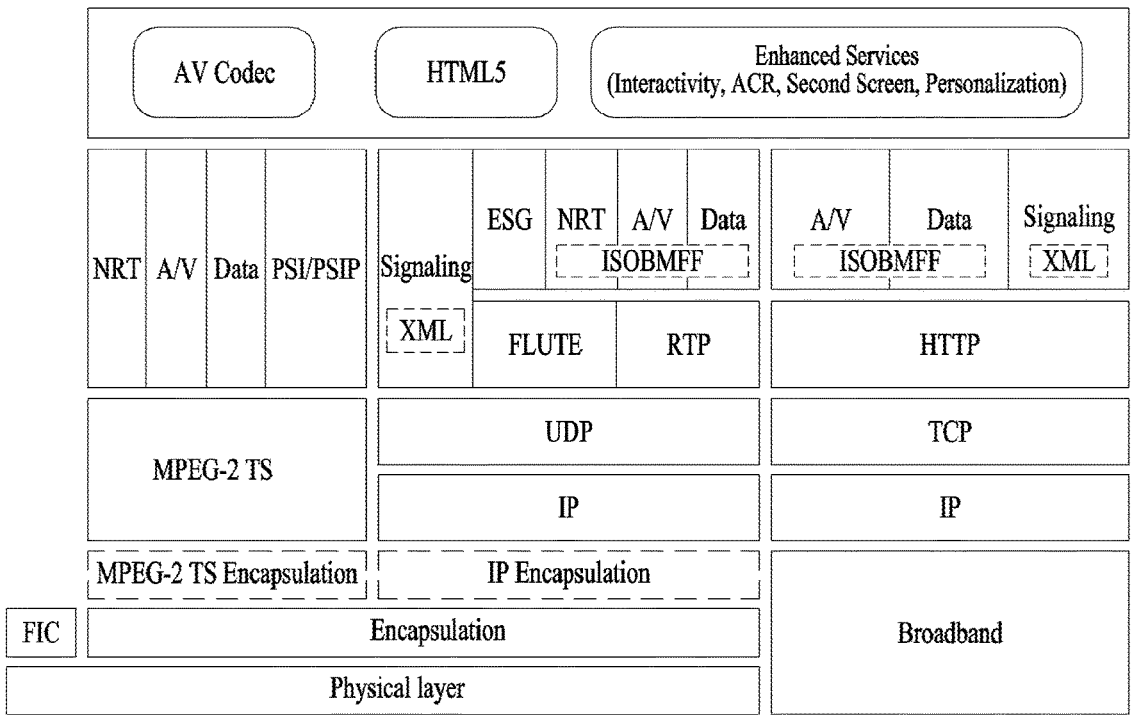
FIG. 41 is a diagram illustrating an example of a protocol stack for supporting a broadcast service according to the present invention.

FIG. 41 is a diagram illustrating a protocol stack for supporting a hybrid-based next-generation broadcast service according to an embodiment of the present invention.

In a broadcast transmitter, a data link (encapsulation) layer delivers an MPEG-2 TS and/or IP packet, which is delivered from an upper layer, to a physical layer. Further, signalling information necessary for an operation of the physical layer may be delivered.

The data link layer may be referred to by various terms such as encapsulation layer, link layer, Layer 2, etc.

A broadcast system according to the present invention may correspond to a hybrid broadcast system in which an IP centric broadcast network is combined with broadband. In addition, the broadcast system according to the present invention may be designed to be compatible with an existing MPEG-2 based broadcast system.

The broadcast system according to the present invention may correspond to a hybrid broadcast system based on a combination of an IP centric broadcast network, a broadband network, and/or a mobile communication network (or cellular network).

Further, the physical layer may use a physical protocol employed in a broadcast system such as an ATSC system and/or a DVB system.

In a broadcast receiver, a link layer acquires an IP datagram from information which is acquired from a physical layer, or converts the acquired IP datagram into a particular frame (for example, RS frame, GSE-lite, GSE, or signal frame). Here, a frame may include a set of IP datagrams.

A broadcast service according to an embodiment of the present invention may provide an additional service such as an HTML5 application, an interactive service, an ACR service, a second screen service, a personalization service, etc. in addition to audio/video (A/V) data. Further, an emergency alert service may be provided as the broadcast service.

The broadcast service may be received by the broadcast receiver through a broadcast network such as a terrestrial broadcast network, a cable satellite, etc., that is, a physical layer. In addition, the broadcast service according to the present embodiment may be received through a broadband network.

MPEG2 TS encapsulation may acquire an MPEG2 TS using information acquired from the physical layer. An FIC corresponds to signaling information, which is also referred to as an FIT or an SLT, and may include information necessary to acquire a service and/or content, and/or information necessary to scan a channel.

The broadcast receiver may extract a UDP datagram from the acquired IP datagram, and extract signaling information from the extracted UDP datagram. In this instance, the signaling information may have an XML form. In addition, the broadcast receiver may extract an asynchronous layered coding/layered coding transport (ALC/LCT) packet from the extracted UDP datagram. Further, the broadcast receiver may extract a file delivery over unidirectional transport (FLUTE) packet from the ALC/LCT packet. In this instance, the FLUTE packet may include real-time audio/video/captioning data, NRT data, and ESG data. Furthermore, the broadcast receiver may extract a real-time transport protocol (RTP) packet and an RTP control protocol (RTCP) packet from the extracted UDP datagram. In addition, the broadcast receiver may extract A/V data and additional data from a real-time transport packet such as the extracted RTP/RTCP packet. In this instance, at least one of the NRT data, the A/V data, and the additional data may have the form of an ISO base media file format (ISO BMFF). In addition, the broadcast receiver may extract signaling information such as NRT data, A/V data, and PSI/PSIP from the MPEG-2 TS packet or the IP packet. In this instance, the signaling information may have the XML or binary form, and may include information for supporting effective acquisition of a service and/or content.

Meanwhile, when the broadcast service is transmitted through the broadband network, the broadcast receiver may receive an IP packet from the broadband network. The broadcast receiver may extract a TCP packet from the IP packet. Further, the broadcast receiver may extract an HTTP packet from the extracted TCP packet, and extract A/V data, additional data, signaling information, etc. from the extracted HTTP packet. In this instance, at least one of the A/V data and the additional data may have an ISO BMFF form. In addition, the signaling information may have an XML form.

The broadcast receiver may combine data received through the above-described protocol stack to provide a viewer with various enhanced services such as an interactive service, a second screen service, an emergency alert service, etc.

Figure 42:
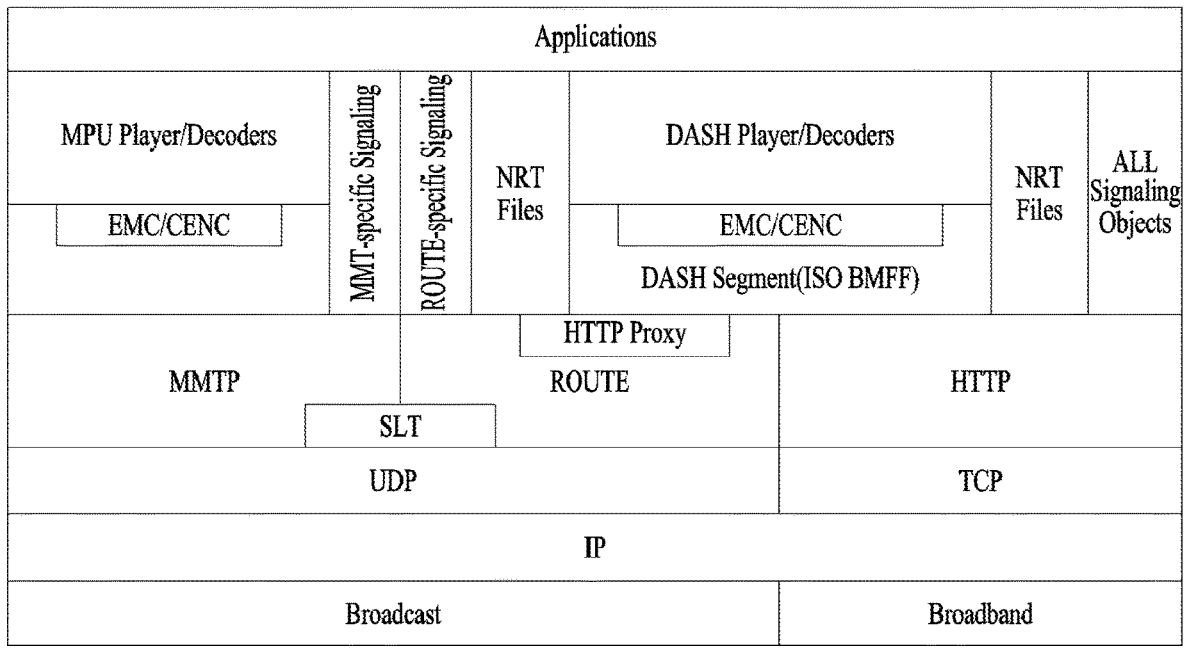
FIG. 42 is a diagram illustrating another example of the protocol stack for supporting the broadcast service according to the present invention.

FIG. 42 illustrates another example of the protocol stack for supporting the broadcast service according to the present invention.

In FIG. 42, the broadcast service may be provided in an application form. In FIG. 42, the broadcast service may be transmitted through a broadcast network such as a terrestrial broadcast network, a cable satellite, etc., that is, a physical layer, and may be transmitted through a broadband network.

When the broadcast service is received through the physical layer of the broadcast network, the broadcast receiver may acquire an IP datagram using information acquired from the physical layer. In addition, the broadcast receiver may extract a UDP datagram from the acquired IP datagram, and extract at least one of MMTP sessions, ROUTE sessions, and signaling information (for example, FIT, MMT specific signaling, and ROUTE specific signaling) from the extracted UDP datagram. Further, the broadcast receiver provides the broadcast service by decoding MPUs received through the MMTP sessions based on the extracted signaling information or by decoding MPEG-DASH segments received through the ROUTE session.

Meanwhile, when the broadcast service is transmitted through the broadband network, the broadcast receiver may receive an IP packet from the broadband network. The broadcast receiver may extract a TCP packet from the IP packet. In addition, the broadcast receiver may extract an HTTP packet from the extracted TCP packet, and provide the broadcast service by decoding an MPEG-DASH segment transmitted through the extracted HTTP packet or provide an NRT service by processing NRT files. In other words, in the case of the broadband network, data encapsulated in the ISO BMFF form may be delivered to a receiving side based on a streaming scheme. For example, the streaming scheme may include MPEG-DASH.

In this instance, video data, audio data, captioning data, etc. in data for the broadcast service may be encapsulated in the ISO BMFF form. For example, the data encapsulated in the ISO BMFF form may conform to a form such as a segment of MPEG-DASH or an MPU of MMTP.

Here, ROUTE is a protocol for transmission of files through IP multicast networks. The ROUTE protocol uses ALC and LCT corresponding to base protocols designed for massively scalable multicast distribution, and other well-known Internet standards. ROUTE is an improved version or functional substitute having additional characteristics when compared to FLUTE. ROUTE may transmit signaling messages, ESG messages, and NRT content. In particular, ROUTE is suitable for transmission of streaming media such as MPEG-DASH media segment files. When compared to FLUTE, ROUTE provides lower end-to-end latency through a delivery chain. In addition, ROUTE provides an easy MPEG-DASH combination. The MPEG-DASH combination allows synergy between broadcast and broadband delivery modes.

One ROUTE session may include at least one LCT transport session. LCT transport sessions may be a subset of the ROUTE session. For media delivery, one LCT transport session may typically transmit one media component (for example, DASH representation). From the viewpoint of broadcast DASH, the ROUTE session may be regarded as a complex of the LCT transport session transmitting at least one media component corresponding to a component of at least one DASH media representation. At least one relevant object may be transmitted in each LCT transport session. For example, objects may be DASH segments related to one representation. Together with each object, metadata properties may be delivered such that the objects can be used in applications. The applications may include DASH media presentations, HTML-5 presentations, or other object-consuming applications, and are not restricted thereto. The ROUTE sessions may or may not be bounded in a temporal sense (The ROUTE sessions may be bounded or unbounded from the temporal perspective). The ROUTE session may include at least one LCT transport session. Each transport session is uniquely identified by a unique TSI present in an LCT header.

In addition, a representation of MPEG-DASH has a concept corresponding to an MMTP packet flow in the MMT protocol, and may be mapped to an asset identifier (or asset ID, asset_id). Further, a segment of MPEG-DASH has a concept corresponding to an MPU in the MMT protocol, and may be mapped to information (or an MPU identifier) included in an mmpu box.

Signaling data (also referred to as signaling information) such as an FIT, MMT specific signaling, ROUTE specific signaling, etc. may be transmitted using a scheme below.

In the case of a broadcast network, the signaling data may be transmitted through a particular physical layer pipe, etc. corresponding to a particular data pipe of a physical layer frame (or frame) delivered to a physical layer of the broadcast network and a next-generation broadcast transmission system according to attributes of signaling. For example, signaling may be encapsulated in a bit stream or IP/UDP datagram. In the case of a broadband network, signaling data may be returned and delivered in response to a request from a receiver.

The FIT corresponds to low level signaling, and may be referred to as an FIC or an SLT. The broadcast receiver builds a basic service list based on the FIT, and allows bootstrapping of discovery of service layer signaling for each service. The FIT (or SLT) may be transmitted through link layer signaling. Alternatively, the FIT (or SLT) may be transmitted in each physical layer frame for rapid acquisition. According to a given embodiment, the FIT (or SLT) may be transmitted through at least one of a physical layer pipe that transmits a physical layer frame and a signal and/or a physical layer pipe that transmits data to be actually serviced. Hereinafter, a description will be focused on the FIT.

SLS such as MMT specific signaling or ROUTE specific signaling enables the receiver to discover and access at least one service and/or at least one content component. When the SLS is transmitted through the broadcast network, the SLS may be transmitted in at least one LCT session included in a ROUTE session by ROUTE/UDP/IP. In this instance, the SLS may be transmitted at a suitable carousel rate that supports rapid channel joining and switching. When the SLS is transmitted through the broadband network, the SLS may be transmitted by HTTP(S)/TCP/IP.

ESG data and NRT content data may be transmitted using a scheme below.

In the case of the broadcast network, the ESG data and NRT content data may be encapsulated in an application layer transport protocol packet. Then, the data encapsulated in the application layer transport protocol packet may be similarly transmitted as described above.

In the case of the broadband network, the ESG data and NRT content data may be returned and delivered in response to a request from the receiver.

A relation between a ROUTE/LCT session and/or an MMTP session for transmitting at least one content component of a service is as below.

For broadcast delivery of a linear service without app-based enhancement, a content component of the service may be transmitted through 1) at least one ROUTE/LCT session and/or 2) at least one MMTP session.

For broadcast delivery of a linear service with app-based enhancement, a content component of the service may be transmitted only through 1) at least one ROUTE/LCT session. Alternatively, the content component of the service may be transmitted through at least one ROUTE/LCT session and/or at least one MMPT session.

For broadcast delivery of an app-based service, a content component of the service may be transmitted through at least one ROUTE/LCT session.

Each ROUTE session may include at least one LCT session. Each LCT session may include all or some content components included in the service.

In transmission of streaming services, the LCT session may transmit a separate component of a user service such as an audio, video, and/or closed caption stream. Streaming media may be formatted in at least one DASH segment by MPEG-DASH.

Each MMTP session may include at least one MMTP packet flow. Each MMTP packet flow may transmit an MMT signaling message. In addition, each MMTP packet flow may include some or all content components included in the service.

The MMTP packet flow may transmit at least one content component formatted in at least one MPU by an MMT signaling message and/or an MMT.

For transmission of an NRT user service and/or system metadata, the LCT session may transmit at least one file-based content item. The at least one file-based content item may include a time-based or non-time-based media component of the NRT service. In addition, the at least one file-based content item may include service signaling and/or an ESG fragment.

A broadcast stream may be an abstract concept of an RF channel. The RF channel may be defined based on a carrier frequency within a particular bandwidth. The RF channel may be defined by a pair of [geographic area, frequency]. Information about the geographic area and the frequency may be defined and/or maintained by administrative authorities together with a BSID. A PLP (or DP) may correspond to a portion of the RF channel.

Each PLP (or DP) may include at least one modulation and/or coding parameter. The PLP (or DP) may be identified by a PLP (or DP) identifier (PLPID or DPID) having a unique value within a broadcast stream to which the PLP (or DP) belongs.

Each service may be identified by two types of service IDs. One type corresponds to a compressed form, which is used in an FIT and has a unique value only within a broadcast area. The other type corresponds to a globally unique form used in SLS and/or ESG.

A ROUTE session may be identified by a source IP address, a destination IP address, and/or a destination port number. An LCT session may be identified by a unique TSI within a parent ROUTE session.

An S-TSID may include information about common characteristics of at least one LCT session and/or a unique characteristic of at least one individual LCT session. The S-TSID may be a ROUTE signaling structure, and may be a part of service level signaling.

Each LCT session may be transmitted through one PLP (or DP). Different LCT sessions within one ROUTE session may be included in different PLPs (DPs) or the same PLP (or DP).

At least one characteristic described in the S-TSID may include a TSI and a PLPID (or DPID) for each LCT session, at least one descriptor for at least one delivery object or file, and/or at least one application layer FEC parameter.

An MMT session may be identified by a source IP address, a destination IP address, and/or a destination port number. An MMTP packet flow may be identified by a unique packet_id within a range of a parent MMTP session.

An S-TSID may include information about a common characteristic of each MMTP packet flow and/or a unique characteristic of at least one individual MMTP packet flow.

At least one characteristic of each MMTP session may be transmitted by an MMT signaling message which is transmitted within the MMTP session.

Each MMTP packet flow may be transmitted through one PLP (or DP). Different MMTP packet flows within one MMTP session may be included in different PLPs (DPs) or included in the same PLP (or DP).

At least one characteristic described in an MMT signaling message may include a packet_id and/or a PLPID (or DPID) of each MMTP packet flow.

Figure 43:
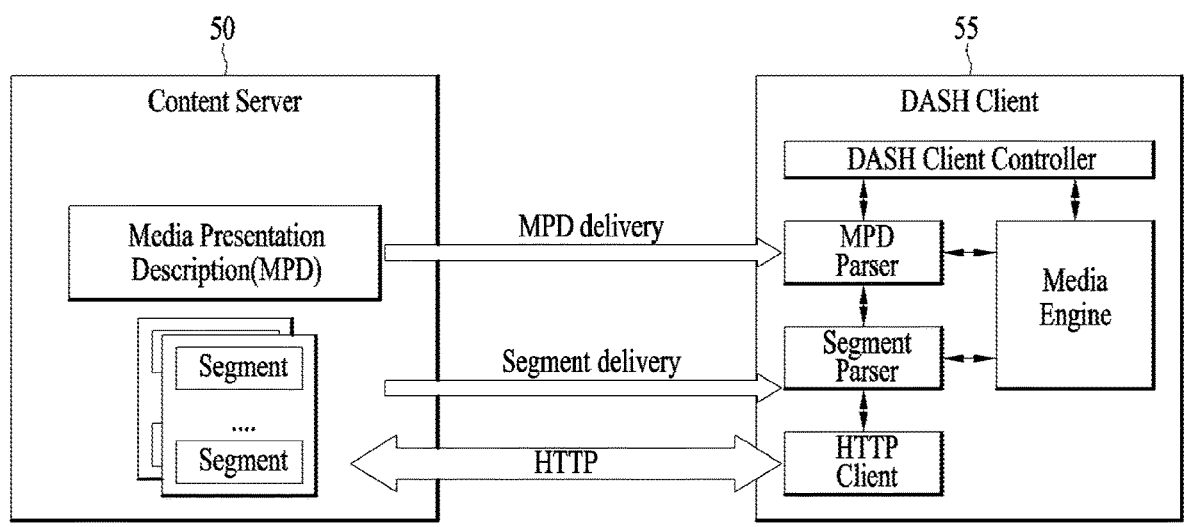
FIG. 43 is a diagram illustrating an example of a transport layer of the broadcast service according to the present invention.

FIG. 43 illustrates a configuration of a media content transmission/reception system through an IP network, that is, a broadband network according to an embodiment of the invention.

Transmission/reception of media content according to an embodiment of the present invention is divided into transmission/reception of a transmission packet including actual media content and transmission/reception of media content reproduction information. A broadcast receiver 55 receives the media content reproduction information, and receives the transmission packet including the media content. In this instance, the media content reproduction information indicates information necessary to reproduce media content. The media content reproduction information may include at least one of spatial information and temporal information necessary to reproduce media content. The broadcast receiver 55 reproduces media content based on the media content reproduction information.

For example, media content may be transmitted and received through an IP network according to an MPEG-DASH standard. In this case, a content server 50 transmits MPD including the media content reproduction information. However, according to a specific embodiment, the MPD may be transmitted by an external server rather than the content server 50. In addition, the content server 50 transmits a segment including media content based on a request from the broadcast receiver 55. The broadcast receiver 55 receives the MPD. The broadcast receiver 55 requests that the content server transmit media content based on the MPD. The broadcast receiver 55 receives a transmission packet including media content based on a request. The broadcast receiver 55 reproduces the media content based on the MPD. To this end, the broadcast receiver 55 may include a DASH client. The DASH client may include an MPD parser that parses the MPD, a segment parser that parses a segment, an HTTP client that transmits an HTTP request message and receives an HTTP response message through an IP transceiver (not illustrated), and a media engine that reproduces media.

As another embodiment, media content may be transmitted and received through the IP network according to an MMT standard. In this instance, the content server 50 transmits a reproduction information document (presentation information document, PI document) including media content reproduction information. In addition, the content server 50 transmits an MMTP packet including media content based on a request from the broadcast receiver 55. The broadcast receiver 55 receives the PI document. The broadcast receiver 55 receives a transmission packet including media content. The broadcast receiver 55 extracts media content from the transmission packet including the media content. The broadcast receiver 55 reproduces the media content based on the PI document.

Meanwhile, the broadcast receiver may receive emergency information related to a natural disaster, a terrorist attack, a war, etc. through the broadcast network. In addition, the broadcast receiver may report the information to a user. In this way, many people may rapidly and efficiently detect a national disaster situation. However, the user may not detect an emergency alert unless the user continuously monitors the broadcast receiver. Even when the user does not continuously monitor the broadcast receiver, the user is likely to carry a linkage device such as a mobile phone, a tablet PC, etc. at all times. Therefore, when the broadcast receiver can transmit an emergency alert to the linkage device, and the linkage device can display the emergency alert, the national disaster situation may be rapidly and efficiently reported to the user.

In the broadcast transmitter, an emergency alert message may be generated in the form of a section table or a packet in a link layer, and then transmitted to a physical layer. Alternatively, the emergency alert message may be directly input to the physical layer without passing through the link layer. In the physical layer, the emergency alert message may be assigned to a physical layer pipe symbol, i.e. a data pipe symbol within the frame, and transmitted. Here, a physical layer pipe may be a data pipe that transmits signaling information, a data pipe that transmits actual data, or a general data pipe, use of which is not designated. Alternatively, as described in the foregoing, in the physical layer, the emergency alert message may be assigned to between a PLS symbol and a data pipe symbol within the frame, and transmitted. In addition, emergency alert-related signaling information may be transmitted through a physical layer parameter symbol within the frame, or may be included in a transmission parameter of the physical layer as described above and transmitted through a preamble symbol or a PLS symbol. The emergency alert-related signaling information transmitted through the preamble symbol or the PLS symbol may be signaled to at least one of an EAC_FLAG field, an EAS_WAKE_UP_VERSION_NUM field, an EAC_LENGTH_BYTE field, an EAC_COUNTER field, and an EA_WAKE_UP field. In this instance, it is possible to refer to or not refer to information provided in the link layer or the upper layer. Details of each field have been described above, and are omitted here.

Next, a description will be given of examples of transmitting and receiving an emergency alert message by the broadcast transmitter and the broadcast receiver according to the invention. In particular, signaling information for receiving and decoding an emergency alert message is needed when the broadcast receiver receives the emergency alert message and provides an emergency alert service to the user, and the present invention describes a method of signaling the emergency alert message.

FIG. 44 is a block diagram of an emergency alert system according to an embodiment of the present invention, and the emergency alert system includes a broadcast transmitter 72 for transmitting an emergency alert message, and a broadcast receiver 70 for receiving and processing the emergency alert message transmitted from the broadcast transmitter 72. In addition, the emergency alert system may further include alert authorities 76 and an information aggregator 74.

In this instance, the emergency alert message refers to a message obtained by converting emergency alert information for reporting an emergency state to a broadcast viewer in a form which is transmissible through the broadcast network. Delivery of emergency alert, normally emergency alert information, is normally led and operated by a government, and thus a specific structure may vary according to nation to which a broadcast system is applied. Therefore, in the present embodiment, a description will be given of a method of configuring an emergency alert message and a method and apparatus for transmitting/receiving the emergency alert message which are commonly applicable to a method of transmitting emergency alert information through the broadcast network.

The alert authorities 76 may include a nation or an institution of a corresponding region. When transmission of emergency alert information needs to be delivered through the broadcast network, the alert authorities 76 generate an emergency alert and deliver the emergency alert to the information aggregator 74 (or institution). In this instance, the information aggregator 74 may be an integrated public alert warning system (IPAWS) aggregator.

The information aggregator 74 configures the emergency alert information to be delivered through the broadcast network as a common alerting protocol (CAP)-based message, and delivers the information to the broadcast transmitter 72. Here, the CAP corresponds to an XML file format for warning against an emergency state and exchanging information. The CAP may simultaneously propagate an emergency alert message through a plurality of emergency alert systems.

Hereinafter, a description will be focused on a process after the CAP message is delivered to the broadcast transmitter 72.

In response to the CAP message delivered to the broadcast transmitter 72, the broadcast transmitter 72, which processes the message, transmits related A/V content and an additional service together with the CAP message. Specifically, the broadcast transmitter 72 inserts the related A/V content or the additional service together with the CAP message into a broadcast signal, and transmits the broadcast signal to the broadcast receiver 70. According to a given embodiment, emergency alert-related data including the CAP message may be transmitted through different routes according to purpose and form. As a specific example, a different route may correspond to one of a signaling channel, a physical layer pipe, and a broadband network.

The broadcast receiver 70 receives the broadcast signal including the emergency alert-related data from the broadcast transmitter 72. Then, the broadcast receiver 70 decodes the broadcast signal received through an emergency alert signaling decoder. The broadcast receiver 70 receives an A/V service according to information acquired by decoding the broadcast signal. Specifically, the broadcast receiver 70 may acquire physical layer frame information including the A/V service from the broadcast signal. In this instance, a physical layer frame may correspond to a unit of data transmitted through a physical layer pipe. In addition, the broadcast receiver 70 may receive A/V service data related to an emergency alert message from the physical layer frame.

Further, the broadcast receiver 70 may extract NRT service information related to an emergency alert from the information acquired by decoding the broadcast signal. Specifically, the NRT service information may be address information that allows an NRT service to be acquired. For example, the NRT service may be delivered via broadband, and the address information may be URI information for acquiring the NRT service.

According to an embodiment of the present invention, the broadcast transmitter 72 may transmit an emergency alert message through a protocol layer included in a protocol stack. In this case, the protocol layer may be a link layer. According to an embodiment, the broadcast transmitter 72 may format the emergency alert message in the form of a table according to a transport protocol. In this instance, the emergency alert message may be formatted in the form of a table in the link layer included in the protocol stack. In addition, the emergency alert message may include information that signals link layer and physical layer operations.

According to another embodiment, the broadcast transmitter 72 may packetize the emergency alert message according to the transport protocol. Specifically, the broadcast transmitter 72 may encapsulate the emergency alert message in the physical layer frame. In this case, emergency alert information may be prevented from being signaled to the broadcast receiver 70 through several layers.

For transmission, the emergency alert message needs to be configured in a form that can be transmitted in the broadcast system. To this end, in an embodiment, a table in the form of a section may be generally used to transmit the emergency alert message. In another embodiment, the emergency alert message may be transmitted as a part of another section table in a configuration of a descriptor form. In still another embodiment, the emergency alert message may be transmitted in a packet of a physical layer. Specifically, the emergency alert message may be transmitted in the form of a packet through a data pipe corresponding to a physical layer pipe. In this case, the emergency alert message may be included in a payload, which is included in a packet, and transmitted.

FIG. 45 illustrates syntax of EAT information according to an embodiment of the present invention. In this instance, an EAT may have a form of an emergency alert message. In an embodiment, when the emergency alert message (also referred to as an EAS message) is transmitted in a payload of a packet, EAT information corresponding to signaling information of the emergency alert message may be included in a header of the packet. In another embodiment, the EAT information may be included in an extended header.

As illustrated in FIG. 45, the EAT information may include version information of a protocol included in an EAT. In a specific example, the information may be an EAT_protocol_version field.

In addition, the EAT information may include information that reports whether to automatically tune to a channel to the broadcast receiver 70. For example, the EAT information may include information that reports whether to automatically tune to a channel on which specific information about an emergency alert is reported to the broadcast receiver 70. In a specific example, the information that reports whether to automatically tune to a channel may be an automatic_tuning_flag field.

In addition, the EAT information may include information about the number of messages included in the EAT. In a specific example, the information about the number of messages may be a num_EAS_message field.

FIG. 46 illustrates syntax of an emergency alert message according to an embodiment of the present invention. In an embodiment of the present invention, the emergency alert message may directly include a CAP message. In another embodiment, the emergency alert message may include information about a route through which the CAP message is delivered. In addition, the emergency alert message may be included in an EAT and transmitted.

As illustrated in FIG. 46, the emergency alert message according to the present embodiment may include identifier information for identifying an EAS message. In a specific embodiment, the identifier information may be an EAS_message_id field. In this case, the EAS_message_id field may correspond to 32 bits.

In addition, syntax for the emergency alert message may include information that indicates an IP version. In this case, the version information may be an EAS_IP_version_flag field. In a specific embodiment, when the EAS_IP_version_flag field has a value of 0, the value may indicate that an IP version is IPv4. In another embodiment, when the EAS_IP_version_flag field has a value of 1, the value may indicate that an IP version is IPv6. The EAS_IP_version_flag field may correspond to 1 bit.

Further, the emergency alert message may include information that indicates a delivery form of the EAS message. In this case, the information that indicates a delivery form of the EAS message may be an EAS_message_transfer_type field. The EAS_message_transfer_type field may correspond to 3 bits.

In a specific embodiment, the EAS_message_transfer_type field may indicate that a delivery form of the emergency alert message, that is, the EAS message, has not been specified. In this case, the EAS_message_transfer_type field may have a value of 000(2).

In another embodiment, the EAS_message_transfer_type field may indicate that a delivery form of the EAS message is a form not including the emergency alert message. In other words, the field may indicate that the EAT transmitted through a broadcast signal only includes information about A/V content without the emergency alert message. In this case, the EAS_message_transfer_type field may have a value of 001(2).

In another embodiment, the EAS_message_transfer_type field may indicate that the EAS message is included in the EAT and delivered. In this case, the EAS_message_transfer_type field may have a value of 010(2).

Further, when the EAS_message_transfer_type field has the value of 010(2), a table including the EAS message may indicate a length of the EAS message. In this case, information indicating the length of the EAS message may be an EAS_message_length field.

The EAS_message_length field may correspond to 12 bits. In addition, when the EAS_message_transfer_type field has the value of 010(2), the table including the EAS message may additionally include information about the EAS message.

In another embodiment, the EAS_message_transfer_type field may indicate that the EAS message is transmitted through a data pipe corresponding to a physical layer pipe in the form of an IP datagram. In this case, the EAS_message_transfer_type field may have a value of 011(2). Further, when the EAS_message_transfer_type field has the value of 011(2), the table including the emergency alert message may additionally include one of IP address information for acquiring an IP datagram, UDP port information, and information about a transmitted physical layer frame.

In addition, the emergency alert message may include information that indicates an encoding type of the EAS message. In this case, the information about the encoding type of the EAS message may be an EAS_message_encoding_type field. The EAS_message_encoding_type field may correspond to 3 bits.

In a specific embodiment, the EAS_message_encoding_type field may indicate that the encoding type of the EAS message has not been specified. In this case, the EAS_message_encoding_type field may have a value of 000(2).

In another embodiment, the EAS_message_encoding_type field may indicate that the EAS message has not been encoded. In this case, the EAS_message_encoding_type field may have a value of 001(2).

In another embodiment, the EAS_message_encoding_type field may indicate that the EAS message has been encoded by a DEFLATE algorithm. The DEFLATE algorithm is a lossless compression data format. In this case, the EAS_message_encoding_type field may have a value of 010(2).

In addition, the emergency alert message may indicate whether information about NRT content and additional data related to the received EAS message is included in the emergency alert table. In this case, information indicating whether the NRT content and the additional data are present may be an EAS_NRT_flag field. The EAS_NRT_flag field may correspond to 1 bit.

In a specific embodiment, when the EAS_NRT_flag field is set to 0, the field indicates that the information about the NRT content related to the received EAS message is not included in the emergency alert table. In another embodiment, when the EAS_NRT_flag field is set to 1, the field indicates that the information about the NRT content related to the received EAS message is included in the table.

FIG. 47 illustrates syntax for automatic channel tuning information according to an embodiment of the present invention. When A/V content related to an emergency alert is transmitted simultaneously with the emergency alert message, the automatic channel tuning information includes information for automatically tuning to a channel on which the A/V content related to the emergency alert is transmitted. In other words, when a channel currently displayed in the broadcast receiver 70 does not include content that includes the emergency alert message, the automatic channel tuning information is information for automatically tuning to the channel on which the A/V content related to the emergency alert is transmitted. In a specific embodiment, the emergency alert table may include the automatic channel tuning information when the automatic tuning flag field of FIG. 45 is enabled. For example, when the automatic tuning flag field has a value of 1, the emergency alert table may include the automatic channel tuning information.

In an embodiment, a table for the automatic channel tuning information may indicate information about a number of a channel to be tuned to. Specifically, the table may indicate information about a channel including content related to the emergency alert information. In this case, the information about the number of the channel to be tuned to may be an automatic_tuning_channel_number field. In a specific embodiment, the automatic_tuning_channel_number field may correspond to 8 bits.

In another embodiment, the table for the automatic channel tuning information may indicate route information for receiving content related to the emergency alert message. Specifically, the table for the automatic channel tuning information may indicate information for identifying a physical layer frame including the A/V content related to the emergency alert message. In this case, the information may be an automatic_tuning_DP_id field. The automatic_tuning_DP_id field may correspond to 8 bits.

In another embodiment, the table for the automatic channel tuning information may indicate identification information of content related to the emergency alert message. Specifically, the table may indicate service ID information of content related to the emergency alert message. In this case, the information may be an automatic_tuning_service_id field. The automatic_tuning_service_id field may correspond to 16 bits.

FIG. 48 illustrates syntax for NRT service information related to an emergency alert message according to an embodiment of the present invention. In other words, the NRT service information includes information for acquiring NRT data related to the emergency alert message. The NRT service information may be included in an EAT when the EAS_NRT_flag field of FIG. 46 is enabled. For example, the NRT service information may be included in the EAT when the EAS_NRT_flag field has a value of 1.

When NRT content and data related to the emergency alert message are transmitted to the broadcast receiver 70, the NRT service information includes identifier information for an NRT service. In this instance, the identifier information for the NRT service may be an EAS_NRT_service_id field. The EAS_NRT_service_id field may correspond to 16 bits.

FIG. 49 illustrates an embodiment of an EAT having a section form for transmitting an emergency alert message according to an embodiment of the present invention. Even though the EAT of FIG. 49 is prepared in an MPEG-2 private section form to assist in understanding, a format of data of the EAT is not restricted thereto.

Examples of fields transmissible through the EAT are given below.

A table_id field (8 bits) is a field for distinguishing a type of a table, and a table may be found to be the EAT through this field.

A section_syntax_indicator field (1 bit) is an indicator that defines a section form of the EAT. For example, the section form may be short-form syntax ("0") of MPEG.

A private_indicator field (1 bit) indicates whether the EAT conforms to a private section.

A section_length field (12 bits) indicates a section length of a remaining EAT after the field.

A table_id_extension field (16 bits) is dependent on a table, and is a logical part of a table_id field that provides a range of remaining fields. The table_id_extension field includes an EAT_protocol_version field.

The EAT_protocol_version field (8 bits) reports a protocol version for permitting an EAT transmitted by a parameter having a different structure from that of others defined in a current protocol.

A version_number field (5 bits) indicates a version number of an EAT.

A current_next_indicator field (1 bit) indicates whether the EAT section is currently applicable.

A section_number field (8 bits) indicates a number of a current EAT section.

A last_section_number field (8 bits) indicates a last section number included in an EAT.

An automatic_tuning_flag field (1 bit) indicates whether to automatically tune to a channel.

A num_EAS_messages field (7 bit) indicates the number of emergency alert messages included in an emergency alert table.

When the automatic_tuning_flag field has a value of "1", that is, indicates automatic channel tuning, the emergency alert table further includes an automatic_tuning_info( ) field. The automatic_tuning_info( ) field includes information for automatic tuning. For example, the automatic_tuning_info( ) field may include information about a channel transmitting content related to emergency alert information, information for identifying a physical layer pipe transmitting A/V content related to an emergency alert message, and service ID information of content related to the emergency alert message. Therefore, when forced tuning to a channel number at which the emergency alert message is broadcast is needed, the above fields may be used.

In addition, an emergency_alert_message( ) field of FIG. 49 is included in a "for" loop, and transmits an emergency alert message corresponding to a value of the num_EAS_messages field. When the EAS_NRT_flag field has a value of 1, the "for" loop further includes an NRT_service_info( ) field. The NRT_service_info( ) field transmits NRT service information related to an emergency alert.

FIG. 50 illustrates another embodiment of a section table for transmitting an emergency alert message according to the present invention.

In an emergency alert table of FIG. 50, a table_id field identifies a type of a current table. The broadcast receiver may identify the present table as an emergency alert table using the table id field.

A table id extension field includes the EAT_protocol_version field. When a structure of the emergency alert table is changed, the EAT_protocol_version field identifies version information thereof. Details of fields of a section header of FIG. 50 have been described with reference to FIG. 49, and will not be described here.

An automatic_tuning_flag field (1 bit) indicates whether to automatically tune to a channel.

A num_EAS_messages field (7 bits) indicates the number of emergency alert messages included in the emergency alert table.

When the automatic_tuning_flag field has a value of "1", that is, indicates automatic channel tuning, the emergency alert table further includes an automatic_tuning_channel_number field, an automatic_DP_id field, and an automatic_service_id field.

The automatic_tuning_channel_number field (8 bits) indicates information about a channel including content related to emergency alert information.

The automatic_DP_id field (8 bits) indicates information for identifying a data pipe, that is, a physical layer pipe including A/V content related to the emergency alert message.

The automatic_service_id field (16 bits) indicates service ID information of content related to the emergency alert message.

In addition, a "for" loop repeated the number of times corresponding to a value of the num_EAS_messages field includes an EAS_message_id field, an EAS_IP_version_flag field, an EAS_message_transfer_type field, an EAS_message_encoding_type field, and an EAS_NRT_flag field.

The EAS_message_id field (32 bits) indicates a unique ID for identifying an emergency alert message. A value of this field may be changed when the emergency alert message is updated or canceled. As another embodiment, this field may be extracted from a CAP message ID.

The EAS_IP_version_flag field (1 bit) indicates an IP version in which the emergency alert table is transmitted. The IP address field includes an IPv4 address when this field has a value of "0" and includes an IPv6 address when this field has a value of "1".

The EAS_message_transfer_type field (3 bits) indicates a transmission type of the emergency alert message. In a specific embodiment, the EAS_message_transfer_type field may indicate that a transmission type of an EAS message has not been specified. In this case, the EAS_message_transfer_type field may have a value of 000(2).

In another embodiment, the EAS_message_transfer_type field may indicate that a transmission type of the EAS message is a type in which no emergency message is included. In this case, the EAS_message_transfer_type field may have a value of 001(2).

In another embodiment, the EAS_message_transfer_type field may indicate that the EAS message is included in the EAT and delivered. In this case, the EAS_message_transfer_type field may have a value of 010(2).

Further, when the EAS_message_transfer_type field has the value of 010(2), the emergency alert table including the EAS message may additionally indicate a length of the EAS message. In this case, information indicating the length of the EAS message may be an EAS_message_length field. The EAS_message_length field may correspond to 12 bits. In addition, an EAS_message_bytes( ) field subsequent to the EAS_message_length field transmits an emergency alert message including emergency alert content corresponding to a length which corresponds to a value of the EAS_message_length field.

In another embodiment, the EAS_message_transfer_type field may indicate that the EAS message is transmitted in the form of an IP datagram through a physical layer pipe. In this case, the EAS_message_transfer_type field may have a value of 011(2).

When the EAS_message_transfer_type field has the value of 011(2), the emergency alert table may additionally include at least one of an IP_address field (32 or 128 bits) indicating IP address information for acquiring an IP datagram that transmits the EAS message, a UDP_port_num field (16 bits) indicating a UDP port number, and a DP_id field (8 bits) indicating identification information of a physical layer frame (that is, a PLP or DP) in which the EAS message is transmitted.

Meanwhile, the EAS_message_encoding_type field (3 bits) indicates an encoding type of the emergency alert message. In a specific embodiment, the EAS_message_encoding_type field may indicate that an encoding type of the emergency alert message has not been specified. In this case, the EAS_message_encoding_type field may have a value of 000(2).

In another embodiment, the EAS_message_encoding_type field may indicate that the emergency alert message has not been encoded. In this case, the EAS_message_encoding_type field may have a value of 001(2).

In another embodiment, the EAS_message_encoding_type field may indicate that the emergency alert message has been encoded by the DEFLATE algorithm. The DEFLATE algorithm is a lossless compression data format. In this case, the EAS_message_encoding_type field may have a value of 010(2).

In the emergency alert table, when the EAS_NRT_flag field has a value of "1", an NRT_service_id field is further included. The NRT_service_id field (16 bits) indicates identification information for identifying an NRT service related to an emergency alert.

Figure 51:
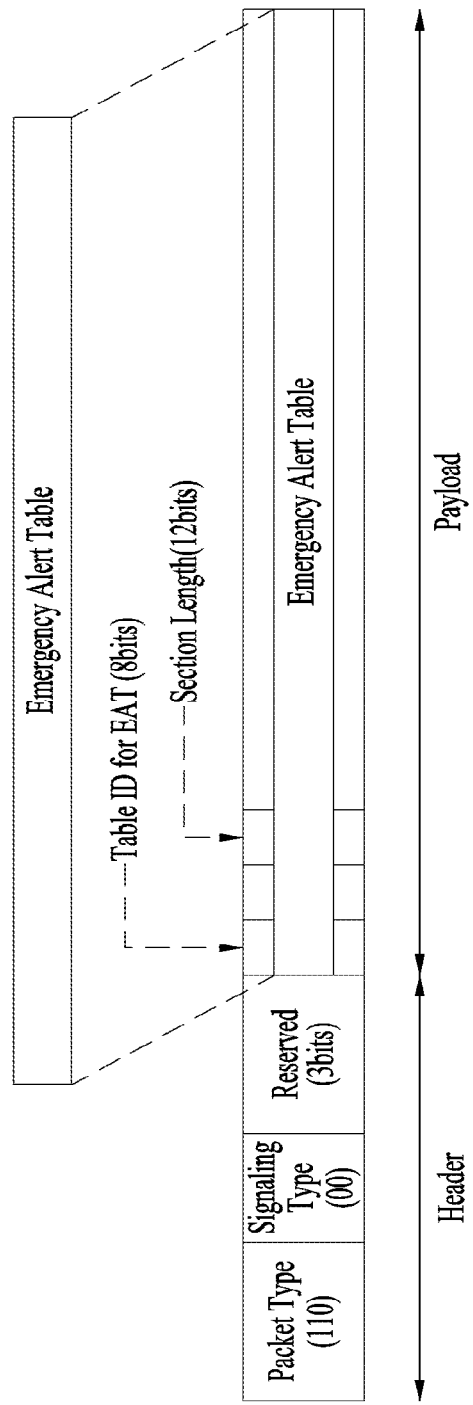
FIG. 51 illustrates an embodiment of configuring a packet to transmit an EAT without changing the form according to the present invention.
Figure 52:
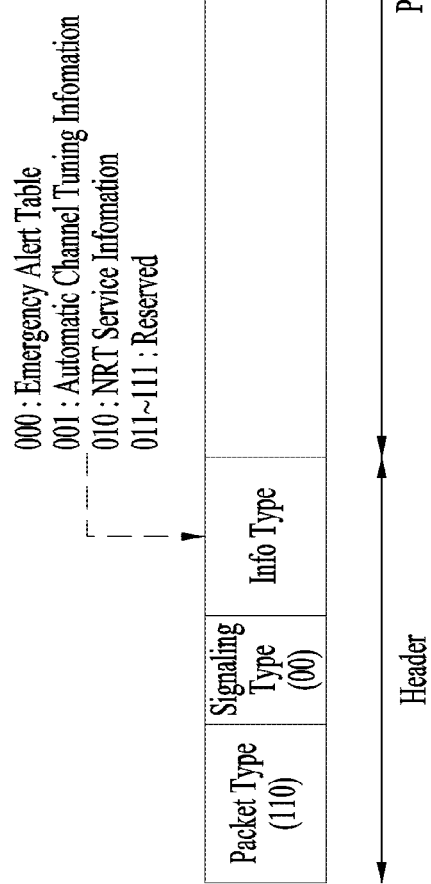
FIG. 52 illustrates an embodiment of configuring a packet to transmit an emergency alert message in the form of separate information rather than a section table according to the present invention.

FIG. 51 and FIG. 52 illustrate embodiments in which the EAT is transmitted in the form of a packet through a physical layer frame according to the invention.

In general, a broadcast packet includes a packet payload into which data to be transmitted through the packet is inserted, and a packet header into which information for signaling the packet payload is inserted. Therefore, according to an embodiment of the present invention, the broadcast transmitter may insert an emergency alert message to be transmitted into the payload of the packet, and insert signaling information for signaling the emergency alert message into the header of the packet.

FIG. 51 illustrates an embodiment in which a form of the above-described emergency alert table is not changed, and the emergency alert table is inserted into the payload of the packet without change and transmitted. As illustrated in FIG. 51, the packet payload includes the emergency alert table without change, and may additionally include an ID for the emergency alert table and length information of the emergency alert table.

In addition, the packet header may include information that indicates a type of the packet. In an embodiment, packet type information may indicate that the payload of the packet includes data for emergency alert signaling. In a specific embodiment, information indicating a packet type may be 110(2).

In addition, the packet header may include information that indicates a type of signaling data included in the payload of the packet. In an embodiment, signaling data type information may indicate that the signaling data has the form of a section table. In a specific embodiment, when the signaling data type information has a value of 00(2), the signaling data type information may indicate that the signaling data has the form of a section table.

FIG. 52 illustrates an embodiment in which an emergency alert message is inserted into the packet payload as individual information rather than in the form of a section table. In this instance, the section table refers to an intermediate form for configuring a final table. Specifically, the broadcast receiver 70 may configure the section table by gathering packets, and the broadcast receiver 70 may configure the final table by gathering section tables. Therefore, the embodiment of FIG. 52 illustrates that each field included in the emergency alert message is packetized into a separate packet. Thus, the broadcast receiver 70 may acquire complete information from one packet without the need to configure the section table by gathering one or more packets.

For example, one packet payload may include only EAT protocol version information, or include only automatic channel tuning information.

In this case, information that indicates a type of a packet may indicate that a payload of the packet includes data for emergency alert signaling. In this case, the information that indicates a type of a packet may be set to 110(2). In addition, information that indicates a type of signaling may indicate that data included in the packet payload has the form of individual information. In this case, the information that indicates a type of signaling may be set to 10(2).

Further, unlike FIG. 51, data for an emergency alert included in the packet payload may vary, and thus the packet header may additionally include information for identifying the data. The information may be an Info Type field.

In a specific embodiment, when the Info Type field has a value of 000(2), the data for an emergency alert included in the packet payload may be an emergency alert message. In another embodiment, when the Info Type field has a value of 001(2), the data for an emergency alert included in the packet payload may be automatic channel tuning information. In another embodiment, when the Info Type field has a value of 010(2), the data for an emergency alert included in the packet payload may be NRT service information.

Hereinafter, FIG. 53 to FIG. 59 illustrate various embodiments of transmitting an EAT. In a specific embodiment, a PLP (or DP) that transmits the EAT may vary according to embodiment, which will be described through FIG. 53 to FIG. 59.

Figure 53:
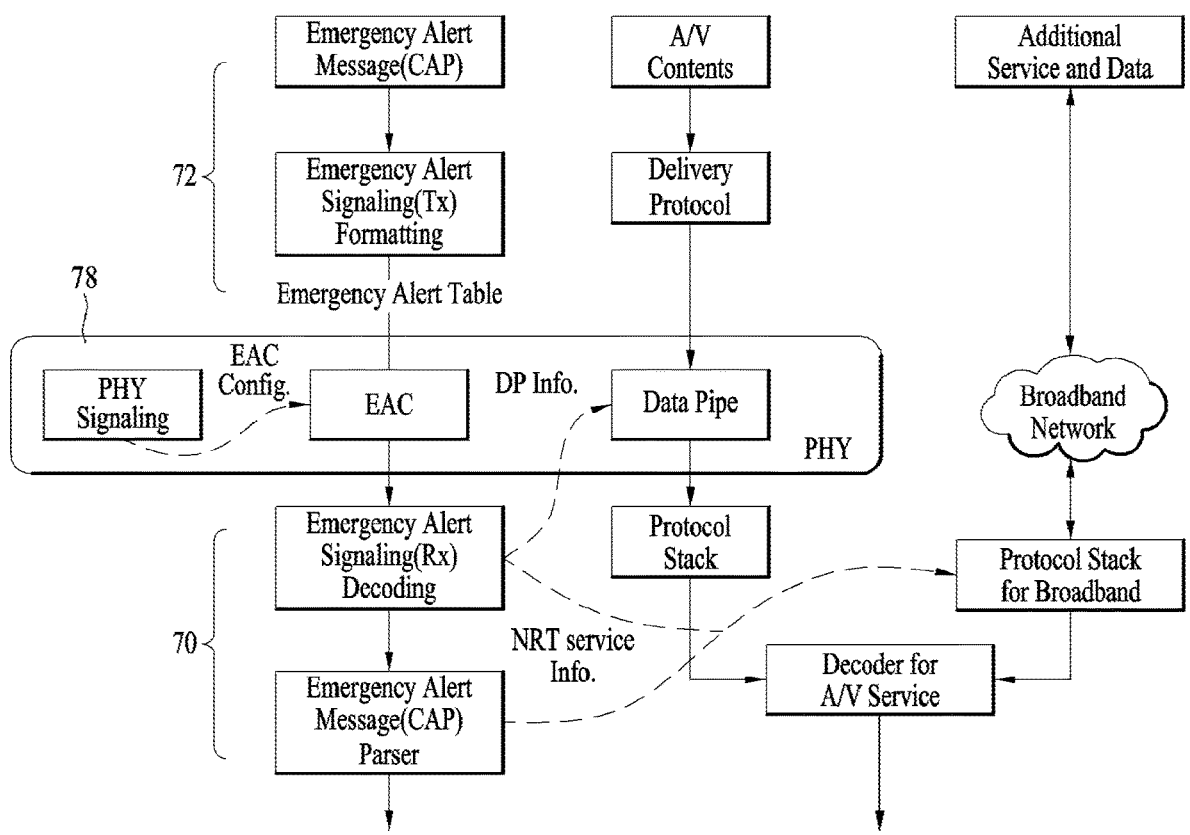
FIG. 53 is a block diagram illustrating another embodiment of the emergency alert system for transmitting/receiving the emergency alert information according to the present invention.

FIG. 53 is an embodiment of the present invention, and illustrates that the broadcast transmitter 72 transmits the EAT through a designated PLP (or DP).

In FIG. 53, reference numeral 70 denotes a broadcast receiver, reference numeral 72 denotes a broadcast transmitter, and reference numeral 78 denotes a physical layer processor included in each of the broadcast transmitter 72 and the broadcast receiver 70. In an embodiment, when the physical layer processor 78 is included in the broadcast transmitter, an emergency alert signaling formatting block for an emergency alert message and a delivery protocol block for A/V content correspond to a link layer processor. In addition, in an embodiment, when the physical layer processor 78 is included in the broadcast receiver, an emergency alert signaling decoding block and a parser block for the emergency alert message and a protocol stack and a decoder block for the A/V content correspond to the link layer processor.

In an embodiment, the broadcast transmitter 72 may transmit the emergency alert table through a designated physical layer pipe (dedicated physical layer pipe). In this instance, the physical layer pipe designated to transmit the emergency alert table may be referred to as an EAC. In other words, the EAC may be a dedicated physical layer pipe for transmitting only a physical layer frame including the emergency alert table. Here, the physical layer frame may be a unit of data transmitted through a physical layer. The physical layer may include one or more physical layer pipes, and the physical layer frame may be transmitted through the physical layer pipes. Hereinafter, the present embodiment will be described in more detail with reference to FIG. 53.

The emergency alert signaling formatting block of the broadcast transmitter 72 generates the EAT based on emergency alert information gathered from the alert authorities 76, etc. Here, the emergency alert information gathered by the broadcast transmitter 72 may be a CAP message received from the information aggregator 74.

In addition, as described in the foregoing, the designated physical layer pipe may be an emergency alert channel that transmits only the EAT. The physical layer processor 78 of the broadcast transmitter 72 generates a broadcast signal including a generated emergency alert table. Specifically, the broadcast signal may include a physical layer frame including the emergency alert table. In addition, the broadcast transmitter 72 transmits the broadcast signal including the emergency alert channel. Specifically, the broadcast transmitter 72 may transmit the broadcast signal through a physical layer pipe designated only for a physical layer frame including the EAT. The physical layer processor 78 of the broadcast receiver 70 receives the broadcast signal through the designated physical layer pipe. As described in the foregoing, the physical layer pipe may be a data pipe designated to transmit only emergency alert information in a physical layer. The decoding and parser block of the broadcast receiver 70 may extract the EAT from the physical layer frame received through the EAC. In addition, the broadcast receiver 70 may acquire information, which indicates whether the EAC is included in the physical layer that delivers the physical layer frame, from the physical layer frame. In this instance, information indicating whether the EAC is included in the physical layer may be referred to as PHY signaling. The broadcast receiver 70 may determine a data pipe that transmits emergency alert information based on the PHY signaling. The decoding block of the broadcast receiver 70 decodes a physical layer frame including the EAT. In this instance, the broadcast receiver 70 may acquire a CAP message, related content information, and related NRT service information from the physical layer frame.

The parser block of the broadcast receiver 70 may acquire the emergency alert information by parsing the acquired CAP message. In a specific embodiment, the parser block (that is, CAP parser) may parse the CAP message. In this case, the broadcast receiver 70 may acquire the related NRT service information together with the emergency alert information. When overlapping information between the EAT and the CAP message is present, the broadcast transmitter 72 may adjust the information in a process of adjusting the EAT.

The protocol stack block of the broadcast receiver 70 may receive A/V content based on the acquired related content information. Specifically, the acquired related content information may be information for identifying a physical layer pipe that transmits the A/V content. Further, the related content information may be information for identifying related A/V content.

The protocol stack block of the broadcast receiver 70 identifies a physical layer pipe to extract a physical layer frame including the related content based on the related content information. In addition, the decoder block of the broadcast receiver 70 decodes the physical layer frame received through the identified physical layer pipe to acquire the A/V content. In this instance, the physical layer pipe that transmits the related content may be distinguished from the physical layer pipe that transmits the emergency alert information. In addition, the broadcast receiver 70 may acquire an NRT service related to the emergency alert information based on the acquired NRT service information. Specifically, the broadcast receiver 70 may acquire address information for acquiring an NRT service from the NRT service information. In this instance, the broadcast receiver 70 may receive the NRT service through the broadband network.

The broadcast receiver 70 provides the acquired emergency alert message together with the A/V content. When information about automatic channel tuning is transmitted, the broadcast receiver 70 may provide the emergency alert message while automatically tuning to a channel including the information about automatic channel tuning.

Figure 54:
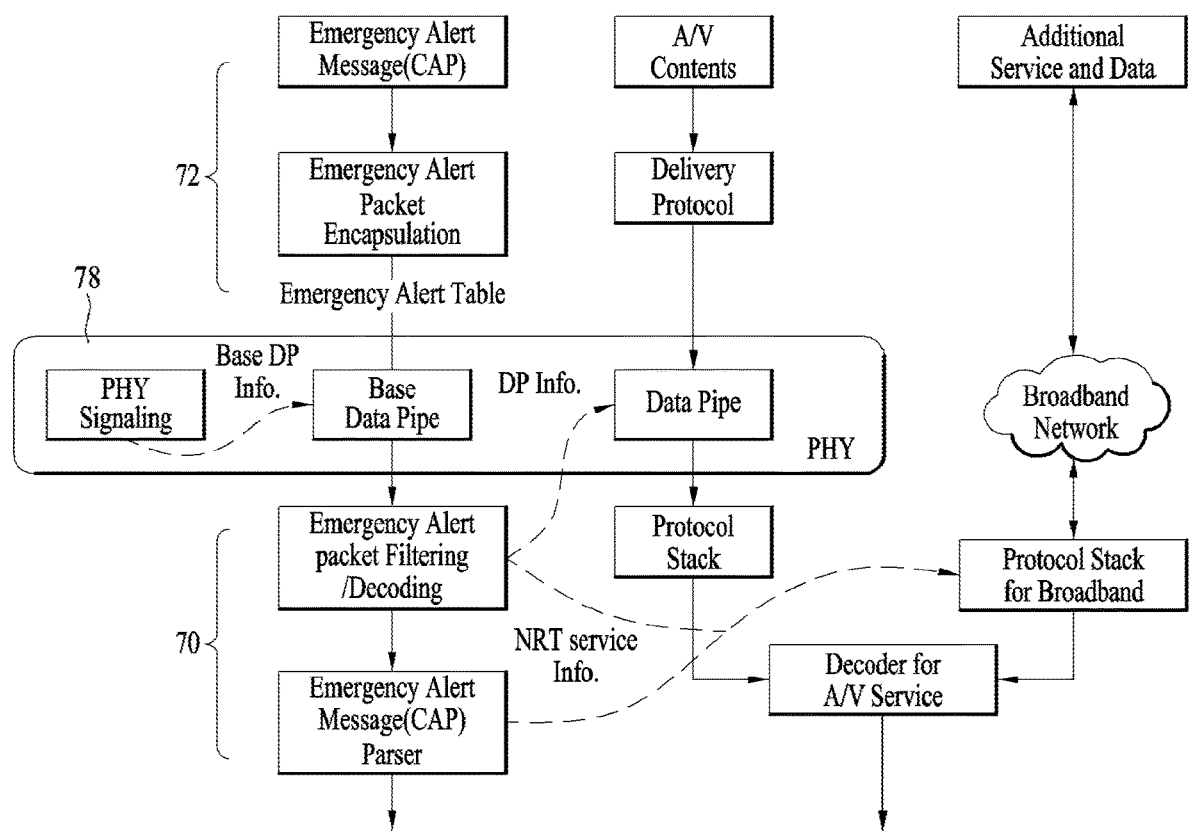
FIG. 54 is a block diagram illustrating another embodiment of the emergency alert system for transmitting/receiving the emergency alert information according to the present invention.
Figure 55:
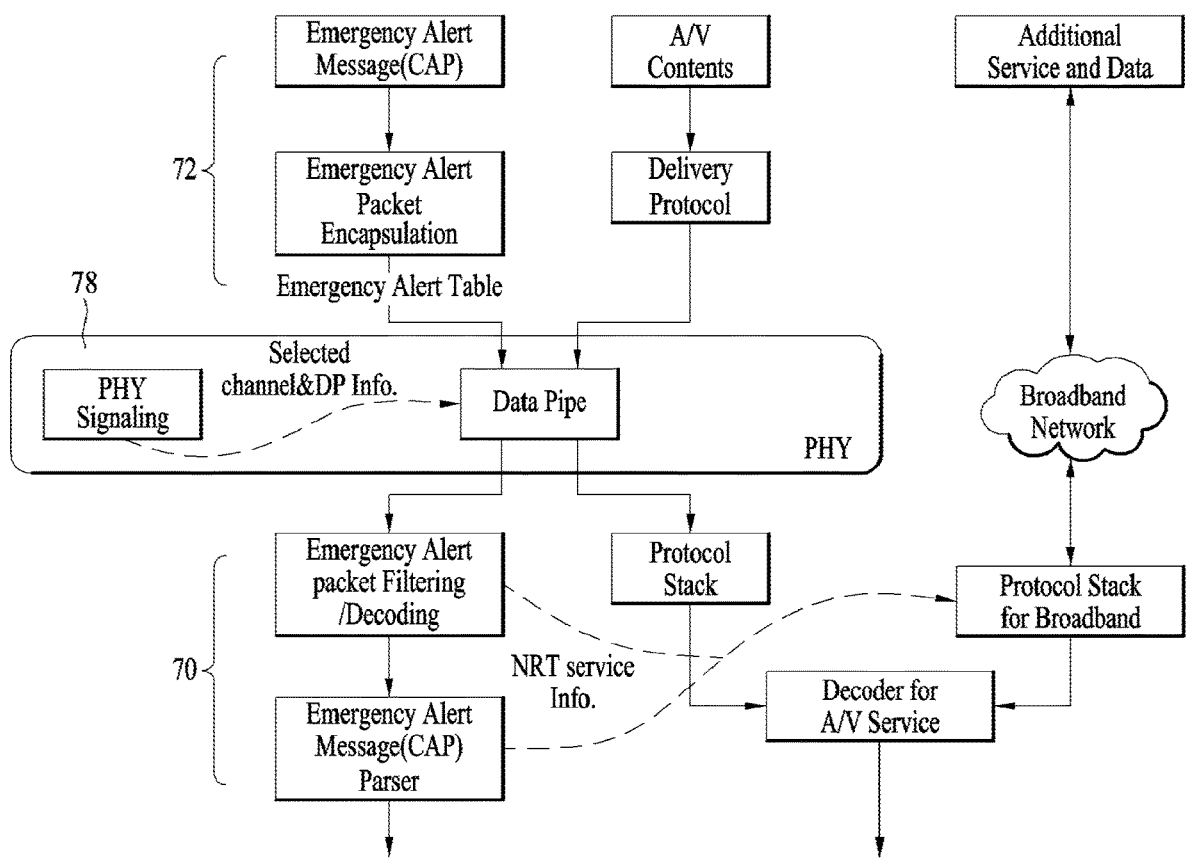
FIG. 55 is a block diagram illustrating another embodiment of the emergency alert system for transmitting/receiving the emergency alert information according to the present invention.

FIG. 54 and FIG. 55 illustrate that the broadcast transmitter 72 encapsulates an EAT in a packet and transmits the packet as an embodiment of the present invention. The packet including the EAT may be referred to as an emergency alert packet.

In an embodiment, a plurality of physical layer pipes may be included in a physical layer of a broadcast signal. In addition, a separate physical layer pipe may be present to transmit specific information about a plurality of broadcast services transmitted through the plurality of physical layer pipes included in the physical layer of the broadcast signal. In this instance, a separate physical layer pipe transmitting broadcast service information may be referred to as a base data pipe. Specifically, the broadcast transmitter 72 may transmit signaling information of a broadcast service or common data applied to a plurality of broadcast services through the base data pipe. Here, the signaling information or the common data may be information that signals a physical layer frame transmitted through a physical layer or data commonly applied to a physical layer frame.

FIG. 54 illustrates that the broadcast transmitter 72 transmits an EAT through a base data pipe as an embodiment.

In FIG. 54, reference numeral 70 denotes a broadcast receiver, reference numeral 72 denotes a broadcast transmitter, and reference numeral 78 denotes a physical layer processor included in each of the broadcast transmitter 72 and the broadcast receiver 70. In an embodiment, when the physical layer processor 78 is included in the broadcast transmitter, an emergency alert packet encapsulation block for an emergency alert message and a delivery protocol block for A/V content correspond to a link layer processor. In addition, in an embodiment, when the physical layer processor 78 is included in the broadcast receiver, a filtering/decoding block and a CAP parser block for the emergency alert message and a protocol stack and a decoder block for the A/V content correspond to the link layer processor.

The emergency alert packet encapsulation block of the broadcast transmitter 72 generates a packet to be transmitted through a physical layer by encapsulating emergency alert information gathered from the alert authorities 76, etc. In this instance, a packet obtained by encapsulating the emergency alert information may be referred to as an emergency alert packet. Here, the emergency alert information received by the broadcast transmitter 72 may be a CAP message received from the information aggregator 74.

In an embodiment, the emergency alert packet may include a packet header and a packet payload. In a specific embodiment, the packet payload may include an EAT without change. In another embodiment, the packet payload may include only partial information in the EAT. Here, the partial information may be partial information having a high importance in the EAT.

In addition, the packet header may include signaling information indicating that data included in the packet payload is emergency alert information. Further, the packet header may signal that the packet includes the emergency alert information. Specifically, the packet header may indicate that the packet includes different type information from that of a general packet, and the packet includes emergency alert information. In other words, the packet header may indicate that the packet is an emergency alert packet.

The physical layer processor 78 of the broadcast transmitter 72 transmits a packet in which the EAT is encapsulated through a physical layer pipe for transmitting signaling information of a broadcast service or common data. In other words, the broadcast transmitter 72 transmits the emergency alert packet through a base data pipe. In this case, the base data pipe is a form of a physical layer pipe, and may be distinguished from another physical layer pipe (or data pipe).

Meanwhile, a physical layer including the base data pipe may transmit information signaling that the base data pipe is present in the physical layer. In this instance, the information signaling the presence of the base data pipe may be referred to as PHY signaling. The physical layer processor 78 of the broadcast receiver 70 may verify that the base data pipe is present in a physical layer of a broadcast signal received based on the PHY signaling. In addition, the physical layer processor 78 of the broadcast receiver 70 may acquire emergency alert information through the base data pipe which is a form of the physical layer pipe. In this instance, the acquired emergency alert information may have the form of an emergency alert packet. The broadcast receiver 70 receives a broadcast signal through the base data pipe. In other words, the broadcast receiver 70 receives a physical layer frame including the emergency alert packet through the base data pipe.

The filtering and decoding block of the broadcast receiver 70 may extract the physical layer frame including the emergency alert packet from the received broadcast signal. In addition, the filtering and decoding block of the broadcast receiver 70 may acquire the emergency alert information by decoding the extracted physical layer frame. Specifically, the emergency alert information may be acquired by decoding the emergency alert packet included in the physical layer frame.

In this instance, the emergency alert packet may include a packet payload into which an EAT is inserted and a packet header that signals the packet payload. In a specific embodiment, the broadcast receiver 70 may determine whether the packet includes the emergency alert information from the packet header. In other words, the broadcast receiver 70 may determine whether the packet is an emergency alert packet based on information extracted from the packet header.

In addition, the broadcast receiver 70 may determine a form of the emergency alert information included in the packet payload from the packet header. For example, the broadcast receiver 70 may determine whether the packet payload includes the whole EAT.

The broadcast receiver 70 acquires the emergency alert information from the packet payload based on the information acquired from the packet header. Here, the acquired emergency alert information may be an EAT or a CAP message. Alternatively, the acquired emergency alert information may be emergency alert related content information or emergency alert related NRT service information.

The CAP parser block of the broadcast receiver 70 may parse the acquired CAP message to acquire the emergency alert information. In this case, the broadcast receiver 70 may acquire related NRT service information together with the emergency alert information. When overlapping information between the EAT and the CAP message is present, the broadcast transmitter 72 may omit the overlapping information in a process of configuring the EAT. Hereinafter, a process of acquiring a related service based on the emergency alert information is the same as the above-described content, and thus is omitted.

FIG. 55 illustrates that the broadcast transmitter 72 transmits an EAT through a normal physical layer pipe as an embodiment of the present invention. Here, the normal physical layer pipe may be a physical layer pipe, use of which is not designated.

The present embodiment is a case in which a base data pipe is not included in a physical layer unlike the embodiment of FIG. 54, and the description will focus on a difference from FIG. 54. That is, the physical layer processor 78 is different between FIG. 55 and FIG. 54.

In the present embodiment, the emergency alert packet encapsulation block of the broadcast transmitter 72 configures a packet header differently from a general packet header while encapsulating emergency alert information. Specifically, the broadcast transmitter 72 may differently set a value that indicates a packet type included in the packet header. For example, the value may be set to 000(2) in a general packet and may be set to 110(2) in an emergency alert packet, thereby distinguishing between the packets.

Meanwhile, the physical layer processor 78 of the broadcast transmitter 72 may transmit information that signals a physical layer pipe in a physical layer. In this instance, the information that signals the physical layer pipe in the physical layer may be referred to as PHY signaling.

The physical layer processor 78 of the broadcast transmitter 72 may acquire information of the physical layer pipe included in the physical layer received based on the PHY signaling.

In the embodiment of FIG. 55, the broadcast receiver 70 may receive a packet including an emergency alert and a packet including broadcast content through a plurality of physical layer pipes included in the physical layer. In addition, the broadcast receiver 70 may acquire emergency alert information from the packet including the emergency alert. Further, the broadcast receiver 70 may identify another physical layer pipe that transmits broadcast content related to the emergency alert based on the emergency alert information. Furthermore, the broadcast receiver 70 may acquire route information for receiving NRT content related to the emergency alert based on the emergency alert information.

FIG. 56 to FIG. 59 illustrate that the broadcast transmitter 72 transmits emergency alert information through another form of the physical layer pipe as an embodiment of the present invention. In this case, the other form of the physical layer pipe may be a physical layer pipe for scanning a broadcast service included in a physical layer of a broadcast signal. Specifically, the broadcast transmitter 72 may transmit service signaling information for scanning a broadcast service directly to the physical layer of the broadcast signal through a physical layer pipe without passing through another layer. In this instance, the physical layer pipe for scanning the broadcast service may be referred to as a signaling channel. The broadcast receiver 70 may acquire at least one of configuration information of a broadcast stream, brief broadcast service information, and component information from the signaling channel. In a specific embodiment, the signaling channel may be one of an FIC and LLS. The FIC is also referred to as an FIT or an SLT.

In an embodiment of the present invention, the broadcast transmitter 72 may transmit an emergency alert message based on a CAP message through the signaling channel. The present embodiment will be described in more detail with reference to FIG. 56 and FIG. 57.

Figure 56:
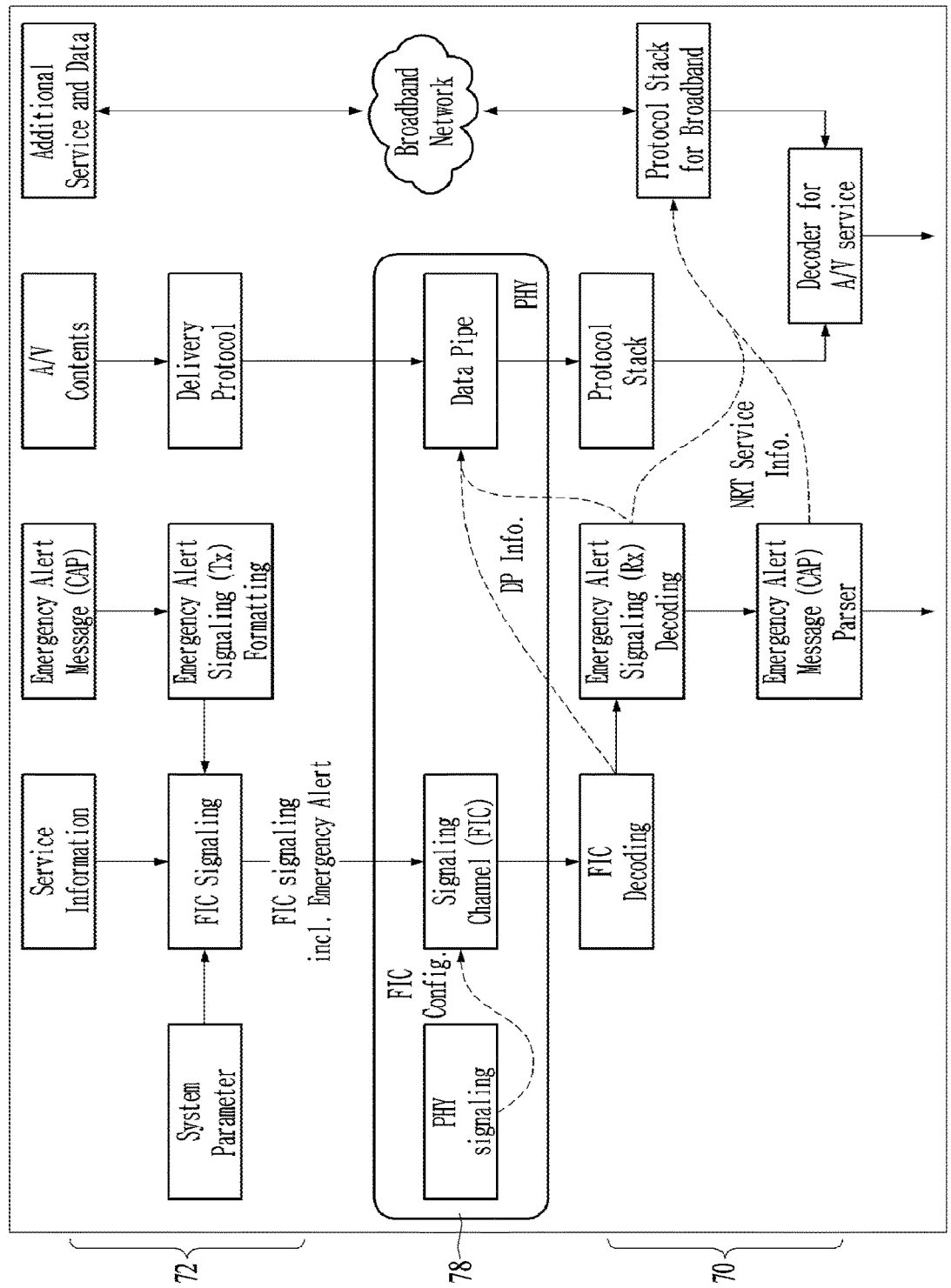
FIG. 56 is a block diagram illustrating another embodiment of the emergency alert system for transmitting/receiving the emergency alert information according to the present invention.

In FIG. 56, reference numeral 70 denotes a broadcast receiver, reference numeral 72 denotes a broadcast transmitter, and reference numeral 78 denotes a physical layer processor included in each of the broadcast transmitter 72 and the broadcast receiver 70. In an embodiment, when the physical layer processor 78 is included in the broadcast transmitter, an emergency alert signaling formatting block for an emergency alert message, an FIC signaling block for signaling channel information, and a delivery protocol block for A/V content correspond to a link layer processor. In addition, in an embodiment, when the physical layer processor 78 is included in the broadcast receiver, an emergency alert signaling decoding block and a CAP parser block for the emergency alert message, an FIC decoding block for the signaling channel information, and a protocol stack and a decoder block for the A/V content correspond to the link layer processor.

In another embodiment of the present invention, the broadcast transmitter 72 may transmit only minimum information that indicates an emergency alert through a signaling channel, and an actual emergency alert message (for example, an EAT) may be transmitted through a physical layer pipe distinguished from the signaling channel. The present embodiment will be described in more detail with reference to FIG. 58 and FIG. 59. The physical layer processor 78 is different between FIG. 58 and FIG. 56.

FIG. 56 illustrates a block diagram of an emergency alert system for directly transmitting an emergency alert message through a signaling channel according to an embodiment of the present invention.

The emergency alert signaling formatting block of the broadcast transmitter 72 generates an EAT based on emergency alert information gathered from the alert authorities 76, etc. Here, the emergency alert information received by the broadcast transmitter 72 may be a CAP message received from the information aggregator 74.

The physical layer processor 78 of the broadcast transmitter 72 generates a broadcast signal including the generated EAT. Specifically, the EAT may be transmitted through a signaling channel which is a form of a physical layer pipe of a broadcast signal. In this instance, the signaling channel may refer to a general signaling channel rather than a designated signaling channel described in the embodiment of FIG. 53. In addition, the broadcast transmitter 72 transmits a broadcast signal including the emergency alert information through the signaling channel.

The physical layer processor 78 of the broadcast receiver 70 may extract a physical layer frame including the emergency alert information from the broadcast signal received through the signaling channel. Specifically, the extracted physical layer frame may include the EAT. The decoding block of the broadcast receiver 70 decodes the extracted physical layer frame. In a specific embodiment, the broadcast receiver 70 decodes the physical layer frame to acquire the emergency alert information. In this instance, the broadcast receiver 70 may acquire a CAP message, emergency alert-related content information, and emergency alert-related NRT service information from the physical layer frame.

The CAP parser block of the broadcast receiver 70 may parse the acquired CAP message to acquire emergency alert information. In this case, the broadcast receiver 70 may acquire the emergency alert-related NRT service information together with the emergency alert information. When overlapping information between the EAT and the CAP message is present, the broadcast transmitter 72 may omit the overlapping information in a process of configuring the EAT. Hereinafter, a process of acquiring a related service based on the emergency alert information is the same as the above-described content, and thus is omitted.

FIG. 57 illustrates syntax of the emergency alert message transmitted through the signaling channel according to the embodiment of FIG. 56. In a specific embodiment, the emergency alert message may be a part of a table transmitted through the signaling channel. In addition, a field illustrated in FIG. 57 may be changed as necessary in the future.

FIG. 57 illustrates an example of transmitting the emergency alert message through an FIC in the signaling channel. In FIG. 57, a FIT_data_version field (8 bits) illustrates version information of semantics and syntax included in the FIC. A receiver according to an embodiment of the present invention may determine whether to process signaling included in the FIC using the FIT_data_version field.

A num_broadcast field (8 bits) indicates the number of broadcasters that transmit broadcast services or content through a frequency or a transmitted transmission frame.

An emergency_alert_flag field (1 bit) indicates whether emergency alert-related signaling information is included in the FIC. In an embodiment, the emergency_alert_flag field indicates that the FIC does not include the emergency alert-related signaling information when the emergency_alert_flag field has a value of 0, and the emergency_alert_flag field indicates that the FIC includes the emergency alert-related signaling information when the emergency_alert_flag field has a value of 1.

The emergency alert-related signaling information may include information related to automatic channel tuning. In addition, when the emergency_alert_flag field has the value of 1, an emergency alert message and/or emergency alert-related NRT service information may be transmitted through the FIC. To this end, when the emergency_alert_flag field has the value of 1, the FIC includes an automatic_tuning_flag field and a num_EAS_messages field. In addition, automatic channel tuning information, an emergency alert message, NRT service information, etc. may be transmitted through the FIC according to each field value.

The automatic_tuning_flag field (1 bit) indicates whether to automatically tune to a channel.

The num_EAS_messages field (7 bits) indicates the number of emergency alert messages included in the FIC.

When the automatic_tuning_flag field has a value of 1, that is, indicates automatic channel tuning, the FIC further includes an automatic_tuning_info( ) field. The automatic_tuning_info( ) field includes information for automatic tuning. For example, the automatic_tuning_info( ) field may include at least one of information about a channel that transmits content related to emergency alert information, information for identifying a physical layer pipe that transmits A/V content related to an emergency alert message, and service ID information of content related to the emergency alert message. Therefore, when automatic channel tuning is needed, the above field may be used.

In addition, an emergency_alert_message ( ) field transmits an emergency alert message, and an NRT_service_info ( ) field transmits NRT service information related to an emergency alert while being repeated the number of times corresponding to a value of the num_EAS_messages field.

Meanwhile, in the FIC, a broadcast_id field (16 bits) indicates a unique ID of a broadcaster that transmits content or a broadcast service or a frequency. In a broadcaster that transmits MPEG-2 TS-based data, a broadcast_id may have the same value as that of a transport_stream_id of an MPEG-2 TS.

A delivery_system_id field (16 bits) indicates an ID of a broadcast transmission system processed by applying the same transmission parameter in a used broadcast network.

A base DP id field (8 bits) indicates an ID of a physical layer pipe corresponding to a data pipe that delivers a broadcast service signal transmitted by a particular broadcaster which is identified by a broadcast_id. The base_DP_id field may indicate an ID of a representative data pipe, that is, a representative physical layer pipe that can decode a component included in a broadcast service transmitted by the particular broadcaster which is identified by the broadcast_id. Here, the physical layer pipe may refer to a data pipe of a physical layer, and the broadcast service transmitted by the particular broadcaster may include PSI/SI information, etc.

A base_DP_version field (5 bits) indicates version information according to change of data transmitted through a data pipe, that is, a PLP identified by base_DP_id. For example, when a service signal such as a PSI/SI is delivered through a base DP, a value of the base_DP_version field may be incremented by 1 each time the service signal is changed.

A num_service field (8 bits) indicates the number of broadcast services transmitted by a broadcaster identified by a broadcast_id within a corresponding frequency or transport frame.

A service_id field (16 bits) indicates an ID that can identify a corresponding broadcast service.

A service_category field (8 bits) indicates a category of a corresponding broadcast service. For example, the service_category field may indicate that the category is Basic TV when a value thereof is 0x01, the category is Basic Radio when a value thereof is 0x02, the category is RI service when a value thereof is 0x03, the category is Service Guide when a value thereof is 0x08, and the category is Emergency Alert when a value thereof is 0x09.

A service_hidden flag field (1 bit) indicates whether a corresponding broadcast service is hidden. When the service is hidden, the service corresponds to a test service or an internally used service, and thus a receiver according to an embodiment of the present invention may ignore the above-described hidden broadcast service or hide the service from a service list.

An SP_indicator field (1 bit) indicates whether service protection is applied to one or more components in a corresponding broadcast service.

A num_component field (8 bits) indicates the number of components included in a corresponding broadcast service.

A component_id field (8 bits) indicates an ID that identifies a component in a broadcast service.

A DP_id field (16 bits) indicates an ID that identifies a PLP corresponding to a data pipe through which a component in a broadcast service is transmitted.

An RoHC_init_descriptor( ) transmits compression information in an embodiment such that the broadcast receiver may release compression of a component when the component is compressed in a broadcast service, in particular, when a header of a packet that transmits the component is compressed using an RoHC scheme.

Figure 58:
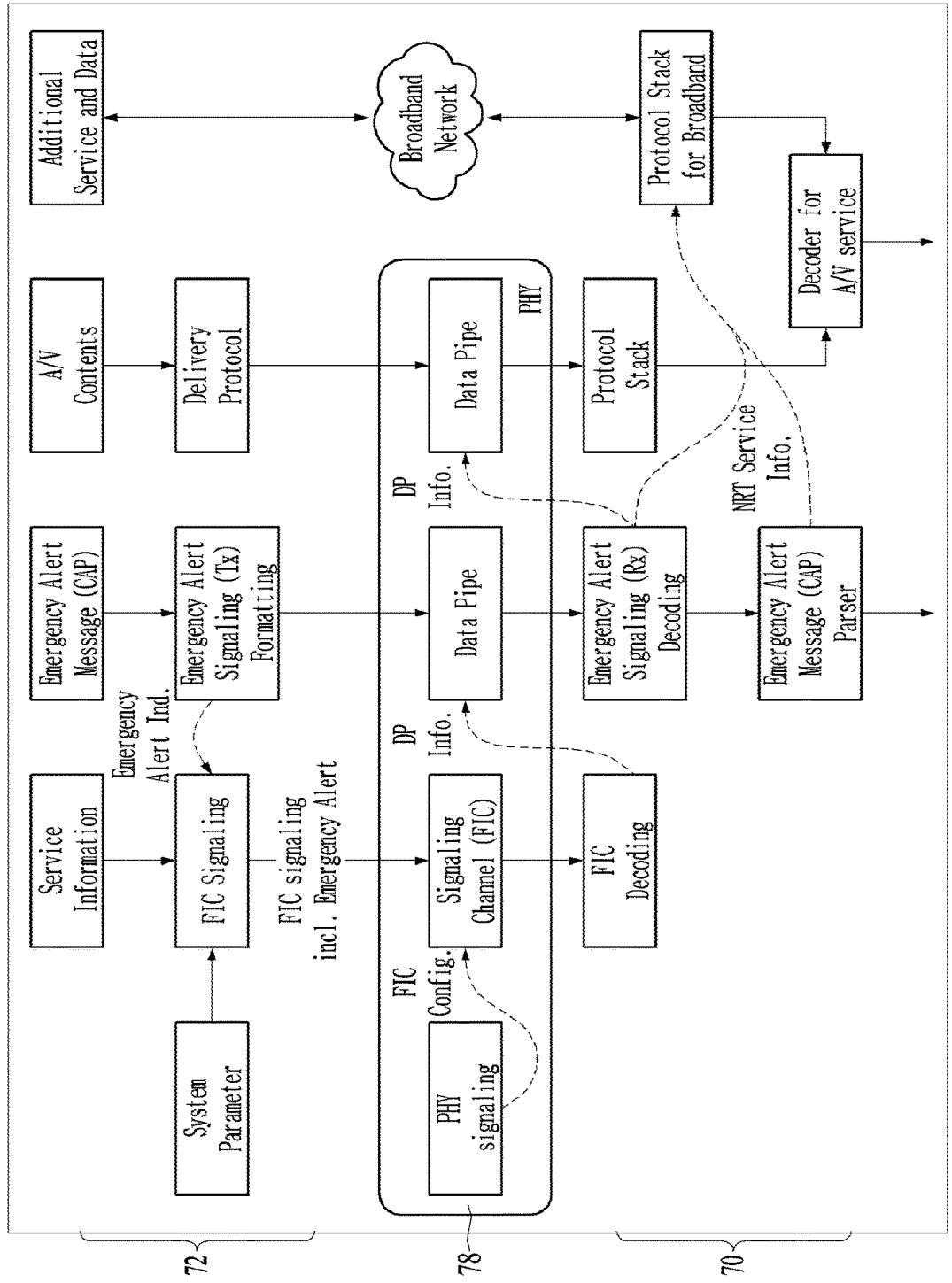
FIG. 58 is a block diagram illustrating another embodiment of the emergency alert system for transmitting/receiving the emergency alert information according to the present invention.

FIG. 58 illustrates a block diagram of an emergency alert system for transmitting/receiving only a delivery route of emergency alert information through a signaling channel according to an embodiment of the present invention. That is, an emergency alert message is not transmitted through the signaling channel.

To this end, the broadcast transmitter 72 signals emergency alert information gathered from the alert authorities 76, etc. in a transmissible form.

Specifically, the broadcast transmitter 72 may configure signaling information for an emergency alert (for example, a CAP message and related data) in a table, a descriptor, or a packet. In this instance, when the broadcast transmitter 72 does not include a module only for separate emergency alert signaling information, the emergency alert signaling information (or emergency alert information) may be signaled through a general signaling module in a transmissible form.

The broadcast transmitter 72 may insert information about whether an emergency alert message is transmitted and information about a route through which the emergency alert message is transmitted together with the emergency alert information into a physical layer frame. In this instance, the information about whether an emergency alert message is transmitted and the information about the transmission route may be indicated using an emergency alert indicator. The descriptor included in the physical layer frame may include the emergency alert indicator. In addition, the table included in the physical layer frame may include the emergency alert indicator as a field. Information included in the emergency alert indicator may be included as a separate field as necessary, and only information having high priority may be included according to order of priority. Here, the order of priority may be determined for each piece of information according to importance in transmitting the emergency alert information.

A physical channel processor 78 of the broadcast transmitter 72 transmits a physical layer frame including an emergency alert indicator and related data. In addition, the physical channel processor 78 of the broadcast transmitter 72 may transmit information related to an emergency alert through a physical layer pipe other than a signaling channel. In this instance, the physical layer pipe other than the signaling channel may be regarded as a general physical layer pipe.

In addition, emergency alert-related data transmitted by the broadcast transmitter 72 may be path information for acquiring emergency alert information from a data pipe. Specifically, the emergency alert-related data may be information for identifying a general data pipe corresponding to a general physical layer pipe that transmits emergency alert information.

A physical channel processor 78 of the broadcast receiver 70 receives the physical layer frame including the emergency alert indicator and the related data through the signaling channel. In addition, the physical layer frame may include information indicating whether a signaling channel that transmits emergency alert information to a physical layer is present. In this instance, the information indicating whether the signaling channel is present may be referred to as PHY signaling. The broadcast receiver 70 verifies whether the signaling channel is present in the physical layer based on the PHY signaling, and receives the physical layer frame including the emergency alert indicator and the related data from the signaling channel.

The broadcast receiver 70 may decode the physical layer frame through an emergency alert signaling decoder, and acquire the emergency alert indicator and the related data from the physical layer frame.

The broadcast receiver 70 acquires delivery path information of the emergency alert message based on the emergency alert indicator and the related data acquired from the physical layer frame. Specifically, the broadcast receiver 70 may acquire information about the physical layer pipe through which the emergency alert message is transmitted from the emergency alert indicator. Specifically, the broadcast receiver 70 may acquire identification information for identifying the physical layer pipe that transmits the emergency alert message from the emergency alert indicator.

The broadcast receiver 70 decodes a packet transmitted through the physical layer pipe which is identified based on the emergency alert indicator.

In a specific embodiment, the broadcast receiver 70 may determine whether the packet includes the emergency alert information based on a packet header. In addition, the broadcast receiver 70 may determine a form of the emergency alert information included in a packet payload from the packet header. For example, the broadcast receiver 70 may determine whether the packet payload includes the whole EAT.

The broadcast receiver 70 acquires the emergency alert information from the packet payload based on information acquired from the packet header. Here, the acquired emergency alert information may be an EAT or a CAP message. Alternatively, the emergency alert information may be related content information or NRT service information.

The CAP parser block of the broadcast receiver 70 may acquire the emergency alert information by parsing the acquired CAP message. In this case, the broadcast receiver 70 may acquire related NRT service information together with the emergency alert information. When overlapping information is present between the EAT and the CAP message, the overlapping part may be omitted in a process in which the broadcast transmitter 72 configures the EAT.

The broadcast receiver 70 may receive A/V content based on the acquired related content information. Specifically, the acquired related content information may be information for identifying a data pipe that transmits the A/V content. Further, the acquired related content information may be information for identifying the A/V content. The broadcast receiver 70 identifies a data pipe that transmits the A/V content based on the related content information. In addition, the broadcast receiver 70 may acquire the A/V content by decoding a physical layer frame transmitted through the identified data pipe, and acquire content related to the emergency alert information in the acquired A/V content. In this instance, the physical layer pipe that transmits the content is distinguished from the physical layer pipe that transmits the emergency alert information. In addition, the broadcast receiver 70 may acquire an NRT service related to the emergency alert information based on the acquired NRT service information. Specifically, the broadcast receiver 70 may acquire address information that allows the NRT service to be acquired from the NRT service information. In this instance, the broadcast receiver 70 may receive the NRT service through the broadband network.

The broadcast receiver 70 may provide the acquired emergency alert message together with the A/V content. When information about automatic channel tuning is transmitted together with the emergency alert message, the broadcast receiver 70 may provide the emergency alert message while automatically tuning to a channel.

FIG. 59 is an example of syntax for signaling an emergency alert transmitted through a signaling channel according to the embodiment of FIG. 58. In a specific embodiment, the emergency alert message may be a part of a table transmitted through the signaling channel. In addition, fields illustrated in FIG. 59 may be changed as necessary in the future.

FIG. 59 illustrates another example of transmitting emergency alert signaling information which is transmitted through the FIC in the signaling channel.

An FIC of FIG. 59 is the same as the FIC of FIG. 57 except that an EAS_message_id field and an EAS_DP_id field are added instead of the emergency_alert_message( ) field and the NRT_service_info( ) field of FIG. 57. Therefore, fields not described with reference to FIG. 59 will be inferred from FIG. 57, and a description thereof will be omitted herein.

The EAS_message_id field (32 bits) of FIG. 59 indicates an ID for identifying an emergency alert message transmitted through a data pipe which is identified by the EAS_DP_id field.

In addition, the EAS_DP_id field (8 bits) indicates an ID for identifying a data pipe (that is, a PLP) that transmits an emergency alert message which is identified by the EAS_message_id field.

Meanwhile, the EAS_message_id field and the EAS_DP_id field of the FIC of FIG. 59 may be used as an emergency alert indicator that indicates whether the emergency alert message is transmitted and information about a transmission path.

Figure 60:
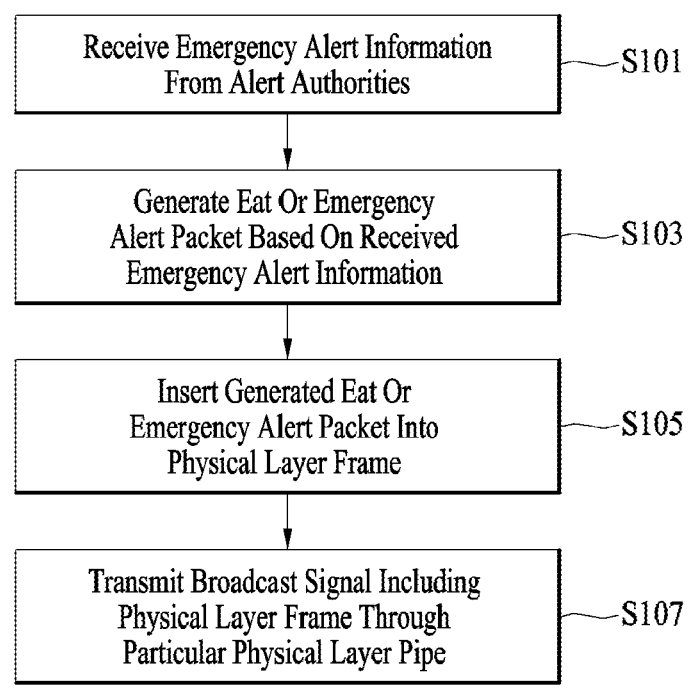
FIG. 60 is a flowchart illustrating an operation method of a broadcast transmitter according to an embodiment of the present invention.

FIG. 60 is a flowchart illustrating an operation method of the broadcast transmitter 72 according to an embodiment of the present invention.

The broadcast transmitter 72 receives emergency alert information from the alert authorities 76 (S101). Here, the alert authorities 76 may be one of disaster management authorities and an involved department. In addition, the broadcast transmitter 72 may receive the emergency alert information from the information aggregator 74. In this case, the broadcast transmitter 72 may receive the emergency alert information processed in a CAP message.

The broadcast transmitter 72 generates a table including the emergency alert information or an emergency alert packet including the emergency alert information based on the received emergency alert information (S103). Specifically, the broadcast transmitter 72 may generate an EAT or an emergency alert packet according to a physical layer pipe that transmits the emergency alert information.

In an embodiment, when the emergency alert information is transmitted through a designated physical layer pipe, the broadcast transmitter 72 may generate an EAT including the emergency alert information. In this case, in a first embodiment, the EAT may include all of the emergency alert information. In addition, in a second embodiment, the EAT may include some of the emergency alert information. Here, the some of the emergency alert information may include minimum information for transmitting the whole emergency alert information.

In another embodiment, when the broadcast transmitter 72 transmits the emergency alert information through a physical layer pipe for packet transmission, the broadcast transmitter 72 may encapsulate the emergency alert information in a packet. The packet in which the emergency alert information is encapsulated may be referred to as an emergency alert packet. In an embodiment, the broadcast transmitter 72 may encapsulate the emergency alert information in a payload of the packet. In another embodiment, the broadcast transmitter 72 may encapsulate the EAT in the payload of the packet.

In addition, the broadcast transmitter 72 may encapsulate information for identifying data of the packet payload in a packet header. Further, information encapsulated in the packet header may be information indicating that the packet is a packet including the emergency alert information.

The broadcast transmitter 72 inserts the generated EAT or emergency alert packet into the physical layer frame (S105). Specifically, the broadcast transmitter 72 inserts the EAT or emergency alert packet into the physical layer frame transmitted through the physical layer pipe. In this instance, the physical layer frame may include information indicating that the frame includes the emergency alert information.

In response to the emergency alert information inserted into the physical layer frame, the broadcast transmitter 72 transmits a broadcast signal including the physical layer frame through a particular physical layer pipe (S107). In an embodiment, the particular physical layer pipe may be a physical layer pipe designated to transmit only the emergency alert information. In another embodiment, the particular physical layer pipe may be a physical layer pipe that transmits signaling information for a broadcast service or data for common use applied to a plurality of broadcast services. In another embodiment, the particular physical layer pipe may be a physical layer pipe that transmits information necessary for service scanning including at least one of configuration information of a broadcast stream, brief broadcast service information, and component information. In another embodiment, the particular physical layer pipe may be a general physical layer pipe, use of which has not been designated.

Figure 61:
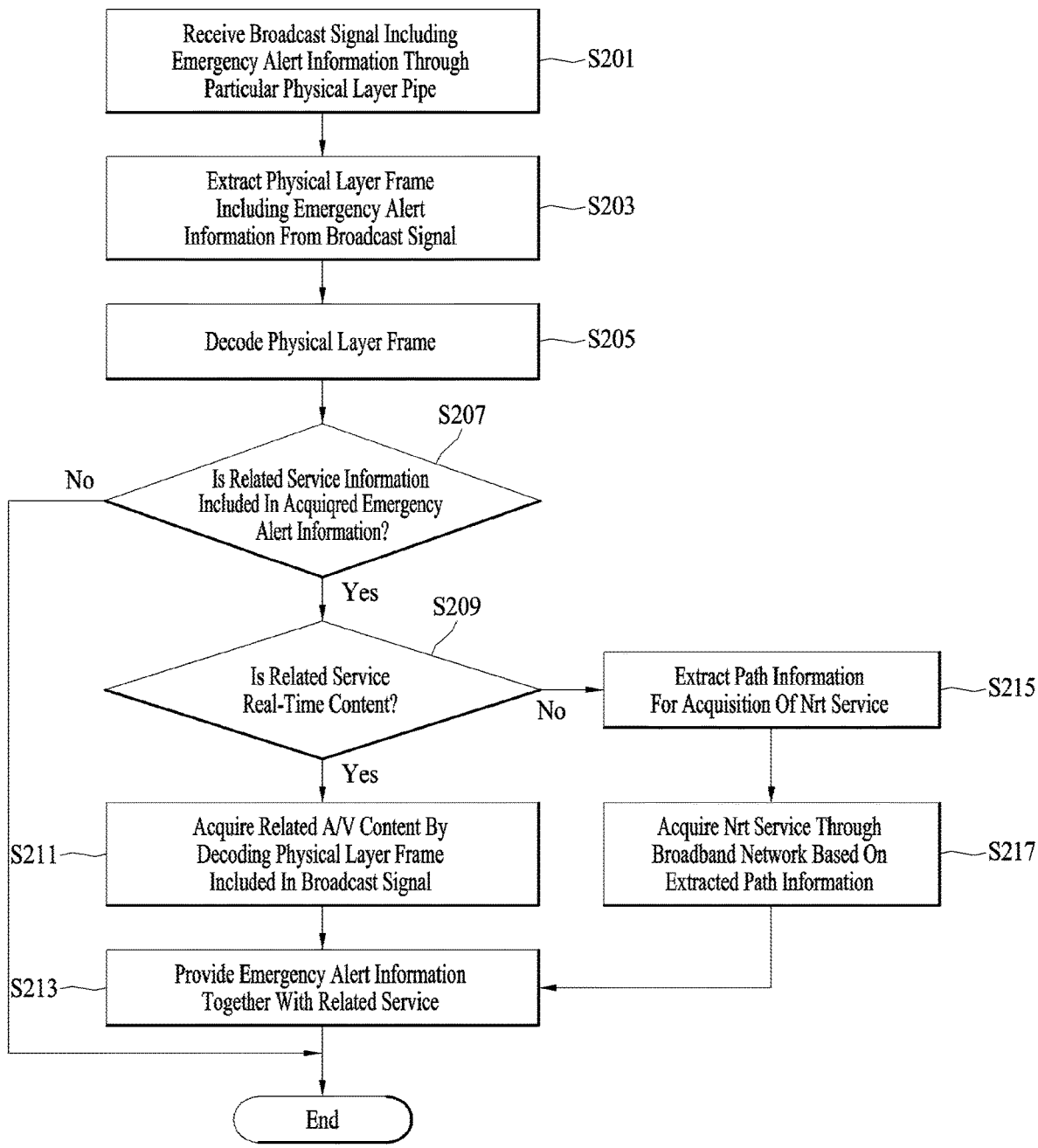
FIG. 61 is a flowchart illustrating an operation method of a broadcast receiver according to an embodiment of the present invention.

FIG. 61 is a flowchart illustrating an operation method of the broadcast receiver 70 according to an embodiment of the present invention.

The broadcast receiver 70 receives the broadcast signal including the emergency alert information through the physical layer pipe (S201). In an embodiment, the physical layer pipe may be a physical layer pipe designated to transmit only the emergency alert information. In another embodiment, the particular physical layer pipe may be a physical layer pipe that transmits signaling information for a broadcast service or data for common use applied to a plurality of broadcast services. In another embodiment, the particular physical layer pipe may be a physical layer pipe that transmits at least one of configuration information of a broadcast stream, brief broadcast service information, and component information. In another embodiment, the particular physical layer pipe may be a general physical layer pipe, use of which has not been designated.

The broadcast receiver 70 extracts the physical layer frame including the emergency alert information from the received broadcast signal (S203). In an embodiment, the physical layer frame may include an EAT. In this case, the EAT may include only minimum information for acquiring the emergency alert information. In another embodiment, the physical layer frame may include an emergency alert packet. The broadcast receiver 70 acquires the emergency alert information by decoding the extracted physical layer frame (S205). Specifically, the broadcast receiver 70 acquires the emergency alert information by decoding the EAT or the emergency alert packet included in the physical layer frame. In an embodiment, the broadcast receiver 70 may decode the physical layer frame based on particular information of the EAT or a header of the emergency alert packet. In another embodiment, the broadcast receiver 70 may decode the physical layer frame based on information acquired by decoding the EAT. Specifically, the broadcast receiver 70 may identify the physical layer frame including the emergency alert information from the EAT, and decode the identified physical layer frame.

The broadcast receiver 70 determines whether the acquired emergency alert information includes related service information (S207). Specifically, the broadcast receiver 70 determines whether information about related content which is related to the emergency alert information is included. Here, the related content may be one of real-time content and NRT content.

When the related content is determined to be present, the broadcast receiver 70 determines whether the acquired related content information is real-time content (S209). Specifically, the broadcast receiver 70 determines whether content related to the emergency alert information is real-time content or NRT content. Here, the real-time content may be A/V content. Whether content is real-time content may be determined based on particular information of the EAT. Alternatively, whether content is real-time content may be determined based on information included in the packet header.

Upon determining that the related content is real-time content, the broadcast receiver 70 acquires the related content by decoding the physical layer frame included in the received broadcast signal (S211). Specifically, the emergency alert information may include path information that allows the related content to be acquired. Therefore, the broadcast receiver 70 may acquire content by identifying the physical layer frame including the related content based on the information.

However, when the related content is determined to be NRT content, the broadcast receiver 70 extracts path information for acquiring the NRT content (S215). The information for acquiring the NRT content may be address information. For example, the information may be URI information.

The broadcast receiver 70 acquires an NRT service through an IP communication unit based on the extracted path information (S217). Specifically, the broadcast receiver 70 acquires the NRT service through the broadband network using the address information.

The broadcast receiver 70 provides the acquired emergency alert information together with the related service (S213). Specifically, the broadcast receiver 70 outputs the emergency alert information together with the related service. In this instance, the related service may be one of a real-time service or an NRT service.

Meanwhile, signaling information for broadcast services in the broadcast transmitter is transmitted to the physical layer by being included in a payload of the link layer packet, and the physical layer may configure the physical layer packet by means of one or more link layer packets, map the physical layer packet into a specific data pipe (that is, PLP) and then transmit the physical layer packet to a receiving side through a coding and modulation process. In the present invention, the packet of the link layer may be referred to as a generic packet, and the packet of the physical layer may be referred to as a baseband packet.

Particularly, as one embodiment of the present invention, the emergency alert message and/or the emergency alert related signaling information is packetized into the link layer packet, and the link layer packet is again packetized into the physical layer packet, mapped into a specific data pipe and then transmitted to the broadcast receiver through the coding and modulation process.

If a structure of the link layer packet that enables transmission of signaling information is defined in the system, the structure of the corresponding packet is used as one embodiment of the present invention. At this time, as one embodiment, the existing field or a new field is used to transmit signaling information indicating that the corresponding packet is an emergency alert related packet.

Generally, it is convenient that the signaling information related to the emergency alert message is transmitted at one time, and the signaling information may quickly be delivered to the broadcast receiver. However, if there is no dedicated data path that can transmit emergency alert information in view of a structure of the system, or for a structure that is difficult to transmit every kind of emergency alert information at one time, a method for transmitting emergency alert related information through classification and segmentation of the emergency alert related information based on a certain reference may be used.

Figure 62:
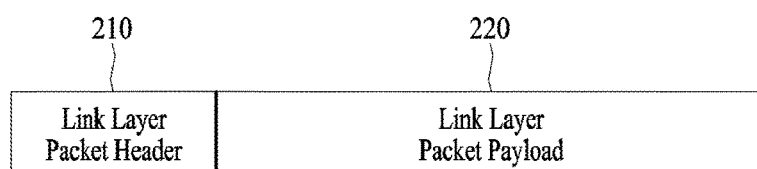
FIG. 62 illustrates a conceptual view of a link layer packet according to the present invention.

FIG. 62 illustrates a conceptual view of a link layer packet according to one embodiment of the present invention.

Referring to FIG. 62, the link layer packet includes a link layer packet header and a link layer packet payload. For convenience of description, the link layer packet header will be used to refer to "header", and the link layer packet payload will be used to refer to "payload".

A header 210 of FIG. 62 may be divided into a fixed header of 1 byte and an extended header of a variable length.

Figure 63:
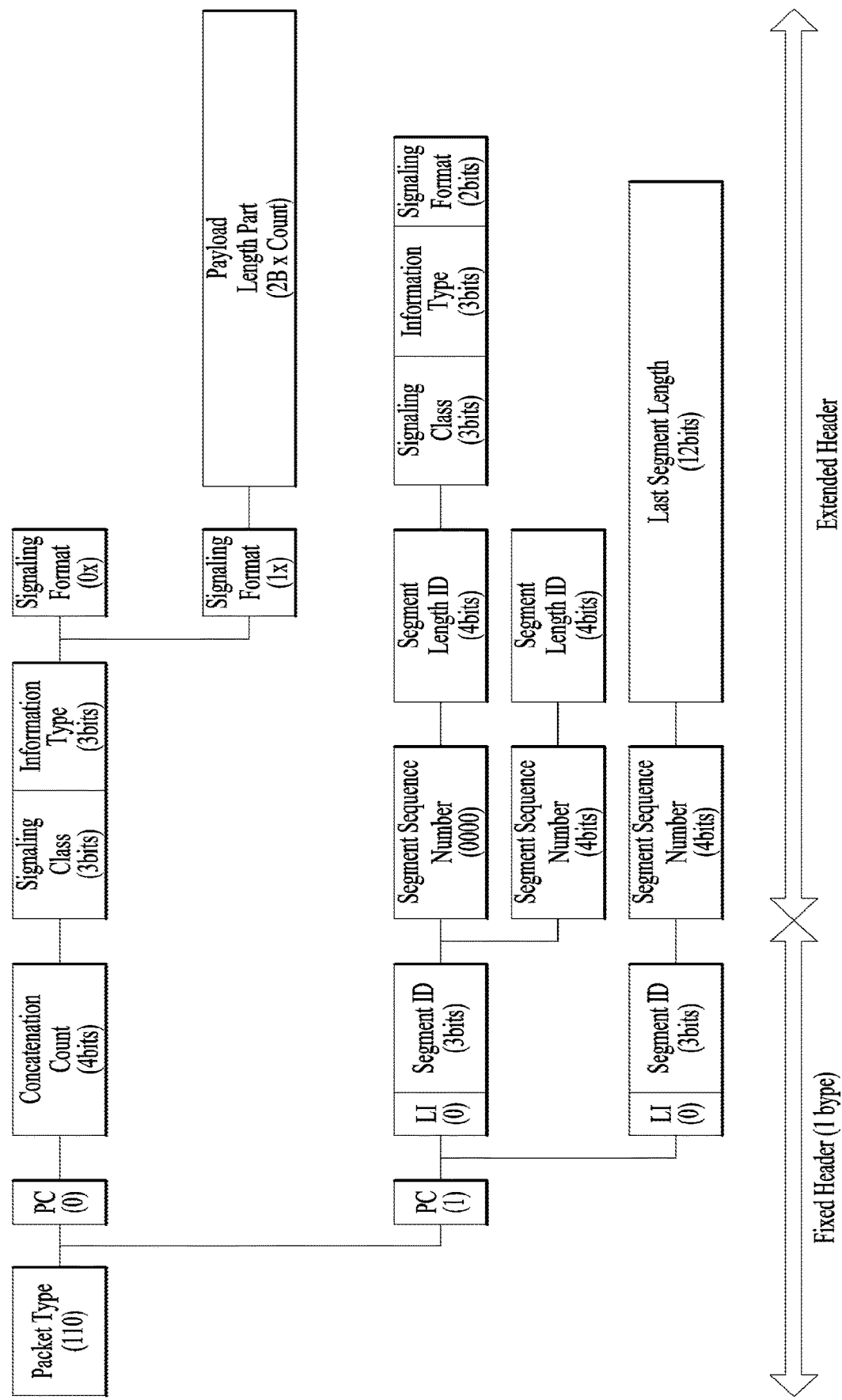
FIG. 63 is a diagram illustrating examples of respective fields included in a fixed header and an extended header of a link layer packet.

FIG. 64 illustrates a header structure of FIG. 63 as a syntax format, and relates to the same as that of FIG. 63.

Therefore, each field of the link layer header will be described with reference to FIGS. 63 and 64.

That is, a packet type field (3 bits) of the fixed header indicates a type of data transmitted to the corresponding packet.

For example, if a value of a packet_type field is '000', it indicates data of IPv4 transmitted to the corresponding packet. If the value of the packet type field is '010', it indicates data of a header compressed IP packet transmitted to the corresponding packet.

And, if the value of a packet type field is '110', it indicates data transmitted to the corresponding packet is signaling information (or signaling data). The signaling information may be either a signaling table (or descriptor) or a signaling packet. The signaling table may include a signaling table/table section included in DVB_SI (service information), PSI/PSIP, NRT (Non Real Time), ATSC 2.0, and MH (Mobile/Handheld), which exist conventionally.

In the present invention, the case where the value of the packet type field is '110' will be described in detail.

That is, if the value of the packet type field is '110', fields of the fixed header and fields of the extended header, which are subsequent to a payload_config field, are varied depending on a value of the payload_config field (1 bit). That is, information signaled to the fixed header and information signaled to the extended header are determined depending on the value of the payload_config field. The payload_config field may be referred to as a packet configuration (PC) field.

One embodiment indicates whether the signaling information is segmented by the upper layer and then provided to the link layer. According to one embodiment, if the value of the payload_config field is '0', the signaling information is provided without being segmented by the upper layer, and if the value of the payload_config field is '1', the signaling information is provided after being segmented by the upper layer.

If the value of the payload_config field is '0', a concatenation_count field of 4 bits is included in the fixed header. Also, the extended header includes a signaling_class field of 3 bits, an information_type field of 3 bits, and a signaling_format field of 2 bits. The extended field further includes a payload_lengthpart field of a variable length depending on a value of the signaling_format field.

If the value of the payload_config field is '1', an LI field of 1 bit and a segment_ID field of 3 bits are included in the fixed header. Also, the extended header includes a segment_sequence_number field of 4 bits, a segment_length_ID field of 4 bits, a signaling_class field of 3 bits, an information_type field of 3 bits, and a signaling_format field of 2 bits, or includes a segment_sequence_number field of 4 bits and a segment_length_ID field of 4 bits, or includes a segment_sequence_number field of 4 bits and a last_segment_length field of 12 bits.

The concatenation_count field (4 bits) corresponds to a count field of FIG. 64, and one embodiment of the present invention indicates how many link layer packets through which signaling information provided by the upper layer is transmitted are used. Alternatively, the field may indicate how many kinds of individual signaling information configure one payload.

The signaling_class field (3 bits) indicates a type of the signaling information included in the corresponding link layer packet, especially a payload of the corresponding link layer packet.

FIG. 65 illustrates an example of a type of signaling information defined depending on a value of a signaling_class field according to the present invention.

For example, if the value of the signaling_class field is '000', it indicates that the corresponding packet includes signaling information (for example, SLT) for channel scan and service acquisition. If the value of the signaling_class field is '001', it indicates that the corresponding packet includes signaling information for emergency alert. If the value of the signaling_class field is '010', it indicates that the corresponding packet includes signaling information for header compression.

In the present invention, if the value of the signaling_class field is '001', it indicates that the corresponding packet includes signaling information for emergency alert. However, this is one embodiment for assisting understanding of the present invention, and a reserved value of the signaling_class field may be used to indicate that the corresponding packet includes signaling information for emergency alert.

If the type of the signaling information transmitted to the corresponding packet is determined by the value of the signaling_class field, the information_type field indicates a type of data (that is, emergency alert information) transmitted to the payload of the corresponding packet regarding the determined signaling information. Also, detailed information may additionally be included depending on the type of the data.

In the present invention, if the value of the signaling_class field is 001, the corresponding packet will be referred to as an emergency alert packet.

FIG. 66 illustrates an example of meanings defined depending on a value of the information_type field of the emergency alert packet according to the present invention.

If the value of the information_type field is '000', it indicates that the emergency alert message is transmitted to a payload of the corresponding emergency alert packet. If the value of the information_type field is '001', it indicates that link (or connection) information of the emergency alert message is transmitted to the payload of the corresponding emergency alert packet. If the value of the information_type field is '010', it indicates that information for automatic channel tuning is transmitted to the payload of the corresponding emergency alert packet. If the value of the information_type field is '011', it indicates that emergency alert related NRT service information is transmitted to the payload of the corresponding emergency alert packet.

And, if the value of the information_type field is '111', it indicates that wake_up indication information is transmitted to the payload of the corresponding emergency alert packet. The wake_up indication information is required to indicate whether the corresponding emergency alert message needs a wake-up function. That is, the wake-up indication information is required to support a wake-up function of the broadcast receiver during the occurrence of disaster. The wake-up function means that the broadcast receiver should forcibly be switched to an active mode when an emergency alert message is issued, which is serious enough to switch a sleeping mode (or standby mode) to the active mode even though the broadcast receiver is in the sleeping mode (or standby mode). In order to support the wake-up function, the broadcast receiver should continue to monitor a broadcast signal even in case of the sleeping mode, and should know how the occurrence of disaster is emergent, as quickly as possible.

In FIG. 66, the value allocated to the information_type field and the meaning of the value are embodiments for assisting understanding of the present invention, and addition and deletion of information included in the information_type field may easily be varied by the person with ordinary skill in the art. Therefore, the present invention will not be limited to the aforementioned embodiments. That is, if a procedure related to emergency alert is additionally provided later, a reserved value of the information_type field may be used to transmit the packet related to the corresponding procedure.

The signaling format field indicates a format of signaling information for emergency alert included in the corresponding packet as one embodiment. Examples of the format that may be indicated by the signaling format field may include a section table such as EAT, a descriptor within an EAT, and XML. For example, if the corresponding signaling information has its length value in the same manner as the section table and the descriptor, a separate length field may not be required. However, a separate length field may be required in case of signaling information having no separate length value. In case of the signaling information having no separate length value, a payload_length_part field (length field in FIG. 64) is used to indicate a length as one embodiment. In this case, the payload_length part includes length fields equivalent to the number of count fields as one embodiment.

That is, if the value of the signaling format field is '1x', the payload_length_part field indicates a length of signaling information included in the payload of the corresponding packet. At this time, the payload length part may be a set of length fields indicating a length of each of signaling information which are concatenated.

Meanwhile, if a value of the PC field is '1', that is, if signaling information for emergency alert is provided by the upper layer through segmentation, fields included in the extended header are determined depending on a value of the LI field.

The LI (last segment indicator) field indicates whether the corresponding segment is the last segment, as one embodiment.

If the value of the LI field is '0', that is, if the corresponding segment is not the last segment, the segment_ID field indicates information for identifying the corresponding segment.

The segment_sequence_number field indicates the order of respective segments when the signaling information for emergency alert is segmented by the upper layer.

If the value of the LI field is '0' and the value of the segment_sequence_number field value is '0000', that is, the first segment of the signaling information for emergency alert, the extended header includes a segment_length_ID field of 4 bits, a signaling_class field of 3 bits, an information_type field of 3 bits, and a signaling_format field of 2 bits. The segment_length_ID field indicates a length of the first segment as one embodiment. Details of the signaling_class field, the information_type field and the signaling_format field will be understood with reference to the aforementioned description.

If the value of the LI field is '0' and the value of the segment_sequence_number field value is not '0000', that is, neither the first segment nor the last segment of the signaling information for emergency alert, the extended header includes a segment_sequence_number field of 4 bits and a segment_length_ID field of 4 bits. As one embodiment, the segment_sequence_number field indicates a segment number indicating an order of a corresponding segment of the signaling information for emergency alert, and the segment_length_ID field indicates a length of the corresponding segment. That is, according to one embodiment, the segment_length_ID field is used to indicate a length of each segment except the last one of a plurality of segments.

If the value of the LI field is '1', that is, the last segment, the extended header includes a segment_sequence_number field of 4 bits and a last_segment_length field of 12 bits. As one embodiment, the segment_sequence_number field indicates a number of the last segment, and the last_segment_length field indicates a length of the last segment.

Therefore, when the signaling information for emergency alert is segmented, the signaling information for emergency alert may be completed in such a manner that the broadcast receiver sequentially combines segments having the same segment ID by using the above fields.

FIG. 67 illustrates a syntax of an example of fields included in a payload of a link layer packet when a value of a packet_type field of a corresponding link layer packet header according to the present invention is '110' and a value of an information_type field value is '000'. That is, FIG. 67 illustrates an example of a syntax when the payload of the corresponding link layer packet includes an emergency alert message of the signaling information for emergency alert.

The emergency alert message is intended to mainly deliver a CAP message, and the payload of the link layer packet directly includes the CAP message. At this time, a concatenation method supported by a packet structure of a link layer may be used to transmit several emergency alert messages. In this case, the value of the payload_config field is set to '0' and the value of the count field signals the number of emergency alert messages, as one embodiment. Also, when the emergency alert message is delivered using the link layer packet, version information of the corresponding emergency alert message is given to repeatedly process the emergency alert message.

Each field of the payload of the link layer packet for transmitting the emergency alert message in FIG. 67 will be described as follows.

An EAS_message_id field (32 bits) indicates an identifier for identifying each emergency alert message. As one embodiment, each emergency alert message has an identifier identified from another one.

An EAS_mesage_encoding_type field (4 bits) indicates encoding type information of the emergency alert message. For example, if a value of the EAS_message_encoding_type field is '000', it indicates that an encoding type of the emergency alert message (or EAS message) has not been specified. If the value of the EAS_message_encoding_type field is '001', it indicates that the emergency alert message has not been encoded. If the value of the EAS_message_encoding_type field is '010', it indicates that the emergency alert message has been encoded by a DEFLATE algorithm. If a new encoding method is used later, a reserved value of the EAS_message_encoding_type field may be used to indicate the new encoding method.

An EAS_message_version field (4 bits) indicates version information of the corresponding emergency alert message. As one embodiment of the present invention, the version information included in the EAS_message_version field is used to determine whether to process the emergency alert messages having the same EAS_message_id. In the present invention, a value increased as much as 1 whenever a new emergency alert message is generated is given to the EAS_message_version field. In this case, if the value of the EAS_message_version field is high, it indicates a new emergency alert message. And, if the value of the EAS_message_version field reaches a maximum value, next value has '0'. If the version information of the emergency alert message can be identified through the EAS_message_id field, the EAS_message_version field may be omitted.

An EAS_message_protocol field (4 bits) indicates a protocol of a corresponding emergency alert message. If the emergency alert message is a CAP message, the EAS_message_protocol field indicates a protocol of the CAP message as one embodiment. Also, if another protocol other than the protocol of the CAP message is used, the EAS_message_protocol field indicates the corresponding protocol. For example, the EAS_message_protocol field may be used for interworking of the emergency alert message with another network such as a mobile network.

An EAS_message_length field (12 bits) indicates a length of an emergency alert message actually included in a payload of a corresponding packet. An emergency alert message which is intended to be actually transmitted is transmitted through an EAS_message_bytes( ) field. That is, the EAS_message_bytes( ) field transmits the emergency alert message as much as a length corresponding to a value of the EAS_message_length field.

Figure 68:
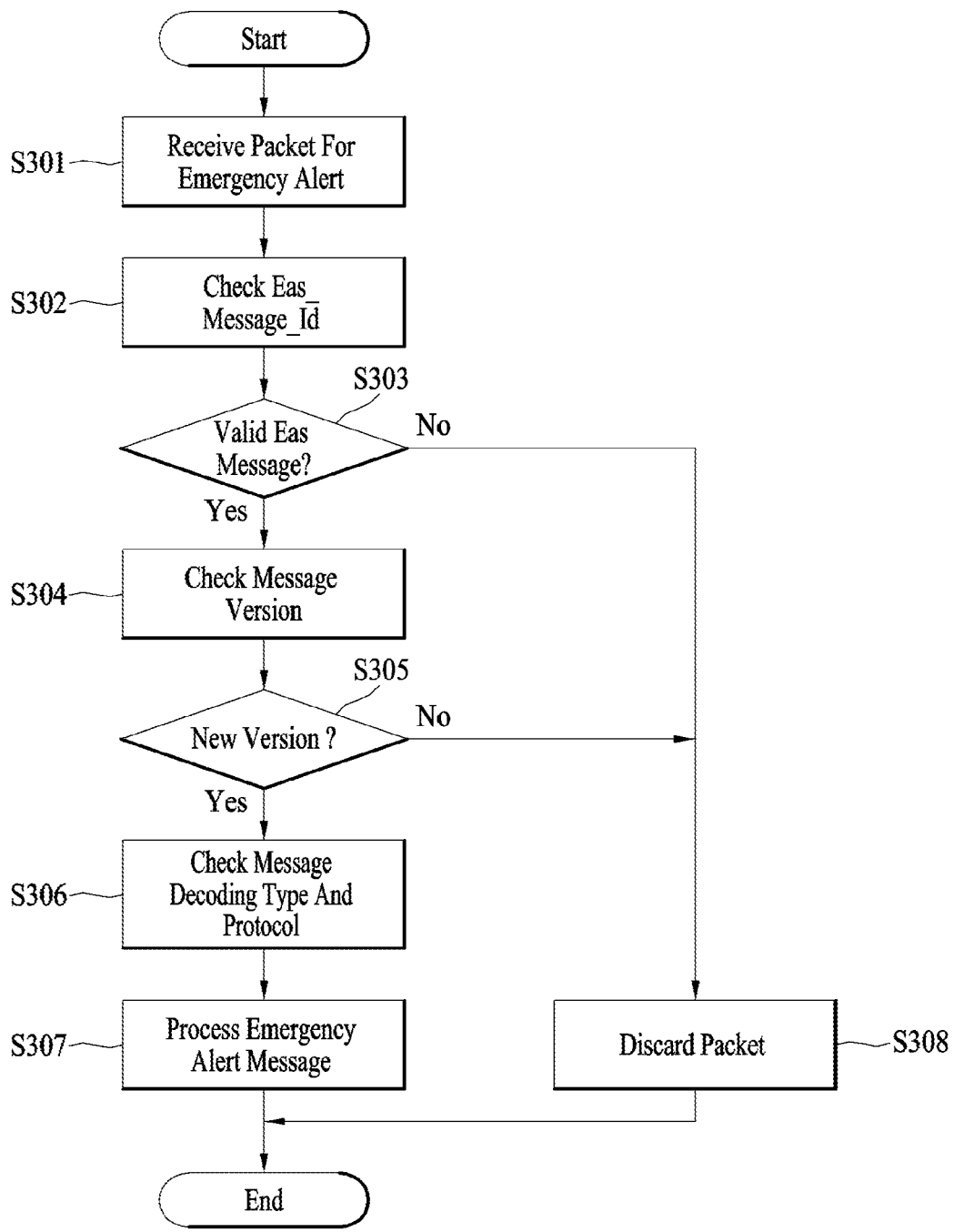
FIG. 68 is a flowchart illustrating one embodiment of a method of receiving and processing an emergency alert packet in a broadcast receiver according to the present invention.

FIG. 68 is a flowchart illustrating one embodiment of a method for receiving and processing an emergency alert message in a broadcast receiver according to the present invention. Particularly, FIG. 68 illustrates one embodiment of a processing method when an emergency alert message is received by being included in a payload of a link layer packet in the same manner as FIG. 67.

That is, if a packet for emergency alert is received (S301), an identifier of the emergency alert message is identified (S302). The packet received in the above step is the link layer packet decapsulated from the physical layer packet, and it is identified whether the packet is a packet for emergency alert, especially a packet for transmitting an emergency alert message, by using information signaled to the header of the link layer packet as one embodiment. The identifier of the emergency alert message is identified using the EAS_message_id field included in the payload of the corresponding packet as one embodiment.

If the identifier of the emergency alert message is identified in the step S302, it is identified whether the emergency alert message (that is, EAS message) included in the payload of the corresponding packet is effective (S303). If it is identified that the emergency alert message is effective, version information of the emergency alert message is identified (S304). That is, if it is identified that the emergency alert message is effective, the version information is identified using the EAS_message_version field included in the payload of the corresponding packet. It is identified whether the corresponding emergency alert message is the updated message or the message which has been conventionally received, based on the identified version information (S305). If the corresponding emergency alert message is a message of a new version, a decoding type and a protocol of the corresponding emergency alert message are identified using the EAS_message_encoding_type field and the EAS_message_protocol field of the payload of the corresponding packet (S306). The corresponding emergency alert message is processed in accordance with the identified decoding type and protocol (S307). However, if it is identified that the emergency alert message is not effective in the step S303, or if it is identified that the corresponding emergency alert message is not new version in the step S305, the packet received in the step S301 is disregarded (S308). That is, if the received emergency alert message is not effective or if the corresponding emergency alert message is not new version newer than the emergency alert message which has been conventionally received, the corresponding packet is disregarded and may return to a standby state for receiving another packet.

FIG. 69 is a syntax illustrating examples of fields included in a payload of a corresponding link layer packet when a packet_type field value of the link layer packet header according to the present invention indicates '110', a signaling_class field value indicates '001' and an information_type field value indicates '001'. That is, FIG. 49 is an example of a syntax when a payload of a corresponding link layer packet includes link or connection information of an emergency alert message among signaling information for emergency alert.

FIG. 69 illustrates an example of transmitting link or connection information of the emergency alert message to the payload of the link layer packet when the emergency alert message is transmitted through a separate path due to a lack of bandwidth.

Each field of the payload of the link layer packet for transmitting link or connection information of the emergency alert message in FIG. 69 will be described as follows.

Since an EAS_message_id field (32 bits), an EAS_message_encoding_type field (4 bits), an EAS_message_version field (4 bits), and an EAS_message_protocol field (4 bits) mean the EAS_message_id field, the EAS_message_encoding_type field, the EAS_message_version field and the EAS_message_protocol field of FIG. 67, their detailed description will be understood with reference to FIG. 67 and thus will be omitted here.

Meanwhile, in FIG. 69, a message_link_type field (4 bits) indicates a type of link information for acquiring the emergency alert message when the emergency alert message is transmitted through another path other than the payload of the corresponding packet.

For example, if a value of the message_link_type field is '0000', it indicates that IP datagram of the emergency alert message is transmitted through a data pipe (that is, PLP). That is, this case may be applied to a case where the emergency alert message is transmitted through a data pipe, which is located within a channel to which the corresponding packet is received, in the form of IP datagram. In this case, access information for accessing IP datagram of the emergency alert message is additionally signaled. The access information includes at least one of an IP address, a UDP port number, and identification information of the corresponding data pipe as one embodiment.

That is, if the value of the message_link_type field is '0000', the corresponding payload includes an IP address field, a UDP_port_num field, and a DP_id field.

The IP address field (32 or 128 bits) indicates an IP address of IPv4 or an IP address of IPv6 of the IP datagram of the emergency alert message, and the UDP_port_num field (16 bits) indicates a UDP port number of the IP datagram of the emergency alert message. The DP_id field (8 bits) indicates an identifier of a data pipe that transmits the IP datagram of the emergency alert message.

If the value of message_link_type field is '0001', it indicates that the emergency alert message is transmitted through another channel not the channel to which the corresponding packet is transmitted. In this case, access information for accessing the emergency alert message transmitted to another channel is additionally signaled. The access information includes at least one of channel information, data pipe identification information, and service information as one embodiment.

That is, if the value of the message_link_type field is '0001', the corresponding payload includes an EAS_channel_number field, an EAS_DP_id field, and an EAS_service_id field.

The EAS_channel_number field (8 bits) indicates channel information to which the emergency alert message is transmitted. In this case, the channel information may be a frequency number, or may be a major channel number and a minor channel number. That is, the EAS_channel_number field indicates a corresponding channel number when the emergency information message is received from another channel not the channel currently received by the broadcast receiver. If the channel number is related with the frequency number, the corresponding field may be replaced with the frequency number.

The EAS DP id field (8 bits) indicates an identifier of a data pipe that transmits the emergency alert message from a channel signaled to the EAS_channel_number field value. The EAS_DP_id field is optionally used. For example, if there is a separate path in the corresponding channel instead of the data pipe to which the emergency alert message is transmitted, the corresponding field may not be provided additionally.

The EAS_service_id field (16 bits) indicates an identifier of a service that includes the emergency alert message. That is, when several services are transmitted to one channel, the EAS_service_id field indicates an identifier of a service for acquiring the emergency alert message. If it is required to acquire a separate service in receiving the emergency alert message, the field may not be provided additionally.

If the value of the message_link_type field is '0010', it indicates that the emergency alert message is transmitted through a broadband when the broadcast receiver is connected to the broadband. If the value of the message_link_type field is '0010', a broadband_link_info( ) field of a variable length is provided additionally. The broadband_link_info( ) field indicates link information for the emergency alert message transmitted through the broadband.

If the value of the message_link_type field is '0011', it indicates that the emergency alert message is transmitted through another network (for example, mobile network) not a broadcast network and a broadband network. If the value of the message_link_type field '0011', an external_network_information ( ) field of a variable length is provided additionally. The external_network_information ( ) field indicates link information for the emergency alert message transmitted through another network such as a mobile network and information for the corresponding network. The other values of the message_link_type field are reserved for future use. Therefore, the remaining values may be used later depending on new link. Also, if the emergency alert message is transmitted through a network not the broadcast network, the remaining values may be used to transmit additional emergency alert message.

Figure 70:
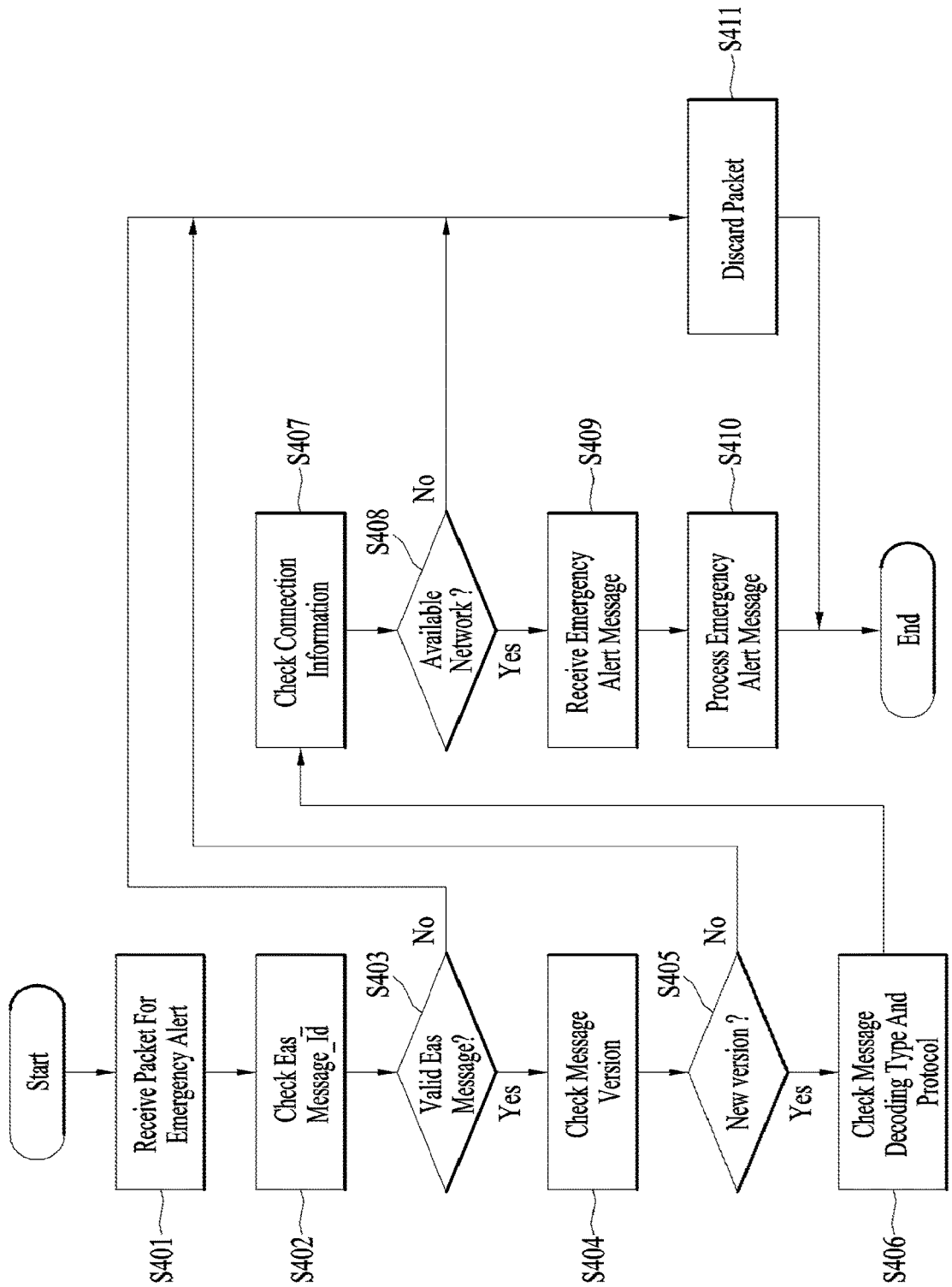
FIG. 70 is a flowchart illustrating an embodiment of a method for receiving and processing a link layer packet in a broadcast receiver according to the present invention.

FIG. 70 is a flowchart illustrating another embodiment of a method for receiving and processing an emergency alert message in a broadcast receiver according to the present invention. Particularly, FIG. 70 illustrates an embodiment of a processing method when link information of an emergency alert message is received by being included in a payload of a link layer packet in the same manner as FIG. 69.

That is, if a packet for emergency alert is received (S401), an identifier of the emergency alert message is identified (S402). The packet received in the above step is the link layer packet decapsulated from the physical layer packet, and it is identified whether the packet is a packet for emergency alert, especially a packet for transmitting link information of the emergency alert message, by using information signaled to the header of the link layer packet as one embodiment. The identifier of the emergency alert message is identified using the EAS_message_id field included in the payload of the corresponding packet as one embodiment.

If the identifier of the emergency alert message is identified in the step S402, it is identified whether the emergency alert message (that is, EAS message) is effective (S403). If it is identified that the emergency alert message is effective, version information of the emergency alert message is identified using the EAS_message_version field included in the payload of the corresponding packet (S404). It is identified whether the corresponding emergency alert message is the updated message or the message which has been conventionally received, based on the identified version information (S405). If the corresponding emergency alert message is a message of a new version, a decoding type and a protocol of the corresponding emergency alert message are identified using the EAS_message_encoding_type field and the EAS_message_protocol field which are included in the payload of the corresponding packet (S406).

Connection or link information to which the corresponding emergency alert message is transmitted is identified using the message_link_type field included in the payload of the corresponding packet (S407). It is identified whether a network that transmits the emergency alert message is an available network based on the connection or link information identified in the step S407 (S408). If it is identified that the corresponding network is the available network in the step S408, the emergency alert message is received using access information included in the payload of the corresponding packet (S409). That is, if the corresponding connection or link information is an effective network or a link that may be linked by the broadcast receiver, the emergency alert message is received using access information of the corresponding link.

For example, if a value of the message_link_type field is '0000', that is, if the emergency alert message is received through a data pipe, which is located within a channel to which the corresponding packet is received, in the form of IP datagram, the access information may be at least one of an IP address, a UDP port number, and identification information of the data pipe.

If the value of the message_link_type field is '0001', that is, if the emergency alert message is received through another channel not the channel to which the corresponding packet is received, the access information may be at least one of channel information, data pipe identification information, and service identification information.

If the value of the message_link_type field is '0010', that is, if the emergency alert message is received through a broadband, the access information may be acquired from a broadband_link_info( ) field included in the payload of the corresponding packet.

If the value of the message_link_type field is '0011', that is, if the emergency alert message is received through another network (for example, mobile network) not a broadcast network and a broadband network, the access information may be acquired from an external_network_information ( ) field included in the packet of the corresponding packet.

If the emergency alert message is received in the step S409, the received emergency alert message is processed in accordance with the decoding type and protocol identified in the step S406 (S410). However, if it is identified that the emergency alert message is not effective in the step S403, if it is identified that the corresponding emergency alert message is not new version in the step S405, or if it is identified that the corresponding network is not available network in the step S408, the packet received in the step S401 is disregarded (S411). That is, if the link for transmitting the emergency alert message is not effective, if it is not possible to access the corresponding link, or if the corresponding emergency alert message is not new version newer than the emergency alert message which has been conventionally received, the corresponding packet is disregarded and may return to a standby state for receiving another packet.

FIG. 71 is a syntax illustrating examples of fields included in a payload of a corresponding link layer packet when a packet_type field value of the link layer packet header according to the present invention indicates '110', a signaling_class field value indicates '001' and an information_type field value indicates '010'. That is, FIG. 71 is an example of a syntax when a payload of a corresponding link layer packet includes information for automatic tuning to a channel for transmitting contents related to an emergency alert message among signaling information for emergency alert.

In other words, FIG. 71 illustrates an example of transmitting automatic tuning information for automatic tuning from a current channel to a channel, to which emergency alert related contents are transmitted, to a payload of a link layer packet in a broadcast receiver when audio/video contents related to emergency alert are transmitted simultaneously with the emergency alert message.

Each field of the payload of the link layer packet for transmitting automatic tuning information related to emergency alert in FIG. 71 will be described as follows.

A num_associated_EAS_messages field (8 bits) indicates the number of emergency alert messages related to channel tuning information. A 'for' loop (or message identification loop) is performed as much as a value of the num_associated_EAS_messages field, whereby identification information of the related emergency alert message is provided. To this end, an associated_EAS_message_id field (32 bits) is included in the 'for' loop. That is, the associated_EAS_message_id field indicates an identifier of each emergency alert message related to automatic tuning information transmitted to a current packet. The associated_EAS_message_id field may be used to identify whether the broadcast receiver has received the emergency alert message for channel tuning earlier than the tuning information.

An automatic_tuning_channel_number field (8 bits) indicates channel information which should be tuned to receive audio/video contents related to emergency alert. In this case, the channel information may be a frequency number, or may be a major channel number and a minor channel number. That is, the automatic_tuning_channel_number field may indicate a channel number for transmitting audio/video contents related to emergency alert. If the channel number is related with the frequency number, the corresponding field may be replaced with the frequency number or may be used together with the frequency number.

An automatic_tuning_DP_id field (8 bits) indicates an identifier of a data pipe (that is, physical layer pipe) that transmits audio/video contents related to emergency alert from a channel signaled to the automatic_tuning_channel_number field.

An automatic_tuning_service_id field (16 bits) indicates an identifier of a service for acquiring audio/video contents related to emergency alert.

Figures 72, 73:
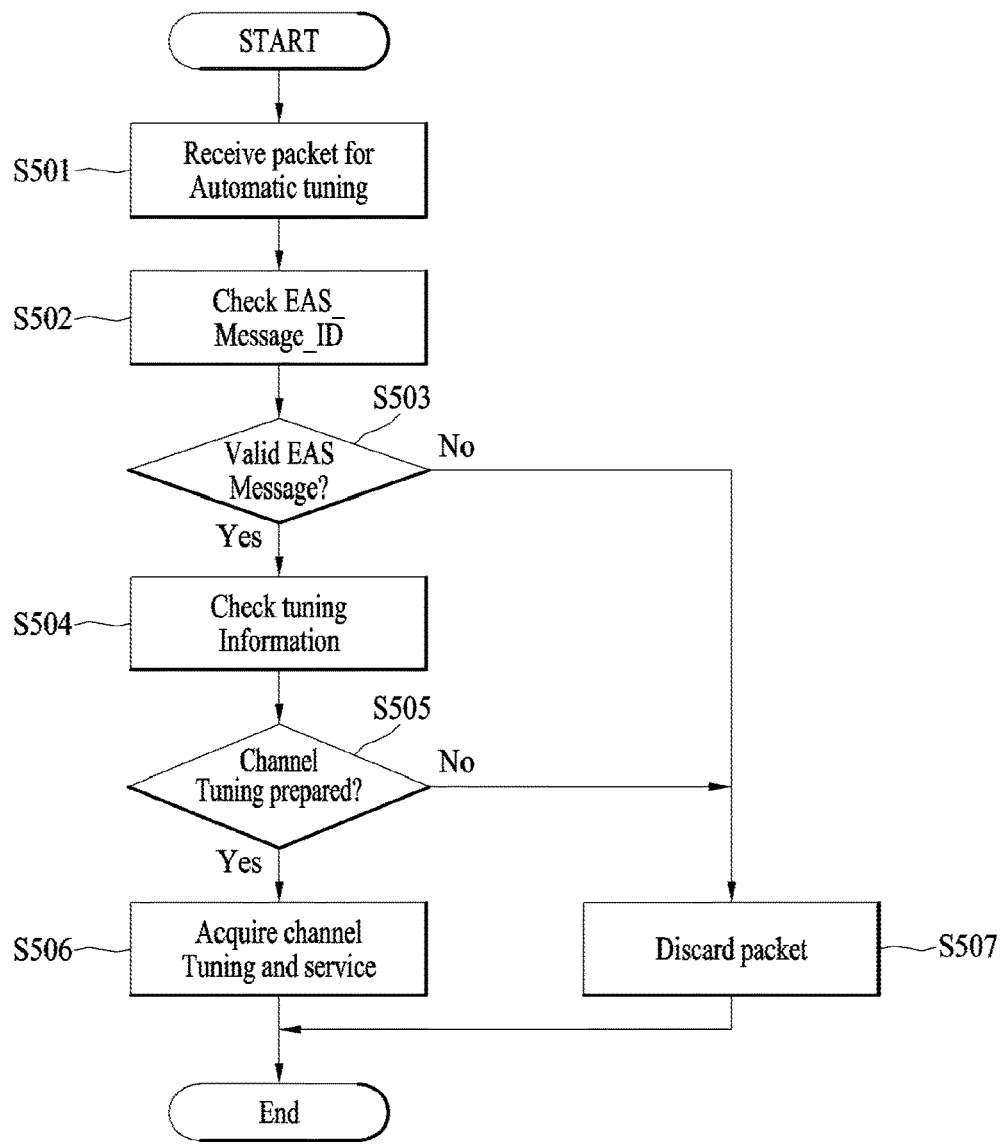
FIG. 72 is a flowchart illustrating an embodiment of a method for receiving and processing a link layer packet in the broadcast receiver according to the present invention.
FIG. 73 illustrates an example of syntax of a payload a packet for an emergency alert when a link layer packet is the packet and NRT service information related to the emergency alert is transmitted using the payload of the packet.

FIG. 72 is a flowchart illustrating still another embodiment of a method for receiving and processing an emergency alert message in a broadcast receiver according to the present invention. Particularly, FIG. 72 illustrates an embodiment of a processing method when automatic tuning information related to emergency alert is received by being included in a payload of a link layer packet in the same manner as FIG. 51.

That is, if a packet for emergency alert is received (S501), an identifier of the emergency alert message is identified (S502). The packet received in the above step is the link layer packet decapsulated from the physical layer packet, and it is identified whether the packet is a packet for emergency alert, especially a packet for transmitting information for automatic tuning, by using information signaled to the header of the link layer packet as one embodiment. The identifier of the emergency alert message is identified using the associated_EAS_message_id field included in the payload of the corresponding packet as one embodiment.

If the identifier of the emergency alert message is identified in the step S502, it is identified whether the emergency alert message (that is, EAS message) is effective (S503). As one embodiment of the present invention, when the packet is received, it is identified whether the related emergency alert message is received earlier than the packet, using the associated_EAS_message_id field, and if not so, it may be identified that the corresponding emergency alert message is not effective. In this case, the corresponding packet is disregarded without being processed as one embodiment.

If it is identified that the emergency alert message is effective, tuning information is acquired from the payload of the corresponding packet (S504). The tuning information may be acquired from at least one of the automatic_tuning_channel_number field, the automatic_tuning_DP_id field, and the automatic_tuning_service_id field.

Then, it is identified whether channel tuning is ready (S505), and if it is identified that channel tuning is ready, a current channel is automatically tuned to a channel for transmitting emergency alert related audio/video contents based on the channel information, whereby emergency alert service is acquired (S506). If the current channel is the channel for transmitting emergency alert related audio/video contents indicated by the channel information, the current channel is maintained without channel tuning. However, if it is identified that the emergency alert message is not effective in the step S503, or if it is identified that channel tuning is not ready in the step S505, the packet received in the step S501 is disregarded and returns to a standby state for receiving another packet (S507).

Meanwhile, as one embodiment of the present invention, if the received packet is a packet for emergency alert, especially a packet for transmitting information for automatic tuning, it may indicate that an automatic tuning flag is enabled. Also, if the corresponding packet is received, it is identified whether the related emergency alert message is received earlier than the packet, and if the related emergency alert message is not received earlier than the packet, the corresponding packet is disregarded. To this end, a list of emergency alert messages related to channel information to be currently tuned may be transmitted to the payload of the corresponding packet by using the associated_EAS_message_id field.

FIG. 73 is a syntax illustrating examples of fields included in a payload of a corresponding link layer packet when a packet_type field value of the link layer packet header according to the present invention indicates '110', a signaling_class field value indicates '001' and an information_type field value indicates '011'. That is, FIG. 73 is an example of a syntax when a payload of a corresponding link layer packet includes NRT service information related to emergency alert among signaling information for emergency alert.

Each field of the payload of the link layer packet for transmitting NRT service information related to emergency alert in FIG. 73 will be described as follows.

A num_associated_EAS_messages field (8 bits) indicates the number of emergency alert messages related to channel tuning information. A 'for' loop (or message identification loop) is performed as much as a value of the num_associated_EAS_messages field, whereby identification information of the related emergency alert message is provided. To this end, an associated_EAS_message_id field (32 bits) is included in the 'for' loop. That is, the associated_EAS_message_id field indicates an identifier of each emergency alert message related to automatic tuning information which is transmitted. The associated_EAS_message_id field may be used to identify whether the broadcast receiver has received the emergency alert message for channel tuning earlier than the channel tuning information.

An EAS_NRT_service_id field (16 bits) indicates an identifier of NRT service corresponding to a case where NRT contents and data related to the received emergency alert message are transmitted, that is, a case where EAS_NRT_flag is enabled.

Figure 74:
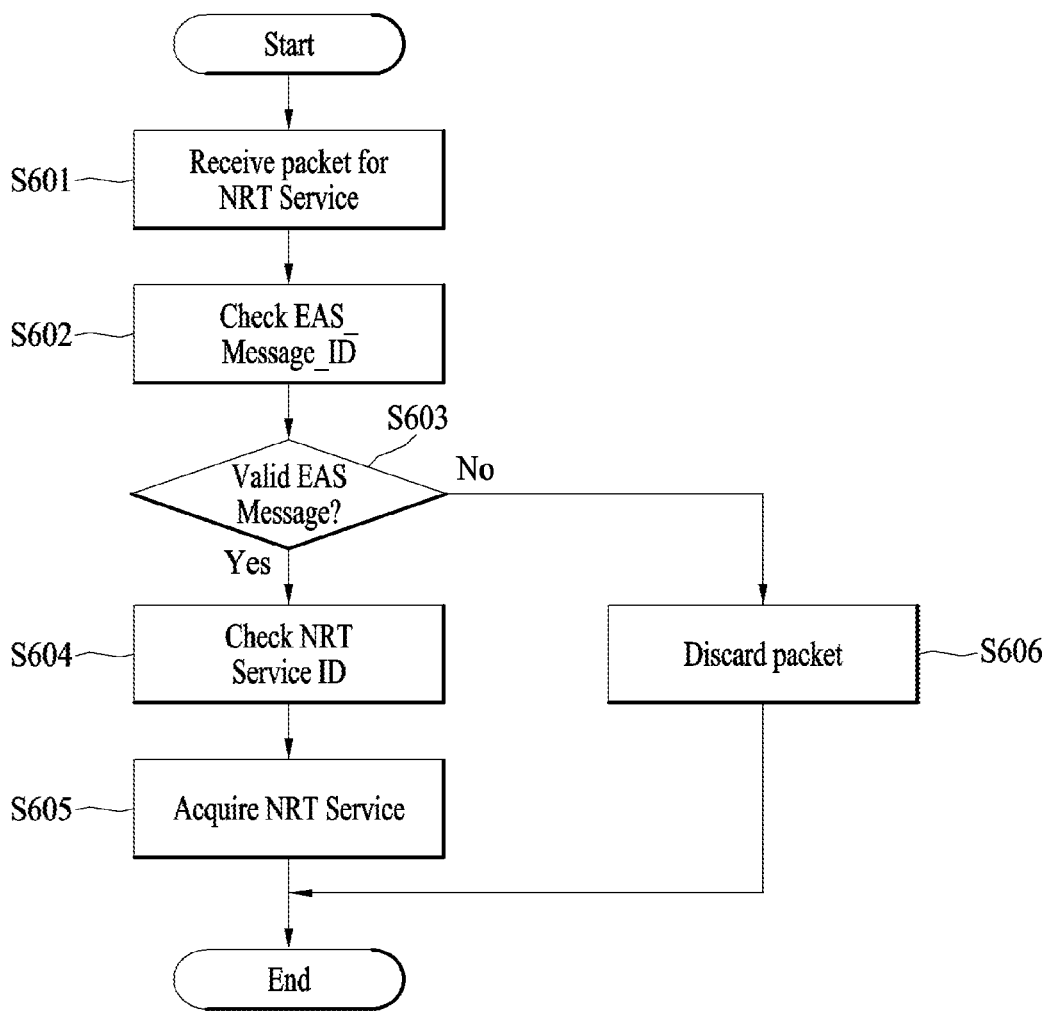
FIG. 74 is a flowchart illustrating an embodiment of a method for receiving and processing a link layer packet in the broadcast receiver according to the present invention.

FIG. 74 is a flowchart illustrating further still another embodiment of a method for receiving and processing an emergency alert message in a broadcast receiver according to the present invention. Particularly, FIG. 74 illustrates an embodiment of a processing method when NRT service information related to emergency alert is received by being included in a payload of a link layer packet in the same manner as FIG. 73.

That is, if a corresponding packet is received, the broadcast receiver may identify an identifier of NRT service and enter a procedure of acquiring NRT service.

That is, if a packet for emergency alert is received (S601), an identifier of the emergency alert message is identified (S602). The packet received in the above step is the link layer packet decapsulated from the physical layer packet, and it is identified whether the packet is a packet for emergency alert, especially a packet for transmitting NRT service information related to emergency alert, by using information signaled to the header of the link layer packet as one embodiment. The identifier of the emergency alert message is identified using the associated_EAS_message_id field included in the payload of the corresponding packet as one embodiment.

If the identifier of the emergency alert message is identified in the step S602, it is identified whether the emergency alert message (that is, EAS message) is effective (S603). As one embodiment of the present invention, when the packet is received, it is identified whether the related emergency alert message is received earlier than the packet, using the associated_EAS_message_id field, and if not so, it may be identified that the corresponding emergency alert message is not effective. In this case, the corresponding packet is disregarded without being processed as one embodiment (S606).

If it is identified that the emergency alert message is effective, an identifier of the NRT service is identified from the payload of the corresponding packet (S604). The identifier of the NRT service may be identified using the EAS_NRT_service_id field included in the payload of the packet.

If the identifier of the NRT service is identified in the step S604, the corresponding NRT service is acquired based on the identified identifier (S605).

Meanwhile, as one embodiment of the present invention, if the received packet is a packet for emergency alert, especially a packet for transmitting NRT service information related to emergency alert, it is identified whether the related emergency alert message is received earlier than the NRT service information, and if the related emergency alert message is not received earlier than the NRT service, the corresponding packet is disregarded. To this end, a list of emergency alert messages related to channel information to be currently tuned may be transmitted to the payload of the corresponding packet by using the associated_EAS_message_id field.

Meanwhile, the method for processing emergency alert information, as described with reference to FIGS. 62 to 74, may be performed by any one of the emergency alert systems of FIGS. 53 to 56 and FIG. 58.

Figure 75:
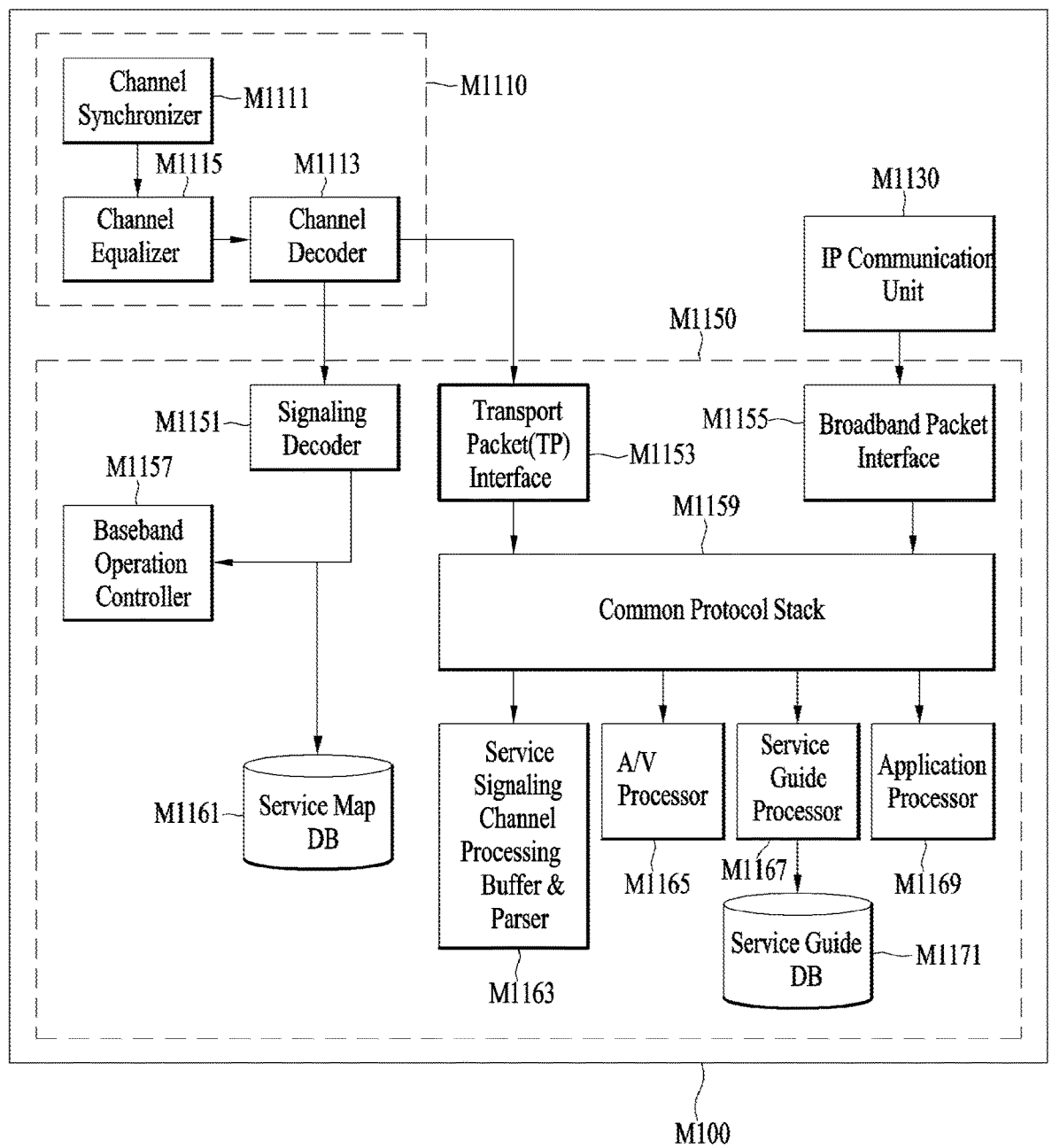
FIG. 75 is a block diagram illustrating an embodiment of the broadcast receiver for supporting an emergency alert service according to the present invention.
Figure 76:
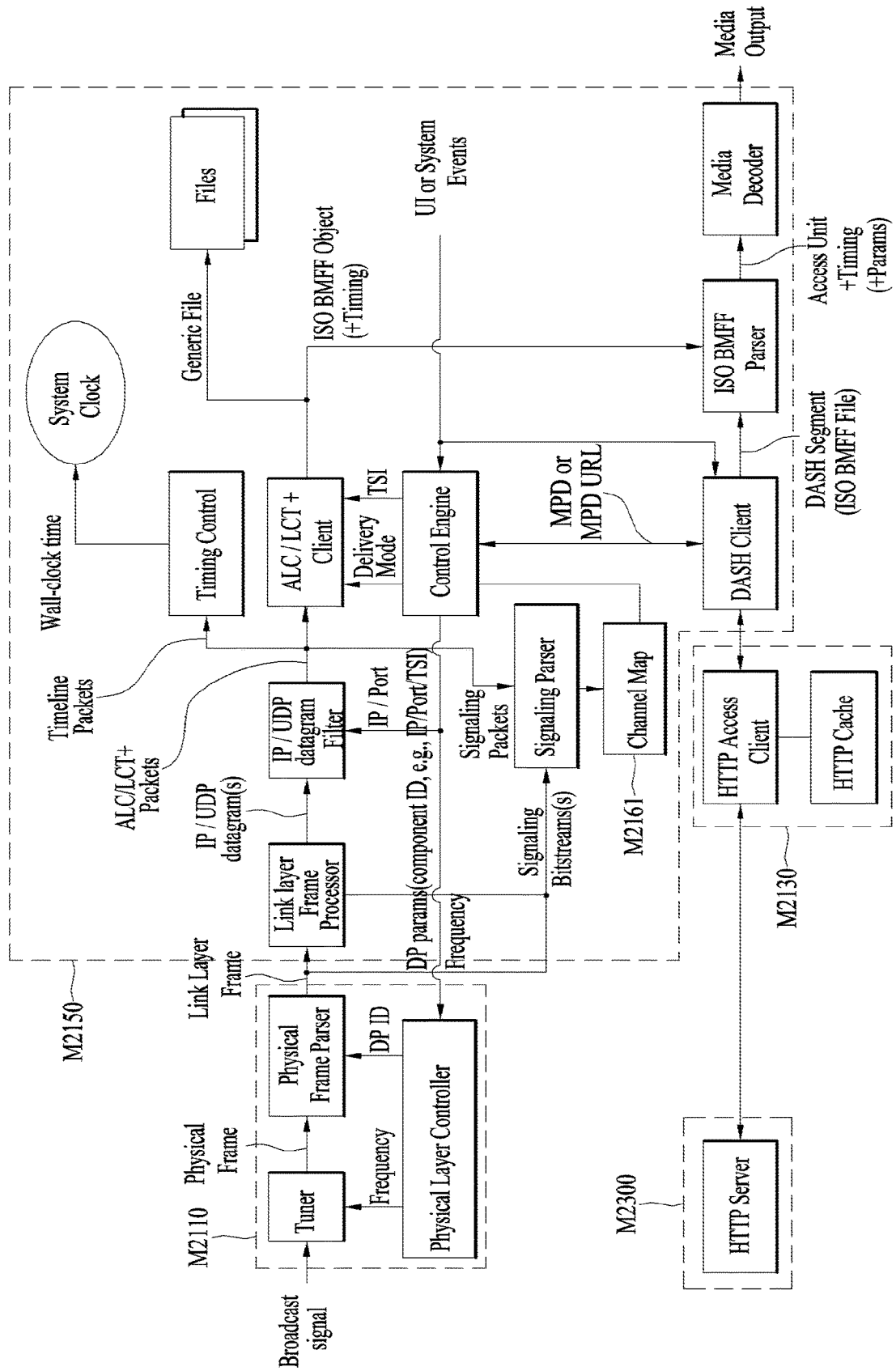
FIG. 76 is a block diagram illustrating another embodiment of the broadcast receiver for supporting the emergency alert service according to the present invention.
Figure 77:
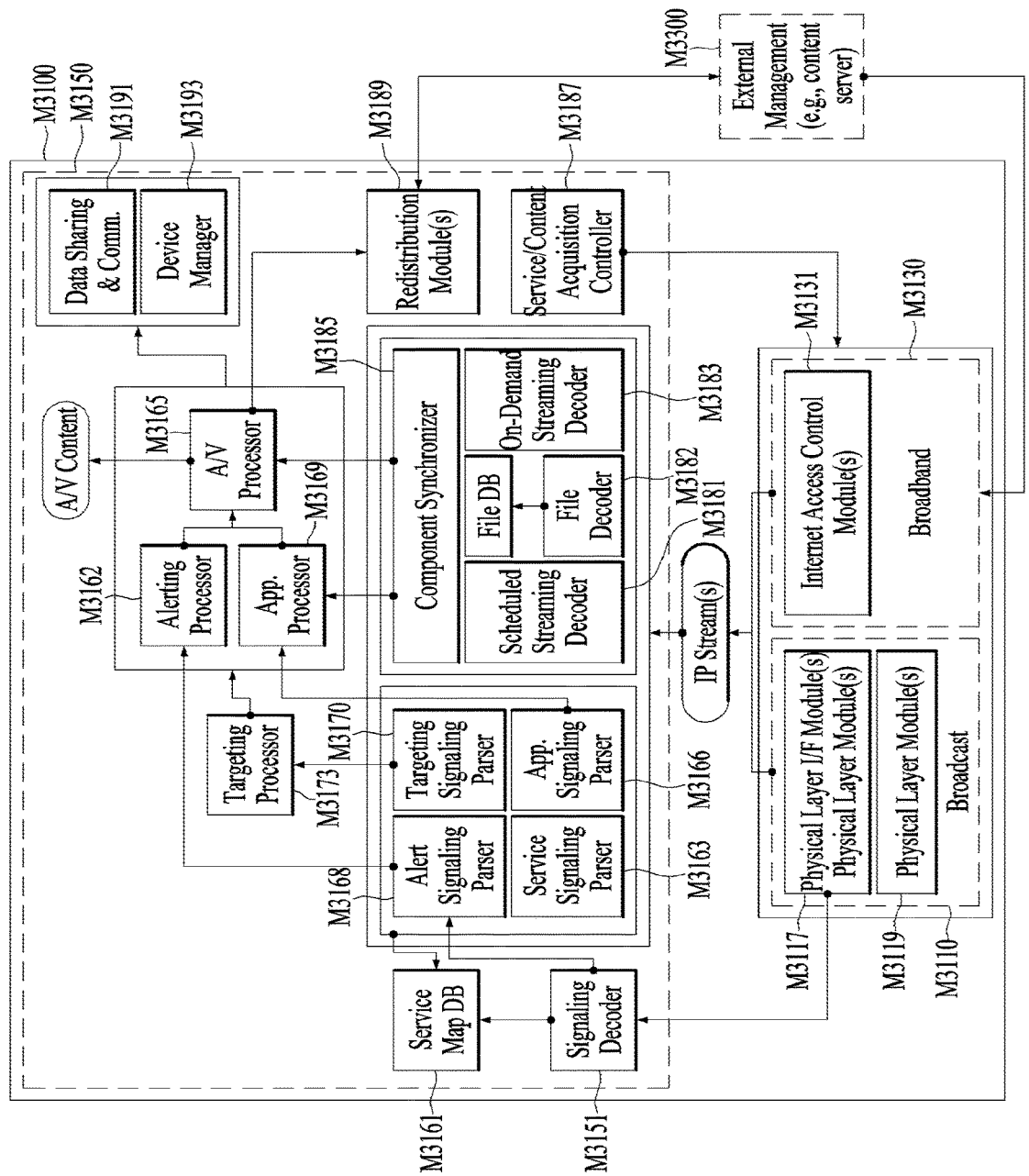
FIG. 77 is a block diagram illustrating another embodiment of the broadcast receiver for supporting the emergency alert service according to the present invention.

FIGS. 75 to 77 illustrate various embodiments of a receiving apparatus of a next generation broadcasting system for processing emergency alert information in accordance with the present invention.

FIG. 75 is a schematic block diagram illustrating a receiving apparatus of a next generation broadcasting system according to one embodiment of the present invention.

A receiving apparatus M100 according to one embodiment of the present invention includes a receiving module M1110, a controller M1150, and an Internet protocol (IP) communication module M1130. The receiving module M1110 includes a channel synchronizer M1111, a channel equalizer M1115, and a channel decoder M1113. The controller M1150 may include a signaling decoder M1151, a baseband operation controller M1157, a service map DB M1161, a transport packet interface M1153, a broadband packet interface M1155, a common protocol stack M1159, a service signaling channel processing buffer & parser M1163, an A/V processor M1165, a service guide processor M1167, an application processor M1169, and/or a service guide DB M1171.

In FIG. 75, the channel synchronizer M1111 of the receiving module M1110 synchronizes symbol frequency with timing to decode a signal received from a baseband. In this case, the baseband indicates an area where a broadcast signal is transmitted and received.

The channel equalizer M1115 performs channel equalization on the received signal. The channel equalizer M1115 serves to compensate for the received signal when the received signal is distorted due to multipath, Doppler effect, etc.

The channel decoder M1113 recovers the received signal to a transport frame which is meaningful. The channel decoder M1113 performs forward error correction (FEC) for data included in the received signal or the transport frame.

The signaling decoder M1151 extracts and decodes signaling data included in the received signal. In this case, the signaling data include signaling data, which will be described later, and/or service information (SI). Also, the signaling data may include an emergency alert message or emergency alert related signaling information.

The baseband operation controller M1157 controls signal processing at the baseband.

The service map DB M1161 stores signaling data and/or service information therein. The service map DB M1161 may store signaling data transmitted by being included in a broadcast signal and/or signaling data transmitted by being included in a broadband packet.

The transport packet interface M1153 extracts a transport packet from the transport frame or the broadcast signal. In this case, the transport packet is a link layer packet acquired by decapsulation of a baseband packet included in the transport frame as one embodiment.

The transport packet interface M1153 extracts signaling data or IP datagram from the transport packet. The broadband packet interface M1155 receives a broadcasting related packet through the broadband. The broadband packet interface M1155 extracts the packet acquired through the broadband, and combines or extracts signaling data or A/V data from the corresponding packet.

The common protocol stack M1159 processes the received packet in accordance with a protocol included in a protocol stack. For example, the common protocol stack M1159 may process the received packet in each protocol in accordance with the aforementioned method.

The service signaling channel processing buffer & parser M1163 extracts signaling data included in the received packet. The service signaling channel processing buffer & parser M1163 extracts signaling information related to scan and/or acquisition of services and/or contents from the IP datagram, and parses the extracted signaling information. The signaling data may exist at a given location or channel within the received packet. This location or channel may be referred to as a service signaling channel. For example, the service signaling channel may have a specific IP address, a UDP port number, a transport session identifier, etc. The receiver may recognize data transmitted to the specific IP address, the UDP port number and the transport session as signaling data.

The A/V processor M1165 performs decoding and presentation processing for received audio and video data.

The service guide processor M1167 extracts announcement information from the received signal, manages a service guide DB M1171, and provides a service guide.

The application processor M1169 extracts application data and/or application related information included in the received packet and processes the extracted application data and application related information.

The service guide DB M1171 stores service guide data therein.

Also, the controller M1150 processes emergency alert related information according to the present invention, which is received from the link layer packet, as one embodiment. To this end, the controller M1150 may further include an emergency alert processor (not shown), and the transport packet interface M1153 may process the emergency alert related information according to the present invention. In FIG. 75, the transport packet interface M1153 processes the emergency alert related information as one embodiment. That is, the transport packet interface M1153 extracts the transport packet from the transport frame (or physical layer frame) or the broadcast signal. At this time, the transport packet may be a physical layer packet or a link layer packet. If the transport packet is a physical layer packet, the link layer packet is acquired by decapsulation of the physical layer packet as one embodiment. The link layer packet depends on the structures of FIGS. 62 to 64 as one embodiment. This is one embodiment for assisting understanding of the present invention, and since the link layer packet structure according to the present invention may be modified by a designer, the present invention is not limited to the aforementioned embodiment.

The transport packet interface M1153 may identify that data received in the link layer packet using each field included in the header of the link layer packet as shown in FIGS. 62 to 66 is signaling information and especially is a packet that includes signaling information for emergency alert. In addition, the transport packet interface M1153 may identify whether the payload of the link layer packet includes an emergency alert message of signaling information for emergency alert, link information of an emergency alert message, emergency alert related automatic tuning information, emergency alert related NRT service information, or wake-up indication information. The method and steps for this identification have been described in detail as above and thus their description will be omitted herein.

If it is identified that the payload of the corresponding link layer packet includes the emergency alert message of signaling information for emergency alert, the transport packet interface M1153 processes the emergency alert message included in the corresponding payload with reference to each field included in the payload of the corresponding packet as described with reference to FIGS. 67 and 68.

If it is identified that the payload of the corresponding link layer packet includes link information of the emergency alert message of signaling information for emergency alert, the transport packet interface M1153 acquires link information and/or access information for acquiring the emergency alert message with reference to each field included in the payload of the corresponding packet as described with reference to FIGS. 69 and 70, and receives and processes the emergency alert message by using the acquired link information and/or access information.

For example, if it is identified that the emergency alert message is received in the form of IP datagram through a data pipe within a channel to which the corresponding packet is received, the link and access information may be at least one of an IP address, a UDP port number and identification information of the data pipe. For another example, if it is identified that the emergency alert message is received through another channel not the channel to which the corresponding packet is received, the link and access information may be at least one of channel information, identification information of the data pipe, and service identification information.

If it is identified that the payload of the corresponding link layer packet includes emergency alert related automatic tuning information of signaling information for emergency alert, the transport packet interface M1153 acquires tuning information, which will be tuned automatically, with reference to each field included in the payload of the corresponding packet as described with reference to FIGS. 71 and 72, and controls channel tuning by using the acquired tuning information.

If it is identified that the payload of the corresponding link layer packet includes emergency alert related NRT service information of signaling information for emergency alert, the transport packet interface M1153 acquires emergency alert related NRT service information with reference to each field included in the payload of the corresponding packet as described with reference to FIGS. 73 and 74, and acquires NRT service based on the acquired information.

FIG. 76 is a schematic block diagram illustrating a broadcast receiver of a next generation broadcasting system according to another embodiment of the present invention.

In the embodiment of FIG. 76, the broadcast receiver includes a broadcasting receiving module M2110, an Internet protocol (IP) communication module M2130, and a controller M2150.

The broadcasting receiving module M2110 may include a tuner, a physical frame parser, and a physical layer controller.

The tuner extracts a physical frame by receiving a broadcast signal through a broadcast channel. The physical frame is a transport unit on a physical layer. The physical frame parser acquires a link layer packet by parsing the received physical frame. For example, the physical frame parser acquires the link layer packet by decapsulation of a baseband packet included in the physical frame as one embodiment. The link layer packet may be referred to as a link layer frame, and a link layer packet parser may be referred to as a link layer frame parser. The physical layer controller controls operations of the tuner and the physical frame parser. In one embodiment, the physical layer controller may control the tuner by using RF information of the broadcast channel. In more detail, if the physical layer controller transmits frequency information to the tuner, the tuner may acquire the physical frame corresponding to the received frequency information from the broadcast signal.

In another embodiment, the physical layer controller may control the operation of the physical layer parser through an identifier of a physical layer pipe. In more detail, the physical layer controller transmits identifier information for identifying a specific one of a plurality of physical layer pipes to the physical frame parser. The physical frame parser may identify the physical layer pipe based on the received identifier information and acquire the link layer packet from the identified physical layer pipe.

The controller M2150 includes a link layer packet parser, an IP/UDP datagram filter, a control engine, an ALC/LCT+ client, a timing controller, a DASH client, an ISO BMFF parser, and a media decoder.

The link layer packet parser extracts data from the link layer packet. In more detail, the link layer packet parser may acquire link layer signaling from the link layer packet. Also, the link layer packet parser may acquire IP/UDP datagram from the link layer packet.

The IP/UDP datagram filter filters a specific one from the IP/UDP datagram received from the link layer packet parser.

The ALC/LCT+ client processes an application layer transport packet. The application layer transport packet may include an ALC/LCT+ packet. In more detail, the ALC/LCT+ client may generate one or more ISO BMFF media file format objects by collecting a plurality of application layer transport packets.

The timing controller processes a packet that includes system time information, and controls a system clock in accordance with the processed result.

The DASH client processes real time streaming or adaptive media streaming. In more detail, the DASH client may acquire a DASH segment by processing adaptive media streaming based on HTTP. At this time, the DASH segment may be a format of ISO BMFF object.

The ISO BMFF parser extracts audio/video data from the ISO BMFF object received from the DASH client. At this time, the ISO BMFF parser may extract the audio/video data in a unit of an access unit. Also, the ISO BMFF parser may acquire timing information for audio/video from the ISO BMFF object.

The media decoder decodes the received audio and video data. Also, the media decoder performs presentation for the decoded result through a media output terminal.

The control engine serves as an interface between the respective modules. In more detail, the control engine may control the operation of each module by transmitting a parameter required for the operation of each module.

The Internet protocol communication module M2130 may include an HTTP access client. The HTTP access client may transmit and receive a request to and from an HTTP server, or may transmit and receive a response to the request to and from the HTTP server.

As one embodiment of the present invention, the emergency alert related information according to the present invention, which is received from the link layer packet parser to the link layer packet, is processed. As another embodiment, the present invention may further include an emergency alert processor (not shown). The link layer packet acquired by the physical layer packet parser depends on the structures of FIGS. 62 to 64 as one embodiment. This is one embodiment for assisting understanding of the present invention, and since the link layer packet structure according to the present invention may be modified by a designer, the present invention is not limited to the aforementioned embodiment.

The link layer packet parser may identify that data received in the link layer packet using each field included in the header of the link layer packet as shown in FIGS. 62 to 66 is signaling information and especially is a packet that includes signaling information for emergency alert. In addition, the link layer packet parser may identify whether the payload of the link layer packet includes an emergency alert message of signaling information for emergency alert, link information of an emergency alert message, emergency alert related automatic tuning information, emergency alert related NRT service information, or wake-up indication information. The method and steps for this identification have been described in detail as above and thus their description will be omitted herein.

If it is identified that the payload of the corresponding link layer packet includes the emergency alert message of signaling information for emergency alert, the link layer packet parser processes the emergency alert message included in the corresponding payload with reference to each field included in the payload of the corresponding packet as described with reference to FIGS. 67 and 68.

If it is identified that the payload of the corresponding link layer packet includes link information of the emergency alert message of signaling information for emergency alert, the link layer packet parser acquires link information and/or access information for acquiring the emergency alert message with reference to each field included in the payload of the corresponding packet as described with reference to FIGS. 69 and 70, and receives and processes the emergency alert message by using the acquired link information and/or access information.

If it is identified that the payload of the corresponding link layer packet includes emergency alert related automatic tuning information of signaling information for emergency alert, the link layer packet parser acquires tuning information, which will be tuned automatically, with reference to each field included in the payload of the corresponding packet as described with reference to FIGS. 71 and 72, and controls channel tuning by using the acquired tuning information.

If it is identified that the payload of the corresponding link layer packet includes emergency alert related NRT service information of signaling information for emergency alert, the link layer packet parser acquires emergency alert related NRT service information with reference to each field included in the payload of the corresponding packet as described with reference to FIGS. 73 and 74, and acquires NRT service based on the acquired information.

FIG. 77 is a schematic block diagram illustrating a broadcast receiver of a next generation broadcasting system according to still another embodiment of the present invention.

In the embodiment of FIG. 77, the broadcast receiver M3100 includes a broadcasting receiving module M3110, an Internet protocol (IP) communication module M3130, and a controller M3150.

The broadcasting receiving module M3110 may include one or a plurality of processors for performing each of a plurality of functions performed by the broadcasting receiving module M3110, one or a plurality of circuits, and one or a plurality of hardware modules. In more detail, the broadcasting receiving module M3110 may be a system on chip (SOC) in which a plurality of semiconductor parts are integrated into one. At this time, the SOC may be a semiconductor obtained by combining various multimedia parts, such as graphic, audio, video, and modem, with a processor and DRAM. The broadcasting receiving module M3110 may include a physical layer module M3119 and a physical layer IP frame module M3117. The physical layer module M3119 receives and processes a broadcasting related signal through a broadcast channel of a broadcast network. The physical layer IP frame module M3117 converts a data packet such as IP datagram acquired from the physical layer module M3119 to a specific frame. For example, the physical layer IP frame module M3117 may convert the IP datagram to a link layer frame, a link layer packet, or GSE.

The IP communication module M3130 may include one or a plurality of processors for performing each of a plurality of functions performed by the IP communication module M3130, one or a plurality of circuits, and one or a plurality of hardware modules. In more detail, the IP communication module M3130 may be a system on chip (SOC) in which a plurality of semiconductor parts are integrated into one. At this time, the SOC may be a semiconductor obtained by combining various multimedia parts, such as graphic, audio, video, and modem, with a processor and DRAM. The IP communication module M3130 may include an Internet access control module M3131. The Internet access control module M3131 controls the operation of the broadcast receiver M3100 for acquiring at least one of services, contents and signaling data through an Internet communication network (broadband).

The controller M3150 may include one or a plurality of processors for performing each of a plurality of functions performed by the controller M3150, one or a plurality of circuits, and one or a plurality of hardware modules. In more detail, the controller M3150 may be a system on chip (SOC) in which a plurality of semiconductor parts are integrated into one. At this time, the SOC may be a semiconductor obtained by combining various multimedia parts, such as graphic, audio, video, and modem, with a processor and DRAM.

The controller M3150 may include at least one of a signaling decoder M3151, a service map database M3161, a service signaling channel parser M3163, an application signaling parser M3166, an emergency alert signaling parser M3168, a targeting signaling parser M3170, a targeting processor M3173, an A/V processor M3161, an emergency alert processor M3162, an application processor M3169, a scheduled streaming decoder M3181, a file decoder M3182, a user request streaming decoder M3183, a file database, a component synchronizer M3185, a service/content acquisition controller M3187, a redistribution module M3189, a device manager M3193, and a data sharing module M3191.

The service/content acquisition controller M3187 controls the operation of the receiver for acquiring services, contents, and signaling data related to services or contents, which are acquired through a broadcast network or Internet communication network.

The signaling decoder M3151 decodes signaling information.

The service signaling parser M3163 parses service signaling information.

The application signaling parser M3166 extracts and parses signaling information related to services. At this time, the signaling information related to services may be signaling information related to service scan. Also, the signaling information related to services may be signaling information related to contents provided through services.

The emergency alert signaling parser M3168 extracts and parses emergency alert related signaling information.

The targeting signaling parser M3170 extracts and parses information for personalizing services or contents or information for signaling targeting information.

The targeting processor M3173 processes information for personalizing services or contents.

The emergency alert processor M3162 processes emergency alert related signaling information.

The application processor M3169 controls running of application and application related information. In more detail, the application processor M3169 processes a state of a downloaded application and a display parameter.

The A/V processor M3161 processes a rendering related operation of audio/video on the basis of decoded audio or video, application data, etc.

The scheduled streaming decoder M3181 previously decodes scheduled streaming which is a content streamed in accordance with a schedule determined by a content provider such as a broadcasting station.

The file decoder M3182 decodes downloaded files. Particularly, the file decoder M3182 decodes files downloaded through a broadband.

The user request streaming decoder M3183 decodes an on demand command provided by a user request.

The file database stores files therein. In more detail, the file database may store files downloaded through the broadband.

The component synchronizer M3185 synchronizes contents or services. In more detail, the component synchronizer M3185 performs synchronization for a play time of a content acquired through at least one of the scheduled streaming decoder M3181, the file decoder M3182 and the user request streaming decoder M3183.

The service/content acquisition controller M3187 controls the operation of the receiver for acquiring at least one of services, contents, and signaling information related to services or contents.

The redistribution module M3189 performs an operation for supporting acquisition of at least one of service, content, service related information and content related information if service or content is not received through a broadcast network. In more detail, the redistribution module M3189 may request an external management device M3300 of at least one of service, content, service related information and content related information. At this time, the external management device M3300 may be a content server.

The device manager M3193 manages an interworking external device. In more detail, the device manager M3193 may perform at least one of addition, deletion and update of the external device. Also, the external device may enable connection and data exchange with the broadcast receiver M3100.

The data sharing module M3191 performs a data transmission operation between the broadcast receiver M3100 and the external device, and processes exchange related information. In more detail, the data sharing module M3191 may transmit A/V data or signaling information to the external device. Also, the data sharing module M3191 may receive A/V data or signaling information from the external device.

Meanwhile, the physical layer IP frame module 117 converts a baseband packet included in a physical layer frame to a link layer packet through decapsulation as one embodiment. As one embodiment, the emergency alert signaling parser M3168 extracts and parses emergency alert related signaling information from the link layer packet, and the emergency alert processor M3162 processes the parsed emergency alert related signaling information.

The link layer packet parsed by the emergency alert signaling parser M3168 depends on the structures of FIGS. 62 to 64 as one embodiment. This is one embodiment for assisting understanding of the present invention, and since the link layer packet structure according to the present invention may be modified by a designer, the present invention is not limited to the aforementioned embodiment.

The emergency alert signaling parser M3168 may identify that data received in the link layer packet using each field included in the header of the link layer packet as shown in FIGS. 62 to 66 is signaling information and especially is a packet that includes signaling information for emergency alert. In addition, the emergency alert signaling parser M3168 may identify whether the payload of the link layer packet includes an emergency alert message of signaling information for emergency alert, link information of an emergency alert message, emergency alert related automatic tuning information, emergency alert related NRT service information, or wake-up indication information. The method and steps for this identification have been described in detail as above and thus their description will be omitted herein.

If it is identified that the payload of the corresponding link layer packet includes the emergency alert message of signaling information for emergency alert, the emergency alert processor M3162 processes the emergency alert message included in the corresponding payload with reference to each field included in the payload of the corresponding packet as described with reference to FIGS. 67 and 68.

If it is identified that the payload of the corresponding link layer packet includes link information of the emergency alert message of signaling information for emergency alert, the emergency alert processor M3162 acquires link information and/or access information for acquiring the emergency alert message with reference to each field included in the payload of the corresponding packet as described with reference to FIGS. 69 and 70, and receives and processes the emergency alert message by using the acquired link information and/or access information.

If it is identified that the payload of the corresponding link layer packet includes emergency alert related automatic tuning information of signaling information for emergency alert, the emergency alert processor M3162 acquires tuning information, which will be tuned automatically, with reference to each field included in the payload of the corresponding packet as described with reference to FIGS. 71 and 72, and controls channel tuning by using the acquired tuning information.

If it is identified that the payload of the corresponding link layer packet includes emergency alert related NRT service information of signaling information for emergency alert, the emergency alert processor M3162 acquires emergency alert related NRT service information with reference to each field included in the payload of the corresponding packet as described with reference to FIGS. 73 and 74, and acquires NRT service based on the acquired information.

FIG. 78 is a diagram illustrating an FIC according to an embodiment of the present invention.

In terrestrial broadcasting, in general, one frequency is used by one broadcaster. However, according to the present embodiment, one frequency may be shared by one or more broadcasters. Hereinafter, a description will be given of a method of sharing one frequency by one or more broadcasters based on low level signaling information.

The low level signaling information is signaling information that supports bootstrapping of rapid channel scanning and service acquisition by a receiver. The low level signaling information may include a fast information table (FIT) (or an SLT). The low level signaling information may be transmitted through a dedicated channel. For example, the dedicated channel may include an FIC. The FIC may include information necessary for acquisition of a service transmitted on a current frequency for rapid channel reception and scanning. The FIC may be a dedicated channel for cross-layer information that allows rapid service acquisition and channel scanning. This information may mainly include channel binding information between DPs and services of respective broadcasters.

The signaling information may include a plurality of low level signaling information. For example, a plurality of low level signaling information may be present within a dedicated channel. However, each broadcaster may transmit one low level signaling information (or FIT). Alternatively, each broadcaster may transmit at least one low level signaling information (or FIT).

The low level signaling information may include information for identifying each broadcaster. For example, the information for identifying each broadcaster may be a provider_id field. Here, each broadcaster is identified by the provider_id field, and services of one broadcaster may have the same provider_id field value.

Therefore, even when one frequency is shared by a plurality of broadcasters, a receiver may receive and/or acquire a low level signal from a particular broadcaster based on a provider_id field.

Hereinafter, details of the FIC will be described. The FIC, the FIT, and the SLT may indicate the low level signaling information.

Referring to the figure, the FIC may include at least one of an FIC_protocol_version field, a broadcaststream_id field, a num_services field, a service_id field, a service_data_version field, a service_channel_number field, a service_category field, a partition_id field, a short_service_name_length field, a short_service_name field, a service_status field, an sp_indicator field, an IP_version_flag field, an SSC_source_IP_address_flag field, a num_min_capability field, a min_capability_type field, a min_capability_value field, an SSC_source_IP_address field, an SSC_destination_IP_address field, an SSC_destination_UDP_port field, an SSC_TSI field, an SSC_DP_ID field, a num_service_level_descriptors field, a service_level_descriptor( ) field, a num_FIC_level_descriptors field, and/or an FIC_level_descriptor( ) field.

The FIC_protocol_version field may indicate a version of a structure of the FIC.

The broadcaststream_id field may indicate an ID of an overall broadcast stream.

The num_services field may indicate the number of services having at least one component within each broadcast stream. Each "for" loop subsequent to the num_services field may include information about each service.

The service_id field may indicate an ID for identifying a service.

A value of the service_data_version field may be incremented when a service entry for a service is changed within an FIC or when a signaling table for a service transmitted through a service signaling channel is changed. The service_data_version field allows a receiver to monitor an FIC, and enables the receiver to detect whether signaling for services has changed.

The service_channel_number field may indicate a channel number of a corresponding service.

The service_category field may indicate a category of a corresponding service.

The partition_id field may indicate an ID of a partition in which a service is broadcast. For example, the partition_id field may indicate an ID for identifying a broadcaster related to the service.

The short_service_name length field may indicate the number of byte pairs in the short_service_name field. A value of the short_service_name_length field may be indicated by "m" in the number of bits for the short_service_name field. When there is no short name in a service, the short_service_name_length field may have a value of "0". The short_service_name_length field may have a value of 3 bits.

The short_service_name field may indicate a short name of a service. Each character of the short name may be encoded in UTF-8 [ ]. When there is an odd number of bytes in the short name, the second byte of the last byte pair for a pair count indicated by the short_service_name_length field may include "0x00". (short_service_name field indicates the short name of the Service, each character of which shall be encoded per UTF-8 [ ]. When there is an odd number of bytes in the short name, the second byte of the last of the byte pair per the pair count indicated by the short_service_name_length field shall contain 0x00)

The service_status field may indicate a status of a service. For example, the service_status field may indicate whether the service is in an "active" status or a "suspended" state. In addition, the service_status field may indicate whether the service is in a "hidden" status or a "shown" status.

The sp indicator field may indicate a service protection flag. The sp_indicator field may indicate whether to interpret at least one protected component for significant presentation.

The IP_version_flag field may indicate a version of an Internet protocol. For example, when the IP_version_flag field has a value of "0", the IP_version_flag field may indicate that the SSC source IP address field and the SSC_destination_IP_address field have IPv4 addresses. When the IP_version_flag field has a value of "1", the IP_version_flag field may indicate that the SSC source IP address field and the SSC_destination_IP_address field have IPv6 addresses.

The SSC_source_IP_address_flag field may indicate whether a service signaling channel source IP address value for a service is present.

The num_min_capability field may indicate the number of minimum capabilities of each service. Each of at least one "for" loop subsequent to the num_min_capability field may include information related to a capability.

The min_capability_type field may indicate a type of a minimum capability.

The min_capability_value field may indicate a value of a minimum capability.

The SSC_source_IP_address field may be present when the SSC_source_IP_address_flag field has a value of "1". In addition, the SSC_source_IP_address field may not be present when the SSC_source_IP_address_flag field has a value of "0". When the SSC_source_IP_address field is present, the SSC_source_IP_address field may include source IP addresses of all IP datagrams that transmit a signal for a corresponding service. Conditional use of a 128-bit address version of this field enables IPv6 to be used in the future.

The SSC_destination_IP_address field may include destination IP addresses of all IP datagrams transmitting a signal for a corresponding service. Conditional use of a 128-bit address version of this field enables IPv6 to be used in the future.

The SSC_destintion_UDP_port field may indicate a destination UDP port number for a UDP/IP stream that transmits a stream for a corresponding service.

The SSC_TSI field may indicate a transport session identifier (TSI) of an LCT channel (or an LCT session) that transmits signaling tables for a corresponding service.

The SSC_DP_ID field may indicate an ID of a DP (or a physical DP) including signaling tables for a corresponding service. The DP may be the most robust pipe within a partition.

The num_service_level_descriptors field may indicate the number of service level descriptors for a corresponding service. Each of at least one "for" loop subsequent to the num_service_level_descriptors field may include at least one service level descriptor.

The service_level_descriptor( ) field may include at least one descriptor that provides additional information for a service.

The num_FIC_level_descriptors field may indicate the number of descriptors of an FIC level for a corresponding FIC.

The FIC_level_descriptor( ) field may include at least one descriptor that provides additional information for an FIC.

Figures 79, 80:
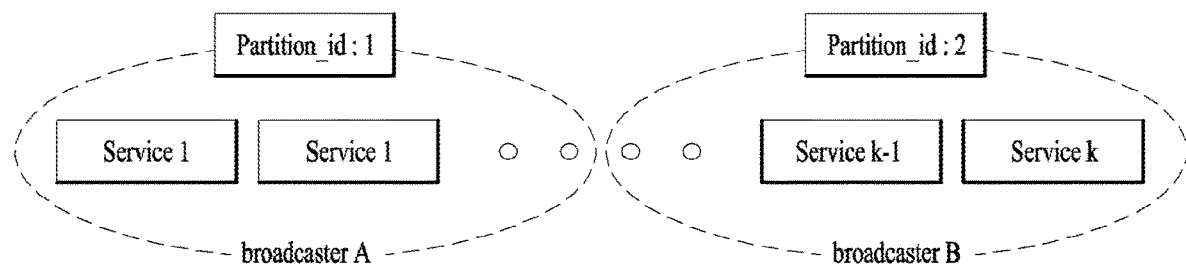
FIG. 79 is a diagram illustrating a service category according to an embodiment of the present invention.
FIG. 80 is a diagram illustrating a form in which one frequency is shared by two broadcasters according to an embodiment of the present invention.

FIG. 79 is a diagram illustrating a service category according to an embodiment of the present invention.

Low level signaling information and/or an FIC may include the service_category field. The service_category field may indicate a category of a corresponding service.

For example, the service_category field may indicate one of an audio/video (A/V) service, an audio service, an electronic service guide (ESG) service, a content on demand (CoD) service, an app-based service, and/or an emergency alert message (EAM) service (or an emergency alert signaling (EAS) service).

For example, when a value of the service_category field indicates "0x00 or informative only", the value of the service_category field may be treated as an informative description of a category of a service. In addition, a receiver needs to investigate a component mapping table (CMT) that refers to a service map table (SMT) to identify an actual category of a service transmitted through an ATSC 3.0 service. With regard to services having a video and/or audio component, the services may include an NTP timebase component.

In addition, when a value of the service_category field indicates "0x01", the service_category field may indicate that a service category is an A/V service. In addition, when a value of the service_category field indicates "0x02", the service_category field may indicate that a service category is an audio service. In addition, when a value of the service_category field indicates "0x03", the service_category field may indicate that a service category is an app-based service. In addition, when a value of the service_category field indicates "0x08", the service_category field may indicate that a service category is an ESG service.

FIG. 80 is a diagram illustrating a form in which one frequency is shared by two broadcasters according to an embodiment of the present invention.

An emergency alert message (or disaster information, EAS message) may be delivered through a dedicated PHY pipe such as an EAC, or transmitted through link layer signaling (or low level signaling) of a general PHY pipe (or DP, PLP). Alternatively, the emergency alert message may be transmitted in the form of a service.

When the emergency alert message is transmitted through the general PHY pipe, the emergency alert message may be transmitted through a separate pipe separated for each broadcaster, or the emergency alert message may be transmitted through one pipe.

When the emergency alert message is transmitted through a separate pipe separated for each broadcaster, the receiver may distinguish the emergency alert message for each broadcaster.

However, when emergency alert messages of several broadcasters are transmitted together through one pipe, the receiver cannot distinguish the emergency alert messages for respective broadcasters. Further, when emergency alert messages are transmitted through the dedicated PHY pipe, emergency alert messages transmitted from several broadcasters are mixed and transmitted through one pipe, and thus the receiver cannot filter the emergency alert messages for the respective broadcasters.

Referring to the figure, one frequency may be shared by broadcaster A and broadcaster B.

At least one service may be transmitted through one frequency. For example, broadcaster A may transmit service 1 and/or service 2. In addition, broadcaster B may transmit service k−1 and/or service k.

In addition, a plurality of low level signaling information (for example, the FIC and the SLT) for services may be transmitted through one frequency. For example, low level signaling information may include first low level signaling information for services transmitted from broadcaster A and second low level signaling information for services transmitted from broadcaster B. The first low level signaling information may include a partition id field that identifies broadcaster A. For example, a value of the partition_id field included in the first low level signaling information may indicate "1". In addition, the second low level signaling information may include a partition_id field that identifies broadcaster B. For example, a value of the partition id field included in the second low level signaling information may indicate "2".

Therefore, when one frequency is shared by two broadcasters (broadcaster A and broadcaster B), a partition_id field according to an embodiment of the present invention may be used as a factor for identifying a broadcaster.

Referring to the figure, one frequency is shared by two broadcasters, and each of the broadcasters may be identified by a partition_id field. When a user is viewing a service (e.g., service 1) of broadcaster A in which a value of the partition_id field is recognized as "1", the receiver may need to receive and process an emergency alert message delivered by broadcaster A.

Forms in which an emergency alert message is delivered may be sorted as below.

First, an emergency alert message may be transmitted through one pipe (a dedicated pipe or a general pipe) for each broadcaster.

For example, when one frequency is used by one broadcaster, the receiver may know that the emergency alert message is transmitted from one broadcaster irrespective of a form of a pipe (e.g., a dedicated pipe, a general pipe, etc.). In addition, when the emergency alert message is transmitted through a separate pipe for each broadcaster, the receiver may know that the emergency alert message is transmitted from one broadcaster.

Second, emergency alert messages of two or more broadcasters may be transmitted through one pipe (a dedicated pipe or a general pipe).

For example, when several broadcasters share and use a frequency, emergency alert messages of two or more broadcasters may be transmitted through one pipe. When the emergency alert messages are transmitted through the dedicated pipe or a particular pipe, the receiver cannot distinguish the emergency alert messages for the respective broadcasters.

To solve the above-described problem, an embodiment of the present invention may provide a method of filtering an emergency alert message transmitted through one pipe for each broadcaster. To this end, mapping information in which each emergency alert message is mapped to each broadcaster needs to be present.

For example, the partition_id field of the low level signaling information (the FIC or the SLT) according to the embodiment of the present invention may be used as the mapping information in which each emergency alert message is mapped to each broadcaster.

FIG. 81 is a diagram illustrating Emergency_Alert_Table( ) according to an embodiment of the present invention.

Referring to the figure, an emergency alert table (Emergency_Alert_Table( )) may include at least one of a table_id field, a table_id_extension field, an EAT_protocol_version field, an automatic_tuning_flag field, a num_EAS_messages field, an automatic_tuning_channel_number field, an automatic_DP_id field, an automatic_service_id field, an EAS_message_id field, an EAS_IP_version_flag field, an EAS_message_transfer_type field, an EAS_message_encoding_type field, an EAS_NRT_flag field, an EAS_message_length field, an EAS_message_bytes( ) field, an IP_address field, a UDP_port_num field, a DP_id field, and/or an NRT_service_id field.

The table_id field identifies a type of a current table. A broadcast receiver may identify that a present table is an emergency alert table using the table_id field.

The table id extension field includes the EAT_protocol_version field. In addition, when a structure of an emergency alert table is changed, the EAT_protocol_version field identifies version information thereof.

The automatic_tuning_flag field (1 bit) indicates whether to automatically change a channel.

The num_EAS_messages field (7 bits) indicates the number of emergency alert messages included in an emergency alert table.

When the automatic_tuning_flag field indicates "1", that is, automatic channel conversion, the emergency alert table further includes the automatic_tuning_channel_number field, the automatic_DP_id field, and the automatic_service_id field.

The automatic_tuning_channel_number field (8 bits) indicates information about a channel which includes content related to emergency alert information.

The automatic_DP_id field (8 bits) indicates information for identifying a DP, that is, a PHY pipe including A/V content related to the emergency alert message.

The automatic_service_id field (16 bits) indicates service ID information of content related to the emergency alert message.

Further, a "for" loop repeated a number of times corresponding to a value of the num_EAS_messages field includes the EAS_message_id field, the EAS_IP_version_flag field, the EAS_message_transfer_type field, the EAS_message_encoding_type field, and the EAS_NRT_flag field.

The EAS_message_id field (32 bits) indicates a unique ID for identifying an emergency alert message. A value of this field may be changed when a previous emergency alert message is updated or canceled. As another example, this field may be extracted from a CAP message ID.

The EAS IP_version_flag field (1 bit) indicates an IP version in which the emergency alert table is transmitted. The IP address field includes an IPv4 address when a value of this field is "0", and includes an IPv6 address when a value of this field is "1".

The EAS_message_transfer_type field (3 bits) indicates a transmission type of an emergency alert table. In a specific example, the EAS_message_transfer_type field may indicate that a transmission type of an EAS message (emergency alert message) has not been specified. In this case, the EAS_message_transfer_type field may have a value of "0x00".

In another example, the EAS_message_transfer_type field may indicate that a transmission type of an EAS message (emergency alert message) is a type in which the emergency alert message is not included. In this case, the EAS_message_transfer_type field may have a value of "0x01".

In another example, the EAS_message_transfer_type field may indicate that the EAS message (emergency alert message) is included and transferred in an EAT. In this case, the EAS_message_transfer_type field may have a value of "0x02".

Further, when the EAS_message_transfer_type field has the value of "0x02", an emergency alert table including the EAS message (emergency alert message) may additionally indicate a length of the EAS message (emergency alert message). In this case, information indicating the length of the EAS message (emergency alert message) may correspond to the EAS_message_length field. The EAS_message_length field may correspond to 12 bits. In addition, the EAS_message_bytes( ) field subsequent to the EAS_message_length field transmits an emergency alert message including emergency alert content corresponding to a length of a value of the EAS_message_length field.

In another example, the EAS_message_transfer_type field may indicate that the EAS message (emergency alert message) is transmitted through a PHY pipe in the form of an IP datagram. In this case, the EAS_message_transfer_type field may have a value of "0x03".

When the EAS_message_transfer_type field has the value of "0x03", the emergency alert table may additionally include at least one of the IP_address field (32 or 128 bits) that indicates IP address information for acquiring an IP datagram which transmits the EAS message (emergency alert message), the UDP_port_num field (16 bits) that indicates a UDP port number, and the DP_id field (8 bits) that indicates identification information of a physical layer frame (that is, a PLP or a DP) in which the EAS message is transmitted.

Meanwhile, the EAS_message_encoding_type field (3 bits) indicates an encoding type of an emergency alert message. In a specific example, the EAS_message_encoding_type field may indicate that an encoding type of an emergency alert message has not been specified. In this case, the EAS_message_encoding_type field may have a value of "0x00".

In another example, the EAS_message_encoding_type field may indicate that an emergency alert message has not been encoded. In this case, the EAS_message_encoding_type field may have a value of "0x01".

In another example, the EAS_message_encoding_type field may indicate that an emergency alert message has been encoded by a DEFLATE algorithm. The DEFLATE algorithm is a lossless compression data format. In this case, the EAS_message_encoding_type field may have a value of "0x02".

When the EAS_NRT_flag field has a value of "1", the emergency alert table includes the NRT_service_id field. The NRT_service_id field (16 bits) indicates identification information for identifying an NRT service related to an emergency alert.

The emergency alert table may further include the partition_id field. The partition_id field may indicate an ID of a partition in which a service is broadcast. For example, the partition_id field may indicate an ID for identifying a broadcaster related to a service.

For example, an emergency alert table according to an embodiment of the present invention may include at least one emergency alert message provided by at least one broadcaster. In addition, the emergency alert message may include the partition_id field.

The receiver may receive an emergency alert message from at least one broadcaster. The receiver may filter an emergency alert message delivered by a broadcaster that provides a current channel/service based on the partition_id field. Then, the receiver may express an emergency alert message filtered for each broadcaster to the user.

Figure 82:
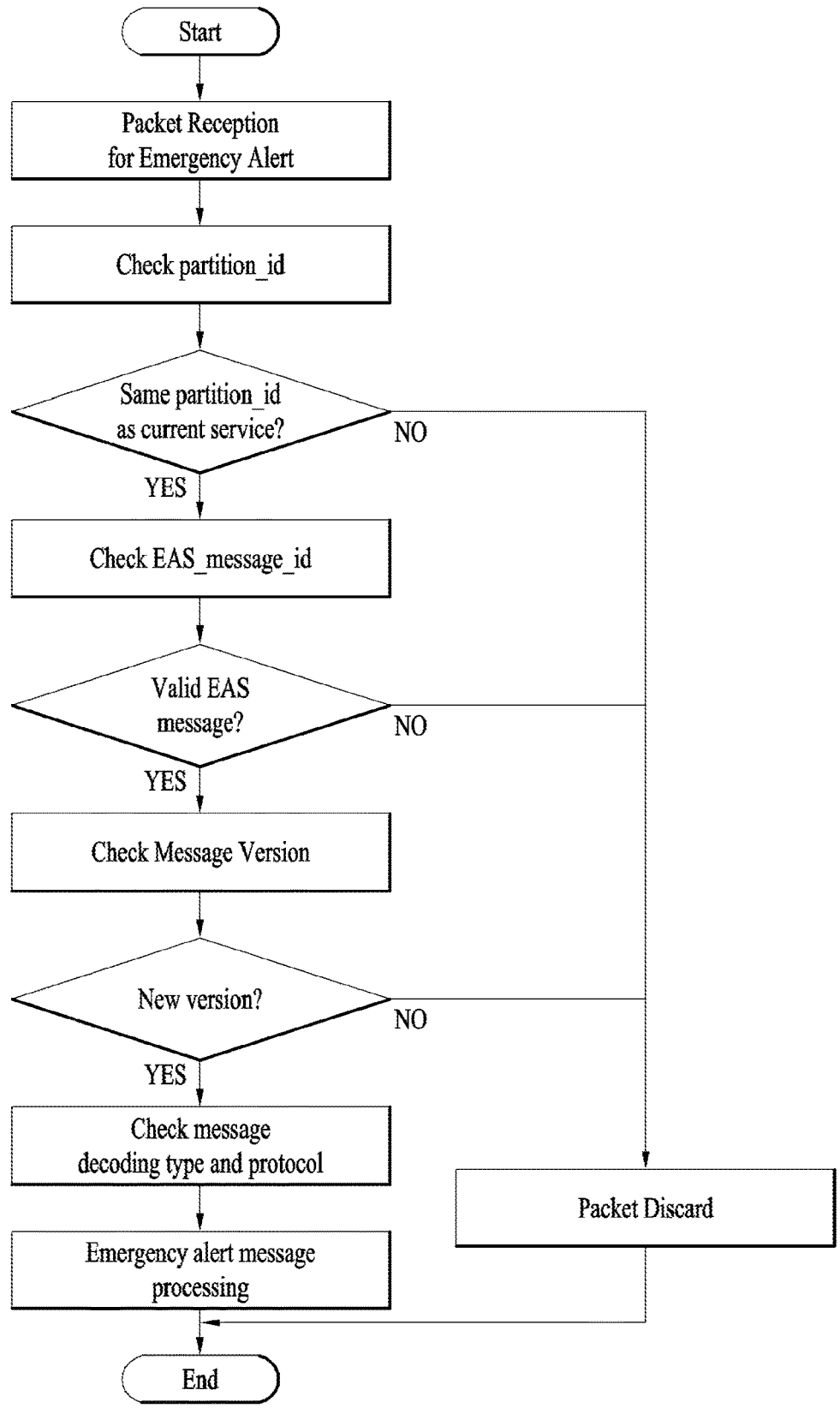
FIG. 82 is a diagram illustrating a flow of a broadcast receiver according to an embodiment of the present invention.

FIG. 82 is a diagram illustrating a flow of a broadcast receiver according to an embodiment of the present invention.

The figure illustrates an operation flow of filtering an emergency alert message (or an EAS message) for each broadcaster by the broadcast receiver.

The broadcast receiver according to the embodiment of the present invention may check a value of a partition_id field of the emergency alert message (EAS message). Then, the broadcast receiver may verify whether the value of the partition_id field of the emergency alert message (EAS message) is the same as a value of a partition_id field of a currently viewed channel/service.

When the values are the same, the broadcast receiver may process the emergency alert message (EAS message). When the values are different from each other, the broadcast receiver may discard the emergency alert message (EAS message).

Hereinafter, a detailed description will be given of the flowchart of the broadcast receiver.

The broadcast receiver may receive a packet for the emergency alert message using a broadcast receiving unit and/or a controller (CS820010).

Then, the broadcast receiver may check a value of the partition_id field of the emergency alert message using the controller (CS820020).

Then, the broadcast receiver may verify whether the value of the partition_id field of the emergency alert message is the same as the value of the partition_id field of the currently viewed channel/service (CS820030).

When the values are the same, the broadcast receiver may check an ID of the emergency alert message using the controller (CS820040). For example, the broadcast receiver may check the ID of the emergency alert message based on the EAS_message_id field.

When the values are different from each other, the broadcast receiver may discard the packet for the emergency alert message (CS820100).

Then, the broadcast receiver may verify whether the emergency alert message which is included in a payload of the packet is a valid message using the controller (CS820050).

When the emergency alert message an invalid message, the broadcast receiver may discard the packet for the emergency alert message (CS820100). That is, when the received emergency alert message is invalid, the broadcast receiver may ignore the packet and return to a reception standby state for another packet.

When the emergency alert message is a valid message, the broadcast receiver may check version information of the emergency alert message using the controller (CS820060). For example, the broadcast receiver may check the version information of the emergency alert message based on the EAS_message_version field.

Then, the broadcast receiver may verify whether the emergency alert message is an updated message or a previously received message using the controller (CS820070).

When the emergency alert message is the previously received message, the broadcast receiver may discard the packet for the emergency alert message (CS820100). That is, when the received emergency alert message is the previously received message, the broadcast receiver may ignore the packet and return to a reception standby state for another packet.

When the emergency alert message is a message of a new version, the broadcast receiver may check a decoding type and a protocol of the emergency alert message using the controller (CS820080). For example, the broadcast receiver may check the decoding type and the protocol of the emergency alert message based on the EAS_message_encoding_type field and the EAS_message_protocol field.

Then, the broadcast receiver may process the emergency alert message according to the checked decoding type and protocol using the controller (CS820090).

Figure 83:
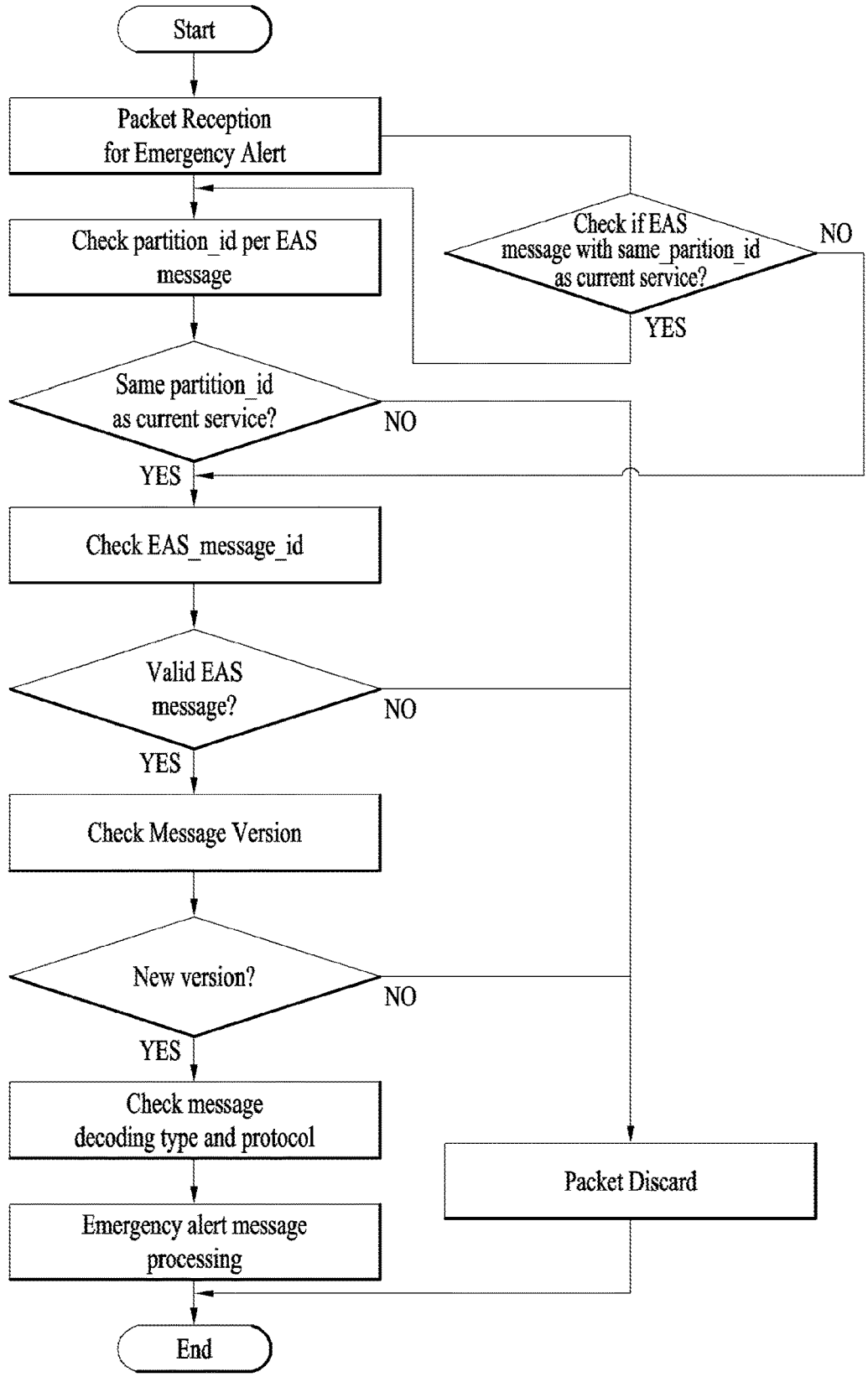
FIG. 83 is a diagram illustrating a flow of a broadcast receiver according to an embodiment of the present invention.

FIG. 83 is a diagram illustrating a flow of a broadcast receiver according to an embodiment of the present invention.

When several broadcasters use one pipe (dedicated pipe or general pipe) for transmission of an emergency alert message (EAS message), two cases may be sorted as below.

First, in a case in which the user views a channel of a broadcaster transmitting the emergency alert message (EAS message):

When a broadcaster of a currently viewed channel transmits the emergency alert message (EAS message), the broadcast receiver may normally filter and/or receive the emergency alert message (EAS message) to inform the user of an emergency situation.

Second, in a case in which the user does not view a channel of a broadcaster transmitting the emergency alert message (EAS message):

Even though broadcasters share a pipe for transmission of the emergency alert message (EAS message), a broadcaster of a currently viewed channel may not transmit the emergency alert message (EAS message). In this case, the broadcast receiver may receive the emergency alert message (EAS message) of another broadcaster other than the broadcaster of the currently viewed channel and inform the user of an emergency situation.

An operation flow of the broadcast receiver that supports the above operation is as below.

The broadcast receiver may receive a packet for an emergency alert message using a broadcast receiving unit and/or a controller (CS830010). For example, a broadcast signal may include a plurality of emergency alert tables transmitted by a plurality of broadcasters. A particular broadcaster may not transmit an emergency alert table. In addition, an emergency alert table may include a plurality of emergency alert messages. One emergency alert table may include a plurality of emergency alert messages for a plurality of broadcasters. For example, the respective emergency alert messages may include partition_id fields for the plurality of broadcasters.

Then, the broadcast receiver may verify whether an emergency alert message having a value of a partition_id field which indicates a broadcaster of a currently viewed channel is present among all emergency alert messages (EAS messages) defined in an emergency alert table (Emergency_Alert_Table) using the controller (CS830015).

When there is no emergency alert message having the value of the partition_id field which indicates the broadcaster of the currently viewed channel, the broadcast receiver may process the received emergency alert message (EAS message) without filtering. That is, the broadcast receiver may proceed to CS830040. In this case, the broadcast receiver needs to process all received emergency alert messages.

When there is an emergency alert message having the value of the partition_id field which indicates the broadcaster of the currently viewed channel, the broadcast receiver may check the value of the partition_id field of the emergency alert message using the controller (CS830020). For example, the broadcast receiver may check a value of a partition_id field with respect to each emergency alert message included in an emergency alert table.

Then, the broadcast receiver may verify whether the value of the partition id field of the emergency alert message is the same as the value of the partition_id field of the currently viewed channel/service using the controller (CS830030). That is, the broadcast receiver may filter and process the emergency alert message (EAS message) by comparing the value of the partition_id field of the emergency alert message with the value of the partition_id field of the currently viewed channel/service.

When the values are the same as a result of comparison, the broadcast receiver may check an ID of the emergency alert message using the controller (CS830040). For example, the broadcast receiver may check the ID of the emergency alert message based on the EAS_message_id field.

When the values are different from each other as a result of comparison, the broadcast receiver may discard the packet for the emergency alert message (CS830100).

Then, the broadcast receiver may verify whether the emergency alert message which is included in a payload of the packet is a valid message using the controller (CS830050).

When the emergency alert message is an invalid message, the broadcast receiver may discard the packet for the emergency alert message (CS830100). That is, when the received emergency alert message is invalid, the broadcast receiver may ignore the packet and return to a reception standby state for another packet.

When the emergency alert message is a valid message, the broadcast receiver may check version information of the emergency alert message using the controller (CS830060).

For example, the broadcast receiver may check the version information of the emergency alert message based on the EAS_message_version field.

Then, the broadcast receiver may verify whether the emergency alert message is an updated message or a previously received message using the controller (CS830070).

When the emergency alert message is the previously received message, the broadcast receiver may discard the packet for the emergency alert message (CS830100). That is, when the received emergency alert message is the previously received message, the broadcast receiver may ignore the packet and return to a reception standby state for another packet.

When the emergency alert message is a message of a new version, the broadcast receiver may check a decoding type and a protocol of the emergency alert message using the controller (CS830080). For example, the broadcast receiver may check the decoding type and the protocol of the emergency alert message based on the EAS_message_encoding_type field and the EAS_message_protocol field.

Then, the broadcast receiver may process the emergency alert message according to the checked decoding type and protocol using the controller (CS830090).

Even when broadcaster A of a channel currently viewed by the user does not transmit an emergency alert message, the broadcast receiver may use an emergency alert table and/or an emergency alert message of broadcaster B which is transmitting the emergency alert message. In this instance, the emergency alert table transmitted by broadcaster B may include an emergency alert message for broadcaster A in addition to an emergency alert message for broadcaster B. Therefore, the broadcast receiver may provide an emergency alert message to the user on a current channel based on the emergency alert table and/or the emergency alert message of broadcaster B.

FIG. 84 is a diagram illustrating syntax related to an EAC added to PLS according to an embodiment of the present invention.

Hereinafter, a description will be given of a method that allows transmission of a private data stream according to an embodiment of the present invention. For example, a description will be given of a method of transmitting and/or receiving a WARN message according to an embodiment of the present invention.

An emergency alert message (or emergency alert data) according to an embodiment of the present invention may include the WARN message and/or a common alert protocol (CAP) message. The WARN message refers to a disaster broadcast message used in a disaster broadcast construction system constructed by PBS (Public Broadcasting Service of the United States). In addition, an EAS message generally refers to a disaster message used in disaster broadcasting. Further, the CAP message means that the EAS message is transmitted in a form of a CAP. Here, the CAP message and the EAS message may have the same meaning.

An embodiment of the present invention describes a method of transmitting and/or receiving the WARN message through an EAC. To transmit the WARN message through the EAC, PLS according to an embodiment of the present invention may include syntax related to the EAC.

The PLS according to the embodiment of the present invention may include at least one of an EAC_Flag field, a num_EA_data field, an EA_data_Type field, a WARN_data_version field, a WARN_data_target field, a WARN_data_version field, a WARN_data_target field, a WARN_data_Length field, and/or a CAP_message_info( ) field.

The EAC_Flag field may indicate whether an EAC is present within a corresponding PHY frame (or a frame of a physical layer). When a value of the EAC_Flag field is "true", the EAC may be present. The num_EA_data field may indicate the number of transmitted emergency alert messages (or emergency alert data). A "for" loop subsequent to the num_EA_data field may include content related to emergency alert messages, the number of which is indicated by a value of the num_EA_data field.

The EA_data_Type field may indicate a type of an emergency alert message. A value of this field may be assigned as below, and a remaining value may be assigned based on a possibility that a new type may be added in the future.

For example, when a value of the EA_data_Type field is "0", a type of an emergency alert message may be "WARN only". In this case, the emergency alert message may include only the WARN message.

In addition, when a value of the EA_data_Type field is "1", a type of an emergency alert message may be "WARN+CAP". In this case, the emergency alert message may include the WARN message and the CAP message.

In addition, when a value of the EA_data_Type field is "2", a type of an emergency alert message may be "CAP only". In this case, the emergency alert message may include only the CAP message.

When a value of the EA_data_Type field is "0", the PLS according to the embodiment of the present invention may include at least one of the WARN_data_version field and/or the WARN_data_target field.

The WARN_data_version field may indicate a version of a transmitted WARN message (or WARN data).

The WARN_data_target field may indicate target information of the transmitted WARN message (or WARN data). For example, when a value of the WARN_data_target field is "0", the target information of the WARN message (or WARN data) may indicate "Communities of Amber Alerts". In addition, when a value of the WARN_data_target field is "1", the target information of the WARN message (or WARN data) may indicate "Imminent threats to safety or life". In addition, when a value of the WARN_data_target field is "2", the target information of the WARN message (or WARN data) may indicate "Presidential Alerts via geographically-targeted".

When a value of the EA_data_Type field is "1", the PLS according to the embodiment of the present invention may include at least one of the WARN_data_version field, the WARN_data_target field, the WARN_data_Length field, and/or the CAP_message_info( ) field.

Content about the WARN_data_version field and the WARN_data_target field has been described above.

The WARN_data_Length field may indicate length information of the WARN message. When a broadcast transmitter transmits both the WARN message and the CAP message, the broadcast transmitter may transmit the WARN message having the corresponding length, and transmit a message subsequent to the data length as the CAP message.

The CAP_message_info( ) field may include CAP message information. For example, the CAP_message_info( ) field may include at least one of a message_id field that identifies a CAP_message_info( ) field message and/or a CAP message encoding type field that indicates an encoding type of the CAP message.

When a value of the EA_data_Type field is "2", the PLS according to the embodiment of the present invention may include the CAP_message_info( ) field.

Content about the CAP_message_info( ) field has been described above.

Figure 85:
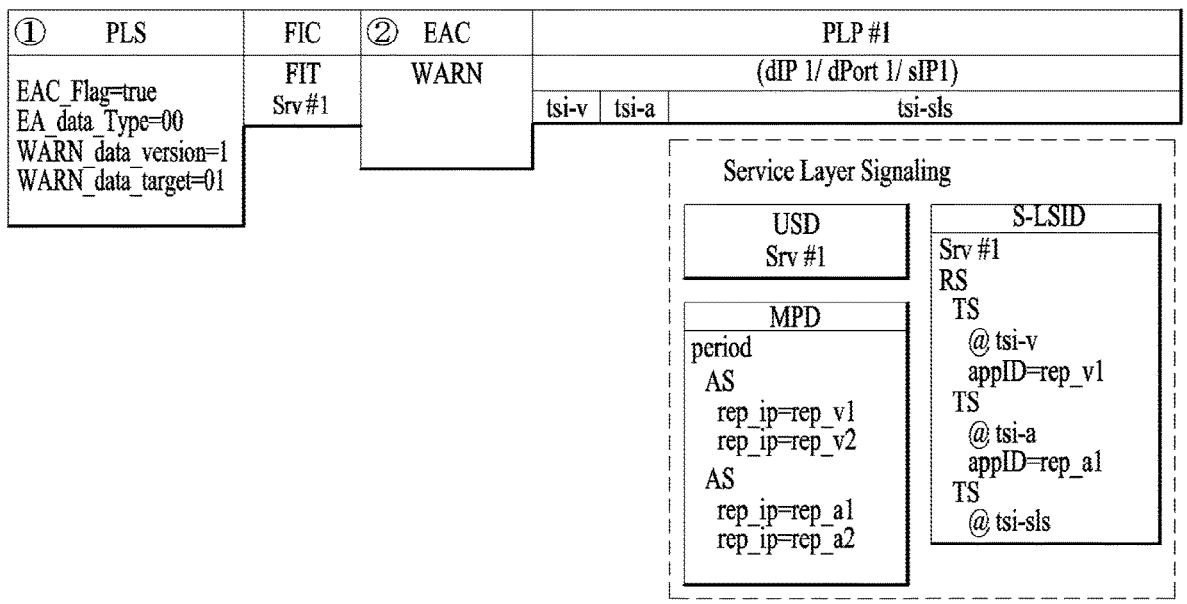
FIG. 85 is a diagram illustrating a form in which only the WARN message is transmitted through the EAC according to an embodiment of the present invention.

FIG. 85 is a diagram illustrating a form in which only the WARN message is transmitted through the EAC according to an embodiment of the present invention.

A broadcast transmitter according to an embodiment of the present invention may transmit PLS information.

PLS may include at least one of an EAC Flag field, an EA_data_Type field, a WARN_data_version field, and/or a WARN_data_target field. Content about signaling information included in the PLS has been described above.

For example, the EAC_Flag field may have a value of "true" to indicate that the EAC is present.

In addition, the EA_data_Type field may have a value of "00" to indicate that a type of an emergency alert message is "WARN only". In this case, the emergency alert message may include only a WARN message.

In addition, the WARN_data_version field may have a value of "1".

In addition, the WARN_data_target field may have a value of "1" to indicate that target information of a WARN message (or WARN data) is "Imminent threats to safety or life".

The broadcast transmitter according to the embodiment of the present invention may transmit an FIT (or SLT). For example, the FIT may be transmitted through an FIC. In addition, the FIT may be encapsulated in an IP/UDP datagram and transmitted.

The FIT is signaling information that supports bootstrapping of rapid channel scanning and service acquisition by the receiver. The FIT may include signaling information used to establish basic service listing and signaling information that provides discovery of a bootstrap of SLS.

For example, the FIT may include bootstrap information for SLS information of a service (Srv #1) and/or a service (Srv #1).

The broadcast transmitter according to the embodiment of the present invention may transmit a WARN message through a dedicated PLP. In this instance, the PLP designated to transmit the WARN message may be referred to as an EAC. In other words, the EAC may be a dedicated PLP for transmission of only a physical layer frame including the WARN message. Here, the physical layer frame may be a unit of data transmitted through a physical layer. The physical layer may include one or more PLPs, and the physical layer frame may be transmitted through the PLP.

The broadcast transmitter according to the embodiment of the present invention may transmit service data and SLS information for a service.

The service data may include at least one of a video component, an audio component, and/or a captioning component. The service data may be transmitted through a ROUTE session. The ROUTE session may be identified through a destination IP address (dIP1), a destination port number (dPort1), and/or a source IP address (sIP1). In addition, the ROUTE session may be transmitted through at least one PLP. For example, the ROUTE session may be transmitted through one PLP (PLP #1).

The ROUTE session may include at least one LCT session (or LCT channel). Each LCT session may be identified by a TSI. Each of the video component, the audio component, and the SLS information may be transmitted through the LCT session. For example, the video component may be transmitted through a first LCT session (tsi-v), the audio component may be transmitted through a second LCT session (tsi-a), and the SLS information may be transmitted through a third LCT session (tsi-sls).

SLS may be signaling that provides information for discovering and acquiring a service and a content component thereof. The SLS may include a USD, an S-LSID, and/or an MPD. The USD may be expressed as a USBD, and the S-LSID may be expressed as a S-TSID.

The USD may include reference information of SLS for a service (Srv #1).

The MPD may include a period element. The period element may include a first AdaptationSet element having information about at least one video component and a second AdaptationSet element having information about at least one audio component.

Each of the first AdaptationSet element and the second AdaptationSet element may include a Representation element. For example, the first AdaptationSet element may include a first Representation element including information for a first Representation and a second Representation element including information for a second Representation. The second AdaptationSet element may include a third Representation element including information for a third Representation and a fourth Representation element including information for a fourth Representation.

The first Representation and the second Representation may be interchanged. In addition, the third Representation and the fourth Representation may be interchanged.

Each Representation element may include information about a representation related to a component. The Representation element may include a rep_id attribute (or id attribute) that identifies a representation.

For example, the first Representation element may include a value of the rep_id attribute which has a value of "rep_v1", the second Representation element may include a value of the rep_id attribute which has a value of "rep_v2", the third Representation element may include a value of the rep_id attribute which has a value of "rep_a1", and the fourth Representation element may include a value of the rep_id attribute which has a value of "rep_a2".

The S-LSID may include at least one RS element (ROUTE session element) which includes information about a ROUTE session for the service (Srv #1). Each ROUTE session element may include at least one TS element (LCT session element) which includes information about an LCT session.

Each TS element may include a tsi attribute and an appID element. The tsi attribute may identify an LCT session. The appID element may be referred to as a ContentInfo element. The ContentInfo element may include additional information mapped to a service (or application service) transmitted through a transmission session. For example, the ContentInfo element may include a Representation ID of DASH content and/or Adaptation Set parameters of a DASH media representation in order to select an LCT transmission session for rendering. The Representation ID is an ID related to a component for a service, and may be referred to as a rep_id attribute.

For example, the RS element may include a first TS element for a video component, a second TS element for an audio component, and/or a third TS element for SLS information.

A tsi element included in the first TS element may have a value of "tsi-v", and an appID element may have a value of "rep_v1". A tsi element included in the second TS element may have a value of "tsi-a", and an appID element may have a value of "rep_a1". A tsi element included in the third TS element may have a value of "tsi-sls".

Figure 86:
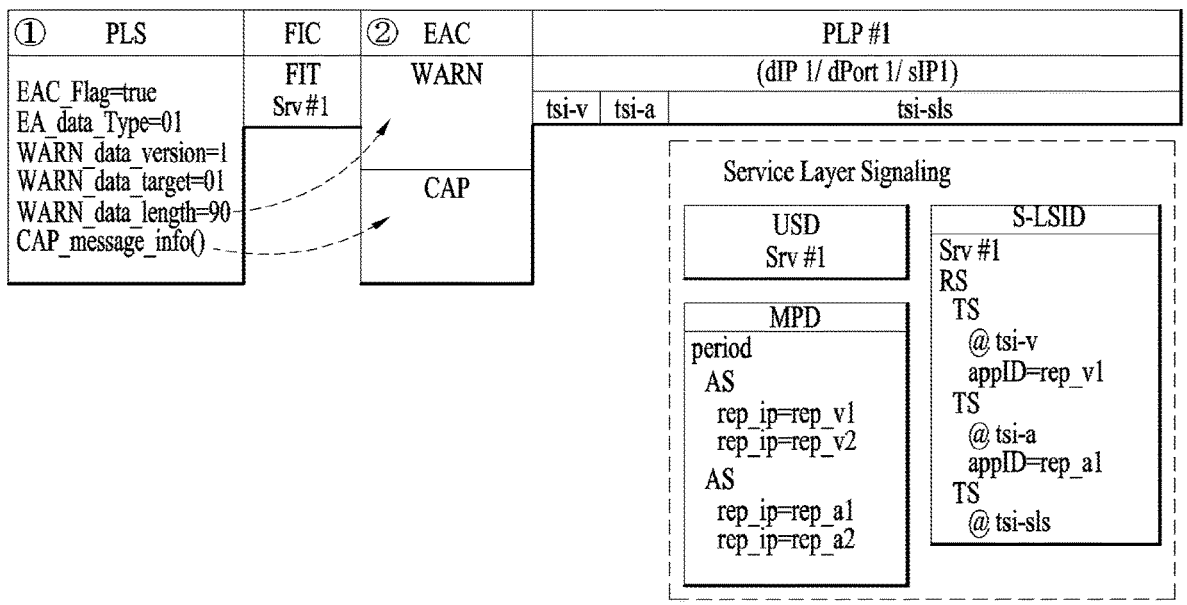
FIG. 86 is a diagram illustrating a form in which a WARN message and a CAP message are transmitted through an EAC according to an embodiment of the present invention.

FIG. 86 is a diagram illustrating a form in which a WARN message and a CAP message are transmitted through an EAC according to an embodiment of the present invention.

A broadcast transmitter according to an embodiment of the present invention may transmit a PLS, an FIT (or SLT), an emergency alert message, service data, and SLS. Content related to the FIT (or SLT), the service data, and the SLS is the same as the above description. Hereinafter, differences will be mainly described.

A PLS according to an embodiment of the present invention may at least one of an EAC_Flag field, an EA_data_Type field, a WARN_data_version field, a WARN_data_target field, a WARN_data_Length field, and/or a CAP_message_info( ) field. Content about signaling information included in the PLS is the same as the above description.

For example, the EAC_Flag field may have a value of "true" to indicate that an EAC is present.

In addition, the EA_data_Type field may have a value of "1" to indicate that a type of an emergency alert message is "WARN+CAP". In this case, the emergency alert message may include a WARN message and a CAP message.

In addition, the WARN_data_version field may have a value of "1".

In addition, the WARN_data_target field may have a value of "1" to indicate that target information of a WARN message (or WARN data) is "Imminent threats to safety or life".

In addition, the WARN_data_Length field may have a value of "90" to indicate that a length of a WARN message is "90".

In addition, the CAP_message_info( ) field may include information related to a CAP message. For example, the CAP_message_info( ) field may include at least one of message_id that identifies a CAP_message_info( ) field message and/or a CAP message encoding type field that indicates an encoding type of the CAP message.

The broadcast transmitter according to the embodiment of the present invention may transmit the WARN message and the CAP message through a designated PLP. In this instance, the PLP designated to transmit the WARN message and the CAP message may be referred to as an EAC. In other words, the EAC may be a dedicated PLP for transmitting only a physical layer frame including the WARN message and the CAP message.

For example, when the broadcast transmitter transmits both the WARN message and the CAP message, the broadcast transmitter may transmit the WARN message corresponding to a length of "90" indicated by the WARN_data_Length field, and transmit the CAP message after the data length.

Figure 87:
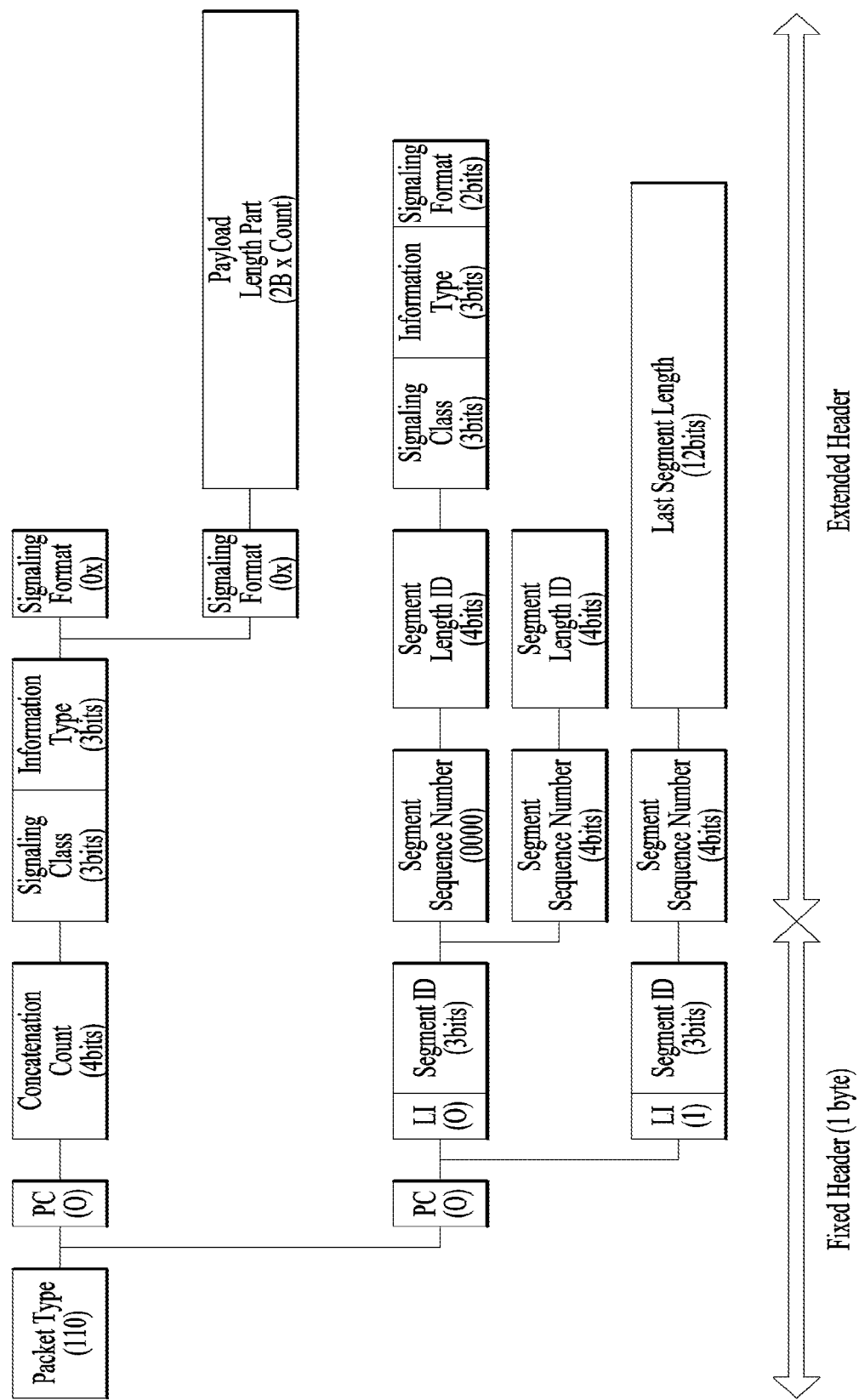
FIG. 87 is a diagram illustrating a link layer header according to an embodiment of the present invention.

FIG. 87 is a diagram illustrating a link layer header according to an embodiment of the present invention.

The figure illustrates a header structure of a link layer packet according to an embodiment of the present invention. Content about each field of a header of the link layer packet may include all of the above description. Hereinafter, differences will be mainly described.

An embodiment of the present invention may provide a method of transmitting a WARN message through link layer signaling. In order for the broadcast transmitter to transmit the WARN message as one link layer packet, an LLS packet header may include information that indicates a type of the WARN message.

For example, the LLS packet header according to the present embodiment may include a signaling_class field and an information_type field. The signaling_class field and/or the information_type field may indicate a type of the WARN message.

The signaling_class field indicates a type of signaling information included in the link layer packet, in particular, a payload of the link layer packet. When a type of signaling information transmitted in the packet is determined by a value of the signaling_class field, the information_type field indicates a type of data transmitted in a payload of the packet (that is, a target of the WARN message) with regard to the determined signaling information. In addition, specific information may be additionally included according to data type.

FIG. 88 is a diagram illustrating a signaling_class field according to an embodiment of the present invention.

For example, when a value of the signaling_class field is "000", the value indicates that a packet includes signaling information (e.g., SLT) for channel scanning and service acquisition. When a value of the signaling_class field is "001", the value indicates that the packet includes signaling information for a CAP message (or an EAS message or an emergency alert). When a value of the signaling_class field is "010", the value indicates that the packet includes signaling information for header compression.

In addition, when a value of the signaling_class field according to the present embodiment is "011", the value indicates that the packet includes signaling information for a WARN message.

When a value of the signaling_class field according to the present embodiment is "011", the packet is referred to as a WARN message packet.

FIG. 89 is a diagram illustrating an information_type field according to an embodiment of the present invention.

When the signaling_class field indicates that a corresponding packet includes signaling information for a WARN message, the information_type field indicates a type of data transmitted in a payload of the packet (that is, a target of the WARN message) with regard to determined signaling information.

That is, the information_type field may indicate target information of the transmitted WARN message (or WARN data).

For example, when a value of the information_type field is "000", the target information of the WARN message (or WARN data) may indicate "Communities of Amber Alerts". In addition, when a value of the information_type field is "001", the target information of the WARN message (or WARN data) may indicate "Imminent threats to safety or life". In addition, when a value of the information_type field is "010", the target information of the WARN message (or WARN data) may indicate "Presidential Alerts via geographically-targeted". A value of the information_type field is not fixed, and may be changed.

FIG. 90 is a diagram illustrating syntax related to a WARN message added to PLS according to an embodiment of the present invention.

When the broadcast transmitter transmits a WARN message (or WARND) in a link layer packet, PLS according to an embodiment of the present invention may include signaling information for the WARN message.

For example, the PLS according to the embodiment of the present invention may include at least one of an EAC_Flag field, a WARN_data_version field, and/or a WARN PLP ID field.

The EAC_Flag field may indicate whether an EAC is present in a PHY frame. For example, when a value of the EAC_Flag field is "true", the EAC may be present in the physical frame. When a value of the EAC_Flag field is "false", the EAC may not be present in the physical frame.

The WARN_data_version field may indicate a version of the WARN message (or WARN data) transmitted in the PLP.

The WARN_PLP_ID field may indicate a PLP identifier (or PLP ID) that identifies a PLP which transmits the WARN message in the PHY frame.

In addition, when the WARN message (or WARND) is transmitted in the link layer packet, and the WARN message is transmitted through a base PLP, the PLS may not include WARN_PLP_ID. Since the base PLP is a PLP which is decoded at all times, the PLS may not include the WARN_PLP_ID field. The broadcast receiver may receive and acquire the WARN message transmitted through the base PLP.

Figures 91, 92:
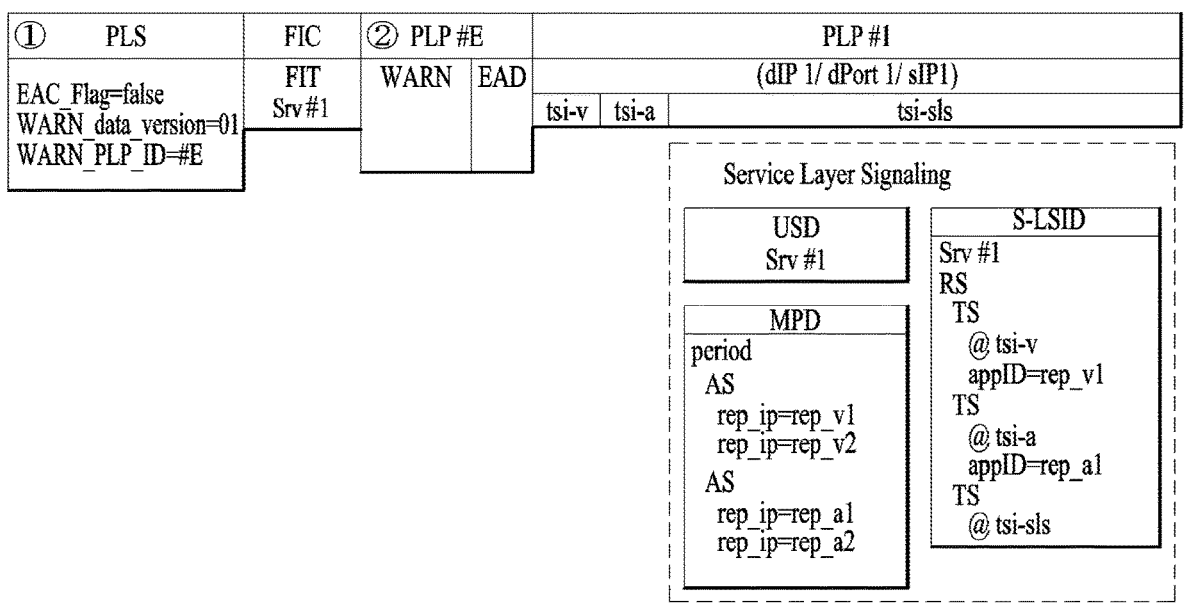
FIG. 91 is a diagram illustrating a form in which a WARN message is transmitted through LLS according to an embodiment of the present invention.
FIG. 92 is a diagram illustrating PLS in a case in which signaling information for a WARN message is transmitted through an EAC according to an embodiment of the present invention.

FIG. 91 is a diagram illustrating a form in which a WARN message is transmitted through LLS according to an embodiment of the present invention.

A broadcast transmitter according to an embodiment of the present invention may transmit PLS, an FIT (or SLT), an emergency alert message, service data, and SLS. The FIT (or SLT), the service data, and the SLS are the same as described above. Hereinafter, differences will be mainly described.

The PLS according to the present embodiment may include signaling information for the WARN message. The PLS may include at least one of an EAC_Flag field, a WARN_data_version field, and/or a WARN_PLP_ID field. The signaling information included in the PLS is the same as described above.

For example, the EAC_Flag field may have a value of "false" to indicate that an EAC is not present in a PHY frame. That is, the WARN message may not be transmitted through an EAC and may be transmitted through the LLS.

In addition, the WARN_data_version field may have a value of "01" to indicate that a version of the WARN message (or WARN data) is "01".

In addition, the WARN_PLP_ID field may have a value of "#E" to indicate that an ID of a PLP that transmits the WARN message is "#E".

The WARN message may be transmitted through link layer signaling. The WARN message (or WARND) and/or a CAP message (or EAS message, EAD) may be transmitted through a PLP. For example, the WARN message and/or the CAP message may be transmitted through a base PLP and/or a general PLP (or a general data pipe). Signaling information for the WARN message and the CAP message may be included in the PLS.

FIG. 92 is a diagram illustrating PLS in a case in which signaling information for a WARN message is transmitted through an EAC according to an embodiment of the present invention.

Even though the WARN message according to the present embodiment is transmitted in a link layer packet, the signaling information for the WARN message may be transmitted through the EAC. In addition, signaling information for the EAC may be included in the PLS.

Referring to the figure, the PLS may include an EAC_Flag field. The signaling information included in the PLS is the same as described above.

For example, the EAC_Flag field may have a value of "true" to indicate that the EAC is present in a PHY frame. In addition, an EAT of the EAC may include information that signals a position at which the WARN message is transmitted. In addition, the WARN message may not be transmitted through the EAC, and may be transmitted through LLS.

FIG. 93 is a diagram illustrating an EAT that includes signaling information for a WARN message according to an embodiment of the present invention.

The broadcast transmitter may transmit the EAT through an EAC. After entering the EAC, the broadcast receiver may acquire the EAT transmitted through the EAC, and acquire transmission path information of the WARN message from the EAT.

Referring to the figure, the EAT may include at least one of a table_id field, a version_number field, a num_EA_data field, an EA_data_type field, a PLP_ID field, and/or a data version field.

The table_id field may indicate an ID (or table ID) that identifies the EAT transmitted through the EAC.

The version_number field may indicate a version number of the EAT.

The num_EA_data field may indicate the number of emergency alert messages described in the EAT.

The EA_data_type field may indicate a data type of an emergency alert message described in the EAT. For example, when a value of the EA_data_type field is "00", the data type of the emergency alert message may indicate "unspecified". In addition, when a value of the EA_data_type field is "01", the data type of the emergency alert message may indicate the "WARN message". When a value of the EA_data_type field is "01", the data type of the emergency alert message may indicate a "CAP message".

A value of the EA_data_type field may be assigned as described above, and a remaining value may be assigned based on a possibility that a new type may be added in the future. Information that needs to be notified when a transmission path of the emergency alert message is signaled may vary for each type.

When a value of the EA_data_type field is "01", the EAT may include at least one of the PLP_ID field and/or the data version field.

The PLP_ID field may indicate a PLP identifier (or PLP_ID) that identifies a PLP which transmits the WARN message in a corresponding PHY frame.

The data_version field may indicate a version of the WARN message (or WARN data) transmitted through the PLP.

Figure 94:
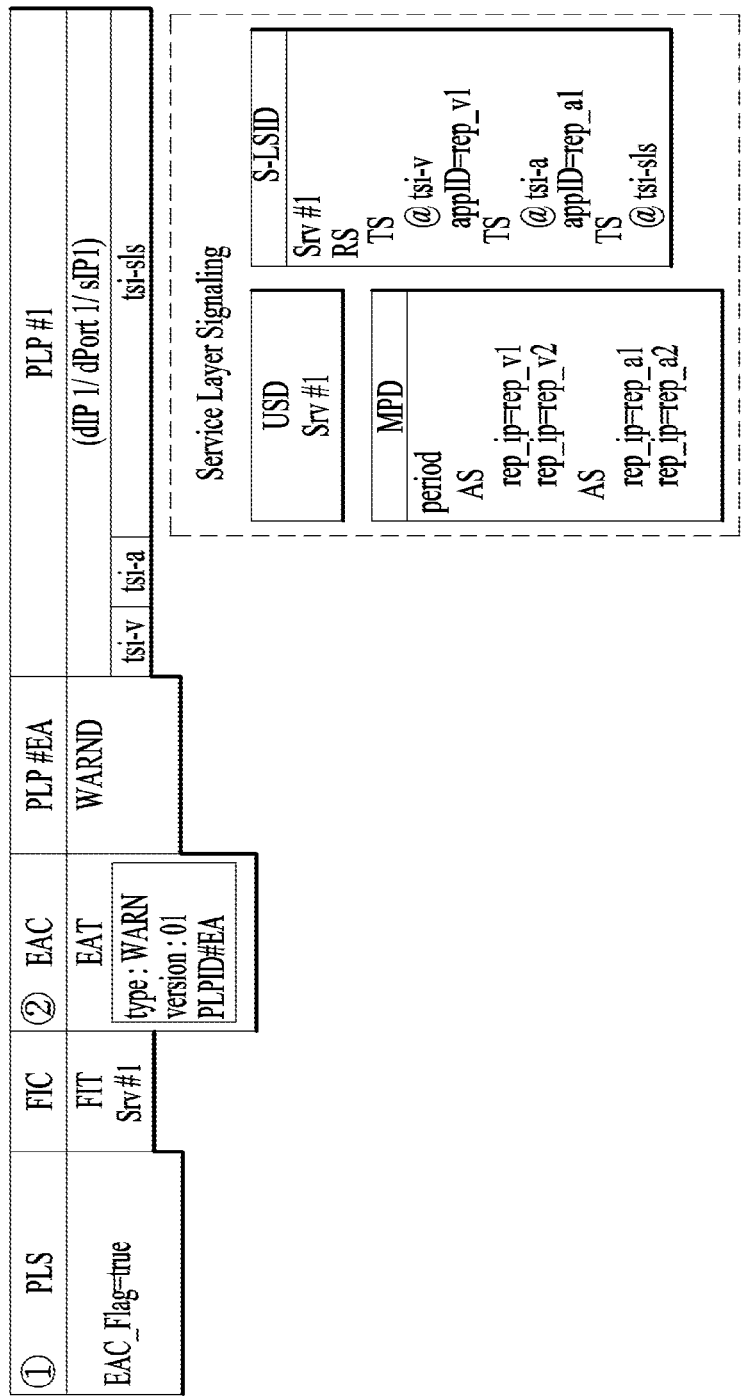
FIG. 94 is a diagram illustrating a form in which signaling information for a WARN message is transmitted through an EAC according to an embodiment of the present invention.

FIG. 94 is a diagram illustrating a form in which signaling information for a WARN message is transmitted through an EAC according to an embodiment of the present invention.

A broadcast transmitter according to an embodiment of the present invention may transmit PLS, an FIT (or SLT), an EAT, an emergency alert message, service data, and SLS. The FIT (or SLT), the service data, and the SLS are the same as described above. Hereinafter, differences will be mainly described.

The PLS according to the present embodiment may include signaling information for the WARN message. The PLS may include an EAC_Flag field. The signaling information included in the PLS is the same as described above. For example, the EAC_Flag field may have a value of "true" to indicate that an EAC is present in a corresponding PHY frame. That is, most signaling information for the WARN message may be transmitted through the EAC, and the WARN message may be transmitted through LLS.

The EAT according to the present embodiment may be transmitted through the EAC. The EAT may indicate a type and a transmission path of the emergency alert message. The EAT may include an EA_data_type field, a data_version field, and/or a PLP_ID field.

For example, a value of the EA_data_type field may be "01", and the EA_data_type field may indicate that a data type of the emergency alert message is the "WARN message". In addition, the data_version field may indicate that a version of the WARN message (or WARN data) transmitted through a PLP is "01". In addition, the PLP_ID field may indicate that an ID of the PLP that transmits the WARN message in a corresponding PHY frame is "#EA".

The WARN message according to the present embodiment may be transmitted in a link layer packet. The WARN message may be transmitted through a general PLP (or general data pipe). An ID of the general PLP through which the WARN message is transmitted may be "#EA" which is indicated by the PLP_ID field.

FIG. 95 is a diagram illustrating PLS that includes signaling information for a WARN message according to an embodiment of the present invention.

The WARN message according to the present embodiment may be transmitted through an LCT session. In addition, the signaling information for the WARN message may be included in the PLS. For example, the PLS may include information about a path through which the WARN message is transmitted and attribute information of the WARN message.

Referring to the figure, the PLS may include at least one of a num_EA_data field, an EA_data_Type field, a WARN_data_version field, a WARN_data_target field, a sourceIPaddress field, a destIPaddress field, a destPort field, a tsi field, a PLP_ID field, a WARN_data_Length field, and/or a CAP_message_info( ) field.

The num_EA_data field may indicate the number of transmitted emergency alert messages (or emergency alert data). A "for" loop subsequent to the num_EA_data field may include content related to emergency alert data, the number of which is indicated by a value of the num_EA_data field.

The EA_data_Type field may indicate a type of an emergency alert message. For example, when a value of the EA_data_Type field is "00", a type of an emergency alert message may be "WARN only". In this case, the emergency alert message may include only the WARN message. In addition, the PLS may include the WARN_data_version field, the WARN_data_target field, the sourceIPaddress field, the destIPaddress field, the destPort field, the tsi field, and the PLP_ID field.

In addition, when a value of the EA_data_Type field is "01", a type of an emergency alert message may be "WARN+CAP". In this case, the emergency alert message may include the WARN message and the CAP message. In addition, the PLS may include the WARN_data_version field, the WARN_data_target field, the sourceIPaddress field, the destIPaddress field, the destPort field, the tsi field, the PLP_ID field, the WARN_data_Length field, and the CAP_message_info( ) field.

In addition, when a value of the EA_data_Type field is "10", a type of an emergency alert message may be "CAP only". In this case, the emergency alert message may include only the CAP message. In addition, the PLS may include the CAP_message_info( ) field.

The WARN_data_version field may indicate a version of a transmitted WARN message (or WARN data).

The WARN_data_target field may indicate target information of the transmitted WARN message (or WARN data).

The sourceIPaddress field may indicate a source IP address of a session in which the WARN message is transmitted.

The destIPaddress field may indicate a destination IP address of a session in which the WARN message is transmitted.

The destPort field may indicate a destination port number of a session in which the WARN message is transmitted.

The tsi field may indicate an ID of an LCT session through which the WARN message is transmitted.

The PLP_ID field may indicate an ID of a PLP through which the WARN message is transmitted.

The WARN_data_Length field may indicate length information of the WARN message.

The CAP_message_info( ) field may include CAP message information. For example, the CAP_message_info( ) field may include at least one of a message_id field that identifies a CAP_message_info( ) field message and/or a CAP message encoding type field that indicates an encoding type of the CAP message.

Figure 96:
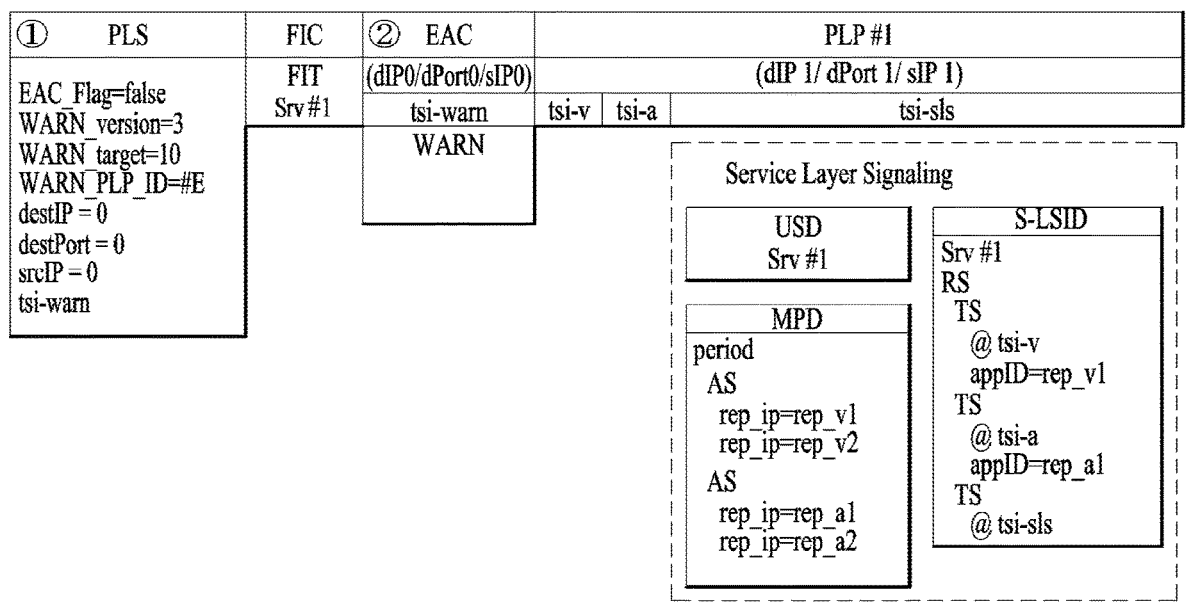
FIG. 96 is a diagram illustrating a form in which a WARN message is transmitted through an LCT session according to an embodiment of the present invention.

FIG. 96 is a diagram illustrating a form in which a WARN message is transmitted through an LCT session according to an embodiment of the present invention.

A broadcast transmitter according to an embodiment of the present invention may transmit PLS, an FIT (or SLT), an emergency alert message, service data, and SLS. The FIT (or SLT), the service data, and the SLS are the same as described above. Hereinafter, differences will be mainly described.

The PLS according to the present embodiment may include signaling information for the WARN message. The PLS may include at least one of an EAC_Flag field, a WARN_data_version field, a WARN_data_target field, a WARN_PLP_ID field, a sourceIPaddress field, a destIPaddress field, a destPort field, and/or a tsi field. The signaling information included in the PLS is the same as described above.

For example, the EAC_Flag field may have a value of "false" to indicate that an EAC is not present in a corresponding PHY frame. That is, the WARN message may not be transmitted through an EAC, and the WARN message may be transmitted through the LCT session.

In addition, the WARN_data_version field may have a value of "3".

In addition, the WARN_data_target field may have a value of "10" to indicate that target information of the WARN message is "Presidential Alerts via geographically-targeted".

In addition, the WARN_PLP_ID field may have a value of "#E" to indicate that an ID of a PLP that transmits the WARN message is "#E".

In addition, the sourceIPaddress field may have a value of "0", the destIPaddress field may have a value of "0", and the destPort field may have a value of "0". The sourceIPaddress field, the destIPaddress field, and the destPort field may uniquely identify a session (or ROUTE session) through which the WARN message is transmitted.

In addition, the tsi field may have a value of "tsi-warn" to indicate that an ID of an LCT session through which the WARN message is transmitted is "tsi-warn".

The WARN message according to the present embodiment may be transmitted through the LCT session. One ROUTE session may include at least one LCT session. The ROUTE session may be transmitted through at least one PLP. For example, signaling information that indicates a path through which the WARN message is transmitted may be included in the PLS. The WARN message may be transmitted through a PLP, a ROUTE session, and/or an LCT session identified by the signaling information included in the PLS. A ROUTE session through which the WARN message is transmitted may be different from a ROUTE session through which service data and/or SLS is transmitted. In addition, a PLP through which the WARN message is transmitted may be different from a PLP through which service data and/or SLS is transmitted.

FIG. 97 is a diagram illustrating an EAT in a case in which signaling information for a WARN message is transmitted through an EAC according to an embodiment of the present invention.

The WARN message according to the present embodiment may be transmitted through an LCT session. In addition, the signaling information for the WARN message (for example, information about a path through which the WARN message is transmitted) may be included in the EAT of the EAC. In this case, signaling information for the EAC may be included in PLS.

Referring to the figure, the EAT according to the present embodiment may include at least one of a table_id field, a version_number field, a num_EA_data field, an EA_data_type field, a data_version field, a data_target field, a sourceIPaddress field, a destIPaddress field, a destPort field, a PLP_ID field, and/or a tsi field.

The table_id field may indicate an ID (or table ID) that identifies the EAT transmitted through the EAC.

The version_number field may indicate a version number of the EAT.

The num_EA_data field may indicate the number of emergency alert messages described in the EAT.

The EA_data_type field may indicate a data type of an emergency alert message described by the EAT. For example, when a value of the EA_data_type field is "01", the data type of the emergency alert message may indicate the "WARN message".

The data_version field may indicate a version of the WARN message which is transmitted through a PLP.

The data_target field may indicate target information of the transmitted WARN message.

The sourceIPaddress field may indicate a source IP address of a session through which the WARN message is transmitted.

The destIPaddress field may indicate a destination IP address of a session through which the WARN message is transmitted.

The destPort field may indicate a destination port number of a session through which the WARN message is transmitted.

The PLP_ID field may indicate a PLP identifier (or PLP_ID) that identifies a PLP which transmits the WARN message in a corresponding PHY frame.

The tsi field may indicate an ID of a transmitted LCT session of an LCT session in which the WARN message is transmitted.

Figure 98:
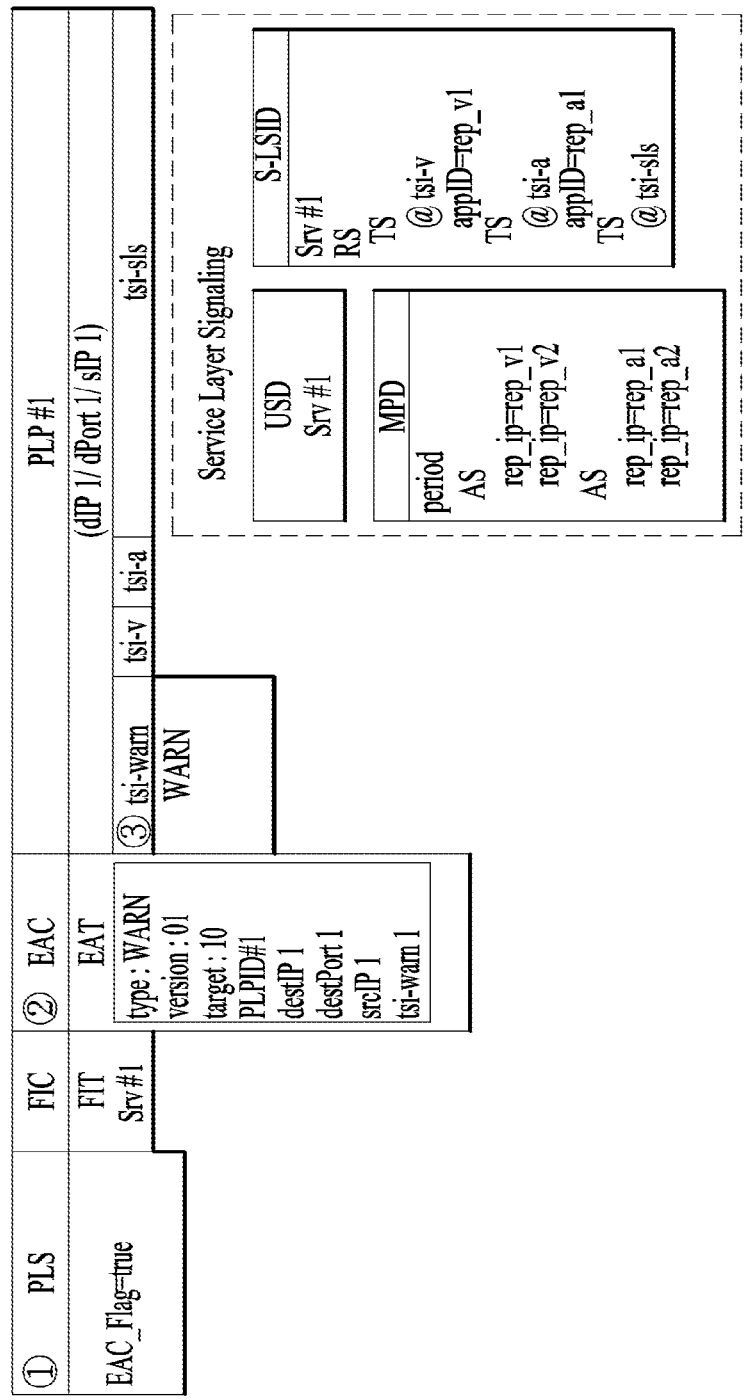
FIG. 98 is a diagram illustrating a form in which signaling information for a WARN message is transmitted through an EAC according to an embodiment of the present invention.

FIG. 98 is a diagram illustrating a form in which signaling information for a WARN message is transmitted through an EAC according to an embodiment of the present invention.

A broadcast transmitter according to an embodiment of the present invention may transmit PLS, an FIT (or SLT), an EAT, an emergency alert message, service data, and SLS. The FIT (or SLT), the service data, and the SLS are the same as described above. Hereinafter, differences will be mainly described.

The PLS according to the present embodiment may include signaling information for the EAC. The PLS may include an EAC_Flag field. The signaling information included in the PLS is the same as described above.

For example, the EAC_Flag field may have a value of "true" to indicate that an EAC is present in a corresponding PHY frame. That is, the signaling information for the WARN message may be transmitted through the EAT of the EAC, and the WARN message may be transmitted through an LCT session.

The EAT according to the present embodiment may be transmitted through the EAC. For example, the EAT may include at least one of an EA_data_type field, a data_version field, a data_target field, a sourceIPaddress field, a destIPaddress field, a destPort field, a PLP_ID field, and/or a tsi field.

A value of the EA_data_type field may be "00", and a type of the emergency alert message may be "WARN only". In this case, the emergency alert message may include only the WARN message.

In addition, a value of the data_version field may be "01".

In addition, a value of the data_target field may be "10", and target information of the WARN message may indicate "Presidential Alerts via geographically-targeted".

In addition, a value of the PLP_ID field may be "#1", and the PLP_ID field may indicate that an ID of a PLP that transmits the WARN message is "#E".

In addition, a value of the sourceIPaddress field may be "#1", a value of the destIPaddress field may be "#1", and a value of the destPort field may be "#1". The sourceIPaddress field, the destIPaddress field, and the destPort field may uniquely identify a ROUTE session through which the WARN message is transmitted.

In addition, a value of the tsi field may be "tsi-warn", and the tsi field may indicate that the WARN message is transmitted through an LCT session identified by "tsi-warn".

The WARN message according to the present embodiment may be transmitted through the LCT session.

Referring to the figure, the WARN message, the service data, and service layer signaling information may be transmitted through one ROUTE session (dIP1/dPort1/sIP1). The ROUTE session (dIP1/dPort1/sIP1) may be transmitted through one PLP (#1). In addition, the ROUTE session (dIP1/dPort1/sIP1) may include an LCT session (tsi-warn) that transmits the WARN message, an LCT session (tsi-v) that transmits a video component, an LCT session (tsi-a) that transmits an audio component, and an LCT session (tsi-sls) that transmits the service layer signaling information.

Figure 99:
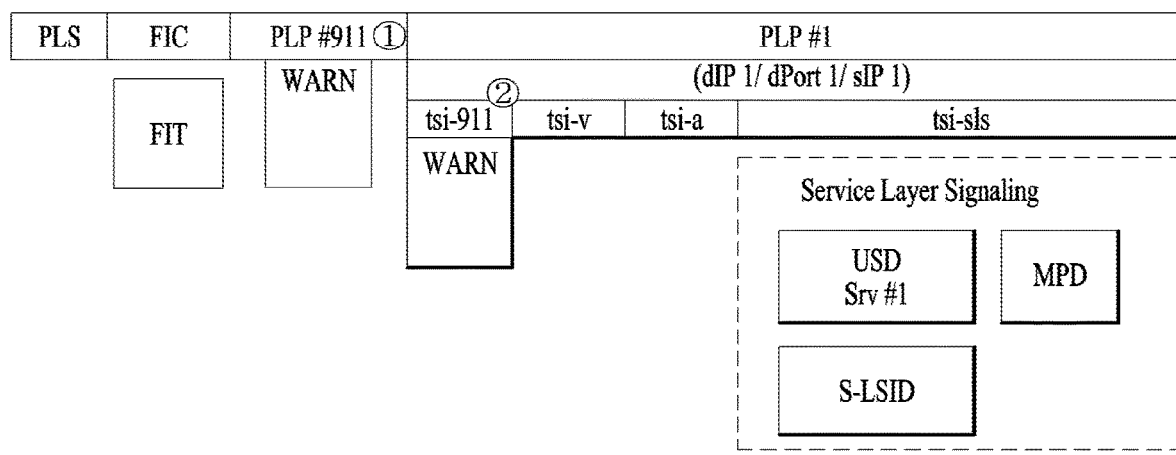
FIG. 99 is a diagram illustrating a form in which a WARN message is transmitted through a dedicated PLP or a dedicated LCT session according to an embodiment of the present invention.

FIG. 99 is a diagram illustrating a form in which a WARN message is transmitted through a dedicated PLP or a dedicated LCT session according to an embodiment of the present invention.

An embodiment of the present invention may use a PLP_ID designated for Private Data Stream Delivery, a designated LCT session ID, or an ID value that may be assigned to a corresponding protocol.

For example, the WARN message may be transmitted through a dedicated PLP in which a value of a PLP_ID is "#911". In addition, the WARN message may be transmitted through a dedicated LCT session in which a value of an LCT session ID is "tsi-911". When the WARN message is transmitted through the dedicated PLP or the dedicated LCT session, the broadcast receiver may receive the WARN message transmitted through the dedicated PLP or the dedicated LCT session, and immediately process the WARN message.

Figure 100:
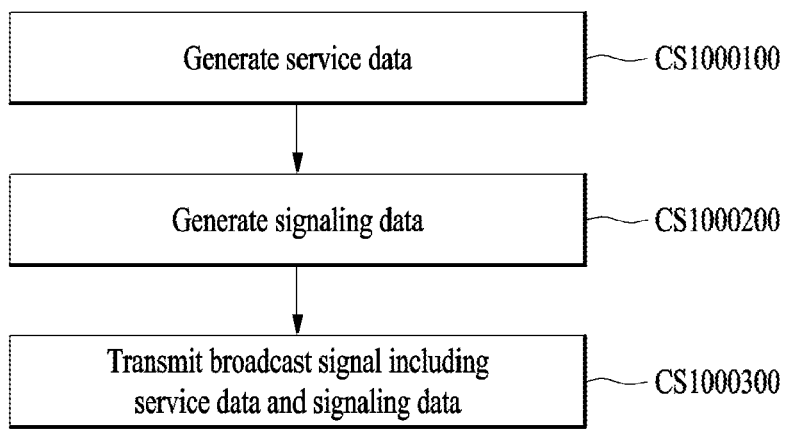
FIG. 100 is a diagram illustrating a broadcast transmission method according to an embodiment of the present invention.

FIG. 100 is a diagram illustrating a broadcast transmission method according to an embodiment of the present invention.

A broadcast transmitter according to an embodiment of the present invention may include a controller and/or a transmitting unit.

The broadcast transmitter according to the present embodiment may generate service data using the controller (CS1000100).

Then, the broadcast transmitter according to the present embodiment may generate signaling data using the controller (CS1000200).

Then, the broadcast transmitter according to the present embodiment may transmit a broadcast signal including the service data and the signaling data using the transmitting unit (CS1000300).

The broadcast transmitter may encapsulate an emergency alert message and the signaling data in a link layer packet using the controller. In addition, the broadcast transmitter may transmit a broadcast signal including the link layer packet.

The signaling data may include bootstrapping information that supports bootstrapping of service acquisition. For example, the signaling data may include low level signaling data, and the low level signaling data may include an FIT and/or an SLT.

The signaling data may include a broadcaster ID that identifies a broadcaster related to a service. For example, the broadcaster ID included in the signaling data may refer to a partition_id field included in the FIT and/or the SLT.

The emergency alert message may include a broadcaster ID that identifies a broadcaster related to the emergency alert message. For example, the broadcaster ID included in the emergency alert message may refer to a partition_id field included in an EAT.

According to an embodiment of the present invention, the partition_id field included in the FIT and/or the SLT may be matched to the partition_id field included in the EAT.

Therefore, the broadcast receiver may receive the emergency alert message based on the partition_id field included in the FIT and/or the SLT and the partition_id field included in the EAT.

The signaling data may further include category information that indicates a category of the service. For example, the category information may refer to a service_category field. For example, the service_category field may indicate one of an A/V service, an audio service, an ESG service, a Content on Demand (CoD) service, an app-based service, and/or an emergency alert message (EAM) service (or EAS service).

The signaling data may further include the emergency alert message. For example, the emergency alert message may be transmitted through link layer signaling. In addition, the emergency alert message may be included in the signaling data and transmitted.

The emergency alert message may further include a message ID that identifies the emergency alert message. For example, the message ID may refer to an EAS_message_id field.

The link layer packet may include a header and a payload. In addition, the header may include a first header having a fixed length and a second header having a variable length. In addition, the first header may include type information that indicates a packet type of input data, and the first header may further include configuration information that indicates a configuration of the payload. For example, the type information may refer to a packet type field. In addition, the configuration information may refer to a payload_config field.

A broadcast signal according to an embodiment of the present invention may be shared by a plurality of broadcasters. That is, the broadcasters may use a portion of the broadcast signal or the whole broadcast signal to broadcast a service. For example, the plurality of broadcasters may share one frequency.

In addition, the broadcast signal may include a plurality of emergency alert messages transmitted from the plurality of broadcasters.

For example, the plurality of broadcasters may include a first broadcaster and a second broadcaster. An emergency alert message transmitted from the second broadcaster may include an emergency alert message for the first broadcaster.

Even when the broadcast receiver provides a service transmitted from the first broadcaster to a user, the broadcast receiver may provide the emergency alert message transmitted from the second broadcaster to the user.

Figure 101:
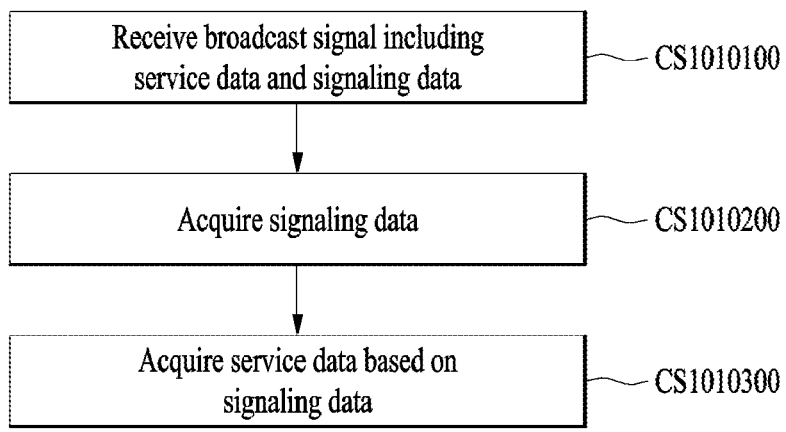
FIG. 101 is a diagram illustrating a broadcast reception method according to an embodiment of the present invention.

FIG. 101 is a diagram illustrating a broadcast reception method according to an embodiment of the present invention.

A broadcast receiver according to an embodiment of the present invention may include a controller and/or a broadcast receiving unit.

The broadcast receiver according to the embodiment of the present invention may receive a broadcast signal including service data and signaling data using the broadcast receiving unit (CS1010100).

The broadcast receiver according to the embodiment of the present invention may acquire the signaling data using the controller (CS1010200).

Then, the broadcast receiver according to the embodiment of the present invention may acquire the service data based on the signaling data using the controller (CS1010300).

In addition, the broadcast receiver may receive a broadcast signal including a link layer packet. Then, the broadcast receiver may decapsulate the link layer packet into an emergency alert message and the signaling data using the controller.

The signaling data may include bootstrapping information that supports bootstrapping of service acquisition. For example, the signaling data may include low level signaling information, and the low level signaling information may include an FIT and/or an SLT.

The signaling data may include a broadcaster ID that identifies a broadcaster related to a service. For example, the broadcaster ID included in the signaling data may refer to a partition_id field included in the FIT and/or the SLT.

The emergency alert message may include a broadcaster ID that identifies a broadcaster related to the emergency alert message. For example, the broadcaster ID included in the emergency alert message may refer to a partition_id field included in an EAT.

According to an embodiment of the present invention, the partition_id field included in the FIT and/or the SLT may match the partition_id field included in the EAT. Therefore, the broadcast receiver may receive the emergency alert message based on the partition id field included in the FIT and/or the SLT and the partition_id field included in the EAT.

The signaling data may further include category information that indicates a category of the service. For example, the category information may refer to a service_category field. For example, the service_category field may indicate one of an A/V service, an audio service, an ESG service, a CoD service, an app-based service, and/or an EAM service (or EAS service).

The signaling data may further include the emergency alert message. For example, the emergency alert message may be transmitted through link layer signaling. In addition, the emergency alert message may be included in the signaling data and transmitted.

The emergency alert message may further include a message ID that identifies the emergency alert message. For example, the message ID may refer to an EAS_message_id field.

The link layer packet may include a header and a payload. In addition, the header may include a first header having a fixed length and a second header having a variable length. In addition, the first header may include type information that indicates a packet type of input data, and the first header may further include configuration information that indicates a configuration of the payload. For example, the type information may refer to a packet type field. In addition, the configuration information may refer to a payload_config field.

A broadcast signal according to an embodiment of the present invention may be shared by a plurality of broadcasters. That is, a broadcaster may use a portion of the broadcast signal or the whole broadcast signal to broadcast a service. For example, the plurality of broadcasters may share one frequency.

In addition, the broadcast signal may include a plurality of emergency alert messages transmitted from the plurality of broadcasters.

For example, the plurality of broadcasters may include a first broadcaster and a second broadcaster. An emergency alert message transmitted from the second broadcaster may include an emergency alert message for the first broadcaster.

Even when the broadcast receiver provides a service transmitted from the first broadcaster to a user, the broadcast receiver may provide the emergency alert message transmitted from the second broadcaster to the user.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

Various embodiments have been described in the best mode for carrying out the invention.

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

What is claimed is:

1. A method of processing a broadcast signal, comprising:
physical layer processing a plurality of data pipes to form a signal frame of the broadcast signal, wherein:
a data pipe carries an emergency alert message, the emergency alert message including a message identifier (ID) for identifying the emergency alert message and a service ID identifying a service related to the emergency alert message,
the physical layer processing further includes:
encoding data in each data pipe;
bit interleaving the encoded data in each data pipe; and
time interleaving the bit interleaved data in each data pipe according to a first mode or a second mode,
the first mode represents that the time interleaving is performed based on a convolutional interleaving operation,
the second mode represents that the time interleaving is performed based on a block interleaving operation and a convolutional interleaving operation; and
transmitting the broadcast signal,
wherein the broadcast signal further includes physical layer signaling information, the physical layer signaling information including signaling information for the data pipe carrying the emergency alert message and time interleaving signaling information related to the first mode or the second mode.

2. The method of claim 1, wherein the broadcast signal further includes:
access information to access emergency alert service information that is transmitted via a broadband that is different from the broadcast signal.

3. A device of processing a broadcast signal, comprising:
a physical layer processor configured to process a plurality of data pipes to form a signal frame of the broadcast signal, wherein:
a data pipe carries an emergency alert message, the emergency alert message including a message identifier (ID) for identifying the emergency alert message and a service ID identifying a service related to the emergency alert message,
the physical layer processor is further configured to:
encode data in each data pipe;
bit interleave the encoded data in each data pipe; and
time interleave the bit interleaved data in each data pipe according to a first mode or a second mode,
the first mode represents that the time interleaving is performed based on a convolutional interleaving operation,
the second mode represents that the time interleaving is performed based on a block interleaving operation and convolutional interleaving operation; and
a transmitter configured to transmit the broadcast signal,
wherein the broadcast signal further includes physical layer signaling information, the physical layer signaling information including signaling information for the data pipe carrying the emergency alert message and time interleaving signaling information related to the first mode or the second mode.

4. The device of claim 3, wherein the broadcast signal further includes:
access information to access emergency alert service information that is transmitted via a broadband that is different from the broadcast signal.

5. A method of processing a broadcast signal, comprising:
receiving the broadcast signal carrying a signal frame, the signal frame including a plurality of data pipes and physical layer signaling information; and
physical layer processing the physical layer signaling information and data in the plurality of data pipes, the physical layer processing including:
decoding the physical layer signaling information, wherein:
the physical layer signaling information include signaling information for a data pipe carrying an emergency alert message for an emergency service, time interleaving signaling information related to a first mode or a second mode of time interleaving operation,
the first mode represents that the time interleaving operation includes a convolutional interleaving operation, and the second mode represents that the time interleaving operation includes a convolutional interleaving operation and a block interleaving operation;
processing data in the data pipe based on the signaling information in order to output the emergency alert message, the processing including:
time deinterleaving data in the data pipe based on the time interleaving signaling information;
bit deinterleaving the time deinterleaved data in the data pipe; and
decoding the bit deinterleaved data in the data pipe, wherein:
the emergency alert message including a message identifier (ID) for identifying the emergency alert message and a service ID identifying a service related to the emergency alert message.

6. The method of claim 5, wherein the broadcast signal further includes:

access information to access emergency alert service information that is received via a broadband that is different from the broadcast signal.

7. A device of processing a broadcast signal, comprising:

a tuner configured to receive the broadcast signal carrying a signal frame, the signal frame including a plurality of data pipes and physical layer signaling information; and a physical layer processor configured to process the physical layer signaling information and data in the plurality of data pipes, wherein the physical layer processor is further configured to:

decode the physical layer signaling information, the physical layer signaling information including signaling information for a data pipe carrying an emergency alert message for an emergency service, and time interleaving signaling information related to a first mode or a second mode of time interleaving operation, the first mode represents that the time interleaving operation includes a convolutional interleaving operation, and the second mode represents that the time interleaving operation includes a convolutional interleaving operation and a block interleaving operation, wherein the physical layer processor is further configured to perform processing data in the data pipe based on the signaling information in order to output the emergency alert message, the processing including:

time deinterleaving data in the data pipe based on the time interleaving signaling information;

bit deinterleaving the time deinterleaved data in the data pipe; and decoding the bit deinterleaved data in the data pipe, wherein:

the emergency alert message including a message identifier (ID) for identifying the emergency alert message and a service ID identifying a service related to the emergency alert message.

8. The device of claim 7, wherein the broadcast signal further includes:

access information to access emergency alert service information that is received via a broadband that is different from the broadcast signal.

* * * * *